United States Patent
Cirik et al.

(10) Patent No.: US 12,317,211 B2
(45) Date of Patent: May 27, 2025

(54) MAINTENANCE OF MULTIPLE TIMING ADVANCE GROUPS

(71) Applicant: Ofinno, LLC, Reston, VA (US)

(72) Inventors: Ali Cagatay Cirik, Chantilly, VA (US); Gautham Prasad, Herndon, VA (US); Esmael Hejazi Dinan, McLean, VA (US); Hua Zhou, Vienna, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

(21) Appl. No.: 18/638,224

(22) Filed: Apr. 17, 2024

(65) Prior Publication Data

US 2024/0267866 A1 Aug. 8, 2024

Related U.S. Application Data

(63) Continuation of application No. PCT/US2023/019527, filed on Apr. 24, 2023.
(Continued)

(51) Int. Cl.
*H04W 56/00* (2009.01)
*H04L 1/1812* (2023.01)
(Continued)

(52) U.S. Cl.
CPC ....... *H04W 56/0045* (2013.01); *H04L 1/1812* (2013.01); *H04W 72/11* (2023.01);
(Continued)

(58) Field of Classification Search
CPC . H04W 56/0045; H04W 76/20; H04W 72/11; H04W 72/232; H04W 72/1273; H04L 1/1812; H04L 56/00
See application file for complete search history.

(56) References Cited

U.S. PATENT DOCUMENTS

| 11,252,762 B2 | 2/2022 | Dinan |
| 11,291,072 B2 | 3/2022 | Dinan |

(Continued)

FOREIGN PATENT DOCUMENTS

| CN | 116782303 A | 9/2023 |
| CN | 117296255 A | 12/2023 |
| WO | 2023/159365 A1 | 8/2023 |

OTHER PUBLICATIONS

3GPP TS 36.133 V12.13.0 (Sep. 2016); Technical Specification; 3rd Generation Partnership Project; Technical Specification Group Radio Access Network; Evolved Universal Terrestrial Radio Access (E-UTRA); Requirements for support of radio resource management; (Release 12).
(Continued)

*Primary Examiner* — Chi Ho A Lee
(74) *Attorney, Agent, or Firm* — Jacob L. Mangan; Kavon Nasabzadeh; Brett K. Gardner

(57) ABSTRACT

A wireless device may receive one or more messages indicating at least two timing advance groups (TAGs) for a cell, wherein each TAG of the at least two TAGs is associated with a respective transmission configuration indicator (TCI) state. A wireless device may receive downlink control information (DCI). The DCI may indicate a semi-persistent scheduling (SPS) deactivation and an uplink resource of a hybrid automatic repeat request acknowledgement (HARQ-ACK) feedback. The wireless device may indicate, to a physical layer of the wireless device, a positive acknowledgement for the SPS deactivation in response to a time alignment timer of a TAG, among the at least two TAGs and associated with a TCI state used for transmitting the HARQ-ACK feedback, being running. The wireless device may transmit, via the cell and based on the TCI state, the
(Continued)

HARQ-ACK feedback comprising the positive acknowledgement.

20 Claims, 21 Drawing Sheets

Related U.S. Application Data

(60) Provisional application No. 63/334,985, filed on Apr. 26, 2022.

(51) Int. Cl.
  *H04W 72/11* (2023.01)
  *H04W 72/1273* (2023.01)
  *H04W 72/232* (2023.01)
  *H04W 76/20* (2018.01)

(52) U.S. Cl.
  CPC ..... *H04W 72/1273* (2013.01); *H04W 72/232* (2023.01); *H04W 76/20* (2018.02)

(56) References Cited

U.S. PATENT DOCUMENTS

| | | | |
|---|---|---|---|
| 2019/0081750 A1* | 3/2019 | Yang | H04L 5/0082 |
| 2019/0174466 A1* | 6/2019 | Zhang | H04L 5/0057 |
| 2019/0246447 A1 | 8/2019 | Dinan | |
| 2020/0100201 A1* | 3/2020 | Farmanbar | H04W 56/0005 |
| 2020/0351841 A1 | 11/2020 | Cirik et al. | |
| 2021/0176797 A1 | 6/2021 | Kang et al. | |
| 2022/0040899 A1* | 2/2022 | Epstein | B29C 49/24 |
| 2022/0046679 A1* | 2/2022 | Yeo | H04L 1/1896 |
| 2022/0190969 A1* | 6/2022 | Wei | H04L 1/1854 |
| 2022/0304036 A1* | 9/2022 | Zhang | H04W 72/23 |
| 2022/0322398 A1* | 10/2022 | Tsai | H04W 72/1273 |
| 2022/0329363 A1* | 10/2022 | Lee | H04L 1/1854 |
| 2022/0330213 A1* | 10/2022 | Lee | H04L 1/1864 |
| 2023/0122786 A1* | 4/2023 | Bang | H04W 72/1268 370/329 |
| 2023/0188283 A1 | 6/2023 | Liu et al. | |
| 2023/0284287 A1 | 9/2023 | Kung et al. | |
| 2023/0319949 A1* | 10/2023 | Wang | H04W 72/02 370/328 |
| 2024/0023045 A1* | 1/2024 | Da Silva | H04W 36/249 |

OTHER PUBLICATIONS

3GPP TS 38.133 V17.5.0 (Mar. 2022); Technical Specification; 3rd Generation Partnership Project; Technical Specification Group Radio Access Network; NR; Requirements for support of radio resource management; (Release 17).
3GPP TS 38.211 V17.0.0 (Dec. 2021); Technical Specification; 3rd Generation Partnership Project; Technical Specification Group Radio Access Network; NR; Physical channels and modulation; (Release 17).
3GPP TS 38.212 V17.0.0 (Dec. 2021); Technical Specification; 3rd Generation Partnership Project; Technical Specification Group Radio Access Network; NR; Multiplexing and channel coding; (Release 17).
3GPP TS 38.213 V17.0.0 (Dec. 2021); Technical Specification; 3rd Generation Partnership Project; Technical Specification Group Radio Access Network; NR; Physical layer procedures for control (Release 17).
3GPP TS 38.214 V17.0.0 (Dec. 2021); Technical Specification; 3rd Generation Partnership Project; Technical Specification Group Radio Access Network; NR; Physical layer procedures for data; (Release 17).
3GPP TS 38.300 V16.7.0 (Sep. 2021); Technical Specification; 3rd Generation Partnership Project; Technical Specification Group Radio Access Network; NR; NR and NG-RAN Overall Description; Stage 2; (Release 16).
3GPP TS 38.306 V16.7.0 (Dec. 2021); Technical Specification; 3rd Generation Partnership Project; Technical Specification Group Radio Access Network; NR; User Equipment (UE) radio access capabilities; (Release 16).
3GPP TS 38.321 V0.0.3 (May 2017); Technical Specification; 3rd Generation Partnership Project; Technical Specification Group Radio Access Network; NR; Medium Access Control (MAC) protocol specification; (Release 15).
3GPP TS 38.321 V16.7.0 (Dec. 2021); Technical Specification; 3rd Generation Partnership Project; Technical Specification Group Radio Access Network; NR; Medium Access Control (MAC) protocol specification; (Release 16).
3GPP TS 38.321 V17.0.0 (Mar. 2022); Technical Specification; 3rd Generation Partnership Project; Technical Specification Group Radio Access Network; NR; Medium Access Control (MAC) protocol specification; (Release 17).
3GPP TS 38.331 V16.7.0 (Dec. 2021); Technical Specification; 3rd Generation Partnership Project; Technical Specification Group Radio Access Network; NR; Radio Resource Control (RRC) protocol specification; (Release 16).
R1-1707951; 3GPP TSG RAN WG1 Meeting#89; Hangzhou, China, May 15-19, 2017; Agenda item: 7.1.2.1.8; Source: Samsung; Title: Multi-TA procedures for Multi-TRP; Document for: Discussion and Decision.
R1-2006790; 3GPP TSG RAN WG1 Meeting #102-e; Aug. 17-28, 2020; Agenda item: 8.1.1; Source: Qualcomm Incorporated; Title: Enhancements on Multi-beam Operation; Document for: Discussion/Decision.
R1-2103014; 3GPP TSG RAN WG1 #104bis-e; e-Meeting, Apr. 12-20, 2021; Source: Intel Corporation; Title: Enhancements to Multi-Beam Operation; Agenda item: 8.1.1; Document for: Discussion and Decision.
R1-2103854; 3GPP TSG RAN WG1 #104b-e; e-Meeting, Apr. 12-20, 2021; Agenda item: 8.1.1; Source: Moderator (Samsung); Title: Moderator summary#2 for multi-beam enhancement: Round 1; Document for: Discussion and Decision.
R1-2106074; 3GPP TSG RAN WG1 #105-e; e-Meeting, May 19-May 27, 2021; Agenda item: 8.1.2.1; Source: Moderator (Nokia, Nokia Shanghai Bell); Title: Summary #2 of Multi-TRP PUCCH and PUSCH Enhancements; Document for: Discussion and Decision.
R2-082736; TSG-RAN WG2 Meeting #62; Kansas City, USA, May 5-9, 2008 (updated R2-082403); Source: Ericsson; Title: Handling of Timing Advance during RA; Agenda Item: 5.1.1.6; Document for: Discussion and decision.
R2-1704475; 3GPP TSG-RAN WG2 Meeting #98; Hangzhou, China, May 15-19, 2017; Agenda item: 10.3.1.1; Source: Samsung (Rapporteur); Title: Draft TS 38.321 v0.0.3; Document for: Endorsement.
R2-1712211; 3GPP TSG-RAN WG2 Meeting #100; Reno, USA, Nov. 27-Dec. 1, 2017; (Resubmission of R2-1711082); Agenda Item: 10.3.1.13; Source: ASUSTek; Title: Discussion on Timing Advance in NR; Document for: Discussion and Decision.
R2-1712376; 3GPP TSG-RAN2 #100; Reno, Nevada, Nov. 27-Dec. 1, 2017; Agenda Item: 10.3.1.13; Source: Xiaomi; Title: SUL impact on TA; Document for: Discussion and Decision.
R2-1712836; 3GPP TSG-RAN WG2 Meeting #100; Reno, USA, Nov. 27-Dec. 1, 2017; Agenda Item: 10.2.8; Souce: Samsung; Title: On the procedures for SUL; Document for: Discussion.
R2-1712868; 3GPP TSG-RAN WG2 #100; Reno, USA, Nov. 27-Dec. 1, 2017; Agenda item: 10.3.1.13; Source: Samsung; Title: Timing Advance to support SUL; Document for: Discussion & Decision.
R2-1713179; 3GPP TSG-RAN WG2#100; Reno, Nevada, USA, Nov. 27-Dec. 1, 2017; Revision of R2-1709273; Agenda Item: 10.3.1.13; Source: Huawei, HiSilicon; Title: Uplink TA maintenance with multi-beam operation; Document for: Discussion and decision.
R2-1713531; 3GPP TSG-RAN WG2 #100Tdoc; Reno, US, Nov. 27-Dec. 1, 2017; Agenda Item: 10.3.1.13; Source: Ericsson; Title: Aspects of Timing Advance; Document for: Discussion, Decision.
R2-1713924; 3GPP TSG-RAN WG2#100; Reno, Nevada, USA, Nov. 27-Dec. 1, 2017; Revision of R2-1709273; Agenda Item:

(56) References Cited

OTHER PUBLICATIONS 10.3.1.13; Source: Huawei, HiSilicon; Title: Uplink TA maintenance with multi-beam operation; Document for: Discussion and decision.
R2-1801701; 3GPP TSG-RAN WG2 meeting #101; Athens, Greece, Feb. 26-Mar. 2, 2018; Agenda Item: 2.2 Source: ETSI MCC; Title: Report of 3GPP TSG RAN2#100 meeting, Reno, Nevada, USA.
RP-213482; 3GPP TSG RAN#94e; e-Meeting, Dec. 6-17, 2021; Agenda item: 8A.1; Source: Samsung (moderator); Title: Moderator's summary for discussion [94e-02-R18-MIMO] MIMO Evolution for Downlink and Uplink; Document for: Discussion/Decision.
RP-213517; 3GPP TSG RAN Meeting #94e; Electronic Meeting, Dec. 6-17, 2021 (revision of RP-212701); Source: Samsung (Moderator); Title: New WID: MIMO Evolution for Downlink and Uplink; Document for: Approval; Agenda Item: 8A. 1.
RP-213539; 3GPP TSG RAN#94e; e-Meeting, Dec. 6-17, 2021; Agenda item: 8A.1; Source: Samsung (moderator); Title: Moderator's summary for discussion [94e-02-R18-MIMO] MIMO Evolution for Downlink and Uplink; Document for: Discussion/Decision.
RP-213598; 3GPP TSG RAN Meeting #94e; Electronic Meeting, Dec. 6-17, 2021; (revision of RP-213517); Source: Samsung (Moderator); Title: New WID: MIMO Evolution for Downlink and Uplink; Document for: Approval; Agenda Item: 8A. 1.
[94e-02-R18-MIMO] MIMO Evolution for Downlink and Uplink—Version 0.0.6; Ran; 3GPP TSG RAN#94e; RP-213530; Electronic Meeting, Dec. 6-17, 2021; Agenda Item: 8A.1; Source: Samsung (moderator); Title: Moderator's summary for discussion [94e-02-R18-MIMO] MIMO Evolution for Downlink and Uplink; Document for: Information & Decision.
025; Variant of RAN94e-R18Prep-01 Version 0.0.114; RAN; 3GPP TSG RAN Meeting #94-e; RP-212661; Electronic Meeting, Dec. 6-17, 2021; Source: Moderator(CMCC); Title: Moderator's summary of discussion for [RAN94e-R18Prep-01] MIMO Evolution for Downlink and Uplink; Agenda item: 8A. 1; Document for: Report.
[94e-02-R18-MIMO] MIMO Evolution for Downlink and Uplink—intermediate round summary; Variant of [94e-02-R18-MIMO] MIMO Evolution for Downlink and Uplink Version 0.0.3; RAN; 3GPP TSG RAN#94e; RP-213530; Electronic Meeting, Dec. 6-17, 2021; Agenda Item: 8A.1; Source: Samsung (moderator); Title: Moderator's summary for discussion [94e-02-R18-MIMO] MIMO Evolution for Downlink and Uplink; Document for: Information & Decision.
International Search Report and Written Opinion of the International Searching Authority mailed Sep. 7, 2023, in International Application No. PCT/US2023/019527.
R2-2007739; 3GPP TSG-RAN WG2 Meeting #111 electronic; Online, Aug. 17-28, 2020; Revision of R2-2005571; Agenda Item: 7.3.3; Source: ASUSTek; Title: HARQ feedback in RRC_IDLE; Document for: Discussion and Decision.

\* cited by examiner

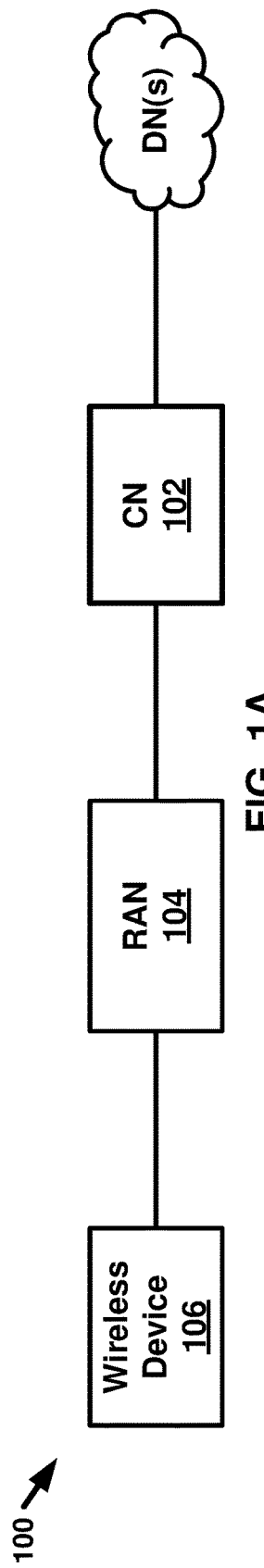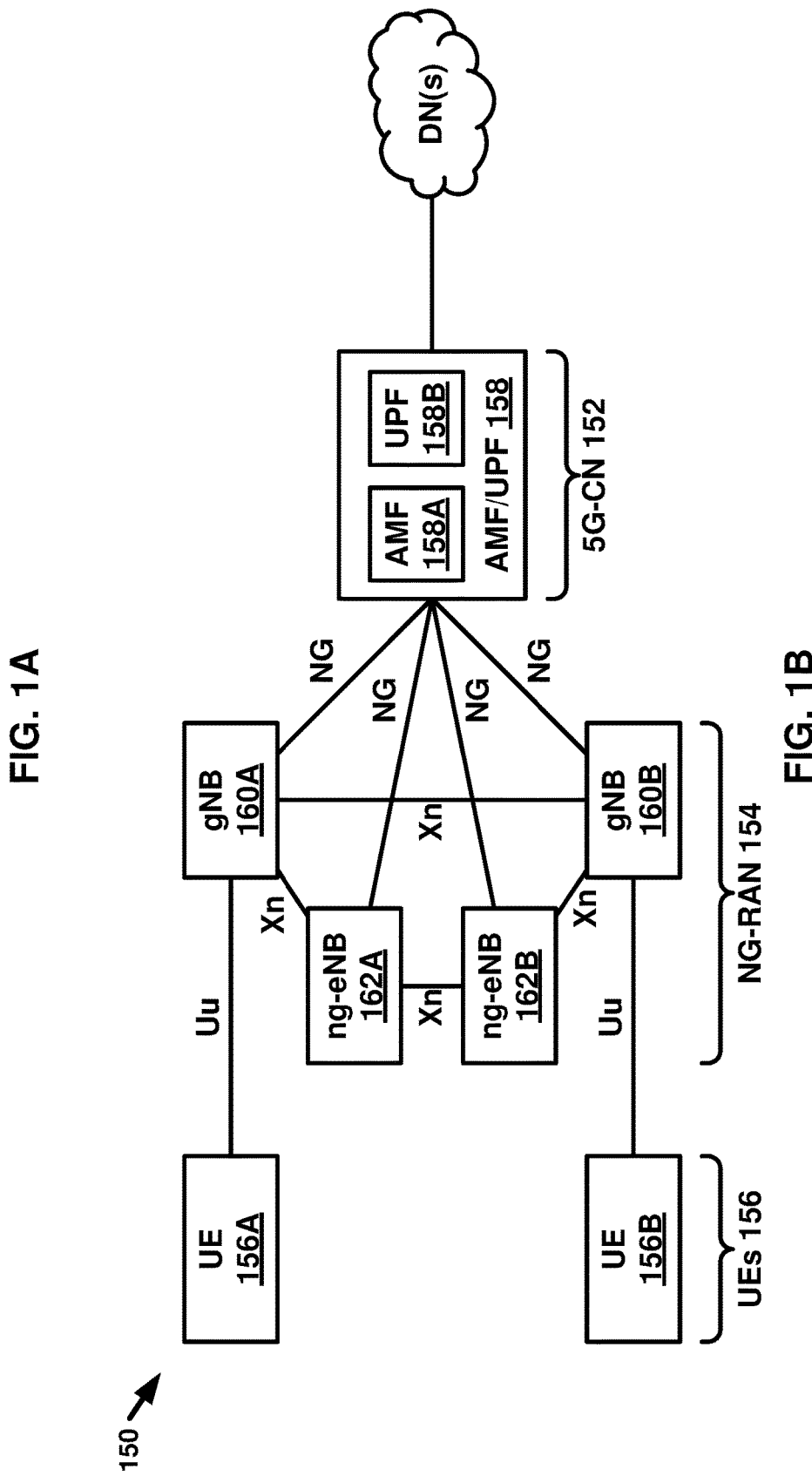

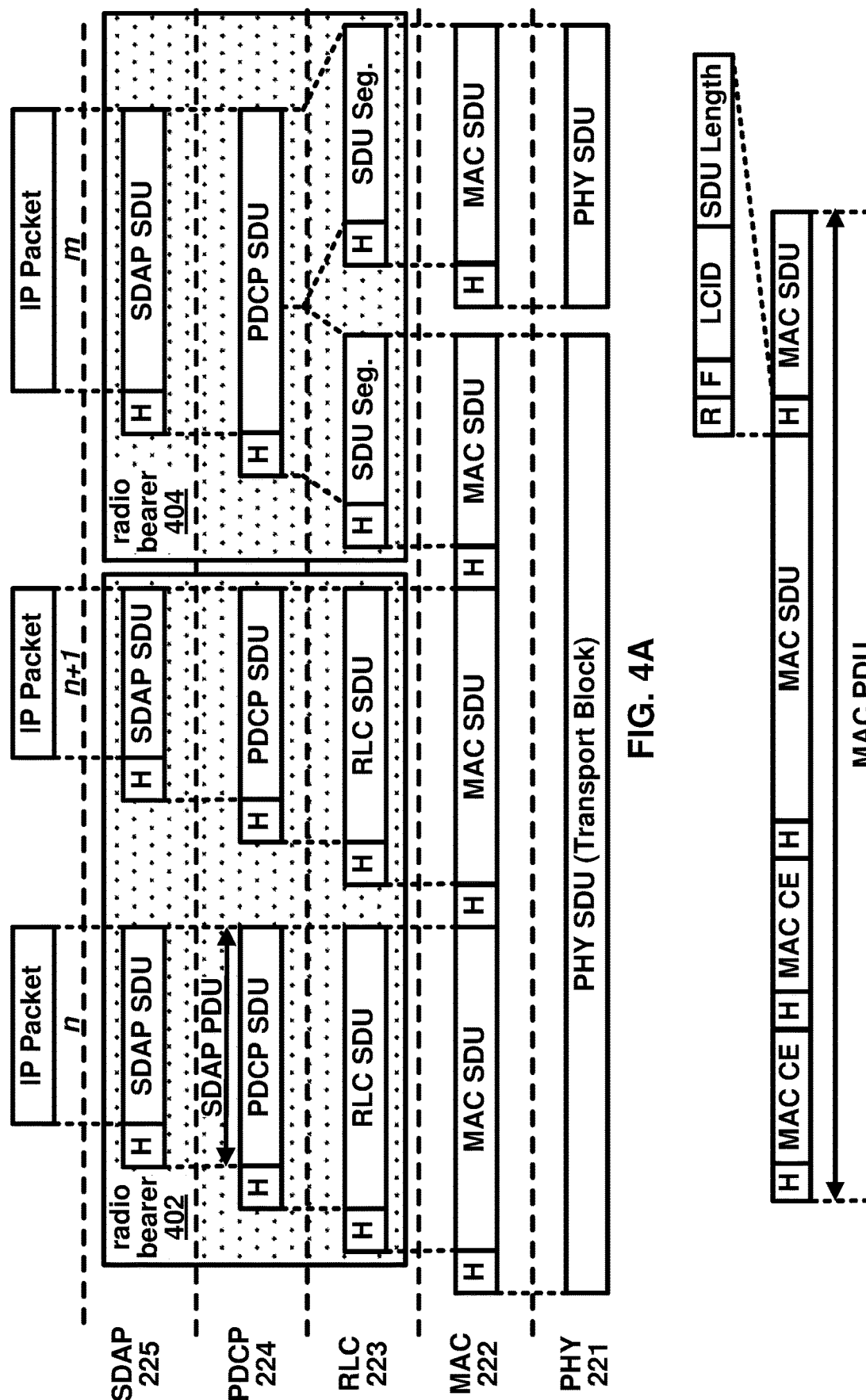

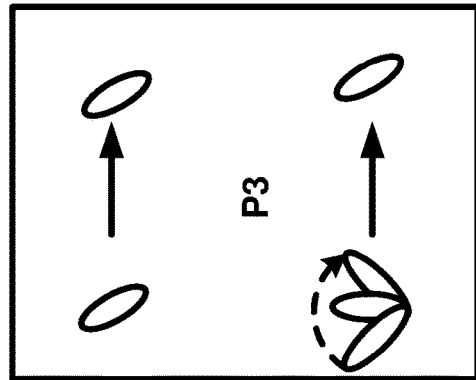
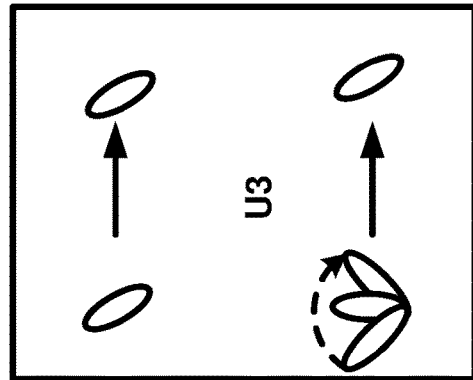
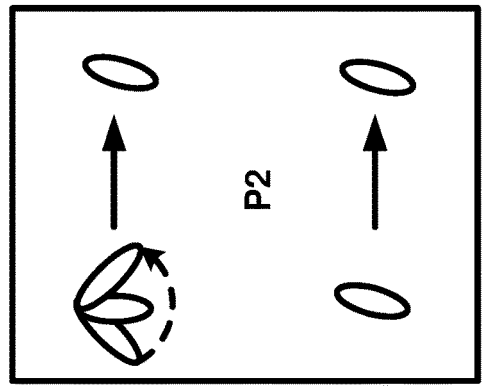
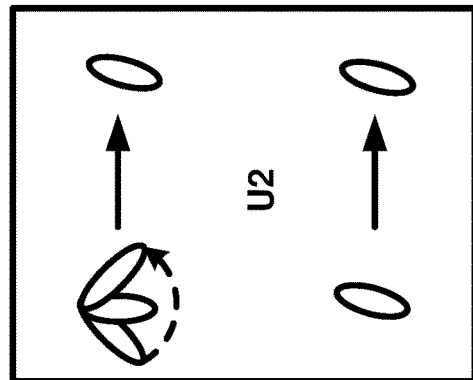
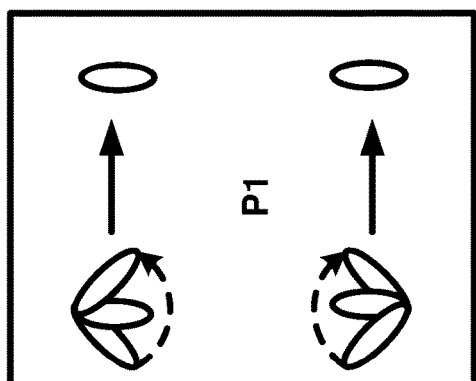
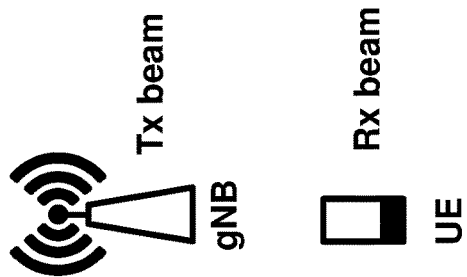
FIG. 12A
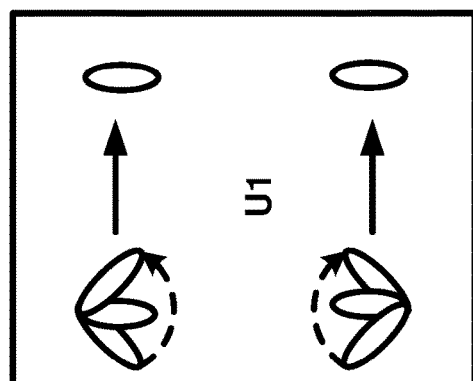
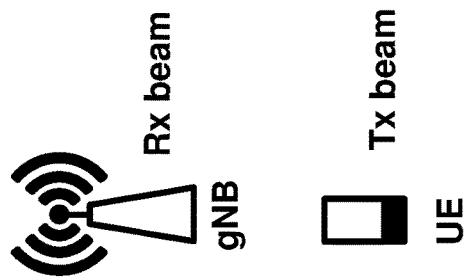
FIG. 12B

MAINTENANCE OF MULTIPLE TIMING ADVANCE GROUPS

CROSS-REFERENCE TO RELATED APPLICATIONS

This application is a continuation of International Application No. PCT/US2023/019527, filed Apr. 24, 2023, which claims the benefit of U.S. Provisional Application No. 63/334,985, filed Apr. 26, 2022, all of which are hereby incorporated by reference in their entireties.

BRIEF DESCRIPTION OF THE DRAWINGS

Examples of several of the various embodiments of the present disclosure are described herein with reference to the drawings.

FIG. 1A and FIG. 1B illustrate example mobile communication networks in which embodiments of the present disclosure may be implemented.

FIG. 4A illustrates an example downlink data flow through the NR user plane protocol stack of FIG. 2A.

FIG. 4B illustrates an example format of a MAC subheader in a MAC PDU.

FIG. 12A and FIG. 12B respectively illustrate examples of three downlink and uplink beam management procedures.

DETAILED DESCRIPTION

Figure 2A:
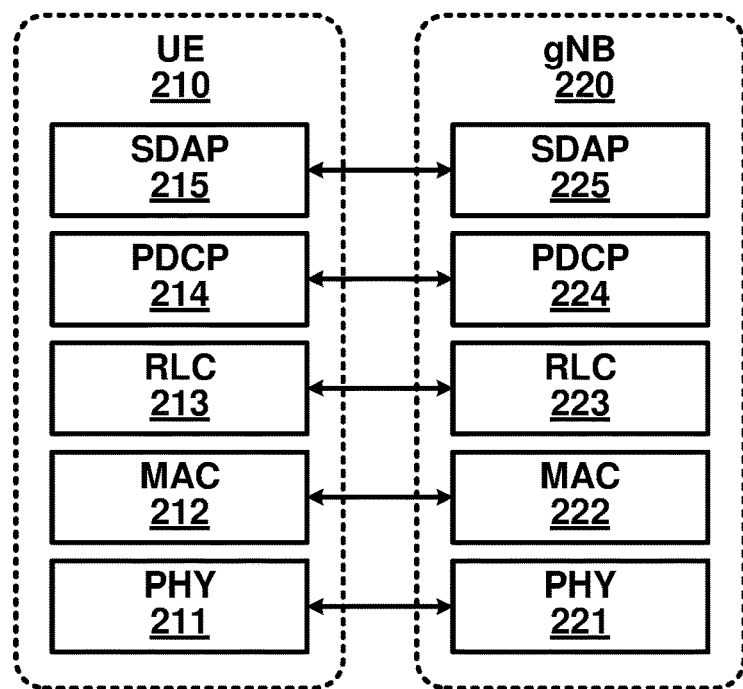
FIG. 2A and FIG. 2B respectively illustrate a New Radio (NR) user plane and control plane protocol stack.

In the present disclosure, various embodiments are presented as examples of how the disclosed techniques may be implemented and/or how the disclosed techniques may be practiced in environments and scenarios. It will be apparent to persons skilled in the relevant art that various changes in form and detail can be made therein without departing from the scope. In fact, after reading the description, it will be apparent to one skilled in the relevant art how to implement alternative embodiments. The present embodiments should not be limited by any of the described exemplary embodiments. The embodiments of the present disclosure will be described with reference to the accompanying drawings. Limitations, features, and/or elements from the disclosed example embodiments may be combined to create further embodiments within the scope of the disclosure. Any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, those wireless devices or base stations may perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed by one or more of the various embodiments. The terms "comprises" and "consists of", as used herein, enumerate one or more components of the element being described. The term "comprises" is interchangeable with "includes" and does not exclude unenumerated components from being included in the element being described. By contrast, "consists of" provides a complete enumeration of the one or more components of the element being described. The term "based on", as used herein, should be interpreted as "based at least in part on" rather than, for example, "based solely on". The term "and/or" as used herein represents any possible combination of enumerated elements. For example, "A, B, and/or C" may represent A; B; C; A and B; A and C; B and C; or A, B, and C.

If A and B are sets and every element of A is an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many features presented are described as being optional through the use of "may" or the use of parentheses. For the sake of brevity and legibility, the present disclosure does not explicitly recite each and every permutation that may be obtained by choosing from the set of optional features. The present disclosure is to be interpreted as explicitly disclosing all such permutations. For example, a system described as having three optional features may be embodied in seven ways, namely with just one of the three possible features, with any two of the three possible features or with three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (e.g. hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. It may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The mentioned technologies are often used in combination to achieve the result of a functional module.

FIG. 1A illustrates an example of a mobile communication network 100 in which embodiments of the present disclosure may be implemented. The mobile communication network 100 may be, for example, a public land mobile network (PLMN) run by a network operator. As illustrated in FIG. 1A, the mobile communication network 100 includes a core network (CN) 102, a radio access network (RAN) 104, and a wireless device 106.

The CN 102 may provide the wireless device 106 with an interface to one or more data networks (DNs), such as public DNs (e.g., the Internet), private DNs, and/or intra-operator DNs. As part of the interface functionality, the CN 102 may set up end-to-end connections between the wireless device 106 and the one or more DNs, authenticate the wireless device 106, and provide charging functionality.

The RAN 104 may connect the CN 102 to the wireless device 106 through radio communications over an air interface. As part of the radio communications, the RAN 104 may provide scheduling, radio resource management, and retransmission protocols. The communication direction from the RAN 104 to the wireless device 106 over the air interface is known as the downlink and the communication direction from the wireless device 106 to the RAN 104 over the air interface is known as the uplink. Downlink transmissions may be separated from uplink transmissions using frequency division duplexing (FDD), time-division duplexing (TDD), and/or some combination of the two duplexing techniques.

The term wireless device may be used throughout this disclosure to refer to and encompass any mobile device or fixed (non-mobile) device for which wireless communication is needed or usable. For example, a wireless device may be a telephone, smart phone, tablet, computer, laptop, sensor, meter, wearable device, Internet of Things (IoT) device, vehicle road side unit (RSU), relay node, automobile, and/or any combination thereof. The term wireless device encompasses other terminology, including user equipment (UE), user terminal (UT), access terminal (AT), mobile station, handset, wireless transmit and receive unit (WTRU), and/or wireless communication device.

The RAN 104 may include one or more base stations (not shown). The term base station may be used throughout this disclosure to refer to and encompass a Node B (associated with UMTS and/or 3G standards), an Evolved Node B (eNB, associated with E-UTRA and/or 4G standards), a remote radio head (RRH), a baseband processing unit coupled to one or more RRHs, a repeater node or relay node used to extend the coverage area of a donor node, a Next Generation Evolved Node B (ng-eNB), a Generation Node B (gNB, associated with NR and/or 5G standards), an access point (AP, associated with, for example, WiFi or any other suitable wireless communication standard), and/or any combination thereof. A base station may comprise at least one gNB Central Unit (gNB-CU) and at least one a gNB Distributed Unit (gNB-DU).

A base station included in the RAN 104 may include one or more sets of antennas for communicating with the wireless device 106 over the air interface. For example, one or more of the base stations may include three sets of antennas to respectively control three cells (or sectors). The size of a cell may be determined by a range at which a receiver (e.g., a base station receiver) can successfully receive the transmissions from a transmitter (e.g., a wireless device transmitter) operating in the cell. Together, the cells of the base stations may provide radio coverage to the wireless device 106 over a wide geographic area to support wireless device mobility.

In addition to three-sector sites, other implementations of base stations are possible. For example, one or more of the base stations in the RAN 104 may be implemented as a sectored site with more or less than three sectors. One or more of the base stations in the RAN 104 may be implemented as an access point, as a baseband processing unit coupled to several remote radio heads (RRHs), and/or as a repeater or relay node used to extend the coverage area of a donor node. A baseband processing unit coupled to RRHs may be part of a centralized or cloud RAN architecture, where the baseband processing unit may be either centralized in a pool of baseband processing units or virtualized. A repeater node may amplify and rebroadcast a radio signal received from a donor node. A relay node may perform the same/similar functions as a repeater node but may decode the radio signal received from the donor node to remove noise before amplifying and rebroadcasting the radio signal.

The RAN 104 may be deployed as a homogenous network of macrocell base stations that have similar antenna patterns and similar high-level transmit powers. The RAN 104 may be deployed as a heterogeneous network. In heterogeneous networks, small cell base stations may be used to provide small coverage areas, for example, coverage areas that overlap with the comparatively larger coverage areas provided by macrocell base stations. The small coverage areas may be provided in areas with high data traffic (or so-called "hotspots") or in areas with weak macrocell coverage. Examples of small cell base stations include, in order of decreasing coverage area, microcell base stations, picocell base stations, and femtocell base stations or home base stations.

The Third-Generation Partnership Project (3GPP) was formed in 1998 to provide global standardization of specifications for mobile communication networks similar to the mobile communication network 100 in FIG. 1A. To date, 3GPP has produced specifications for three generations of mobile networks: a third generation (3G) network known as Universal Mobile Telecommunications System (UMTS), a fourth generation (4G) network known as Long-Term Evolution (LTE), and a fifth generation (5G) network known as 5G System (5GS). Embodiments of the present disclosure are described with reference to the RAN of a 3GPP 5G network, referred to as next-generation RAN (NG-RAN). Embodiments may be applicable to RANs of other mobile communication networks, such as the RAN 104 in FIG. 1A, the RANs of earlier 3G and 4G networks, and those of future networks yet to be specified (e.g., a 3GPP 6G network). NG-RAN implements 5G radio access technology known as New Radio (NR) and may be provisioned to implement 4G radio access technology or other radio access technologies, including non-3GPP radio access technologies.

FIG. 1B illustrates another example mobile communication network 150 in which embodiments of the present disclosure may be implemented. Mobile communication network 150 may be, for example, a PLMN run by a network operator. As illustrated in FIG. 1B, mobile communication network 150 includes a 5G core network (5G-CN) 152, an NG-RAN 154, and UEs 156A and 156B (collectively UEs 156). These components may be implemented and operate in the same or similar manner as corresponding components described with respect to FIG. 1A.

The 5G-CN 152 provides the UEs 156 with an interface to one or more DNs, such as public DNs (e.g., the Internet), private DNs, and/or intra-operator DNs. As part of the interface functionality, the 5G-CN 152 may set up end-to-end connections between the UEs 156 and the one or more DNs, authenticate the UEs 156, and provide charging functionality. Compared to the CN of a 3GPP 4G network, the basis of the 5G-CN 152 may be a service-based architecture. This means that the architecture of the nodes making up the 5G-CN 152 may be defined as network functions that offer services via interfaces to other network functions. The network functions of the 5G-CN 152 may be implemented in several ways, including as network elements on dedicated or shared hardware, as software instances running on dedicated or shared hardware, or as virtualized functions instantiated on a platform (e.g., a cloud-based platform).

As illustrated in FIG. 1B, the 5G-CN 152 includes an Access and Mobility Management Function (AMF) 158A and a User Plane Function (UPF) 158B, which are shown as one component AMF/UPF 158 in FIG. 1B for ease of illustration. The UPF 158B may serve as a gateway between the NG-RAN 154 and the one or more DNs. The UPF 158B may perform functions such as packet routing and forwarding, packet inspection and user plane policy rule enforcement, traffic usage reporting, uplink classification to support routing of traffic flows to the one or more DNs, quality of service (QoS) handling for the user plane (e.g., packet filtering, gating, uplink/downlink rate enforcement, and uplink traffic verification), downlink packet buffering, and downlink data notification triggering. The UPF 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The UEs 156 may be configured to receive services through a PDU session, which is a logical connection between a UE and a DN.

The AMF 158A may perform functions such as Non-Access Stratum (NAS) signaling termination, NAS signaling security, Access Stratum (AS) security control, inter-CN node signaling for mobility between 3GPP access networks, idle mode UE reachability (e.g., control and execution of paging retransmission), registration area management, intra-system and inter-system mobility support, access authentication, access authorization including checking of roaming rights, mobility management control (subscription and policies), network slicing support, and/or session management function (SMF) selection. NAS may refer to the functionality operating between a CN and a UE, and AS may refer to the functionality operating between the UE and a RAN.

The 5G-CN 152 may include one or more additional network functions that are not shown in FIG. 1B for the sake of clarity. For example, the 5G-CN 152 may include one or more of a Session Management Function (SMF), an NR Repository Function (NRF), a Policy Control Function (PCF), a Network Exposure Function (NEF), a Unified Data Management (UDM), an Application Function (AF), and/or an Authentication Server Function (AUSF).

The NG-RAN 154 may connect the 5G-CN 152 to the UEs 156 through radio communications over the air interface. The NG-RAN 154 may include one or more gNBs, illustrated as gNB 160A and gNB 160B (collectively gNBs 160) and/or one or more ng-eNBs, illustrated as ng-eNB 162A and ng-eNB 162B (collectively ng-eNBs 162). The gNBs 160 and ng-eNBs 162 may be more generically referred to as base stations. The gNBs 160 and ng-eNBs 162 may include one or more sets of antennas for communicating with the UEs 156 over an air interface. For example, one or more of the gNBs 160 and/or one or more of the ng-eNBs 162 may include three sets of antennas to respectively control three cells (or sectors). Together, the cells of the gNBs 160 and the ng-eNBs 162 may provide radio coverage to the UEs 156 over a wide geographic area to support UE mobility.

As shown in FIG. 1B, the gNBs 160 and/or the ng-eNBs 162 may be connected to the 5G-CN 152 by means of an NG interface and to other base stations by an Xn interface. The NG and Xn interfaces may be established using direct physical connections and/or indirect connections over an underlying transport network, such as an internet protocol (IP) transport network. The gNBs 160 and/or the ng-eNBs 162 may be connected to the UEs 156 by means of a Uu interface. For example, as illustrated in FIG. 1B, gNB 160A may be connected to the UE 156A by means of a Uu interface. The NG, Xn, and Uu interfaces are associated with a protocol stack. The protocol stacks associated with the interfaces may be used by the network elements in FIG. 1B to exchange data and signaling messages and may include two planes: a user plane and a control plane. The user plane may handle data of interest to a user. The control plane may handle signaling messages of interest to the network elements.

The gNBs 160 and/or the ng-eNBs 162 may be connected to one or more AMF/UPF functions of the 5G-CN 152, such as the AMF/UPF 158, by means of one or more NG interfaces. For example, the gNB 160A may be connected to the UPF 158B of the AMF/UPF 158 by means of an NG-User plane (NG-U) interface. The NG-U interface may provide delivery (e.g., non-guaranteed delivery) of user plane PDUs between the gNB 160A and the UPF 158B. The gNB 160A may be connected to the AMF 158A by means of an NG-Control plane (NG-C) interface. The NG-C interface may provide, for example, NG interface management, UE context management, UE mobility management, transport of NAS messages, paging, PDU session management, and configuration transfer and/or warning message transmission.

The gNBs 160 may provide NR user plane and control plane protocol terminations towards the UEs 156 over the Uu interface. For example, the gNB 160A may provide NR user plane and control plane protocol terminations toward the UE 156A over a Uu interface associated with a first protocol stack. The ng-eNBs 162 may provide Evolved UMTS Terrestrial Radio Access (E-UTRA) user plane and control plane protocol terminations towards the UEs 156 over a Uu interface, where E-UTRA refers to the 3GPP 4G radio-access technology. For example, the ng-eNB 162B may provide E-UTRA user plane and control plane protocol terminations towards the UE 156B over a Uu interface associated with a second protocol stack.

The 5G-CN 152 was described as being configured to handle NR and 4G radio accesses. It will be appreciated by one of ordinary skill in the art that it may be possible for NR to connect to a 4G core network in a mode known as "non-standalone operation." In non-standalone operation, a 4G core network is used to provide (or at least support) control-plane functionality (e.g., initial access, mobility, and paging). Although only one AMF/UPF 158 is shown in FIG. 1B, one gNB or ng-eNB may be connected to multiple AMF/UPF nodes to provide redundancy and/or to load share across the multiple AMF/UPF nodes.

As discussed, an interface (e.g., Uu, Xn, and NG interfaces) between the network elements in FIG. 1B may be associated with a protocol stack that the network elements use to exchange data and signaling messages. A protocol stack may include two planes: a user plane and a control plane. The user plane may handle data of interest to a user, and the control plane may handle signaling messages of interest to the network elements.

Figure 2B:
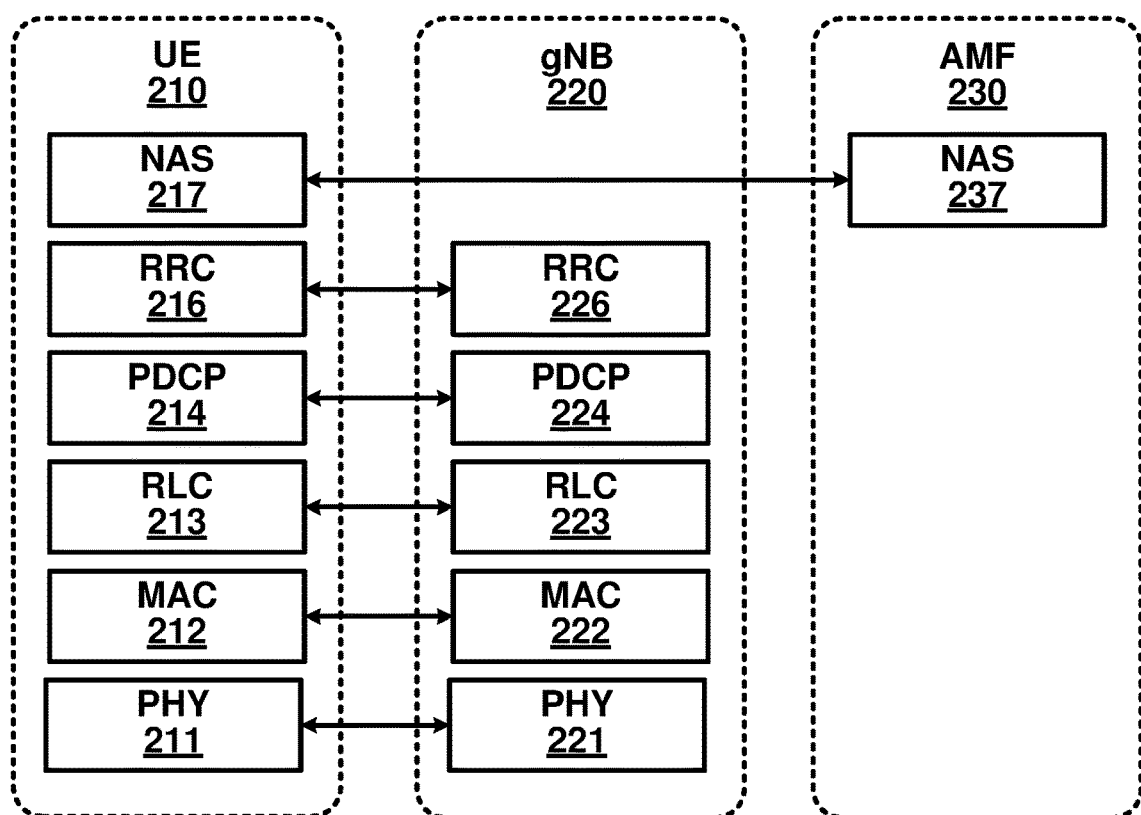

FIG. 2A and FIG. 2B respectively illustrate examples of NR user plane and NR control plane protocol stacks for the Uu interface that lies between a UE 210 and a gNB 220. The protocol stacks illustrated in FIG. 2A and FIG. 2B may be the same or similar to those used for the Uu interface between, for example, the UE 156A and the gNB 160A shown in FIG. 1B.

FIG. 2A illustrates a NR user plane protocol stack comprising five layers implemented in the UE 210 and the gNB 220. At the bottom of the protocol stack, physical layers (PHYs) 211 and 221 may provide transport services to the higher layers of the protocol stack and may correspond to layer 1 of the Open Systems Interconnection (OSI) model. The next four protocols above PHYs 211 and 221 comprise media access control layers (MACs) 212 and 222, radio link control layers (RLCs) 213 and 223, packet data convergence protocol layers (PDCPs) 214 and 224, and service data application protocol layers (SDAPs) 215 and 225. Together, these four protocols may make up layer 2, or the data link layer, of the OSI model.

Figure 3:
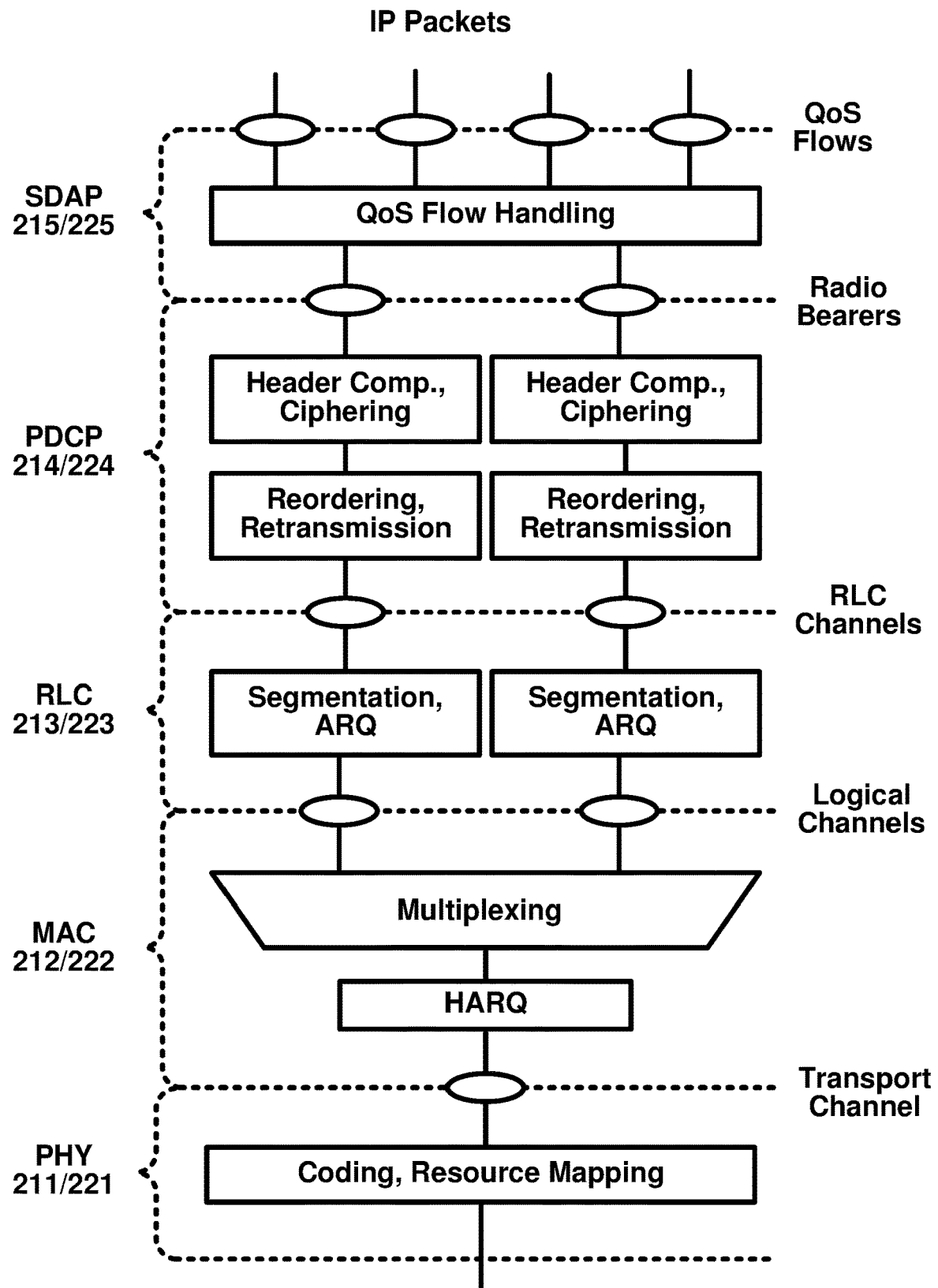
FIG. 3 illustrates an example of services provided between protocol layers of the NR user plane protocol stack of FIG. 2A.

FIG. 3 illustrates an example of services provided between protocol layers of the NR user plane protocol stack. Starting from the top of FIG. 2A and FIG. 3, the SDAPs 215 and 225 may perform QoS flow handling. The UE 210 may receive services through a PDU session, which may be a logical connection between the UE 210 and a DN. The PDU session may have one or more QoS flows. A UPF of a CN (e.g., the UPF 158B) may map IP packets to the one or more QoS flows of the PDU session based on QoS requirements (e.g., in terms of delay, data rate, and/or error rate). The SDAPs 215 and 225 may perform mapping/de-mapping between the one or more QoS flows and one or more data radio bearers. The mapping/de-mapping between the QoS flows and the data radio bearers may be determined by the SDAP 225 at the gNB 220. The SDAP 215 at the UE 210 may be informed of the mapping between the QoS flows and the data radio bearers through reflective mapping or control signaling received from the gNB 220. For reflective mapping, the SDAP 225 at the gNB 220 may mark the downlink packets with a QoS flow indicator (QFI), which may be observed by the SDAP 215 at the UE 210 to determine the mapping/de-mapping between the QoS flows and the data radio bearers.

The PDCPs 214 and 224 may perform header compression/decompression to reduce the amount of data that needs to be transmitted over the air interface, ciphering/deciphering to prevent unauthorized decoding of data transmitted over the air interface, and integrity protection (to ensure control messages originate from intended sources. The PDCPs 214 and 224 may perform retransmissions of undelivered packets, in-sequence delivery and reordering of packets, and removal of packets received in duplicate due to, for example, an intra-gNB handover. The PDCPs 214 and 224 may perform packet duplication to improve the likelihood of the packet being received and, at the receiver, remove any duplicate packets. Packet duplication may be useful for services that require high reliability.

Although not shown in FIG. 3, PDCPs 214 and 224 may perform mapping/de-mapping between a split radio bearer and RLC channels in a dual connectivity scenario. Dual connectivity is a technique that allows a UE to connect to two cells or, more generally, two cell groups: a master cell group (MCG) and a secondary cell group (SCG). A split bearer is when a single radio bearer, such as one of the radio bearers provided by the PDCPs 214 and 224 as a service to the SDAPs 215 and 225, is handled by cell groups in dual connectivity. The PDCPs 214 and 224 may map/de-map the split radio bearer between RLC channels belonging to cell groups.

The RLCs 213 and 223 may perform segmentation, retransmission through Automatic Repeat Request (ARQ), and removal of duplicate data units received from MACs 212 and 222, respectively. The RLCs 213 and 223 may support three transmission modes: transparent mode (TM); unacknowledged mode (UM); and acknowledged mode (AM). Based on the transmission mode an RLC is operating, the RLC may perform one or more of the noted functions. The RLC configuration may be per logical channel with no dependency on numerologies and/or Transmission Time Interval (TTI) durations. As shown in FIG. 3, the RLCs 213 and 223 may provide RLC channels as a service to PDCPs 214 and 224, respectively.

The MACs 212 and 222 may perform multiplexing/demultiplexing of logical channels and/or mapping between logical channels and transport channels. The multiplexing/demultiplexing may include multiplexing/demultiplexing of data units, belonging to the one or more logical channels, into/from Transport Blocks (TBs) delivered to/from the PHYs 211 and 221. The MAC 222 may be configured to perform scheduling, scheduling information reporting, and priority handling between UEs by means of dynamic scheduling. Scheduling may be performed in the gNB 220 (at the MAC 222) for downlink and uplink. The MACs 212 and 222 may be configured to perform error correction through Hybrid Automatic Repeat Request (HARQ) (e.g., one HARQ entity per carrier in case of Carrier Aggregation (CA)), priority handling between logical channels of the UE 210 by means of logical channel prioritization, and/or padding. The MACs 212 and 222 may support one or more numerologies and/or transmission timings. In an example, mapping restrictions in a logical channel prioritization may control which numerology and/or transmission timing a logical channel may use. As shown in FIG. 3, the MACs 212 and 222 may provide logical channels as a service to the RLCs 213 and 223.

The PHYs 211 and 221 may perform mapping of transport channels to physical channels and digital and analog signal processing functions for sending and receiving information over the air interface. These digital and analog signal processing functions may include, for example, coding/decoding and modulation/demodulation. The PHYs 211 and 221 may perform multi-antenna mapping. As shown in FIG. 3, the PHYs 211 and 221 may provide one or more transport channels as a service to the MACs 212 and 222.

FIG. 4A illustrates an example downlink data flow through the NR user plane protocol stack. FIG. 4A illustrates a downlink data flow of three IP packets (n, n+1, and m) through the NR user plane protocol stack to generate two TBs at the gNB 220. An uplink data flow through the NR user plane protocol stack may be similar to the downlink data flow depicted in FIG. 4A.

The downlink data flow of FIG. 4A begins when SDAP 225 receives the three IP packets from one or more QoS flows and maps the three packets to radio bearers. In FIG. 4A, the SDAP 225 maps IP packets n and n+1 to a first radio bearer 402 and maps IP packet m to a second radio bearer 404. An SDAP header (labeled with an "H" in FIG. 4A) is added to an IP packet. The data unit from/to a higher protocol layer is referred to as a service data unit (SDU) of the lower protocol layer and the data unit to/from a lower protocol layer is referred to as a protocol data unit (PDU) of the higher protocol layer. As shown in FIG. 4A, the data unit from the SDAP 225 is an SDU of lower protocol layer PDCP 224 and is a PDU of the SDAP 225.

The remaining protocol layers in FIG. 4A may perform their associated functionality (e.g., with respect to FIG. 3), add corresponding headers, and forward their respective outputs to the next lower layer. For example, the PDCP 224 may perform IP-header compression and ciphering and forward its output to the RLC 223. The RLC 223 may optionally perform segmentation (e.g., as shown for IP packet m in FIG. 4A) and forward its output to the MAC 222. The MAC 222 may multiplex a number of RLC PDUs and may attach a MAC subheader to an RLC PDU to form a transport block. In NR, the MAC subheaders may be distributed across the MAC PDU, as illustrated in FIG. 4A. In LTE, the MAC subheaders may be entirely located at the beginning of the MAC PDU. The NR MAC PDU structure may reduce processing time and associated latency because the MAC PDU subheaders may be computed before the full MAC PDU is assembled.

FIG. 4B illustrates an example format of a MAC subheader in a MAC PDU. The MAC subheader includes: an SDU length field for indicating the length (e.g., in bytes) of the MAC SDU to which the MAC subheader corresponds; a logical channel identifier (LCID) field for identifying the logical channel from which the MAC SDU originated to aid in the demultiplexing process; a flag (F) for indicating the size of the SDU length field; and a reserved bit (R) field for future use.

FIG. 4B further illustrates MAC control elements (CEs) inserted into the MAC PDU by a MAC, such as MAC 223 or MAC 222. For example, FIG. 4B illustrates two MAC CEs inserted into the MAC PDU. MAC CEs may be inserted at the beginning of a MAC PDU for downlink transmissions (as shown in FIG. 4B) and at the end of a MAC PDU for uplink transmissions. MAC CEs may be used for in-band control signaling. Example MAC CEs include: scheduling-related MAC CEs, such as buffer status reports and power headroom reports; activation/deactivation MAC CEs, such as those for activation/deactivation of PDCP duplication detection, channel state information (CSI) reporting, sounding reference signal (SRS) transmission, and prior configured components; discontinuous reception (DRX) related MAC CEs; timing advance MAC CEs; and random access related MAC CEs. A MAC CE may be preceded by a MAC subheader with a similar format as described for MAC SDUs and may be identified with a reserved value in the LCID field that indicates the type of control information included in the MAC CE.

Before describing the NR control plane protocol stack, logical channels, transport channels, and physical channels are first described as well as a mapping between the channel types. One or more of the channels may be used to carry out functions associated with the NR control plane protocol stack described later below.

Figure 5B:
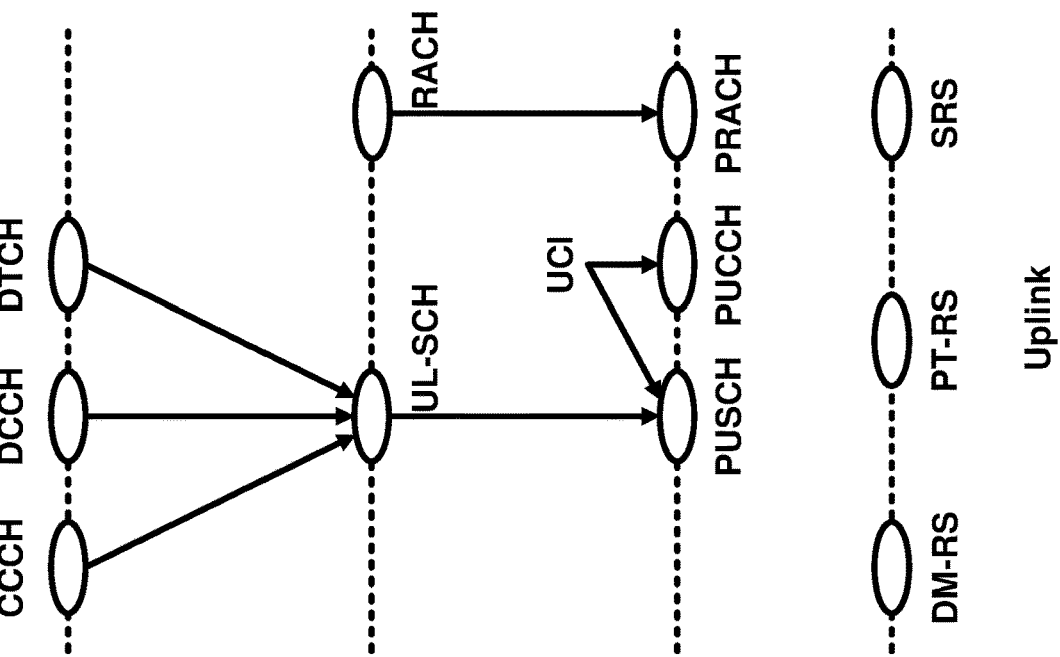
FIG. 5A and FIG. 5B respectively illustrate a mapping between logical channels, transport channels, and physical channels for the downlink and uplink.
Figure 5A:
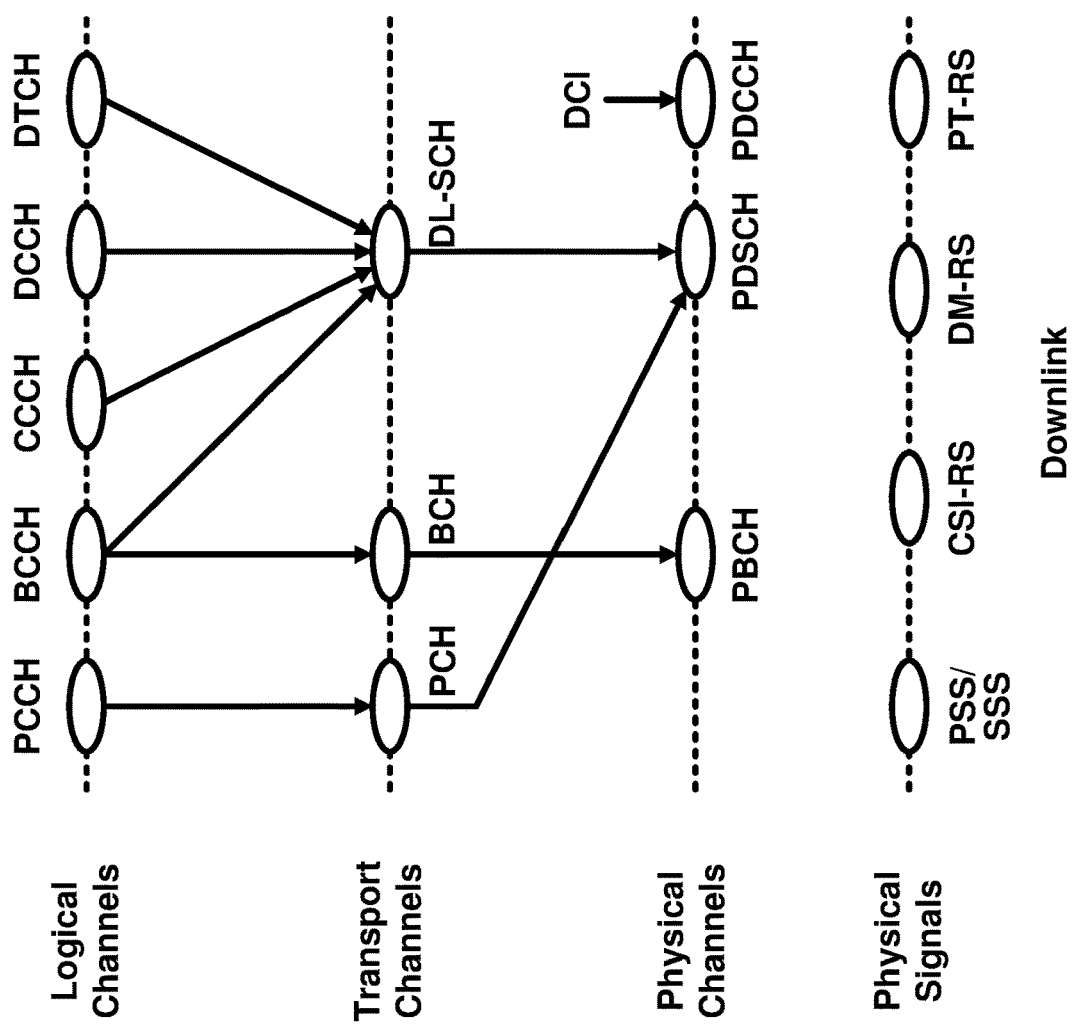

FIG. 5A and FIG. 5B illustrate, for downlink and uplink respectively, a mapping between logical channels, transport channels, and physical channels. Information is passed through channels between the RLC, the MAC, and the PHY of the NR protocol stack. A logical channel may be used between the RLC and the MAC and may be classified as a control channel that carries control and configuration information in the NR control plane or as a traffic channel that carries data in the NR user plane. A logical channel may be classified as a dedicated logical channel that is dedicated to a specific UE or as a common logical channel that may be used by more than one UE. A logical channel may also be defined by the type of information it carries. The set of logical channels defined by NR include, for example:
  a paging control channel (PCCH) for carrying paging messages used to page a UE whose location is not known to the network on a cell level;
  a broadcast control channel (BCCH) for carrying system information messages in the form of a master information block (MIB) and several system information blocks (SIBs), wherein the system information messages may be used by the UEs to obtain information about how a cell is configured and how to operate within the cell;
  a common control channel (CCCH) for carrying control messages together with random access;
  a dedicated control channel (DCCH) for carrying control messages to/from a specific the UE to configure the UE; and
  a dedicated traffic channel (DTCH) for carrying user data to/from a specific the UE.

Transport channels are used between the MAC and PHY layers and may be defined by how the information they carry is transmitted over the air interface. The set of transport channels defined by NR include, for example:
  a paging channel (PCH) for carrying paging messages that originated from the PCCH;
  a broadcast channel (BCH) for carrying the MIB from the BCCH;
  a downlink shared channel (DL-SCH) for carrying downlink data and signaling messages, including the SIBs from the BCCH;
  an uplink shared channel (UL-SCH) for carrying uplink data and signaling messages; and
  a random access channel (RACH) for allowing a UE to contact the network without any prior scheduling.

The PHY may use physical channels to pass information between processing levels of the PHY. A physical channel may have an associated set of time-frequency resources for carrying the information of one or more transport channels. The PHY may generate control information to support the low-level operation of the PHY and provide the control information to the lower levels of the PHY via physical control channels, known as L1/L2 control channels. The set of physical channels and physical control channels defined by NR include, for example:
  a physical broadcast channel (PBCH) for carrying the MIB from the BCH;
  a physical downlink shared channel (PDSCH) for carrying downlink data and signaling messages from the DL-SCH, as well as paging messages from the PCH;
  a physical downlink control channel (PDCCH) for carrying downlink control information (DCI), which may include downlink scheduling commands, uplink scheduling grants, and uplink power control commands;
  a physical uplink shared channel (PUSCH) for carrying uplink data and signaling messages from the UL-SCH and in some instances uplink control information (UCI) as described below;
  a physical uplink control channel (PUCCH) for carrying UCI, which may include HARQ acknowledgments, channel quality indicators (CQI), pre-coding matrix indicators (PMI), rank indicators (RI), and scheduling requests (SR); and
  a physical random access channel (PRACH) for random access.

Similar to the physical control channels, the physical layer generates physical signals to support the low-level operation of the physical layer. As shown in FIG. 5A and FIG. 5B, the physical layer signals defined by NR include: primary synchronization signals (PSS), secondary synchronization signals (SSS), channel state information reference signals (CSI-RS), demodulation reference signals (DMRS), sounding reference signals (SRS), and phase-tracking reference signals (PT-RS). These physical layer signals will be described in greater detail below.

FIG. 2B illustrates an example NR control plane protocol stack. As shown in FIG. 2B, the NR control plane protocol stack may use the same/similar first four protocol layers as the example NR user plane protocol stack. These four protocol layers include the PHYs 211 and 221, the MACs 212 and 222, the RLCs 213 and 223, and the PDCPs 214 and 224. Instead of having the SDAPs 215 and 225 at the top of the stack as in the NR user plane protocol stack, the NR control plane stack has radio resource controls (RRCs) 216 and 226 and NAS protocols 217 and 237 at the top of the NR control plane protocol stack.

The NAS protocols 217 and 237 may provide control plane functionality between the UE 210 and the AMF 230 (e.g., the AMF 158A) or, more generally, between the UE 210 and the CN. The NAS protocols 217 and 237 may provide control plane functionality between the UE 210 and the AMF 230 via signaling messages, referred to as NAS messages. There is no direct path between the UE 210 and the AMF 230 through which the NAS messages can be transported. The NAS messages may be transported using the AS of the Uu and NG interfaces. NAS protocols 217 and 237 may provide control plane functionality such as authentication, security, connection setup, mobility management, and session management.

The RRCs 216 and 226 may provide control plane functionality between the UE 210 and the gNB 220 or, more generally, between the UE 210 and the RAN. The RRCs 216 and 226 may provide control plane functionality between the UE 210 and the gNB 220 via signaling messages, referred to as RRC messages. RRC messages may be transmitted between the UE 210 and the RAN using signaling radio bearers and the same/similar PDCP, RLC, MAC, and PHY protocol layers. The MAC may multiplex control-plane and user-plane data into the same transport block (TB). The RRCs 216 and 226 may provide control plane functionality such as: broadcast of system information related to AS and NAS; paging initiated by the CN or the RAN; establishment, maintenance and release of an RRC connection between the UE 210 and the RAN; security functions including key management; establishment, configuration, maintenance and release of signaling radio bearers and data radio bearers; mobility functions; QoS management functions; the UE measurement reporting and control of the reporting; detection of and recovery from radio link failure (RLF); and/or NAS message transfer. As part of establishing an RRC connection, RRCs 216 and 226 may establish an RRC context, which may involve configuring parameters for communication between the UE 210 and the RAN.

Figure 6:
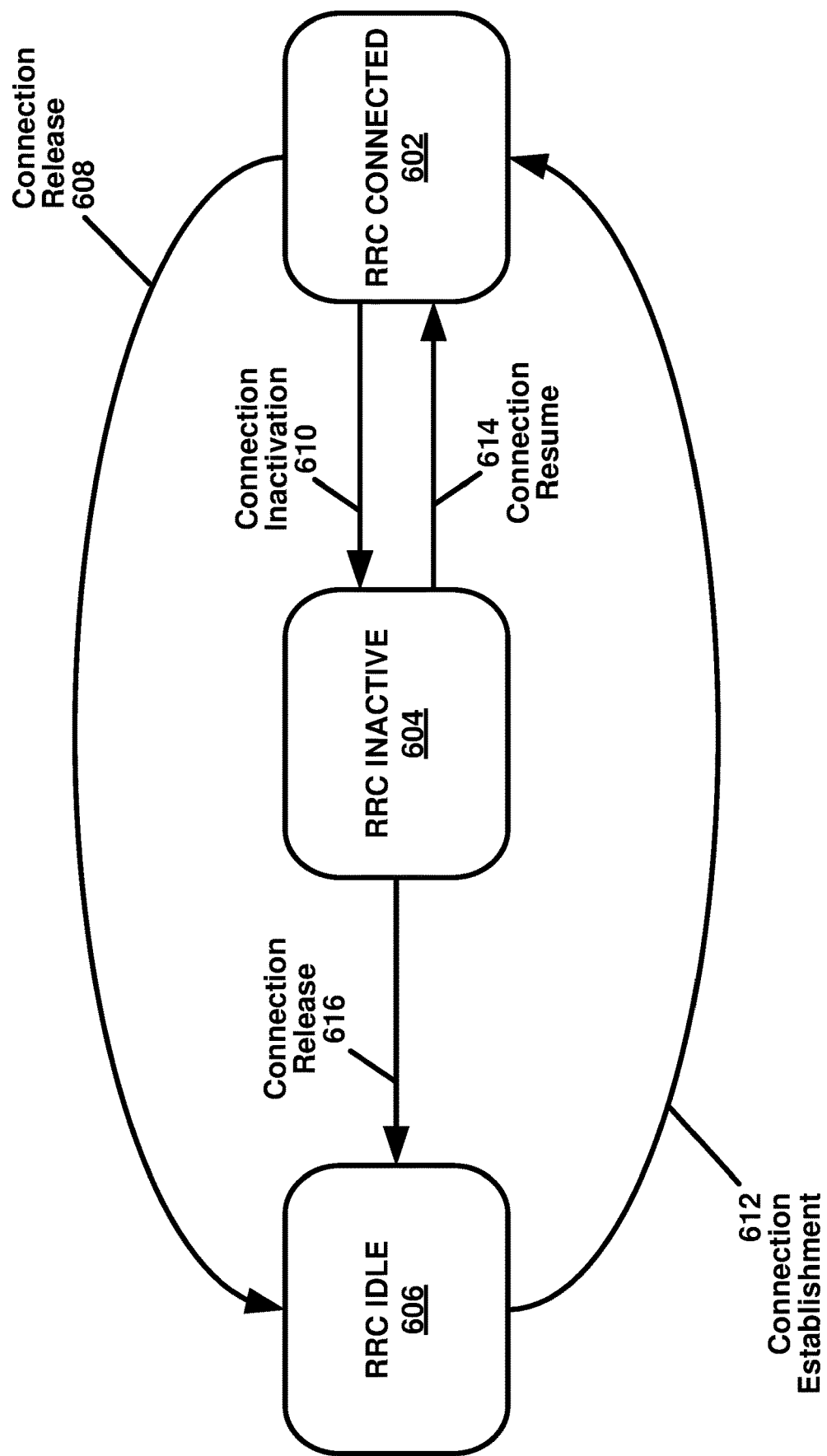
FIG. 6 is an example diagram showing RRC state transitions of a UE.

FIG. 6 is an example diagram showing RRC state transitions of a UE. The UE may be the same or similar to the wireless device 106 depicted in FIG. 1A, the UE 210 depicted in FIG. 2A and FIG. 2B, or any other wireless device described in the present disclosure. As illustrated in FIG. 6, a UE may be in at least one of three RRC states: RRC connected 602 (e.g., RRC_CONNECTED), RRC idle 604 (e.g., RRC_IDLE), and RRC inactive 606 (e.g., RRC_INACTIVE).

In RRC connected 602, the UE has an established RRC context and may have at least one RRC connection with a base station. The base station may be similar to one of the one or more base stations included in the RAN 104 depicted in FIG. 1A, one of the gNBs 160 or ng-eNBs 162 depicted in FIG. 1B, the gNB 220 depicted in FIG. 2A and FIG. 2B, or any other base station described in the present disclosure. The base station with which the UE is connected may have the RRC context for the UE. The RRC context, referred to as the UE context, may comprise parameters for communication between the UE and the base station. These parameters may include, for example: one or more AS contexts; one or more radio link configuration parameters; bearer configuration information (e.g., relating to a data radio bearer, signaling radio bearer, logical channel, QoS flow, and/or PDU session); security information; and/or PHY, MAC, RLC, PDCP, and/or SDAP layer configuration information. While in RRC connected 602, mobility of the UE may be managed by the RAN (e.g., the RAN 104 or the NG-RAN 154). The UE may measure the signal levels (e.g., reference signal levels) from a serving cell and neighboring cells and report these measurements to the base station currently serving the UE. The UE's serving base station may request a handover to a cell of one of the neighboring base stations based on the reported measurements. The RRC state may transition from RRC connected 602 to RRC idle 604 through a connection release procedure 608 or to RRC inactive 606 through a connection inactivation procedure 610.

In RRC idle 604, an RRC context may not be established for the UE. In RRC idle 604, the UE may not have an RRC connection with the base station. While in RRC idle 604, the UE may be in a sleep state for the majority of the time (e.g., to conserve battery power). The UE may wake up periodically (e.g., once in every discontinuous reception cycle) to monitor for paging messages from the RAN. Mobility of the UE may be managed by the UE through a procedure known as cell reselection. The RRC state may transition from RRC idle 604 to RRC connected 602 through a connection establishment procedure 612, which may involve a random access procedure as discussed in greater detail below.

In RRC inactive 606, the RRC context previously established is maintained in the UE and the base station. This allows for a fast transition to RRC connected 602 with reduced signaling overhead as compared to the transition from RRC idle 604 to RRC connected 602. While in RRC inactive 606, the UE may be in a sleep state and mobility of the UE may be managed by the UE through cell reselection. The RRC state may transition from RRC inactive 606 to RRC connected 602 through a connection resume procedure 614 or to RRC idle 604 though a connection release procedure 616 that may be the same as or similar to connection release procedure 608.

An RRC state may be associated with a mobility management mechanism. In RRC idle 604 and RRC inactive 606, mobility is managed by the UE through cell reselection. The purpose of mobility management in RRC idle 604 and RRC inactive 606 is to allow the network to be able to notify the UE of an event via a paging message without having to broadcast the paging message over the entire mobile communications network. The mobility management mechanism used in RRC idle 604 and RRC inactive 606 may allow the network to track the UE on a cell-group level so that the paging message may be broadcast over the cells of the cell group that the UE currently resides within instead of the entire mobile communication network. The mobility management mechanisms for RRC idle 604 and RRC inactive 606 track the UE on a cell-group level. They may do so using different granularities of grouping. For example, there may be three levels of cell-grouping granularity: individual cells; cells within a RAN area identified by a RAN area identifier (RAI); and cells within a group of RAN areas, referred to as a tracking area and identified by a tracking area identifier (TAI).

Tracking areas may be used to track the UE at the CN level. The CN (e.g., the CN 102 or the 5G-CN 152) may provide the UE with a list of TAIs associated with a UE registration area. If the UE moves, through cell reselection, to a cell associated with a TAI not included in the list of TAIs associated with the UE registration area, the UE may perform a registration update with the CN to allow the CN to update the UE's location and provide the UE with a new the UE registration area.

RAN areas may be used to track the UE at the RAN level. For a UE in RRC inactive 606 state, the UE may be assigned a RAN notification area. A RAN notification area may comprise one or more cell identities, a list of RAIs, or a list of TAIs. In an example, a base station may belong to one or more RAN notification areas. In an example, a cell may belong to one or more RAN notification areas. If the UE moves, through cell reselection, to a cell not included in the RAN notification area assigned to the UE, the UE may perform a notification area update with the RAN to update the UE's RAN notification area.

A base station storing an RRC context for a UE or a last serving base station of the UE may be referred to as an anchor base station. An anchor base station may maintain an RRC context for the UE at least during a period of time that the UE stays in a RAN notification area of the anchor base station and/or during a period of time that the UE stays in RRC inactive 606.

A gNB, such as gNBs 160 in FIG. 1B, may be split in two parts: a central unit (gNB-CU), and one or more distributed units (gNB-DU). A gNB-CU may be coupled to one or more gNB-DUs using an F1 interface. The gNB-CU may comprise the RRC, the PDCP, and the SDAP. A gNB-DU may comprise the RLC, the MAC, and the PHY.

In NR, the physical signals and physical channels (discussed with respect to FIG. 5A and FIG. 5B) may be mapped onto orthogonal frequency divisional multiplexing (OFDM) symbols. OFDM is a multicarrier communication scheme that transmits data over F orthogonal subcarriers (or tones). Before transmission, the data may be mapped to a series of complex symbols (e.g., M-quadrature amplitude modulation (M-QAM) or M-phase shift keying (M-PSK) symbols), referred to as source symbols, and divided into F parallel symbol streams. The F parallel symbol streams may be treated as though they are in the frequency domain and used as inputs to an Inverse Fast Fourier Transform (IFFT) block that transforms them into the time domain. The IFFT block may take in F source symbols at a time, one from each of the F parallel symbol streams, and use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. After some processing (e.g., addition of a cyclic prefix) and up-conversion, an OFDM symbol provided by the IFFT block may be transmitted over the air interface on a carrier frequency. The F parallel symbol streams may be mixed using an FFT block before being processed by the IFFT block. This operation produces Discrete Fourier Transform (DFT)-precoded OFDM symbols and may be used by UEs in the uplink to reduce the peak to average power ratio (PAPR). Inverse processing may be performed on the OFDM symbol at a receiver using an FFT block to recover the data mapped to the source symbols.

Figure 7:
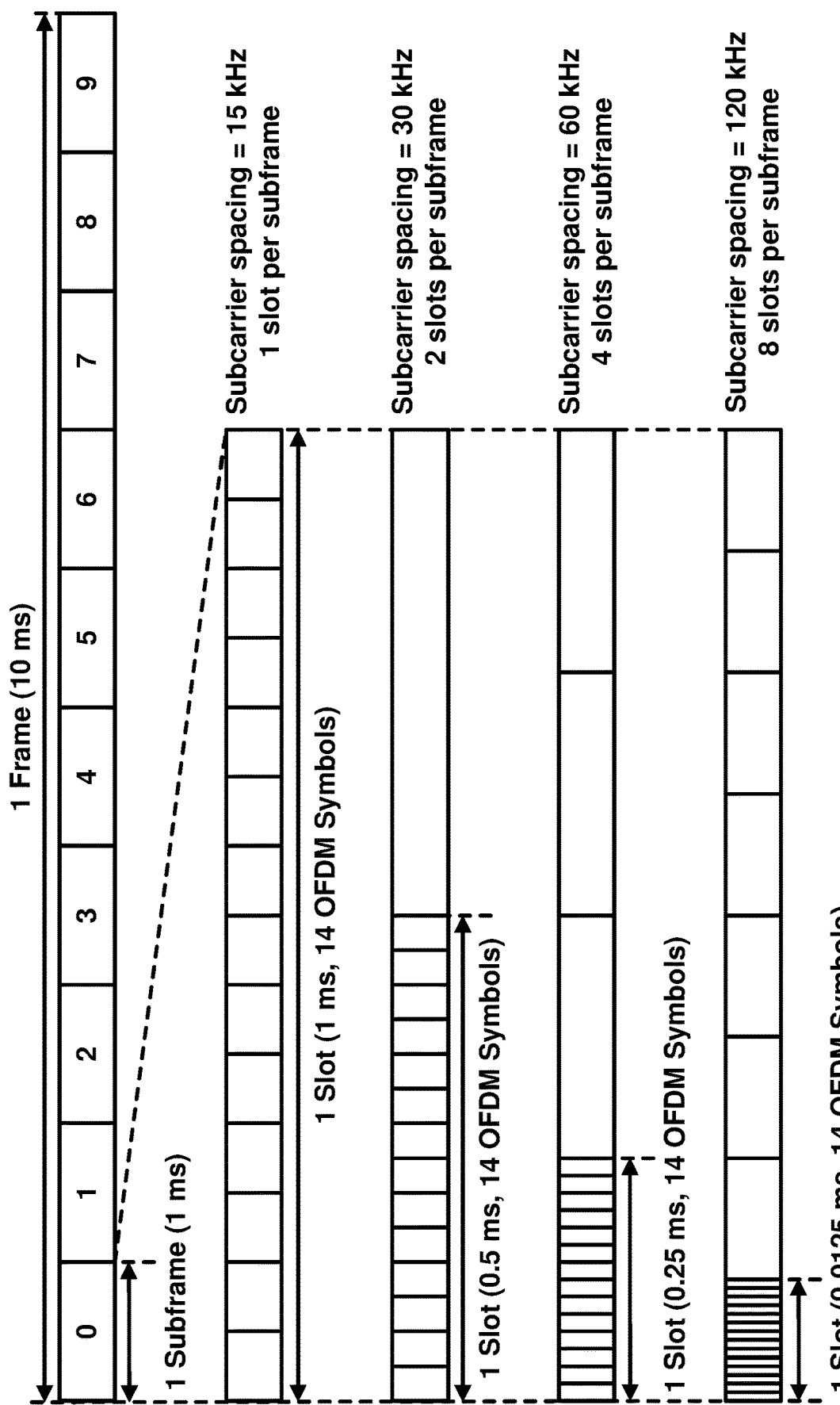
FIG. 7 illustrates an example configuration of an NR frame into which OFDM symbols are grouped.

FIG. 7 illustrates an example configuration of an NR frame into which OFDM symbols are grouped. An NR frame may be identified by a system frame number (SFN). The SFN may repeat with a period of 1024 frames. As illustrated, one NR frame may be 10 milliseconds (ms) in duration and may include 10 subframes that are 1 ms in duration. A subframe may be divided into slots that include, for example, 14 OFDM symbols per slot.

The duration of a slot may depend on the numerology used for the OFDM symbols of the slot. In NR, a flexible numerology is supported to accommodate different cell deployments (e.g., cells with carrier frequencies below 1 GHz up to cells with carrier frequencies in the mm-wave range). A numerology may be defined in terms of subcarrier spacing and cyclic prefix duration. For a numerology in NR, subcarrier spacings may be scaled up by powers of two from a baseline subcarrier spacing of 15 kHz, and cyclic prefix durations may be scaled down by powers of two from a baseline cyclic prefix duration of 4.7 μs. For example, NR defines numerologies with the following subcarrier spacing/cyclic prefix duration combinations: 15 kHz/4.7 μs; 30 kHz/2.3 μs; 60 kHz/1.2 μs; 120 kHz/0.59 μs; and 240 kHz/0.29 μs.

A slot may have a fixed number of OFDM symbols (e.g., 14 OFDM symbols). A numerology with a higher subcarrier spacing has a shorter slot duration and, correspondingly, more slots per subframe. FIG. 7 illustrates this numerology-dependent slot duration and slots-per-subframe transmission structure (the numerology with a subcarrier spacing of 240 kHz is not shown in FIG. 7 for ease of illustration). A subframe in NR may be used as a numerology-independent time reference, while a slot may be used as the unit upon which uplink and downlink transmissions are scheduled. To support low latency, scheduling in NR may be decoupled from the slot duration and start at any OFDM symbol and last for as many symbols as needed for a transmission. These partial slot transmissions may be referred to as mini-slot or subslot transmissions.

Figure 8:
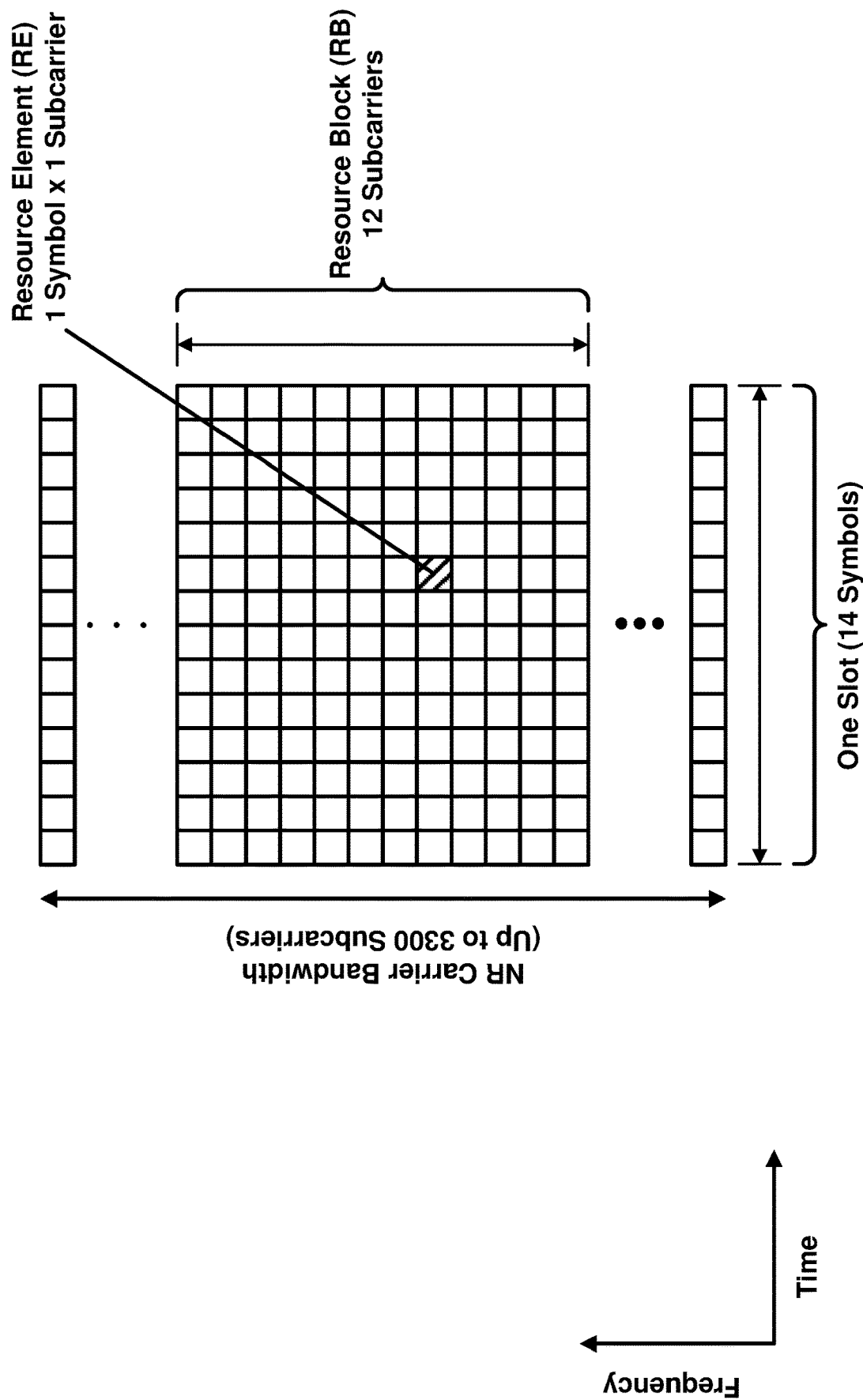
FIG. 8 illustrates an example configuration of a slot in the time and frequency domain for an NR carrier.

FIG. 8 illustrates an example configuration of a slot in the time and frequency domain for an NR carrier. The slot includes resource elements (REs) and resource blocks (RBs). An RE is the smallest physical resource in NR. An RE spans one OFDM symbol in the time domain by one subcarrier in the frequency domain as shown in FIG. 8. An RB spans twelve consecutive REs in the frequency domain as shown in FIG. 8. An NR carrier may be limited to a width of 275 RBs or 275×12=3300 subcarriers. Such a limitation, if used, may limit the NR carrier to 50, 100, 200, and 400 MHz for subcarrier spacings of 15, 30, 60, and 120 kHz, respectively, where the 400 MHz bandwidth may be set based on a 400 MHz per carrier bandwidth limit.

FIG. 8 illustrates a single numerology being used across the entire bandwidth of the NR carrier. In other example configurations, multiple numerologies may be supported on the same carrier.

NR may support wide carrier bandwidths (e.g., up to 400 MHz for a subcarrier spacing of 120 kHz). Not all UEs may be able to receive the full carrier bandwidth (e.g., due to hardware limitations). Also, receiving the full carrier bandwidth may be prohibitive in terms of UE power consumption. In an example, to reduce power consumption and/or for other purposes, a UE may adapt the size of the UE's receive bandwidth based on the amount of traffic the UE is scheduled to receive. This is referred to as bandwidth adaptation.

NR defines bandwidth parts (BWPs) to support UEs not capable of receiving the full carrier bandwidth and to support bandwidth adaptation. In an example, a BWP may be defined by a subset of contiguous RBs on a carrier. A UE may be configured (e.g., via RRC layer) with one or more downlink BWPs and one or more uplink BWPs per serving cell (e.g., up to four downlink BWPs and up to four uplink BWPs per serving cell). At a given time, one or more of the configured BWPs for a serving cell may be active. These one or more BWPs may be referred to as active BWPs of the serving cell. When a serving cell is configured with a secondary uplink carrier, the serving cell may have one or more first active BWPs in the uplink carrier and one or more second active BWPs in the secondary uplink carrier.

For unpaired spectra, a downlink BWP from a set of configured downlink BWPs may be linked with an uplink BWP from a set of configured uplink BWPs if a downlink BWP index of the downlink BWP and an uplink BWP index of the uplink BWP are the same. For unpaired spectra, a UE may expect that a center frequency for a downlink BWP is the same as a center frequency for an uplink BWP.

For a downlink BWP in a set of configured downlink BWPs on a primary cell (PCell), a base station may configure a UE with one or more control resource sets (CORESETs) for at least one search space. A search space is a set of locations in the time and frequency domains where the UE may find control information. The search space may be a UE-specific search space or a common search space (potentially usable by a plurality of UEs). For example, a base station may configure a UE with a common search space, on a PCell or on a primary secondary cell (PSCell), in an active downlink BWP.

For an uplink BWP in a set of configured uplink BWPs, a BS may configure a UE with one or more resource sets for one or more PUCCH transmissions. A UE may receive downlink receptions (e.g., PDCCH or PDSCH) in a downlink BWP according to a configured numerology (e.g., subcarrier spacing and cyclic prefix duration) for the downlink BWP. The UE may transmit uplink transmissions (e.g., PUCCH or PUSCH) in an uplink BWP according to a configured numerology (e.g., subcarrier spacing and cyclic prefix length for the uplink BWP).

One or more BWP indicator fields may be provided in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a UE with a default downlink BWP within a set of configured downlink BWPs associated with a PCell. If the base station does not provide the default downlink BWP to the UE, the default downlink BWP may be an initial active downlink BWP. The UE may determine which BWP is the initial active downlink BWP based on a CORESET configuration obtained using the PBCH.

A base station may configure a UE with a BWP inactivity timer value for a PCell. The UE may start or restart a BWP inactivity timer at any appropriate time. For example, the UE may start or restart the BWP inactivity timer (a) when the UE detects a DCI indicating an active downlink BWP other than a default downlink BWP for a paired spectra operation; or (b) when a UE detects a DCI indicating an active downlink BWP or active uplink BWP other than a default downlink BWP or uplink BWP for an unpaired spectra operation. If the UE does not detect DCI during an interval of time (e.g., 1 ms or 0.5 ms), the UE may run the BWP inactivity timer toward expiration (for example, increment from zero to the BWP inactivity timer value, or decrement from the BWP inactivity timer value to zero). When the BWP inactivity timer expires, the UE may switch from the active downlink BWP to the default downlink BWP.

In an example, a base station may semi-statically configure a UE with one or more BWPs. A UE may switch an active BWP from a first BWP to a second BWP in response to receiving a DCI indicating the second BWP as an active BWP and/or in response to an expiry of the BWP inactivity timer (e.g., if the second BWP is the default BWP).

Downlink and uplink BWP switching (where BWP switching refers to switching from a currently active BWP to a not currently active BWP) may be performed independently in paired spectra. In unpaired spectra, downlink and uplink BWP switching may be performed simultaneously. Switching between configured BWPs may occur based on RRC signaling, DCI, expiration of a BWP inactivity timer, and/or an initiation of random access.

Figure 9:
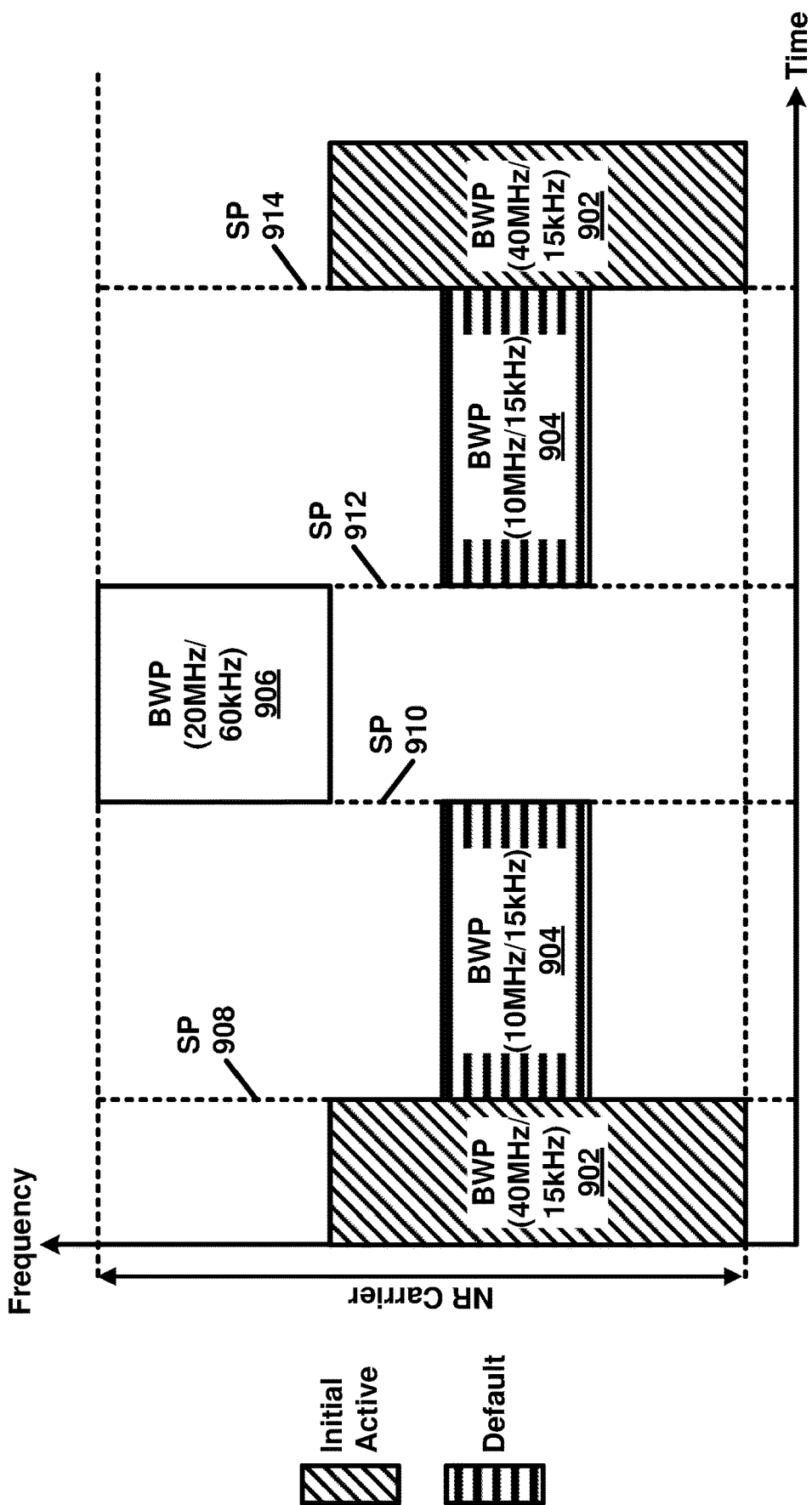
FIG. 9 illustrates an example of bandwidth adaptation using three configured BWPs for an NR carrier.

FIG. 9 illustrates an example of bandwidth adaptation using three configured BWPs for an NR carrier. A UE configured with the three BWPs may switch from one BWP to another BWP at a switching point. In the example illustrated in FIG. 9, the BWPs include: a BWP 902 with a bandwidth of 40 MHz and a subcarrier spacing of 15 kHz; a BWP 904 with a bandwidth of 10 MHz and a subcarrier spacing of 15 kHz; and a BWP 906 with a bandwidth of 20 MHz and a subcarrier spacing of 60 kHz. The BWP 902 may be an initial active BWP, and the BWP 904 may be a default BWP. The UE may switch between BWPs at switching points. In the example of FIG. 9, the UE may switch from the BWP 902 to the BWP 904 at a switching point 908. The switching at the switching point 908 may occur for any suitable reason, for example, in response to an expiry of a BWP inactivity timer (indicating switching to the default BWP) and/or in response to receiving a DCI indicating BWP 904 as the active BWP. The UE may switch at a switching point 910 from active BWP 904 to BWP 906 in response receiving a DCI indicating BWP 906 as the active BWP. The UE may switch at a switching point 912 from active BWP 906 to BWP 904 in response to an expiry of a BWP inactivity timer and/or in response receiving a DCI indicating BWP 904 as the active BWP. The UE may switch at a switching point 914 from active BWP 904 to BWP 902 in response receiving a DCI indicating BWP 902 as the active BWP.

If a UE is configured for a secondary cell with a default downlink BWP in a set of configured downlink BWPs and a timer value, UE procedures for switching BWPs on a secondary cell may be the same/similar as those on a primary cell. For example, the UE may use the timer value and the default downlink BWP for the secondary cell in the same/similar manner as the UE would use these values for a primary cell.

To provide for greater data rates, two or more carriers can be aggregated and simultaneously transmitted to/from the same UE using carrier aggregation (CA). The aggregated carriers in CA may be referred to as component carriers (CCs). When CA is used, there are a number of serving cells for the UE, one for a CC. The CCs may have three configurations in the frequency domain.

Figure 10A:
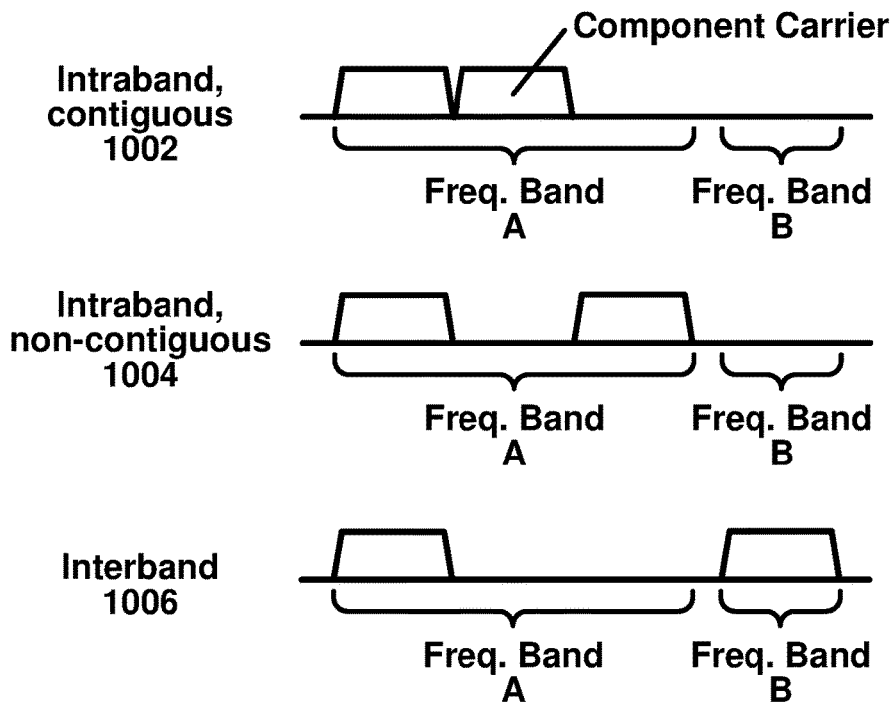
FIG. 10A illustrates three carrier aggregation configurations with two component carriers.

FIG. 10A illustrates the three CA configurations with two CCs. In the intraband, contiguous configuration 1002, the two CCs are aggregated in the same frequency band (frequency band A) and are located directly adjacent to each other within the frequency band. In the intraband, non-contiguous configuration 1004, the two CCs are aggregated in the same frequency band (frequency band A) and are separated in the frequency band by a gap. In the interband configuration 1006, the two CCs are located in frequency bands (frequency band A and frequency band B).

In an example, up to 32 CCs may be aggregated. The aggregated CCs may have the same or different bandwidths, subcarrier spacing, and/or duplexing schemes (TDD or FDD). A serving cell for a UE using CA may have a downlink CC. For FDD, one or more uplink CCs may be optionally configured for a serving cell. The ability to aggregate more downlink carriers than uplink carriers may be useful, for example, when the UE has more data traffic in the downlink than in the uplink.

When CA is used, one of the aggregated cells for a UE may be referred to as a primary cell (PCell). The PCell may be the serving cell that the UE initially connects to at RRC connection establishment, reestablishment, and/or handover.

The PCell may provide the UE with NAS mobility information and the security input. UEs may have different PCells. In the downlink, the carrier corresponding to the PCell may be referred to as the downlink primary CC (DL PCC). In the uplink, the carrier corresponding to the PCell may be referred to as the uplink primary CC (UL PCC). The other aggregated cells for the UE may be referred to as secondary cells (SCells). In an example, the SCells may be configured after the PCell is configured for the UE. For example, an SCell may be configured through an RRC Connection Reconfiguration procedure. In the downlink, the carrier corresponding to an SCell may be referred to as a downlink secondary CC (DL SCC). In the uplink, the carrier corresponding to the SCell may be referred to as the uplink secondary CC (UL SCC).

Configured SCells for a UE may be activated and deactivated based on, for example, traffic and channel conditions. Deactivation of an SCell may mean that PDCCH and PDSCH reception on the SCell is stopped and PUSCH, SRS, and CQI transmissions on the SCell are stopped. Configured SCells may be activated and deactivated using a MAC CE with respect to FIG. 4B. For example, a MAC CE may use a bitmap (e.g., one bit per SCell) to indicate which SCells (e.g., in a subset of configured SCells) for the UE are activated or deactivated. Configured SCells may be deactivated in response to an expiration of an SCell deactivation timer (e.g., one SCell deactivation timer per SCell).

Downlink control information, such as scheduling assignments and scheduling grants, for a cell may be transmitted on the cell corresponding to the assignments and grants, which is known as self-scheduling. The DCI for the cell may be transmitted on another cell, which is known as cross-carrier scheduling. Uplink control information (e.g., HARQ acknowledgments and channel state feedback, such as CQI, PMI, and/or RI) for aggregated cells may be transmitted on the PUCCH of the PCell. For a larger number of aggregated downlink CCs, the PUCCH of the PCell may become overloaded. Cells may be divided into multiple PUCCH groups.

Figure 10B:
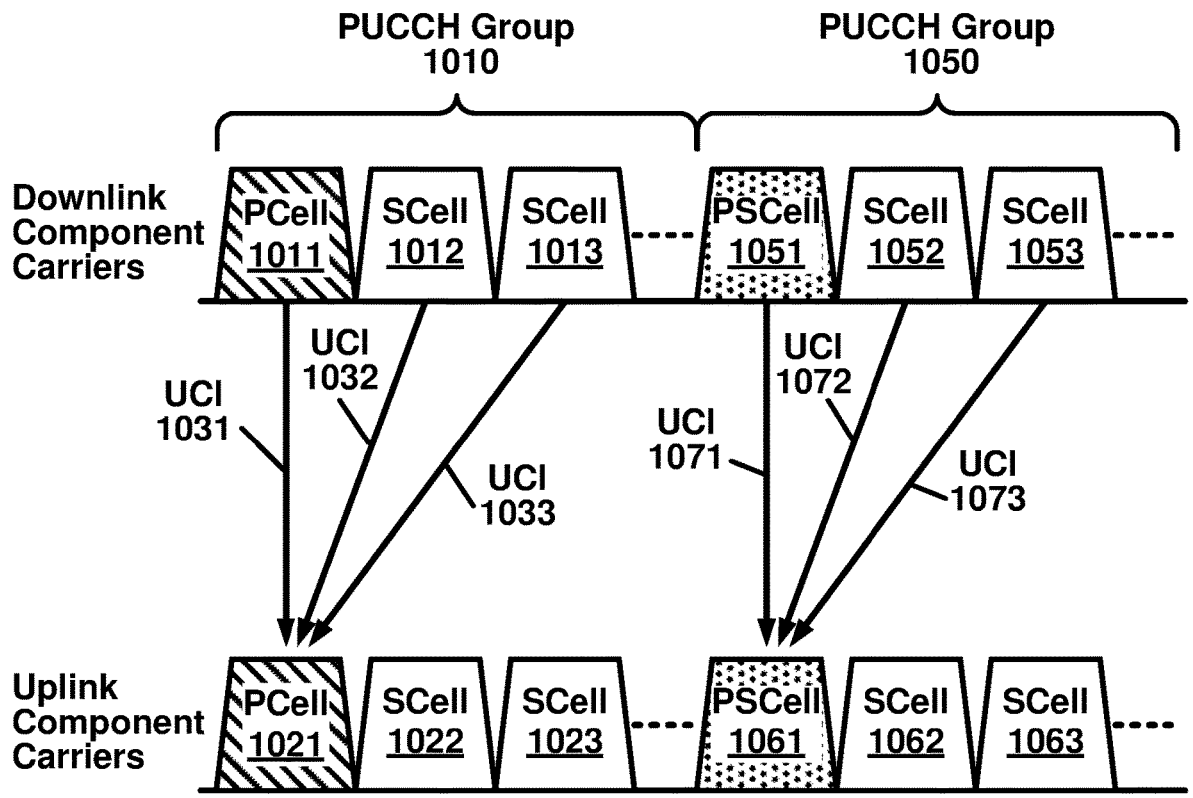
FIG. 10B illustrates an example of how aggregated cells may be configured into one or more PUCCH groups.

FIG. 10B illustrates an example of how aggregated cells may be configured into one or more PUCCH groups. A PUCCH group 1010 and a PUCCH group 1050 may include one or more downlink CCs, respectively. In the example of FIG. 10B, the PUCCH group 1010 includes three downlink CCs: a PCell 1011, an SCell 1012, and an SCell 1013. The PUCCH group 1050 includes three downlink CCs in the present example: a PCell 1051, an SCell 1052, and an SCell 1053. One or more uplink CCs may be configured as a PCell 1021, an SCell 1022, and an SCell 1023. One or more other uplink CCs may be configured as a primary Scell (PSCell) 1061, an SCell 1062, and an SCell 1063. Uplink control information (UCI) related to the downlink CCs of the PUCCH group 1010, shown as UCI 1031, UCI 1032, and UCI 1033, may be transmitted in the uplink of the PCell 1021. Uplink control information (UCI) related to the downlink CCs of the PUCCH group 1050, shown as UCI 1071, UCI 1072, and UCI 1073, may be transmitted in the uplink of the PSCell 1061. In an example, if the aggregated cells depicted in FIG. 10B were not divided into the PUCCH group 1010 and the PUCCH group 1050, a single uplink PCell to transmit UCI relating to the downlink CCs, and the PCell may become overloaded. By dividing transmissions of UCI between the PCell 1021 and the PSCell 1061, overloading may be prevented.

A cell, comprising a downlink carrier and optionally an uplink carrier, may be assigned with a physical cell ID and a cell index. The physical cell ID or the cell index may identify a downlink carrier and/or an uplink carrier of the cell, for example, depending on the context in which the physical cell ID is used. A physical cell ID may be determined using a synchronization signal transmitted on a downlink component carrier. A cell index may be determined using RRC messages. In the disclosure, a physical cell ID may be referred to as a carrier ID, and a cell index may be referred to as a carrier index. For example, when the disclosure refers to a first physical cell ID for a first downlink carrier, the disclosure may mean the first physical cell ID is for a cell comprising the first downlink carrier. The same/similar concept may apply to, for example, a carrier activation. When the disclosure indicates that a first carrier is activated, the specification may mean that a cell comprising the first carrier is activated.

In CA, a multi-carrier nature of a PHY may be exposed to a MAC. In an example, a HARQ entity may operate on a serving cell. A transport block may be generated per assignment/grant per serving cell. A transport block and potential HARQ retransmissions of the transport block may be mapped to a serving cell.

In the downlink, a base station may transmit (e.g., unicast, multicast, and/or broadcast) one or more Reference Signals (RSs) to a UE (e.g., PSS, SSS, CSI-RS, DMRS, and/or PT-RS, as shown in FIG. 5A). In the uplink, the UE may transmit one or more RSs to the base station (e.g., DMRS, PT-RS, and/or SRS, as shown in FIG. 5B). The PSS and the SSS may be transmitted by the base station and used by the UE to synchronize the UE to the base station. The PSS and the SSS may be provided in a synchronization signal (SS)/physical broadcast channel (PBCH) block that includes the PSS, the SSS, and the PBCH. The base station may periodically transmit a burst of SS/PBCH blocks.

Figure 11A:
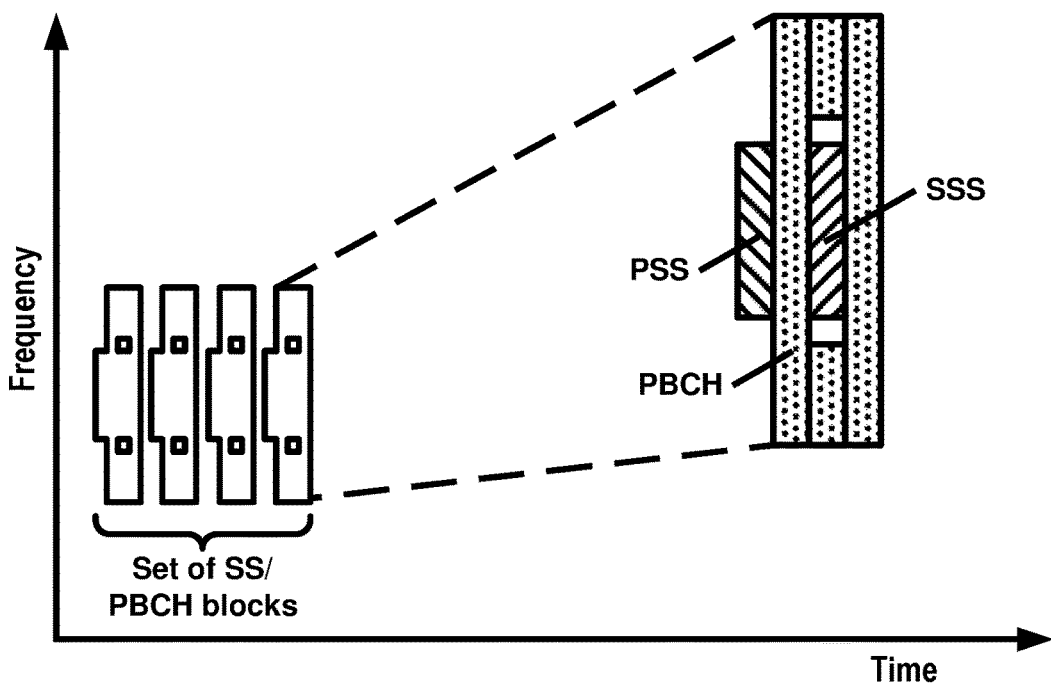
FIG. 11A illustrates an example of an SS/PBCH block structure and location.

FIG. 11A illustrates an example of an SS/PBCH block's structure and location. A burst of SS/PBCH blocks may include one or more SS/PBCH blocks (e.g., 4 SS/PBCH blocks, as shown in FIG. 11A). Bursts may be transmitted periodically (e.g., every 2 frames or 20 ms). A burst may be restricted to a half-frame (e.g., a first half-frame having a duration of 5 ms). It will be understood that FIG. 11A is an example, and that these parameters (number of SS/PBCH blocks per burst, periodicity of bursts, position of burst within the frame) may be configured based on, for example: a carrier frequency of a cell in which the SS/PBCH block is transmitted; a numerology or subcarrier spacing of the cell; a configuration by the network (e.g., using RRC signaling); or any other suitable factor. In an example, the UE may assume a subcarrier spacing for the SS/PBCH block based on the carrier frequency being monitored, unless the radio network configured the UE to assume a different subcarrier spacing.

The SS/PBCH block may span one or more OFDM symbols in the time domain (e.g., 4 OFDM symbols, as shown in the example of FIG. 11A) and may span one or more subcarriers in the frequency domain (e.g., 240 contiguous subcarriers). The PSS, the SSS, and the PBCH may have a common center frequency. The PSS may be transmitted first and may span, for example, 1 OFDM symbol and 127 subcarriers. The SSS may be transmitted after the PSS (e.g., two symbols later) and may span 1 OFDM symbol and 127 subcarriers. The PBCH may be transmitted after the PSS (e.g., across the next 3 OFDM symbols) and may span 240 subcarriers.

The location of the SS/PBCH block in the time and frequency domains may not be known to the UE (e.g., if the UE is searching for the cell). To find and select the cell, the UE may monitor a carrier for the PSS. For example, the UE may monitor a frequency location within the carrier. If the PSS is not found after a certain duration (e.g., 20 ms), the UE may search for the PSS at a different frequency location within the carrier, as indicated by a synchronization raster. If the PSS is found at a location in the time and frequency domains, the UE may determine, based on a known structure of the SS/PBCH block, the locations of the SSS and the PBCH, respectively. The SS/PBCH block may be a cell-defining SS block (CD-SSB). In an example, a primary cell may be associated with a CD-SSB. The CD-SSB may be located on a synchronization raster. In an example, a cell selection/search and/or reselection may be based on the CD-SSB.

The SS/PBCH block may be used by the UE to determine one or more parameters of the cell. For example, the UE may determine a physical cell identifier (PCI) of the cell based on the sequences of the PSS and the SSS, respectively. The UE may determine a location of a frame boundary of the cell based on the location of the SS/PBCH block. For example, the SS/PBCH block may indicate that it has been transmitted in accordance with a transmission pattern, wherein a SS/PBCH block in the transmission pattern is a known distance from the frame boundary.

The PBCH may use a QPSK modulation and may use forward error correction (FEC). The FEC may use polar coding. One or more symbols spanned by the PBCH may carry one or more DMRSs for demodulation of the PBCH. The PBCH may include an indication of a current system frame number (SFN) of the cell and/or a SS/PBCH block timing index. These parameters may facilitate time synchronization of the UE to the base station. The PBCH may include a master information block (MIB) used to provide the UE with one or more parameters. The MIB may be used by the UE to locate remaining minimum system information (RMSI) associated with the cell. The RMSI may include a System Information Block Type 1 (SIB1). The SIB1 may contain information needed by the UE to access the cell. The UE may use one or more parameters of the MIB to monitor PDCCH, which may be used to schedule PDSCH. The PDSCH may include the SIB1. The SIB1 may be decoded using parameters provided in the MIB. The PBCH may indicate an absence of SIB1. Based on the PBCH indicating the absence of SIB1, the UE may be pointed to a frequency. The UE may search for an SS/PBCH block at the frequency to which the UE is pointed.

The UE may assume that one or more SS/PBCH blocks transmitted with a same SS/PBCH block index are quasi co-located (QCLed) (e.g., having the same/similar Doppler spread, Doppler shift, average gain, average delay, and/or spatial Rx parameters). The UE may not assume QCL for SS/PBCH block transmissions having different SS/PBCH block indices.

SS/PBCH blocks (e.g., those within a half-frame) may be transmitted in spatial directions (e.g., using different beams that span a coverage area of the cell). In an example, a first SS/PBCH block may be transmitted in a first spatial direction using a first beam, and a second SS/PBCH block may be transmitted in a second spatial direction using a second beam.

In an example, within a frequency span of a carrier, a base station may transmit a plurality of SS/PBCH blocks. In an example, a first PCI of a first SS/PBCH block of the plurality of SS/PBCH blocks may be different from a second PCI of a second SS/PBCH block of the plurality of SS/PBCH blocks. The PCIs of SS/PBCH blocks transmitted in different frequency locations may be different or the same.

The CSI-RS may be transmitted by the base station and used by the UE to acquire channel state information (CSI). The base station may configure the UE with one or more CSI-RSs for channel estimation or any other suitable purpose. The base station may configure a UE with one or more of the same/similar CSI-RSs. The UE may measure the one or more CSI-RSs. The UE may estimate a downlink channel state and/or generate a CSI report based on the measuring of the one or more downlink CSI-RSs. The UE may provide the CSI report to the base station. The base station may use feedback provided by the UE (e.g., the estimated downlink channel state) to perform link adaptation.

The base station may semi-statically configure the UE with one or more CSI-RS resource sets. A CSI-RS resource may be associated with a location in the time and frequency domains and a periodicity. The base station may selectively activate and/or deactivate a CSI-RS resource. The base station may indicate to the UE that a CSI-RS resource in the CSI-RS resource set is activated and/or deactivated.

The base station may configure the UE to report CSI measurements. The base station may configure the UE to provide CSI reports periodically, aperiodically, or semi-persistently. For periodic CSI reporting, the UE may be configured with a timing and/or periodicity of a plurality of CSI reports. For aperiodic CSI reporting, the base station may request a CSI report. For example, the base station may command the UE to measure a configured CSI-RS resource and provide a CSI report relating to the measurements. For semi-persistent CSI reporting, the base station may configure the UE to transmit periodically, and selectively activate or deactivate the periodic reporting. The base station may configure the UE with a CSI-RS resource set and CSI reports using RRC signaling.

The CSI-RS configuration may comprise one or more parameters indicating, for example, up to 32 antenna ports. The UE may be configured to employ the same OFDM symbols for a downlink CSI-RS and a control resource set (CORESET) when the downlink CSI-RS and CORESET are spatially QCLed and resource elements associated with the downlink CSI-RS are outside of the physical resource blocks (PRBs) configured for the CORESET. The UE may be configured to employ the same OFDM symbols for downlink CSI-RS and SS/PBCH blocks when the downlink CSI-RS and SS/PBCH blocks are spatially QCLed and resource elements associated with the downlink CSI-RS are outside of PRBs configured for the SS/PBCH blocks.

Downlink DMRSs may be transmitted by a base station and used by a UE for channel estimation. For example, the downlink DMRS may be used for coherent demodulation of one or more downlink physical channels (e.g., PDSCH). An NR network may support one or more variable and/or configurable DMRS patterns for data demodulation. At least one downlink DMRS configuration may support a front-loaded DMRS pattern. A front-loaded DMRS may be mapped over one or more OFDM symbols (e.g., one or two adjacent OFDM symbols). A base station may semi-statically configure the UE with a number (e.g. a maximum number) of front-loaded DMRS symbols for PDSCH. A DMRS configuration may support one or more DMRS ports. For example, for single user-MIMO, a DMRS configuration may support up to eight orthogonal downlink DMRS ports per UE. For multiuser-MIMO, a DMRS configuration may support up to 4 orthogonal downlink DMRS ports per UE. A radio network may support (e.g., at least for CP-OFDM) a common DMRS structure for downlink and uplink, wherein a DMRS location, a DMRS pattern, and/or a scrambling sequence may be the same or different. The base station may transmit a downlink DMRS and a corresponding PDSCH using the same precoding matrix. The UE may use the one or more downlink DMRSs for coherent demodulation/channel estimation of the PDSCH.

In an example, a transmitter (e.g., a base station) may use a precoder matrices for a part of a transmission bandwidth. For example, the transmitter may use a first precoder matrix for a first bandwidth and a second precoder matrix for a second bandwidth. The first precoder matrix and the second precoder matrix may be different based on the first bandwidth being different from the second bandwidth. The UE may assume that a same precoding matrix is used across a set of PRBs. The set of PRBs may be denoted as a precoding resource block group (PRG).

A PDSCH may comprise one or more layers. The UE may assume that at least one symbol with DMRS is present on a layer of the one or more layers of the PDSCH. A higher layer may configure up to 3 DMRSs for the PDSCH.

Downlink PT-RS may be transmitted by a base station and used by a UE for phase-noise compensation. Whether a downlink PT-RS is present or not may depend on an RRC configuration. The presence and/or pattern of the downlink PT-RS may be configured on a UE-specific basis using a combination of RRC signaling and/or an association with one or more parameters employed for other purposes (e.g., modulation and coding scheme (MCS)), which may be indicated by DCI. When configured, a dynamic presence of a downlink PT-RS may be associated with one or more DCI parameters comprising at least MCS. An NR network may support a plurality of PT-RS densities defined in the time and/or frequency domains. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. Downlink PT-RS may be confined in the scheduled time/frequency duration for the UE. Downlink PT-RS may be transmitted on symbols to facilitate phase tracking at the receiver.

The UE may transmit an uplink DMRS to a base station for channel estimation. For example, the base station may use the uplink DMRS for coherent demodulation of one or more uplink physical channels. For example, the UE may transmit an uplink DMRS with a PUSCH and/or a PUCCH. The uplink DM-RS may span a range of frequencies that is similar to a range of frequencies associated with the corresponding physical channel. The base station may configure the UE with one or more uplink DMRS configurations. At least one DMRS configuration may support a front-loaded DMRS pattern. The front-loaded DMRS may be mapped over one or more OFDM symbols (e.g., one or two adjacent OFDM symbols). One or more uplink DMRSs may be configured to transmit at one or more symbols of a PUSCH and/or a PUCCH. The base station may semi-statically configure the UE with a number (e.g. maximum number) of front-loaded DMRS symbols for the PUSCH and/or the PUCCH, which the UE may use to schedule a single-symbol DMRS and/or a double-symbol DMRS. An NR network may support (e.g., for cyclic prefix orthogonal frequency division multiplexing (CP-OFDM)) a common DMRS structure for downlink and uplink, wherein a DMRS location, a DMRS pattern, and/or a scrambling sequence for the DMRS may be the same or different.

A PUSCH may comprise one or more layers, and the UE may transmit at least one symbol with DMRS present on a layer of the one or more layers of the PUSCH. In an example, a higher layer may configure up to three DMRSs for the PUSCH.

Uplink PT-RS (which may be used by a base station for phase tracking and/or phase-noise compensation) may or may not be present depending on an RRC configuration of the UE. The presence and/or pattern of uplink PT-RS may be configured on a UE-specific basis by a combination of RRC signaling and/or one or more parameters employed for other purposes (e.g., Modulation and Coding Scheme (MCS)), which may be indicated by DCI. When configured, a dynamic presence of uplink PT-RS may be associated with one or more DCI parameters comprising at least MCS. A radio network may support a plurality of uplink PT-RS densities defined in time/frequency domain. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. For example, uplink PT-RS may be confined in the scheduled time/frequency duration for the UE.

SRS may be transmitted by a UE to a base station for channel state estimation to support uplink channel dependent scheduling and/or link adaptation. SRS transmitted by the UE may allow a base station to estimate an uplink channel state at one or more frequencies. A scheduler at the base station may employ the estimated uplink channel state to assign one or more resource blocks for an uplink PUSCH transmission from the UE. The base station may semi-statically configure the UE with one or more SRS resource sets. For an SRS resource set, the base station may configure the UE with one or more SRS resources. An SRS resource set applicability may be configured by a higher layer (e.g., RRC) parameter. For example, when a higher layer parameter indicates beam management, an SRS resource in a SRS resource set of the one or more SRS resource sets (e.g., with the same/similar time domain behavior, periodic, aperiodic, and/or the like) may be transmitted at a time instant (e.g., simultaneously). The UE may transmit one or more SRS resources in SRS resource sets. An NR network may support aperiodic, periodic and/or semi-persistent SRS transmissions. The UE may transmit SRS resources based on one or more trigger types, wherein the one or more trigger types may comprise higher layer signaling (e.g., RRC) and/or one or more DCI formats. In an example, at least one DCI format may be employed for the UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH and SRS are transmitted in a same slot, the UE may be configured to transmit SRS after a transmission of a PUSCH and a corresponding uplink DMRS.

The base station may semi-statically configure the UE with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port is defined such that the channel over which a symbol on the antenna port is conveyed can be inferred from the channel over which another symbol on the same antenna port is conveyed. If a first symbol and a second symbol are transmitted on the same antenna port, the receiver may infer the channel (e.g., fading gain, multipath delay, and/or the like) for conveying the second symbol on the antenna port, from the channel for conveying the first symbol on the antenna port. A first antenna port and a second antenna port may be referred to as quasi co-located (QCLed) if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming require beam management. Beam management may comprise beam measurement, beam selection, and beam indication. A beam may be associated with one or more reference signals. For example, a beam may be identified by one or more beamformed reference signals. The UE may perform downlink beam measurement based on downlink reference signals (e.g., a channel state information reference signal (CSI-RS)) and generate a beam measurement report. The UE may perform the downlink beam measurement procedure after an RRC connection is set up with a base station.

Figure 11B:
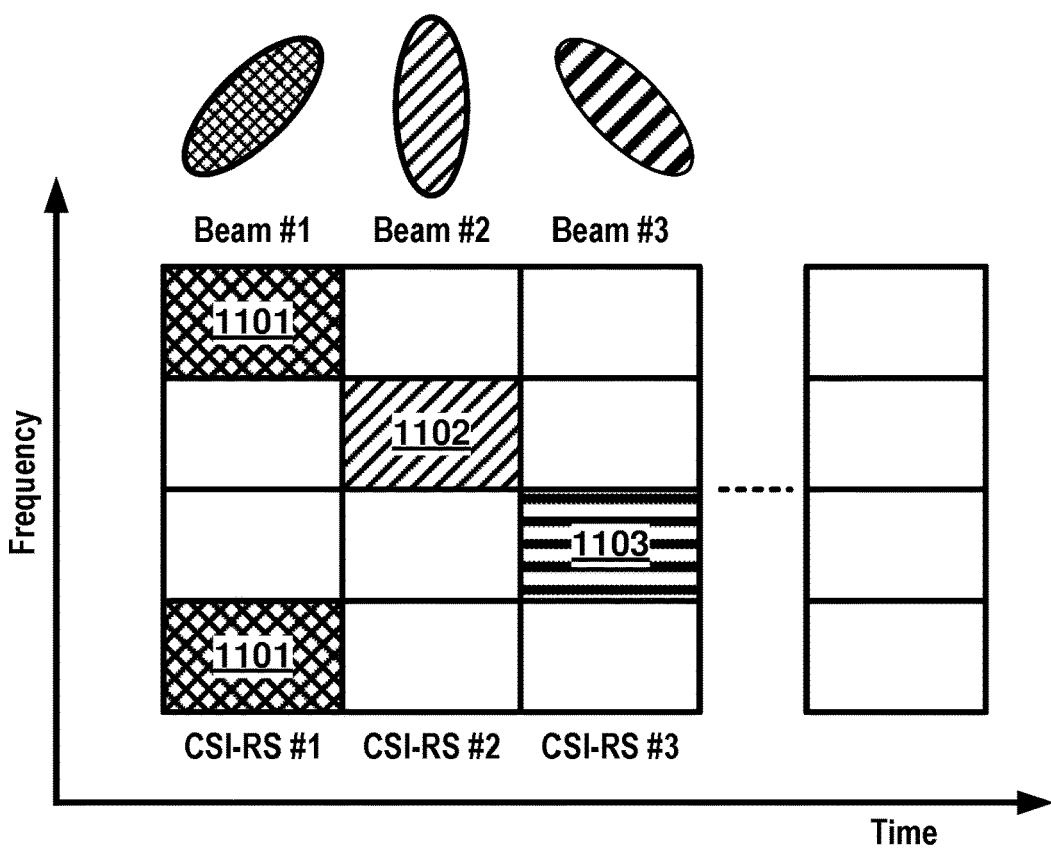
FIG. 11B illustrates an example of CSI-RSs that are mapped in the time and frequency domains.

FIG. 11B illustrates an example of channel state information reference signals (CSI-RSs) that are mapped in the time and frequency domains. A square shown in FIG. 11B may span a resource block (RB) within a bandwidth of a cell. A base station may transmit one or more RRC messages comprising CSI-RS resource configuration parameters indicating one or more CSI-RSs. One or more of the following parameters may be configured by higher layer signaling (e.g., RRC and/or MAC signaling) for a CSI-RS resource configuration: a CSI-RS resource configuration identity, a number of CSI-RS ports, a CSI-RS configuration (e.g., symbol and resource element (RE) locations in a subframe), a CSI-RS subframe configuration (e.g., subframe location, offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

The three beams illustrated in FIG. 11B may be configured for a UE in a UE-specific configuration. Three beams are illustrated in FIG. 11B (beam #1, beam #2, and beam #3), more or fewer beams may be configured. Beam #1 may be allocated with CSI-RS 1101 that may be transmitted in one or more subcarriers in an RB of a first symbol. Beam #2 may be allocated with CSI-RS 1102 that may be transmitted in one or more subcarriers in an RB of a second symbol. Beam #3 may be allocated with CSI-RS 1103 that may be transmitted in one or more subcarriers in an RB of a third symbol. By using frequency division multiplexing (FDM), a base station may use other subcarriers in a same RB (for example, those that are not used to transmit CSI-RS 1101) to transmit another CSI-RS associated with a beam for another UE. By using time domain multiplexing (TDM), beams used for the UE may be configured such that beams for the UE use symbols from beams of other UEs.

CSI-RSs such as those illustrated in FIG. 11B (e.g., CSI-RS 1101, 1102, 1103) may be transmitted by the base station and used by the UE for one or more measurements. For example, the UE may measure a reference signal received power (RSRP) of configured CSI-RS resources. The base station may configure the UE with a reporting configuration and the UE may report the RSRP measurements to a network (for example, via one or more base stations) based on the reporting configuration. In an example, the base station may determine, based on the reported measurement results, one or more transmission configuration indication (TCI) states comprising a number of reference signals. In an example, the base station may indicate one or more TCI states to the UE (e.g., via RRC signaling, a MAC CE, and/or a DCI). The UE may receive a downlink transmission with a receive (Rx) beam determined based on the one or more TCI states. In an example, the UE may or may not have a capability of beam correspondence. If the UE has the capability of beam correspondence, the UE may determine a spatial domain filter of a transmit (Tx) beam based on a spatial domain filter of the corresponding Rx beam. If the UE does not have the capability of beam correspondence, the UE may perform an uplink beam selection procedure to determine the spatial domain filter of the Tx beam. The UE may perform the uplink beam selection procedure based on one or more sounding reference signal (SRS) resources configured to the UE by the base station. The base station may select and indicate uplink beams for the UE based on measurements of the one or more SRS resources transmitted by the UE.

In a beam management procedure, a UE may assess (e.g., measure) a channel quality of one or more beam pair links, a beam pair link comprising a transmitting beam transmitted by a base station and a receiving beam received by the UE. Based on the assessment, the UE may transmit a beam measurement report indicating one or more beam pair quality parameters comprising, e.g., one or more beam identifications (e.g., a beam index, a reference signal index, or the like), RSRP, a precoding matrix indicator (PMI), a channel quality indicator (CQI), and/or a rank indicator (RI).

FIG. 12A illustrates examples of three downlink beam management procedures: P1, P2, and P3. Procedure P1 may enable a UE measurement on transmit (Tx) beams of a transmission reception point (TRP) (or multiple TRPs), e.g., to support a selection of one or more base station Tx beams and/or UE Rx beams (shown as ovals in the top row and bottom row, respectively, of P1). Beamforming at a TRP may comprise a Tx beam sweep for a set of beams (shown, in the top rows of P1 and P2, as ovals rotated in a counter-clockwise direction indicated by the dashed arrow). Beamforming at a UE may comprise an Rx beam sweep for a set of beams (shown, in the bottom rows of P1 and P3, as ovals rotated in a clockwise direction indicated by the dashed arrow). Procedure P2 may be used to enable a UE measurement on Tx beams of a TRP (shown, in the top row of P2, as ovals rotated in a counter-clockwise direction indicated by the dashed arrow). The UE and/or the base station may perform procedure P2 using a smaller set of beams than is used in procedure P1, or using narrower beams than the beams used in procedure P1. This may be referred to as beam refinement. The UE may perform procedure P3 for Rx beam determination by using the same Tx beam at the base station and sweeping an Rx beam at the UE.

FIG. 12B illustrates examples of three uplink beam management procedures: U1, U2, and U3. Procedure U1 may be used to enable a base station to perform a measurement on Tx beams of a UE, e.g., to support a selection of one or more UE Tx beams and/or base station Rx beams (shown as ovals in the top row and bottom row, respectively, of U1). Beamforming at the UE may include, e.g., a Tx beam sweep from a set of beams (shown in the bottom rows of U1 and U3 as ovals rotated in a clockwise direction indicated by the dashed arrow). Beamforming at the base station may include, e.g., an Rx beam sweep from a set of beams (shown, in the top rows of U1 and U2, as ovals rotated in a counter-clockwise direction indicated by the dashed arrow). Procedure U2 may be used to enable the base station to adjust its Rx beam when the UE uses a fixed Tx beam. The UE and/or the base station may perform procedure U2 using a smaller set of beams than is used in procedure P1, or using narrower beams than the beams used in procedure P1. This may be referred to as beam refinement The UE may perform procedure U3 to adjust its Tx beam when the base station uses a fixed Rx beam.

A UE may initiate a beam failure recovery (BFR) procedure based on detecting a beam failure. The UE may transmit a BFR request (e.g., a preamble, a UCI, an SR, a MAC CE, and/or the like) based on the initiating of the BFR procedure. The UE may detect the beam failure based on a determination that a quality of beam pair link(s) of an associated control channel is unsatisfactory (e.g., having an error rate higher than an error rate threshold, a received signal power lower than a received signal power threshold, an expiration of a timer, and/or the like).

The UE may measure a quality of a beam pair link using one or more reference signals (RSs) comprising one or more SS/PBCH blocks, one or more CSI-RS resources, and/or one or more demodulation reference signals (DMRSs). A quality of the beam pair link may be based on one or more of a block error rate (BLER), an RSRP value, a signal to interference plus noise ratio (SINR) value, a reference signal received quality (RSRQ) value, and/or a CSI value measured on RS resources. The base station may indicate that an RS resource is quasi co-located (QCLed) with one or more DM-RSs of a channel (e.g., a control channel, a shared data channel, and/or the like). The RS resource and the one or more DMRSs of the channel may be QCLed when the channel characteristics (e.g., Doppler shift, Doppler spread, average delay, delay spread, spatial Rx parameter, fading, and/or the like) from a transmission via the RS resource to the UE are similar or the same as the channel characteristics from a transmission via the channel to the UE.

A network (e.g., a gNB and/or an ng-eNB of a network) and/or the UE may initiate a random access procedure. A UE in an RRC_IDLE state and/or an RRC_INACTIVE state may initiate the random access procedure to request a connection setup to a network. The UE may initiate the random access procedure from an RRC_CONNECTED state. The UE may initiate the random access procedure to request uplink resources (e.g., for uplink transmission of an SR when there is no PUCCH resource available) and/or acquire uplink timing (e.g., when uplink synchronization status is non-synchronized). The UE may initiate the random access procedure to request one or more system information blocks (SIBs) (e.g., other system information such as SIB2, SIB3, and/or the like). The UE may initiate the random access procedure for a beam failure recovery request. A network may initiate a random access procedure for a handover and/or for establishing time alignment for an SCell addition.

Figure 13C:
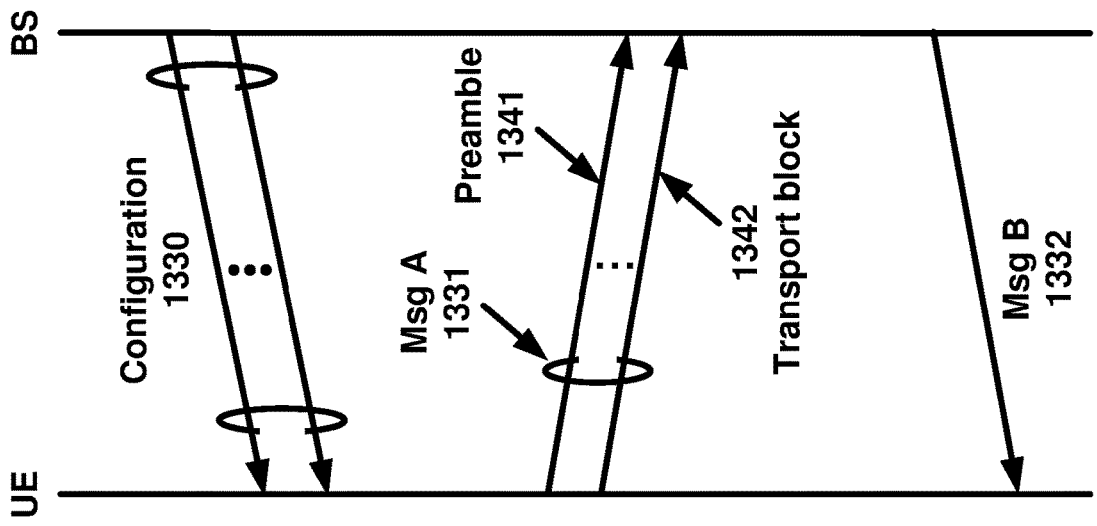
FIG. 13A, FIG. 13B, and FIG. 13C respectively illustrate a four-step contention-based random access procedure, a two-step contention-free random access procedure, and another two-step random access procedure.
Figure 13B:
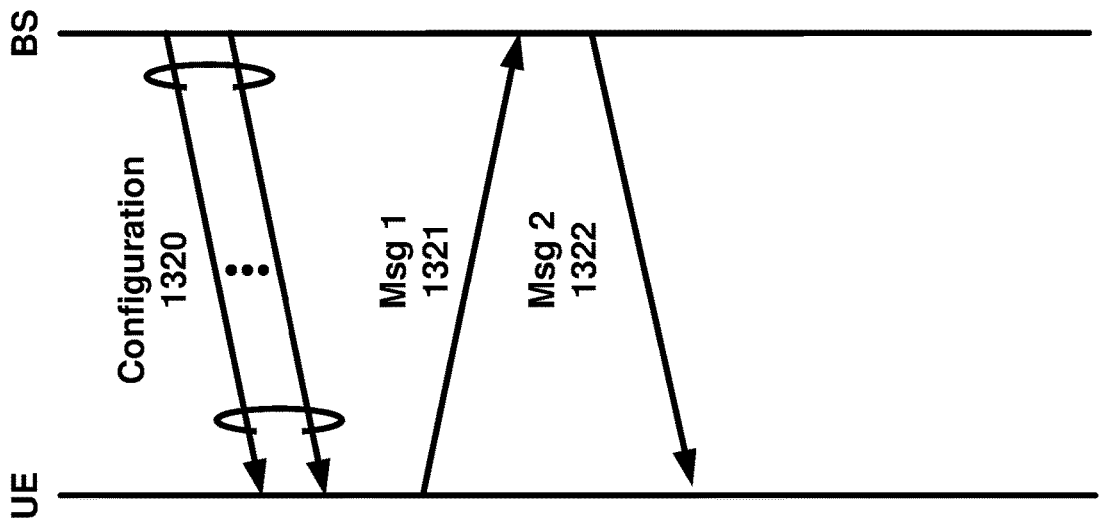
Figure 13A:
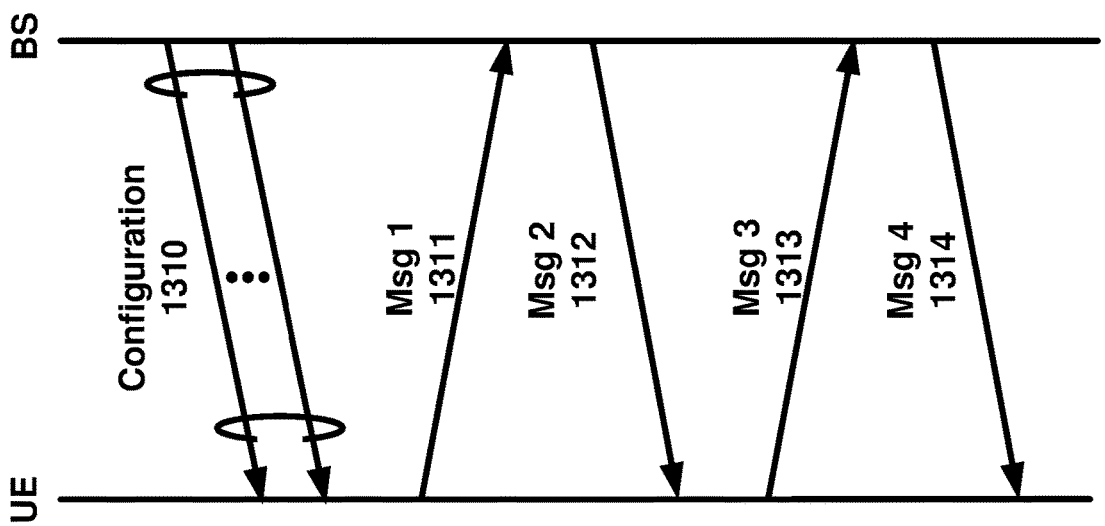

FIG. 13A illustrates a four-step contention-based random access procedure. Prior to initiation of the procedure, a base station may transmit a configuration message 1310 to the UE. The procedure illustrated in FIG. 13A comprises transmission of four messages: a Msg 1 1311, a Msg2 1312, a Msg3 1313, and a Msg4 1314. The Msg 1 1311 may include and/or be referred to as a preamble (or a random access preamble). The Msg 2 1312 may include and/or be referred to as a random access response (RAR).

The configuration message 1310 may be transmitted, for example, using one or more RRC messages. The one or more RRC messages may indicate one or more random access channel (RACH) parameters to the UE. The one or more RACH parameters may comprise at least one of following: general parameters for one or more random access procedures (e.g., RACH-configGeneral); cell-specific parameters (e.g., RACH-ConfigCommon); and/or dedicated parameters (e.g., RACH-configDedicated). The base station may broadcast or multicast the one or more RRC messages to one or more UEs. The one or more RRC messages may be UE-specific (e.g., dedicated RRC messages transmitted to a UE in an RRC_CONNECTED state and/or in an RRC_INACTIVE state). The UE may determine, based on the one or more RACH parameters, a time-frequency resource and/or an uplink transmit power for transmission of the Msg 1 1311 and/or the Msg 3 1313. Based on the one or more RACH parameters, the UE may determine a reception timing and a downlink channel for receiving the Msg 2 1312 and the Msg 4 1314.

The one or more RACH parameters provided in the configuration message 1310 may indicate one or more Physical RACH (PRACH) occasions available for transmission of the Msg 1 1311. The one or more PRACH occasions may be predefined. The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. For example, the one or more RACH parameters may indicate a number of SS/PBCH blocks mapped to a PRACH occasion and/or a number of preambles mapped to a SS/PBCH blocks.

The one or more RACH parameters provided in the configuration message 1310 may be used to determine an uplink transmit power of Msg 1 1311 and/or Msg 3 1313. For example, the one or more RACH parameters may indicate a reference power for a preamble transmission (e.g., a received target power and/or an initial power of the preamble transmission). There may be one or more power offsets indicated by the one or more RACH parameters. For example, the one or more RACH parameters may indicate: a power ramping step; a power offset between SSB and CSI-RS; a power offset between transmissions of the Msg 1 1311 and the Msg 3 1313; and/or a power offset value between preamble groups. The one or more RACH parameters may indicate one or more thresholds based on which the UE may determine at least one reference signal (e.g., an SSB and/or CSI-RS) and/or an uplink carrier (e.g., a normal uplink (NUL) carrier and/or a supplemental uplink (SUL) carrier).

The Msg 1 1311 may include one or more preamble transmissions (e.g., a preamble transmission and one or more preamble retransmissions). An RRC message may be used to configure one or more preamble groups (e.g., group A and/or group B). A preamble group may comprise one or more preambles. The UE may determine the preamble group based on a pathloss measurement and/or a size of the Msg 3 1313. The UE may measure an RSRP of one or more reference signals (e.g., SSBs and/or CSI-RSs) and determine at least one reference signal having an RSRP above an RSRP threshold (e.g., rsrp-ThresholdSSB and/or rsrp-Threshold-CSI-RS). The UE may select at least one preamble associated with the one or more reference signals and/or a selected preamble group, for example, if the association between the one or more preambles and the at least one reference signal is configured by an RRC message.

The UE may determine the preamble based on the one or more RACH parameters provided in the configuration message 1310. For example, the UE may determine the preamble based on a pathloss measurement, an RSRP measurement, and/or a size of the Msg 3 1313. As another example, the one or more RACH parameters may indicate: a preamble format; a maximum number of preamble transmissions; and/or one or more thresholds for determining one or more preamble groups (e.g., group A and group B). A base station may use the one or more RACH parameters to configure the UE with an association between one or more preambles and one or more reference signals (e.g., SSBs and/or CSI-RSs). If the association is configured, the UE may determine the preamble to include in Msg 1 1311 based on the association. The Msg 1 1311 may be transmitted to the base station via one or more PRACH occasions. The UE may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The UE may perform a preamble retransmission if no response is received following a preamble transmission. The UE may increase an uplink transmit power for the preamble retransmission. The UE may select an initial preamble transmit power based on a pathloss measurement and/or a target received preamble power configured by the network. The UE may determine to retransmit a preamble and may ramp up the uplink transmit power. The UE may receive one or more RACH parameters (e.g., PREAMBLE_POWER_RAMPING_STEP) indicating a ramping step for the preamble retransmission. The ramping step may be an amount of incremental increase in uplink transmit power for a retransmission. The UE may ramp up the uplink transmit power if the UE determines a reference signal (e.g., SSB and/or CSI-RS) that is the same as a previous preamble transmission. The UE may count a number of preamble transmissions and/or retransmissions (e.g., PREAMBLE_TRANSMISSION_COUNTER). The UE may determine that a random access procedure completed unsuccessfully, for example, if the number of preamble transmissions exceeds a threshold configured by the one or more RACH parameters (e.g., preambleTransMax).

The Msg 2 1312 received by the UE may include an RAR. In some scenarios, the Msg 2 1312 may include multiple RARs corresponding to multiple UEs. The Msg 2 1312 may be received after or in response to the transmitting of the Msg 1 1311. The Msg2 1312 may be scheduled on the DL-SCH and indicated on a PDCCH using a random access RNTI (RA-RNTI). The Msg 2 1312 may indicate that the Msg 1 1311 was received by the base station. The Msg 2 1312 may include a time-alignment command that may be used by the UE to adjust the UE's transmission timing, a scheduling grant for transmission of the Msg 3 1313, and/or a Temporary Cell RNTI (TC-RNTI). After transmitting a preamble, the UE may start a time window (e.g., ra-ResponseWindow) to monitor a PDCCH for the Msg 2 1312. The UE may determine when to start the time window based on a PRACH occasion that the UE uses to transmit the preamble. For example, the UE may start the time window one or more symbols after a last symbol of the preamble (e.g., at a first PDCCH occasion from an end of a preamble transmission). The one or more symbols may be determined based on a numerology. The PDCCH may be in a common search space (e.g., a Type1-PDCCH common search space) configured by an RRC message. The UE may identify the RAR based on a Radio Network Temporary Identifier (RNTI). RNTIs may be used depending on one or more events initiating the random access procedure. The UE may use random access RNTI (RA-RNTI). The RA-RNTI may be associated with PRACH occasions in which the UE transmits a preamble. For example, the UE may determine the RA-RNTI based on: an OFDM symbol index; a slot index; a frequency domain index; and/or a UL carrier indicator of the PRACH occasions. An example of RA-RNTI may be as follows:

$$RA\text{-}RNTI = 1 + s\_id + 14 \times t\_id + 14 \times 80 \times f\_id + 14 \times 80 \times 8 \times ul\_carrier\_id$$

where s_id may be an index of a first OFDM symbol of the PRACH occasion (e.g., $0 \leq s\_id < 14$), t_id may be an index of a first slot of the PRACH occasion in a system frame (e.g., $0 \leq t\_id < 80$), f_id may be an index of the PRACH occasion in the frequency domain (e.g., $0 \leq f\_id < 8$), and ul_carrier_id may be a UL carrier used for a preamble transmission (e.g., 0 for an NUL carrier, and 1 for an SUL carrier).

The UE may transmit the Msg 3 1313 in response to a successful reception of the Msg 2 1312 (e.g., using resources identified in the Msg 2 1312). The Msg 3 1313 may be used for contention resolution in, for example, the contention-based random access procedure illustrated in FIG. 13A. In some scenarios, a plurality of UEs may transmit a same preamble to a base station and the base station may provide an RAR that corresponds to a UE. Collisions may occur if the plurality of UEs interpret the RAR as corresponding to themselves. Contention resolution (e.g., using the Msg 3 1313 and the Msg 4 1314) may be used to increase the likelihood that the UE does not incorrectly use an identity of another the UE. To perform contention resolution, the UE may include a device identifier in the Msg 3 1313 (e.g., a C-RNTI if assigned, a TC-RNTI included in the Msg 2 1312, and/or any other suitable identifier).

The Msg 4 1314 may be received after or in response to the transmitting of the Msg 3 1313. If a C-RNTI was included in the Msg 3 1313, the base station will address the UE on the PDCCH using the C-RNTI. If the UE's unique C-RNTI is detected on the PDCCH, the random access procedure is determined to be successfully completed. If a TC-RNTI is included in the Msg 3 1313 (e.g., if the UE is in an RRC_IDLE state or not otherwise connected to the base station), Msg 4 1314 will be received using a DL-SCH associated with the TC-RNTI. If a MAC PDU is successfully decoded and a MAC PDU comprises the UE contention resolution identity MAC CE that matches or otherwise corresponds with the CCCH SDU sent (e.g., transmitted) in Msg 3 1313, the UE may determine that the contention resolution is successful and/or the UE may determine that the random access procedure is successfully completed.

The UE may be configured with a supplementary uplink (SUL) carrier and a normal uplink (NUL) carrier. An initial access (e.g., random access procedure) may be supported in an uplink carrier. For example, a base station may configure the UE with two separate RACH configurations: one for an SUL carrier and the other for an NUL carrier. For random access in a cell configured with an SUL carrier, the network may indicate which carrier to use (NUL or SUL). The UE may determine the SUL carrier, for example, if a measured quality of one or more reference signals is lower than a broadcast threshold. Uplink transmissions of the random access procedure (e.g., the Msg 1 1311 and/or the Msg 3 1313) may remain on the selected carrier. The UE may switch an uplink carrier during the random access procedure (e.g., between the Msg 1 1311 and the Msg 3 1313) in one or more cases. For example, the UE may determine and/or switch an uplink carrier for the Msg 1 1311 and/or the Msg 3 1313 based on a channel clear assessment (e.g., a listen-before-talk).

FIG. 13B illustrates a two-step contention-free random access procedure. Similar to the four-step contention-based random access procedure illustrated in FIG. 13A, a base station may, prior to initiation of the procedure, transmit a configuration message 1320 to the UE. The configuration message 1320 may be analogous in some respects to the configuration message 1310. The procedure illustrated in FIG. 13B comprises transmission of two messages: a Msg 1 1321 and a Msg 2 1322. The Msg 1 1321 and the Msg 2 1322 may be analogous in some respects to the Msg 1 1311 and a Msg 2 1312 illustrated in FIG. 13A, respectively. As will be understood from FIGS. 13A and 13B, the contention-free random access procedure may not include messages analogous to the Msg 3 1313 and/or the Msg 4 1314.

The contention-free random access procedure illustrated in FIG. 13B may be initiated for a beam failure recovery, other SI request, SCell addition, and/or handover. For example, a base station may indicate or assign to the UE the preamble to be used for the Msg 1 1321. The UE may receive, from the base station via PDCCH and/or RRC, an indication of a preamble (e.g., ra-PreambleIndex).

After transmitting a preamble, the UE may start a time window (e.g., ra-ResponseWindow) to monitor a PDCCH for the RAR. In the event of a beam failure recovery request, the base station may configure the UE with a separate time window and/or a separate PDCCH in a search space indicated by an RRC message (e.g., recoverySearchSpaceId). The UE may monitor for a PDCCH transmission addressed to a Cell RNTI (C-RNTI) on the search space. In the contention-free random access procedure illustrated in FIG. 13B, the UE may determine that a random access procedure successfully completes after or in response to transmission of Msg 1 1321 and reception of a corresponding Msg 2 1322. The UE may determine that a random access procedure successfully completes, for example, if a PDCCH transmission is addressed to a C-RNTI. The UE may determine that a random access procedure successfully completes, for example, if the UE receives an RAR comprising a preamble identifier corresponding to a preamble transmitted by the UE and/or the RAR comprises a MAC sub-PDU with the preamble identifier. The UE may determine the response as an indication of an acknowledgement for an SI request.

FIG. 13C illustrates another two-step random access procedure. Similar to the random access procedures illustrated in FIGS. 13A and 13B, a base station may, prior to initiation of the procedure, transmit a configuration message 1330 to the UE. The configuration message 1330 may be analogous in some respects to the configuration message 1310 and/or the configuration message 1320. The procedure illustrated in FIG. 13C comprises transmission of two messages: a Msg A 1331 and a Msg B 1332.

Msg A 1331 may be transmitted in an uplink transmission by the UE. Msg A 1331 may comprise one or more transmissions of a preamble 1341 and/or one or more transmissions of a transport block 1342. The transport block 1342 may comprise contents that are similar and/or equivalent to the contents of the Msg 3 1313 illustrated in FIG. 13A. The transport block 1342 may comprise UCI (e.g., an SR, a HARQ ACK/NACK, and/or the like). The UE may receive the Msg B 1332 after or in response to transmitting the Msg A 1331. The Msg B 1332 may comprise contents that are similar and/or equivalent to the contents of the Msg 2 1312 (e.g., an RAR) illustrated in FIGS. 13A and 13B and/or the Msg 4 1314 illustrated in FIG. 13A.

The UE may initiate the two-step random access procedure in FIG. 13C for licensed spectrum and/or unlicensed spectrum. The UE may determine, based on one or more factors, whether to initiate the two-step random access procedure. The one or more factors may be: a radio access technology in use (e.g., LTE, NR, and/or the like); whether the UE has valid TA or not; a cell size; the UE's RRC state; a type of spectrum (e.g., licensed vs. unlicensed); and/or any other suitable factors.

The UE may determine, based on two-step RACH parameters included in the configuration message 1330, a radio resource and/or an uplink transmit power for the preamble 1341 and/or the transport block 1342 included in the Msg A 1331. The RACH parameters may indicate a modulation and coding schemes (MCS), a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the UE to determine a reception timing and a downlink channel for monitoring for and/or receiving Msg B 1332.

The transport block 1342 may comprise data (e.g., delay-sensitive data), an identifier of the UE, security information, and/or device information (e.g., an International Mobile Subscriber Identity (IMSI)). The base station may transmit the Msg B 1332 as a response to the Msg A 1331. The Msg B 1332 may comprise at least one of following: a preamble identifier; a timing advance command; a power control command; an uplink grant (e.g., a radio resource assignment and/or an MCS); a UE identifier for contention resolution; and/or an RNTI (e.g., a C-RNTI or a TC-RNTI). The UE may determine that the two-step random access procedure is successfully completed if: a preamble identifier in the Msg B 1332 is matched to a preamble transmitted by the UE; and/or the identifier of the UE in Msg B 1332 is matched to the identifier of the UE in the Msg A 1331 (e.g., the transport block 1342).

A UE and a base station may exchange control signaling. The control signaling may be referred to as L1/L2 control signaling and may originate from the PHY layer (e.g., layer 1) and/or the MAC layer (e.g., layer 2). The control signaling may comprise downlink control signaling transmitted from the base station to the UE and/or uplink control signaling transmitted from the UE to the base station.

The downlink control signaling may comprise: a downlink scheduling assignment; an uplink scheduling grant indicating uplink radio resources and/or a transport format; a slot format information; a preemption indication; a power control command; and/or any other suitable signaling. The UE may receive the downlink control signaling in a payload transmitted by the base station on a physical downlink control channel (PDCCH). The payload transmitted on the PDCCH may be referred to as downlink control information (DCI). In some scenarios, the PDCCH may be a group common PDCCH (GC-PDCCH) that is common to a group of UEs.

A base station may attach one or more cyclic redundancy check (CRC) parity bits to a DCI in order to facilitate detection of transmission errors. When the DCI is intended for a UE (or a group of the UEs), the base station may scramble the CRC parity bits with an identifier of the UE (or an identifier of the group of the UEs). Scrambling the CRC parity bits with the identifier may comprise Modulo-2 addition (or an exclusive OR operation) of the identifier value and the CRC parity bits. The identifier may comprise a 16-bit value of a radio network temporary identifier (RNTI).

DCIs may be used for different purposes. A purpose may be indicated by the type of RNTI used to scramble the CRC parity bits. For example, a DCI having CRC parity bits scrambled with a paging RNTI (P-RNTI) may indicate paging information and/or a system information change notification. The P-RNTI may be predefined as "FFFE" in hexadecimal. A DCI having CRC parity bits scrambled with a system information RNTI (SI-RNTI) may indicate a broadcast transmission of the system information. The SI-RNTI may be predefined as "FFFF" in hexadecimal. A DCI having CRC parity bits scrambled with a random access RNTI (RA-RNTI) may indicate a random access response (RAR). A DCI having CRC parity bits scrambled with a cell RNTI (C-RNTI) may indicate a dynamically scheduled unicast transmission and/or a triggering of PDCCH-ordered random access. A DCI having CRC parity bits scrambled with a temporary cell RNTI (TC-RNTI) may indicate a contention resolution (e.g., a Msg 3 analogous to the Msg 3 1313 illustrated in FIG. 13A). Other RNTIs configured to the UE by a base station may comprise a Configured Scheduling RNTI (CS-RNTI), a Transmit Power Control-PUCCH RNTI (TPC-PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C-RNTI), and/or the like.

Depending on the purpose and/or content of a DCI, the base station may transmit the DCIs with one or more DCI formats. For example, DCI format 00 may be used for scheduling of PUSCH in a cell. DCI format 00 may be a fallback DCI format (e.g., with compact DCI payloads). DCI format 01 may be used for scheduling of PUSCH in a cell (e.g., with more DCI payloads than DCI format 0_0). DCI format 10 may be used for scheduling of PDSCH in a cell. DCI format 10 may be a fallback DCI format (e.g., with compact DCI payloads). DCI format 1_1 may be used for scheduling of PDSCH in a cell (e.g., with more DCI payloads than DCI format 1_0). DCI format 20 may be used for providing a slot format indication to a group of UEs. DCI format 21 may be used for notifying a group of UEs of a physical resource block and/or OFDM symbol where the UE may assume no transmission is intended to the UE. DCI format 22 may be used for transmission of a transmit power control (TPC) command for PUCCH or PUSCH. DCI format 23 may be used for transmission of a group of TPC commands for SRS transmissions by one or more UEs. DCI format(s) for new functions may be defined in future releases. DCI formats may have different DCI sizes, or may share the same DCI size.

After scrambling a DCI with a RNTI, the base station may process the DCI with channel coding (e.g., polar coding), rate matching, scrambling and/or QPSK modulation. A base station may map the coded and modulated DCI on resource elements used and/or configured for a PDCCH. Based on a payload size of the DCI and/or a coverage of the base station, the base station may transmit the DCI via a PDCCH occupying a number of contiguous control channel elements (CCEs). The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
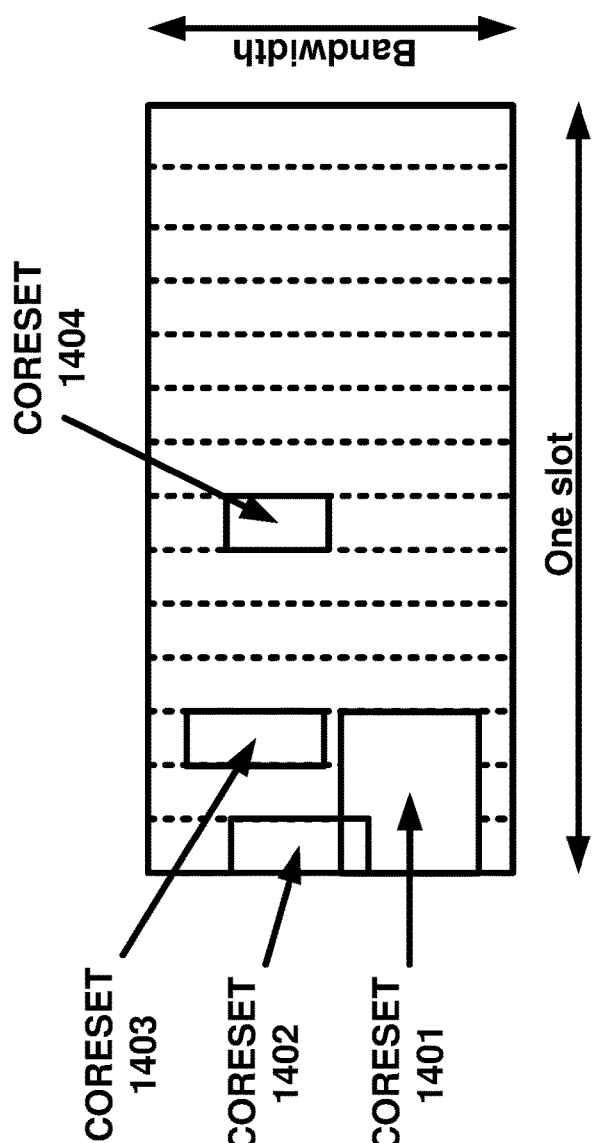
FIG. 14A illustrates an example of CORESET configurations for a bandwidth part.

FIG. 14A illustrates an example of CORESET configurations for a bandwidth part. The base station may transmit a DCI via a PDCCH on one or more control resource sets (CORESETs). A CORESET may comprise a time-frequency resource in which the UE tries to decode a DCI using one or more search spaces. The base station may configure a CORESET in the time-frequency domain. In the example of FIG. 14A, a first CORESET 1401 and a second CORESET 1402 occur at the first symbol in a slot. The first CORESET 1401 overlaps with the second CORESET 1402 in the frequency domain. A third CORESET 1403 occurs at a third symbol in the slot. A fourth CORESET 1404 occurs at the seventh symbol in the slot. CORESETs may have a different number of resource blocks in frequency domain.

Figure 14B:
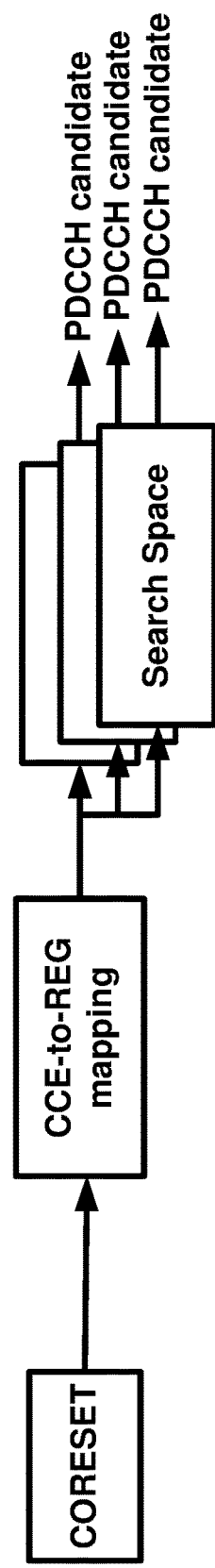
FIG. 14B illustrates an example of a CCE-to-REG mapping for DCI transmission on a CORESET and PDCCH processing.

FIG. 14B illustrates an example of a CCE-to-REG mapping for DCI transmission on a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping by RRC configuration. A CORESET may be configured with an antenna port quasi co-location (QCL) parameter. The antenna port QCL parameter may indicate QCL information of a demodulation reference signal (DMRS) for PDCCH reception in the CORESET.

The base station may transmit, to the UE, RRC messages comprising configuration parameters of one or more CORESETs and one or more search space sets. The configuration parameters may indicate an association between a search space set and a CORESET. A search space set may comprise a set of PDCCH candidates formed by CCEs at a given aggregation level. The configuration parameters may indicate: a number of PDCCH candidates to be monitored per aggregation level; a PDCCH monitoring periodicity and a PDCCH monitoring pattern; one or more DCI formats to be monitored by the UE; and/or whether a search space set is a common search space set or a UE-specific search space set. A set of CCEs in the common search space set may be predefined and known to the UE. A set of CCEs in the UE-specific search space set may be configured based on the UE's identity (e.g., C-RNTI).

As shown in FIG. 14B, the UE may determine a time-frequency resource for a CORESET based on RRC messages. The UE may determine a CCE-to-REG mapping (e.g., interleaved or non-interleaved, and/or mapping parameters) for the CORESET based on configuration parameters of the CORESET. The UE may determine a number (e.g., at most 10) of search space sets configured on the CORESET based on the RRC messages. The UE may monitor a set of PDCCH candidates according to configuration parameters of a search space set. The UE may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding a DCI content of one or more PDCCH candidates with possible (or configured) PDCCH locations, possible (or configured) PDCCH formats (e.g., number of CCEs, number of PDCCH candidates in common search spaces, and/or number of PDCCH candidates in the UE-specific search spaces) and possible (or configured) DCI formats. The decoding may be referred to as blind decoding. The UE may determine a DCI as valid for the UE, in response to CRC checking (e.g., scrambled bits for CRC parity bits of the DCI matching a RNTI value). The UE may process information contained in the DCI (e.g., a scheduling assignment, an uplink grant, power control, a slot format indication, a downlink preemption, and/or the like).

The UE may transmit uplink control signaling (e.g., uplink control information (UCI)) to a base station. The uplink control signaling may comprise hybrid automatic repeat request (HARQ) acknowledgements for received DL-SCH transport blocks. The UE may transmit the HARQ acknowledgements after receiving a DL-SCH transport block. Uplink control signaling may comprise channel state information (CSI) indicating channel quality of a physical downlink channel. The UE may transmit the CSI to the base station. The base station, based on the received CSI, may determine transmission format parameters (e.g., comprising multi-antenna and beamforming schemes) for a downlink transmission. Uplink control signaling may comprise scheduling requests (SR). The UE may transmit an SR indicating that uplink data is available for transmission to the base station. The UE may transmit a UCI (e.g., HARQ acknowledgements (HARQ-ACK), CSI report, SR, and the like) via a physical uplink control channel (PUCCH) or a physical uplink shared channel (PUSCH). The UE may transmit the uplink control signaling via a PUCCH using one of several PUCCH formats.

There may be five PUCCH formats and the UE may determine a PUCCH format based on a size of the UCI (e.g., a number of uplink symbols of UCI transmission and a number of UCI bits). PUCCH format 0 may have a length of one or two OFDM symbols and may include two or fewer bits. The UE may transmit UCI in a PUCCH resource using PUCCH format 0 if the transmission is over one or two symbols and the number of HARQ-ACK information bits with positive or negative SR (HARQ-ACK/SR bits) is one or two. PUCCH format 1 may occupy a number between four and fourteen OFDM symbols and may include two or fewer bits. The UE may use PUCCH format 1 if the transmission is four or more symbols and the number of HARQ-ACK/SR bits is one or two. PUCCH format 2 may occupy one or two OFDM symbols and may include more than two bits. The UE may use PUCCH format 2 if the transmission is over one or two symbols and the number of UCI bits is two or more. PUCCH format 3 may occupy a number between four and fourteen OFDM symbols and may include more than two bits. The UE may use PUCCH format 3 if the transmission is four or more symbols, the number of UCI bits is two or more and PUCCH resource does not include an orthogonal cover code. PUCCH format 4 may occupy a number between four and fourteen OFDM symbols and may include more than two bits. The UE may use PUCCH format 4 if the transmission is four or more symbols, the number of UCI bits is two or more and the PUCCH resource includes an orthogonal cover code.

The base station may transmit configuration parameters to the UE for a plurality of PUCCH resource sets using, for example, an RRC message. The plurality of PUCCH resource sets (e.g., up to four sets) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the UE may transmit using one of the plurality of PUCCH resources in the PUCCH resource set. When configured with a plurality of PUCCH resource sets, the UE may select one of the plurality of PUCCH resource sets based on a total bit length of the UCI information bits (e.g., HARQ-ACK, SR, and/or CSI). If the total bit length of UCI information bits is two or fewer, the UE may select a first PUCCH resource set having a PUCCH resource set index equal to "0". If the total bit length of UCI information bits is greater than two and less than or equal to a first configured value, the UE may select a second PUCCH resource set having a PUCCH resource set index equal to "1". If the total bit length of UCI information bits is greater than the first configured value and less than or equal to a second configured value, the UE may select a third PUCCH resource set having a PUCCH resource set index equal to "2". If the total bit length of UCI information bits is greater than the second configured value and less than or equal to a third value (e.g., 1406), the UE may select a fourth PUCCH resource set having a PUCCH resource set index equal to "3".

After determining a PUCCH resource set from a plurality of PUCCH resource sets, the UE may determine a PUCCH resource from the PUCCH resource set for UCI (HARQ-ACK, CSI, and/or SR) transmission. The UE may determine the PUCCH resource based on a PUCCH resource indicator in a DCI (e.g., with a DCI format 10 or DCI for 1_1) received on a PDCCH. A three-bit PUCCH resource indicator in the DCI may indicate one of eight PUCCH resources in the PUCCH resource set. Based on the PUCCH resource indicator, the UE may transmit the UCI (HARQ-ACK, CSI and/or SR) using a PUCCH resource indicated by the PUCCH resource indicator in the DCI.

Figure 15:
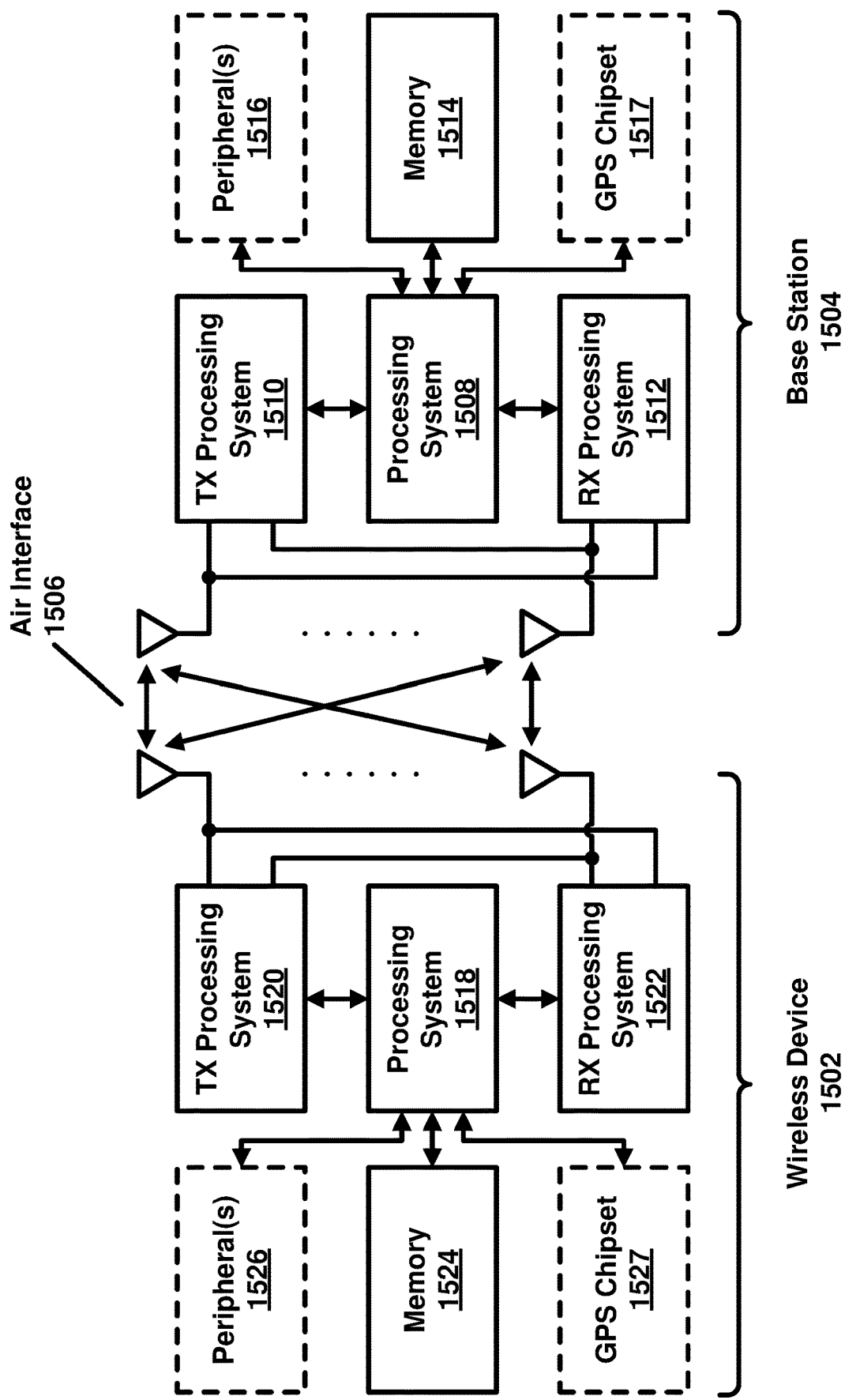
FIG. 15 illustrates an example of a wireless device in communication with a base station.

FIG. 15 illustrates an example of a wireless device 1502 in communication with a base station 1504 in accordance with embodiments of the present disclosure. The wireless device 1502 and base station 1504 may be part of a mobile communication network, such as the mobile communication network 100 illustrated in FIG. 1A, the mobile communication network 150 illustrated in FIG. 1B, or any other communication network. Only one wireless device 1502 and one base station 1504 are illustrated in FIG. 15, but it will be understood that a mobile communication network may include more than one UE and/or more than one base station, with the same or similar configuration as those shown in FIG. 15.

The base station 1504 may connect the wireless device 1502 to a core network (not shown) through radio communications over the air interface (or radio interface) 1506. The communication direction from the base station 1504 to the wireless device 1502 over the air interface 1506 is known as the downlink, and the communication direction from the wireless device 1502 to the base station 1504 over the air interface is known as the uplink. Downlink transmissions may be separated from uplink transmissions using FDD, TDD, and/or some combination of the two duplexing techniques.

In the downlink, data to be sent to the wireless device 1502 from the base station 1504 may be provided to the processing system 1508 of the base station 1504. The data may be provided to the processing system 1508 by, for example, a core network. In the uplink, data to be sent to the base station 1504 from the wireless device 1502 may be provided to the processing system 1518 of the wireless device 1502. The processing system 1508 and the processing system 1518 may implement layer 3 and layer 2 OSI functionality to process the data for transmission. Layer 2 may include an SDAP layer, a PDCP layer, an RLC layer, and a MAC layer, for example, with respect to FIG. 2A, FIG. 2B, FIG. 3, and FIG. 4A. Layer 3 may include an RRC layer as with respect to FIG. 2B.

After being processed by processing system 1508, the data to be sent to the wireless device 1502 may be provided to a transmission processing system 1510 of base station 1504. Similarly, after being processed by the processing system 1518, the data to be sent to base station 1504 may be provided to a transmission processing system 1520 of the wireless device 1502. The transmission processing system 1510 and the transmission processing system 1520 may implement layer 1 OSI functionality. Layer 1 may include a PHY layer with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

At the base station 1504, a reception processing system 1512 may receive the uplink transmission from the wireless device 1502. At the wireless device 1502, a reception processing system 1522 may receive the downlink transmission from base station 1504. The reception processing system 1512 and the reception processing system 1522 may implement layer 1 OSI functionality. Layer 1 may include a PHY layer with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

As shown in FIG. 15, a wireless device 1502 and the base station 1504 may include multiple antennas. The multiple antennas may be used to perform one or more MIMO or multi-antenna techniques, such as spatial multiplexing (e.g., single-user MIMO or multi-user MIMO), transmit/receive diversity, and/or beamforming. In other examples, the wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518 to carry out one or more of the functionalities discussed in the present application. Although not shown in FIG. 15, the transmission processing system 1510, the transmission processing system 1520, the reception processing system 1512, and/or the reception processing system 1522 may be coupled to a memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and the base station 1504 to operate in a wireless environment.

The processing system 1508 and/or the processing system 1518 may be connected to one or more peripherals 1516 and one or more peripherals 1526, respectively. The one or more peripherals 1516 and the one or more peripherals 1526 may include software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive user input data from and/or provide user output data to the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 and/or the processing system 1518 may be connected to a GPS chipset 1517 and a GPS chipset 1527, respectively. The GPS chipset 1517 and the GPS chipset 1527 may be configured to provide geographic location information of the wireless device 1502 and the base station 1504, respectively.

Figure 16A:
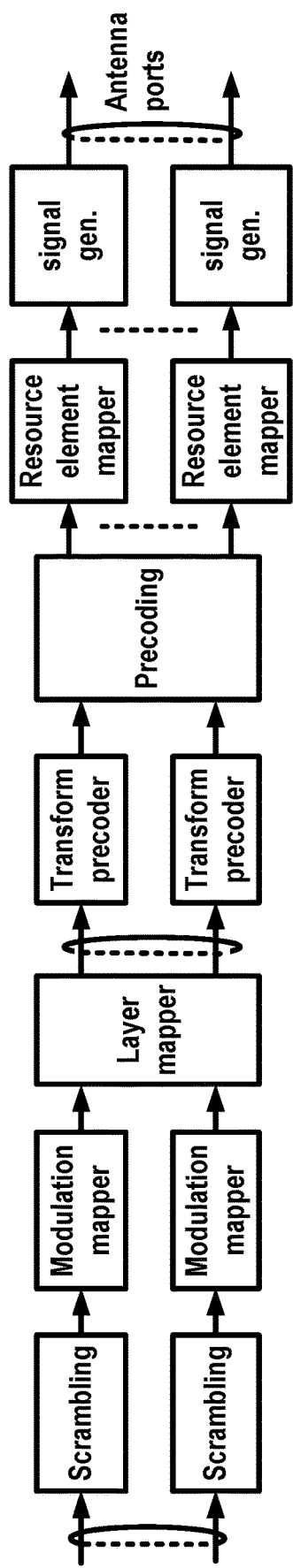
FIG. 16A, FIG. 16B, FIG. 16C, and FIG. 16D illustrate example structures for uplink and downlink transmission.

FIG. 16A illustrates an example structure for uplink transmission. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 16A. These functions are illustrated as examples and it is anticipated that other mechanisms may be implemented in various embodiments.

Figure 16B:
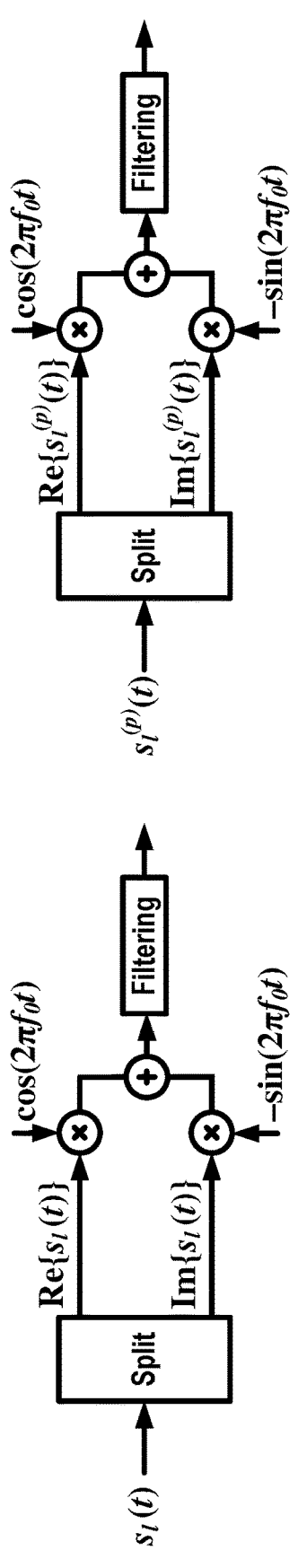

FIG. 16B illustrates an example structure for modulation and up-conversion of a baseband signal to a carrier frequency. The baseband signal may be a complex-valued SC-FDMA or CP-OFDM baseband signal for an antenna port and/or a complex-valued Physical Random Access Channel (PRACH) baseband signal. Filtering may be employed prior to transmission.

Figure 16C:
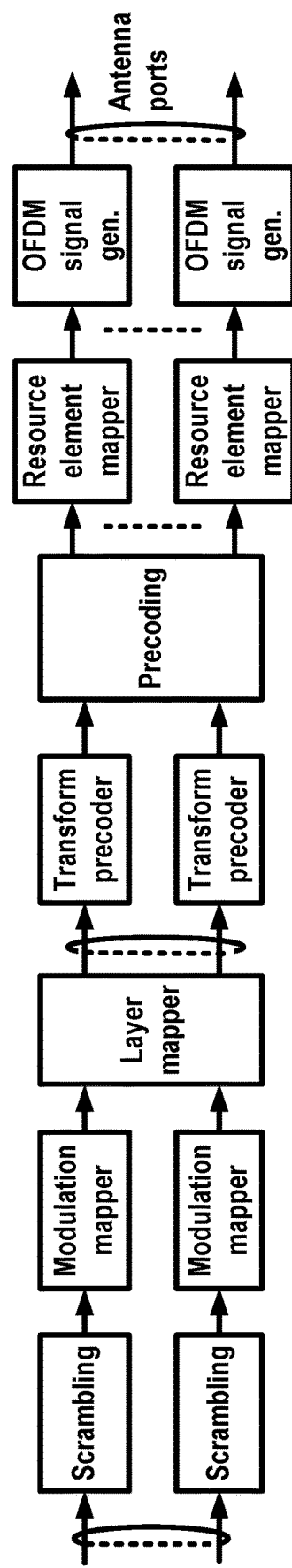

FIG. 16C illustrates an example structure for downlink transmissions. A baseband signal representing a physical downlink channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

Figure 16D:
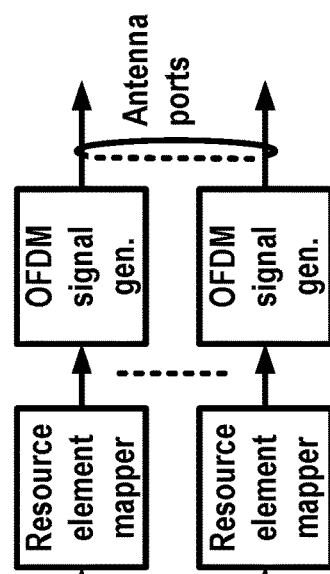

FIG. 16D illustrates another example structure for modulation and up-conversion of a baseband signal to a carrier frequency. The baseband signal may be a complex-valued OFDM baseband signal for an antenna port. Filtering may be employed prior to transmission.

A wireless device may receive from a base station one or more messages (e.g. RRC messages) comprising configuration parameters of a plurality of cells (e.g. primary cell, secondary cell). The wireless device may communicate with at least one base station (e.g. two or more base stations in dual-connectivity) via the plurality of cells. The one or more messages (e.g. as a part of the configuration parameters) may comprise parameters of physical, MAC, RLC, PCDP, SDAP, RRC layers for configuring the wireless device. For example, the configuration parameters may comprise parameters for configuring physical and MAC layer channels, bearers, etc. For example, the configuration parameters may comprise parameters indicating values of timers for physical, MAC, RLC, PCDP, SDAP, RRC layers, and/or communication channels.

A timer may begin running once it is started and continue running until it is stopped or until it expires. A timer may be started if it is not running or restarted if it is running. A timer may be associated with a value (e.g. the timer may be started or restarted from a value or may be started from zero and expire once it reaches the value). The duration of a timer may not be updated until the timer is stopped or expires (e.g., due to BWP switching). A timer may be used to measure a time period/window for a process. When the specification refers to an implementation and procedure related to one or more timers, it will be understood that there are multiple ways to implement the one or more timers. For example, it will be understood that one or more of the multiple ways to implement a timer may be used to measure a time period/window for the procedure. For example, a random access response window timer may be used for measuring a window of time for receiving a random access response. In an example, instead of starting and expiry of a random access response window timer, the time difference between two time stamps may be used. When a timer is restarted, a process for measurement of time window may be restarted. Other example implementations may be provided to restart a measurement of a time window.

A wireless device may receive, e.g., from a base station, one or more messages comprising one or more configuration parameters of/for a cell.

The wireless device may be served (e.g., transmit to or receive from) a plurality of TRPs comprising a first TRP and a second TRP. The first TRP and the second TRP may not be co-located. A first distance between the first TRP and the wireless device may be different from a second distance between the second TRP and the wireless device.

The first TRP may be associated with (or may belong to) a cell (e.g., serving cell). The second TRP may be associated with (or may belong to) the cell. The wireless device may be in an intra-cell multi-TRP operation/mode/scenario.

The first TRP may be associated with (or may belong to) a cell (e.g., serving cell). The second TRP may be associated with (or may belong to) a second cell (e.g., non-serving cell or neighboring cell) that is different from the cell (or a second PCI of the second cell may be different from a PCI of the cell). The wireless device may be in an inter-cell multi-TRP operation/mode/scenario.

The wireless device may be equipped with a plurality of antenna panels. The wireless device may transmit a first uplink signal/transmission (e.g., PUSCH/PUCCH/SRS transmission) with a first antenna panel of the plurality of antenna panels. The wireless device may transmit the first uplink signal/transmission, for example, to the first TRP. The wireless device may transmit a second uplink signal/transmission (e.g., PUSCH/PUCCH/SRS transmission) with a second antenna panel of the plurality of antenna panels. The wireless device may transmit the second uplink signal/transmission, for example, to the second TRP. A first propagation path/distance of the first uplink signal/transmission between the first antenna panel and the first TRP may be different from a second propagation path/distance the second uplink signal/transmission between the second antenna panel and the second TRP. The first TRP and the second TRP may be, for example, different. The first TRP and the second TRP may be, for example, the same.

The one or more configuration parameters may indicate, for the cell, at least two TAGs. The at least two TAGs may comprise a first TAG and a second TAG.

In the existing technologies, the one or more configuration parameters may indicate, for the cell, the at least two TAGs, for example, for a multi-TRP operation (e.g., inter-cell multi-TRP operation, intra-cell multi-TRP operation, and the like). Each TAG of the at least two TAGs may be for (or associated with) a respective TRP of the plurality of TRPs. For example, the first TAG of the at least two TAGs may be associated with the first TRP. The second TAG of the at least two TAGs may be associated with the second TRP.

For example, when a first time alignment timer of the first TAG of the at least two TAGs of the cell expires/stops, in the implementation of the existing technologies, the wireless device may not perform any uplink transmission via the cell based on the first time alignment timer of the first TAG comprising the cell expiring/stopping (or not running). This may not be efficient when the cell is associated with the at least two TAGs and a second time alignment timer of the second TAG of the at least two TAGs may be running. Stopping (or not performing) uplink transmissions may reduce data rate and increase latency of a communication. The wireless device may transmit an uplink signal based on the second TAG (or to/towards the second TRP), regardless of the first time alignment timer of the first TAG associated with the first TRP being expired/stopped. The wireless device may transmit to the second TRP, without increasing interference (e.g., inter-symbol interference and/or wireless devices in other cells).

Example embodiments enhance uplink transmissions when a cell is associated with at least two TAGs comprising a first TAG and a second TAG.

In an example embodiment, a first time alignment timer of the first TAG may be running. When a second time alignment timer of the second TAG expires/stops, the wireless device may i) keep transmitting, via the cell, first uplink signals associated with the first TAG, and ii) stop/abort (or not perform) transmission of second uplink signals, via the cell, associated with the second TAG.

In an example embodiment, a second time alignment timer of the second TAG may be running. When a first time alignment timer of the first TAG expires/stops, the wireless device may i) keep transmitting, via the cell, second uplink signals associated with the second TAG, and ii) stop/abort (or not perform) transmission of first uplink signals, via the cell, associated with the first TAG.

The first uplink signals associated with a first coreset pool index or a first SRS resource set or a PCI of the cell may be associated with the first TAG. The second uplink signals associated with a second coreset pool index or a second SRS resource set or a second PCI different from the PCI of the cell may be associated with the second TAG.

Example embodiments may increase data rate and reduce latency of a communication.

For example, when a first time alignment timer of the first TAG of the at least two TAGs of the cell expires/stops, in the implementation of the existing technologies, a MAC layer of the wireless device may not instruct a PHY layer of the wireless device to generate an acknowledgement (e.g., ACK/NACK) for a transport block. The wireless device (or the PHY layer of the wireless device) may not transmit an uplink signal (e.g., HARQ-ACK information feedback/bit) indicating/comprising an acknowledgement (e.g., ACK/NACK) for/of the transport block. This may not be efficient when the cell is associated with the at least two TAGs and a second time alignment timer of the second TAG of the at least two TAGs may be running. The base station may not be aware of successful or unsuccessful reception/decoding of the transport block by the wireless device. The base station may transmit a downlink signal (e.g., DCI) rescheduling the transport block, even though the wireless device successfully decoded the transport block. This may increase latency of a communication and increase power consumption at the wireless device and/or the base station. For example, the transport block may be associated with the second TAG. For example, the uplink signal comprising/indicating an acknowledgement of/for the transport block may be associated with the second TAG.

Example embodiments enhance uplink transmissions (e.g., HARQ-ACK information feedback/bit) when a cell is associated with at least two TAGs comprising a first TAG and a second TAG.

In an example embodiment, a first time alignment timer of the first TAG may be running. When a second time alignment timer of the second TAG expires/stops, the wireless device may i) transmit, via the cell, a first HA RQ-ACK information feedback/bit, of a first transport block, associated with the first TAG, and ii) not transmit, via the cell, a second HARQ-ACK information feedback/bit, of a second transport block, associated with the second TAG. The MAC layer may instruct the PHY layer to generate an acknowledgement for the first transport block, for example, based on the first time alignment timer of the first TAG running. For example, the first transport block may be associated with the first TAG. For example, the first HARQ-ACK information feedback/bit may be associated with the first TAG. The MAC layer may not instruct the PHY layer to generate an acknowledgement for the second transport block, for example, based on the second time alignment timer of the second TAG being expired/stopped (or not running). For example, the second transport block may be associated with the second TAG. For example, the second HARQ-ACK information feedback/bit may be associated with the second TAG.

In an example embodiment, a second time alignment timer of the second TAG may be running. When a first time alignment timer of the first TAG expires/stops, the wireless device may i) transmit, via the cell, a second HARQ-ACK information feedback/bit, of a second transport block, associated with the second TAG, and ii) not transmit, via the cell, a first HARQ-ACK information feedback/bit, of a first transport block, associated with the first TAG. The MAC layer may instruct the PHY layer to generate an acknowledgement for the second transport block, for example, based on the second time alignment timer of the second TAG running. For example, the second transport block may be associated with the second TAG. For example, the second HARQ-ACK information feedback/bit may be associated with the second TAG. The MAC layer may not instruct the PHY layer to generate an acknowledgement for the first transport block, for example, based on the first time alignment timer of the first TAG being expired/stopped (or not running). For example, the first transport block may be associated with the first TAG. For example, the first HARQ-ACK information feedback/bit may be associated with the first TAG.

Example embodiments may reduce latency of a communication and reduce power consumption at the wireless device and/or the base station.

Throughout this specification, unless otherwise noted, the size of various fields in the time domain may be expressed in time units $T_c=1/(\Delta f_{max} \cdot N_f)$ where $\Delta f_{max}=480 \cdot 10^3$ Hz and $N_f=4096$. The constant $\kappa=T_s/T_c=64$ where $T_s=1/(\Delta f_{ref} \cdot N_{f,ref})$, $\Delta f_{ref}=15 \cdot 10^3$ Hz and $N_{f,ref}=2048$.

Multiple OFDM numerologies may be supported by a wireless device. A subcarrier spacing (e.g., $\mu$) and the cyclic prefix for a downlink BWP or an uplink BWP may be obtained by the wireless device from the higher-layer (e.g., RRC or one or more configuration) parameters subcarrierSpacing and cyclicPrefix, respectively.

For subcarrier spacing configuration $\mu$ (e.g., $\mu=0$, 1, 2, 3, . . . ), slots may be numbered $n_s^\mu \in \{0, \ldots, N_{slot}^{subframe,\mu}-1\}$ in increasing order within a subframe and $n_{s,f}^\mu \in \{0, \ldots, N_{slot}^{frame,\mu}-1\}$ in increasing order within a frame. There may be $N_{symb}^{slot}$ consecutive OFDM symbols in a slot where $N_{symb}^{slot}$ may be based/depend on the cyclic prefix (e.g., normal or extended cyclic prefix). The start of slot $n_s^\mu$ in a subframe may be aligned in time with a start of OFDM symbol $n_s^\mu N_{symb}^{slot}$ in the same subframe.

A transmission (e.g., a downlink transmission, an uplink transmission, and a sidelink transmission) may be organized into frames with $T_f = (\Delta f_{max} N_f/100) \cdot T_c = 10$ ms duration. A frame may comprise (or consist of) ten subframes of $T_{sf} = (\Delta f_{max} N_f/1000) \cdot T_c = 1$ ms duration. A number of consecutive OFDM symbols per subframe may be $N_{symb}^{subframe,\mu} = N_{symb}^{slot} N_{slot}^{subframe,\mu}$. Each frame may be divided into two equally-sized half-frames of five subframes each with half-frame 0 consisting of subframes 0-4 and half-frame 1 consisting of subframes 5-9.

There may be one set of frames in the uplink and one set of frames in the downlink on a carrier.

Uplink frame number i for transmission from a wireless device may start $T_{TA}=(N_{TA}+N_{TA,offset}+N_{TA,adj}^{common}+N_{TA,adj}^{UE})T_c$ before the start of the corresponding downlink frame at the wireless device, where $N_{TA}$ may be a timing advance (or a timing advance value) between downlink and uplink, and $N_{TA,offset}$ may be a fixed offset used to calculate the timing advance. For example, for msgA transmission on PUSCH, $N_{TA}=0$ may be used by the wireless device.

$N_{TA,adj}^{common}$ may be derived/determined, by the wireless device, from (or indicated to the wireless device by) higher-layer (or RRC or one or more configuration) parameters TACommon, TACommonDrift, and TACommonDriftVariation if configured, otherwise $N_{TA,adj}^{common}=0$. $N_{TA,adj}^{common}$ may be a network-controlled timing correction.

$N_{TA,adj}^{UE}$ may be computed/determined by the wireless device based on satellite-ephemeris-related higher-layers (e.g., RRC or one or more configuration) parameters if configured, otherwise $N_{TA,adj}^{UE}=0$. $N_{TA,adj}^{UE}$ may be a UE-derived timing correction.

A wireless device may receive one or more messages comprising one or more configuration parameters (e.g., higher layer parameters, RRC parameters, and the like). The one or more configuration parameters (e.g., by n-TimingAdvanceOffset) may indicate a value of a timing advance offset (e.g., $N_{TA,offset}$) of/for a cell (e.g., serving cell, non-serving cell). In an example, the one or more configuration parameters may not indicate a value of a timing advance offset (e.g., $N_{TA,offset}$) of/for a cell. The one or more configuration parameters may not comprise n-TimingAdvanceOffset. Based on the one or more configuration parameters not indicating a value of a timing advance offset (e.g., $N_{TA,offset}$) of/for the cell, the wireless device may determine a default value for/of the timing advance offset (e.g., $N_{TA,offset}$) of/for the cell.

The one or more configuration parameters may indicate at least two uplink carriers for a cell. The at least two uplink carriers may comprise a first uplink carrier (e.g., NUL) and a second uplink carrier (e.g., SUL). The wireless device may apply a same value of the timing advance offset (e.g., $N_{TA,offset}$) to the first uplink carrier and the second uplink carrier. The wireless device may determine/calculate, for transmission of a first uplink signal via the first uplink carrier, a first timing advance based on the value (or default value) of the timing advance offset. The wireless device may transmit, via the first uplink carrier, the first uplink signal based on the first timing advance. The wireless device may determine/calculate, for transmission of a second uplink signal via the second uplink carrier, a second timing advance based on the value (or default value) of the timing advance offset. The wireless device may transmit, via the second uplink carrier, the second uplink signal based on the second timing advance. In an example, the first timing advance of (or associated with or corresponding to) the first uplink carrier and the second timing advance of (or associated with or corresponding to) the second uplink carrier may be the same.

The one or more configuration parameters may indicate one or more timing advance groups (TAGs). The one or more TAGs may comprise (or be associated with) one or more cells. Each TAG of the one or more TAGs may comprise respective cell(s) of the one or more cells. The one or more configuration parameters may indicate, for each cell of the one or more cells, a respective TAG of the one or more TAGs.

The wireless device may receive a timing advance command (e.g., in a random access response or in an absolute timing advance command MAC CE or a timing advance command MAC CE) for a TAG of the one or more TAGs. The timing advance command may, for example, comprise a field (e.g., TAG ID) indicating/identifying the TAG. The wireless device may, for example, receive the timing advance command via a cell associated with the TAG. The TAG may comprise at least one cell that comprise the cell. The one or more cells may comprise the at least one cell that comprise the cell. The wireless device may adjust/determine an uplink timing for uplink transmissions (e.g., PUCCH/PUSCH/SRS transmissions) on/via each cell of the at least one cell in the TAG, for example, based on the timing advance command. The wireless device may adjust/determine the uplink timing for the uplink transmissions on/via each cell of the at least one cell in the TAG, for example, based on a value (or a default value) of a timing advance offset (e.g., $N_{TA,offset}$). In an example, the value (or the default value) of the timing advance offset may be the same for each cell of the at least one cell in the TAG. In an example, the uplink timing may be the same for each cell of the at least one cell in the TAG. In an example, the uplink timing of the uplink transmissions (e.g., PUCCH/PUSCH/SRS transmission) may be the same for each cell of the at least one cell.

For a subcarrier spacing (SCS) of $2^\mu \cdot 15$ kHz, a timing advance command, received by the wireless device, for a TAG of the one or more TAGs may indicate a change of an uplink timing relative to the current uplink timing for the TAG in multiples of $16 \cdot 64 \cdot T_c/2^\mu$.

The wireless device may receive a timing advance command (e.g., $T_A$) for a TAG of the one or more TAGs.

In an example, a random-access response or in an absolute timing advance command MAC CE may indicate/comprise the timing advance command. The wireless device may receive the timing advance command in the random-access response or in the absolute timing advance command MAC CE. The timing advance command may indicate a timing advance value (e.g., $N_{TA}$) by an index value (e.g., $T_A=0, 1, 2, \ldots, 3846$). The wireless device may determine/calculate/adjust an amount/quantity of the timing advance value (or the time alignment) for/of the TAG with SCS of $2^\mu \cdot 15$ kHz as $N_{TA}=T_A \cdot 16 \cdot 64/2^\mu$. The timing advance value may be relative to a SCS of a starting/earliest/first uplink transmission from the wireless device after the reception of the random-access response or the absolute timing advance command MAC CE.

In an example, a timing advance command MAC CE may indicate/comprise the timing advance command. The wireless device may receive the timing advance command in the . . . MAC CE. The timing advance command may indicate adjustment of a current timing advance value, $N_{TA\_old}$, to a new timing advance value, $N_{TA\_new}$, by an index value (e.g., $T_A=0, 1, 2 \ldots, 63$). For a SCS of $2^\mu \cdot 15$ kHz, the wireless device may determine the new timing advance value as $N_{TA\_new}=N_{TA\_old}+(T_A-31) \cdot 16 \cdot 64/2^\mu$.

Each cell of the at least one cell in the TAG may have/comprise (or be indicated/configured, by the one or more configuration parameters, with) respective uplink carrier(s) (e.g., NUL and/or SUL). For example, a first cell of the at least one cell may comprise a first uplink carrier (e.g., NUL). A second cell of the at least one cell may comprise a second uplink carrier (e.g., SUL). A third cell of the at least one cell may comprise the first uplink carrier (e.g., NUL) and the second uplink carrier (e.g., SUL). The wireless device may be active in (or may activate) a plurality of uplink BWPs for/of one or more uplink carriers of the at least one cell in the TAG. The wireless device may be active in (or may activate) a respective uplink BWP, of the plurality of uplink BWPs, of the one or more uplink carriers of each cell of the at least one cell. The TAG may comprise the plurality of uplink BWPs of the at least one cell. The timing advance command (or a value in (or indicated by) the timing advance command) may be relative to the largest SCS of/among the plurality of uplink BWPs. The new timing advance value (e.g., $N_{TA\_new}$) for an uplink BWP, of the plurality of uplink BWPs, with a lower SCS may be rounded, by the wireless device, to align with the timing advance granularity for the uplink BWP with the lower SCS.

Adjustment of the timing advance value (e.g., $N_{TA}$) by a positive or a negative amount may indicate advancing or delaying an uplink transmission timing for the TAG by a corresponding amount, respectively.

The wireless device may receive a timing advance command for a TAG of the one or more TAGs. The TAG may comprise at least one cell of the one or more cells. The wireless device may receive, in/on/via an uplink time slot n, the timing advance command. The wireless device may adjust an uplink transmission timing based on the timing advance command. The wireless device may apply adjustment of the uplink transmission timing from beginning of a second uplink time slot. The wireless device may apply the adjustment of the uplink transmission timing for transmission of an uplink signal (e.g., PUSCH/PUSCH/SRS transmission). The wireless device may apply the adjustment of the uplink transmission timing for transmission of the uplink signal via a cell of the at least one cell (or vi a an uplink carrier of a cell of the at least one cell). The transmission of the uplink signal may not comprise, for example, a PUSCH transmission scheduled by a RAR uplink grant or a fallbackRAR uplink grant. The transmission of the uplink signal may not comprise, for example, a PUCCH transmission with HARQ-ACK information in response to a successRAR. The wireless device may apply the adjustment of the uplink transmission timing for uplink transmissions via the at least one cell. The wireless device may determine the second uplink time slot as the uplink time slot $n+k+1+2^\mu \cdot K_{offset}$ where $k = \lceil N_{slot}^{subframe,\mu} \cdot (N_{T,1} + N_{T,2} + N_{TA,max} + 0.5)/T_{sf} \rceil$. For example, $N_{T,1}$ may be a time duration in msec of $N_1$ symbols corresponding to a PDSCH processing time for UE processing capability 1 when additional PDSCH DM-RS is configured (or is indicated by the one or more configuration parameters). For example, $N_{T,2}$ may be a time duration in msec of $N_2$ symbols corresponding to a PUSCH preparation time for UE processing capability 1. For example, $N_{TA,max}$ may be a maximum timing advance value in msec that can be provided by a TA command field of 12 bits. For example, $N_{slot}^{subframe,\mu}$ may be a number of slots per subframe. For example, $T_{sf}$ may be a subframe duration of 1 msec. For example, $K_{offset} = K_{cell,offset} - K_{UE,offset}$. In an example, the one or more configuration parameters may indicate the $K_{cell,offset}$ (e.g., provided by Koffset in ServingCellConfigCommon). In an example, the one or more configuration parameters may not indicate a value for $K_{cell,offset}$ (e.g., Koffset is absent in ServingCellConfigCommon). The wireless device may determine a default value for $K_{cell,offset} = 0$ based on the one or more configuration parameters not indicating a value for $K_{cell,offset}$. For example, the wireless device may receive a MAC CE command indicating the $K_{UE,offset}$. For example, the wireless device may not receive a MAC CE command indicating a value for $K_{UE,offset}$. The wireless device may determine a default value for $K_{UE,offset} = 0$ based on not receiving a MAC CE command indicating a value for $K_{UE,offset}$. The wireless device may determine $N_1$ and $N_2$ with respect to the minimum SCS among the SCSs of all configured uplink BWPs for all uplink carriers of the at least one cell in the TAG and of all configured downlink BWPs for the corresponding downlink carriers (or for the at least one cell). For $\mu=0$, the wireless device may determine/assume $N_{1,0}=14$. The wireless device may determine the uplink time slot n and $N_{slot}^{subframe,\mu}$ with respect to the minimum SCS among the SCSs of all configured uplink BWPs for all uplink carriers of the at least one cell in the TAG. The wireless device may determine $N_{TA,max}$ with respect to the minimum SCS among the SCSs of all configured uplink BWPs for all uplink carriers of the at least one cell in the TAG and for all configured initial uplink BWPs indicated by the one or more configuration parameters (e.g., provided by initialUplinkBWP). The uplink time slot n may be the last slot among uplink slot(s) overlapping with the slot(s) of a PDSCH reception assuming $T_{TA}=0$, where the PDSCH reception indicates/comprises/provides the timing advance command.

The wireless device may change an active uplink BWP of a cell of the at least one cell in the TAG. The wireless device may activate (or switch to a new uplink BWP of the cell) based on the changing the active uplink BWP. The wireless device may change the active uplink BWP between a first time of a reception of the timing advance command and a second time of applying the adjustment of the uplink transmission timing. Based on the changing the active uplink BWP between the first time and the second time, the wireless device may determine a value of the timing advance command (or a timing advance value) based on a SCS of the new active UL BWP. The wireless device may change the active uplink BWP after the second time. The wireless device may determine/assume a same absolute value for the timing advance command (or the same absolute timing advance value) before and after the change of the active uplink BWP.

A received downlink timing may change. The change of the received downlink timing may not be compensated or may be partly compensated by the adjustment of the uplink transmission timing without a timing advance command. In this case, the wireless device may change a timing advance value (e.g., $N_{TA}$) accordingly.

Two adjacent slots may overlap, for example, based on a timing advance command. The latter slot of the two adjacent slots may be reduced in duration relative to the former slot of the two adjacent slots, for example, based on the two adjacent slots overlapping. The wireless device may not change a timing advance value (e.g., $N_{TA}$) during an actual transmission time window for an uplink transmission (e.g., PUSCH/PUCCH/SRS transmission).

A wireless device may receive, e.g., from a base station, one or more messages comprising one or more configuration parameters (e.g., RRC configuration parameters, RRC reconfiguration parameters). The one or more configuration parameters comprise one or more cell group configuration parameters (e.g., provided by MAC-CellGroupConfig). The one or more cell group configuration parameters may comprise a TAG configuration (e.g., tag-Config). The TAG configuration may be used, by the wireless device and/or the base station, to configure parameters for a time-alignment group. The TAG configuration may indicate one or more TAGs. A maximum number of the one or more TAGs (e.g., maxNrofTAGs) may be equal to a value (e.g., 4, 5, 6, 7, 8, and the like).

The TAG configuration may indicate one or more TAG indexes/identifiers (e.g., TAG-Id) for the one or more TAGs. The TAG configuration may indicate a respective TAG index/identifier of the one or more TAG indexes/identifiers for each TAG of the one or more TAGs. Each TAG of the one or more TAGs may be identified by/with a respective TAG index (e.g., 0, 1, . . . , maxNrofTAGs−1) of the one or more TAG indexes. A TAG index of a TAG of the one or more TAGs may indicate the TAG of a cell (e.g., SpCell, SCell). A TAG index of a TAG of the one or more TAGs may indicate the TAG within the scope of a cell group (e.g., MCG, SCG). The one or more TAG indexes may comprise the TAG index.

The TAG configuration may indicate one or more time alignment timers (e.g., TimeAlignmentTimer) for the one or more TAGs. The TAG configuration may indicate a respective time alignment timer of the one or more time alignment timers for each TAG of the one or more TAGs. Each TAG of the one or more TAGs may be associated with (or correspond to) a respective time alignment timer of the one or more time alignment timers. Value of a time alignment timer of the one or more time alignment timers may be in ms (e.g., 500 ms, 750 ms, . . . , 5120 ms, 10240 ms, or infinity). A time alignment timer of a TAG may indicate/control how long cell(s) in (or belonging to or associated with or corresponding to) the TAG are uplink time aligned. The one or more time alignment timers may comprise the time alignment timer. The one or more TAGs may comprise the TAG.

The one or more configuration parameters may indicate, for a cell, a TAG index of the one or more TAG indexes. The TAG index may indicate/identify a TAG of the one or more TAGs. The one or more configuration parameters may comprise one or more serving cell configuration parameters (e.g., ServingCellConfig) of the cell. The one or more serving cell configuration parameters of the cell may comprise/indicate the TAG index indicating/identifying the TAG. The cell may belong to (or may be associated with or may correspond to) the TAG, for example, based on the one or more configuration parameters indicating, for the cell, the TAG index indicating/identifying the TAG. The TAG may comprise (or may be associated with or may correspond to) the cell, for example, based on the one or more configuration parameters indicating, for the cell, the TAG index indicating/identifying the TAG.

A wireless device may be capable of handling a relative transmission timing difference between subframe timing boundary of E-UTRA PCell and the closest slot timing boundary of PSCell to be aggregated for EN-DC operation.

A wireless device may be capable of handling a relative transmission timing difference among the closest slot timing boundaries of different carriers to be aggregated in NR carrier aggregation.

A wireless device may be capable of handling a relative transmission timing difference between slot timing boundary of PCell and subframe timing boundary of E-UTRA PSCell to be aggregated for NE-DC operation.

A wireless device may be capable of handling a relative transmission timing difference between slot timing boundaries of PCell and the closest slot timing boundary of PSCell to be aggregated in NR DC operation.

A wireless device may be capable of handling at least a relative transmission timing difference between slot timing of all pairs of TAGs (or all pairs of the one or more TAGs). The wireless device may be capable of handling at least a relative transmission timing difference between slot timing of all pairs of the TAGs, for example, based on the one or more configuration parameters indicating a primary TAG (pTAG) and a secondary TAG (sTAG) for inter-band NR carrier aggregation in standalone (SA) or NR-DC mode. The wireless device may be capable of handling at least a relative transmission timing difference between slot timing of all pairs of the TAGs, for example, based on the one or more configuration parameters indicating more than one sTAG for inter-band NR carrier aggregation in EN-DC or NE-DC mode.

The one or more TAGs may comprise a first TAG and a second TAG.

The first TAG may be/operate in FR1. The second TAG may be/operate in FR1. A maximum uplink transmission timing difference between the first TAG and the second TAG may be 34.6 microseconds (/mu).

The first TAG may be/operate in FR2. The second TAG may be/operate in FR2. A maximum uplink transmission timing difference between the first TAG and the second TAG may be 8.5 microseconds (/mu). The wireless device may be capable of independent beam management for FR2 inter-band carrier aggregation.

In an example, the first TAG may be/operate in FR1 and the second TAG may be/operate in FR2. In an example, the first TAG may be/operate in FR2 and the second TAG may be/operate in FR1. A maximum uplink transmission timing difference between the first TAG and the second TAG may be 26.1 microseconds (/mu).

In RRC_CONNECTED, a base station may maintain the timing advance to keep a layer 1 (L1) of a wireless device synchronized. Serving cells having/with uplink to which the same timing advance applies and using the same timing reference cell may be grouped, by the bases station, in a TAG of one or more TAGs. Each TAG of the one or more TAGs may contain/comprise at least one serving cell configured with uplink. The mapping of each serving cell to a (respective) TAG may be configured/indicated by RRC configuration parameters (e.g., tag-Id).

For a primary TAG (pTAG), the wireless device may use the PCell as timing reference, except with shared spectrum channel access where an SCell can also be used in certain cases. In a secondary TAG (sTAG), the wireless device may use any of the activated SCells of this TAG (or the sTAG) as a timing reference cell.

Timing advance updates may be signaled/indicated by the base station to the wireless device via MAC CE commands. Based on receiving the MAC CE commands, the wireless device may start or restart a TAG-specific timer (e.g., time alignment timer). The TAG-specific timer may indicate whether the L1 of the wireless device is synchronised or not. For example, when the TAG-specific timer is running, the L1 may be (considered) synchronised. When the TAG-specific timer is not running, the L1 may be (considered) non-synchronised. When the L1 is non-synchronised, the wireless device may transmit/perform an uplink transmission through/via MSG1/MSGA. When the L1 is non-synchronised, the wireless device may not transmit/perform an uplink transmission through/via PUSCH/PUCCH/SRS.

A wireless device may transmit/report, to a base station, a user-equipment (UE) capability message (e.g., UE capability information). The wireless device may transmit/report, to the base station, the UE capability message, for example, based on receiving, from the base station, a UE capability enquiry/request. The base station may request, via/by the UE capability enquiry/request, from the wireless device to send/transmit the UE capability message. The UE capability message (or the UE capability information) may be an RRC message that the wireless device transmits/sends/reports to the base station. The wireless device may transmit the UE capability message, for example, during initial registration process.

The UE capability message may indicate a supported number of TAGs (supportedNumberTAG). The UE capability message may comprise carrier aggregation (CA) parameters indicating/comprising the supported number of TAGs by the wireless device. The supported number of TAGs may be applied, by the wireless device and/or the base station, to NR CA, NR-DC, (NG)EN-DC/NE-DC and DAPS handover.

For (NG)EN-DC/NE-DC, the supported number of TAGs may indicate a number of TAGs for NR CG. A number of TAGs for the LTE MCG may be signaled/indicated, from the base station to the wireless device, by LTE TAG capability signaling. For NR CA/NR-DC band combination, if the band combination comprises more than one band entry (i.e., inter-band or intra-band non-contiguous band combination), the supported number of TAGs may indicate that different timing advances on different band entries are supported. The supported number of TAGs may be more than one for NR-DC. It may be mandatory for the wireless device to support more than one TAG for NR-DC.

The supported number of TAGs may be two for inter-frequency DAPS. It may be mandatory for the wireless device to support 2 TAGs for inter-frequency DAPS. For the mixed inter-band and intra-band NR CA/NR-DC band combination, if the base station configures, e.g., by one or more configuration parameters, more non-contiguous uplink serving cells than the supported number of TAGs, the one or more configuration parameters indicate the same TAG (or the same TAG Id/index) for one or more uplink serving cells of the same frequency band.

The UE capability message may not indicate/comprise a supported number of TAGs (supportedNumberTAG). A supported number of TAGs may be absent in the UE capability message. The wireless device may support a single TAG (or only one TAG) based on the supported number of TAGs being absent in the UE capability message. The wireless device may support the single TAG for NR.

The maximum number of the one or more TAGs (e.g., maxNrofTAGs) indicated by the one or more configuration parameters (or the TAG configuration) may be equal to or less than the supported number of TAGs. The maximum number of the one or more TAGs (e.g., maxNrofTAGs) indicated by the one or more configuration parameters (or the TAG configuration) may not be greater than the supported number of TAGs.

A TAG may comprise a group of cells (e.g., serving cells). The one or more configuration parameters may indicate, for the group of cells, the TAG. The one or more TAGs comprise the TAG. The one or more configuration parameters may indicate uplink (e.g., PUCCH, PUSCH, PRACH, SRS, and the like) for the group of cells (or for each cell of the group of cells). The wireless device may use the same timing reference cell for the group of cells (or for each cell of the group of cells). The wireless device may use the same timing advance for the group of cells (or for each cell of the group of cells). The wireless device may transmit, via a first cell of the group of cells, a first uplink signal/transmission (e.g., PUCCH/PUSCH/SRS/PRACH transmission) based on a timing reference cell. The wireless device may transmit, via a second cell of the group of cells, a second uplink signal/transmission (e.g., PUCCH/PUSCH/SRS/PRACH transmission) based on the (same) timing reference cell. The wireless device may transmit, via the first cell of the group of cells, the first uplink signal/transmission based on a timing advance value. The wireless device may transmit, via the second cell of the group of cells, the second uplink signal/transmission based on the (same) timing advance value.

A TAG that comprises/contains the SpCell of a MAC entity of the wireless device may be referred to as a Primary Timing Advance Group (PTAG). A TAG that does not comprise/contain the SpCell of a MAC entity of the wireless device may be referred a Secondary Timing Advance Group (STAG).

For Dual Connectivity operation, a Special Cell (SpCell) may refer to a primary cell (PCell) of the MCG or a primary secondary cell (PSCell) of the SCG depending on if a MAC entity of the wireless device is associated to the MCG or the SCG, respectively. Otherwise the SpCell may refer to the PCell. A SpCell may support PUCCH transmission and contention-based Random Access. A SpCell may be activated. A SpCell may not be deactivated (e.g., always active).

The one or more configuration parameters may indicate, for a cell, a TAG of the one or more TAGs. The one or more configuration parameters may indicate, for the cell, a first uplink carrier (e.g., NUL) and a second uplink carrier (e.g., NUL). The one or more configuration parameters may comprise a supplementary uplink parameter (e.g., supplementaryUplink) indicating the second uplink carrier. The first uplink carrier of the cell and the second uplink carrier of the cell may belong the (same) TAG. The cell configured with the second uplink carrier (or the supplementaryUplink) may belong to a single TAG. The cell configured with the second uplink carrier (or the supplementaryUplink) may not belong to a second TAG, of the one or more TAGs, different from the TAG.

The one or more TAGs may comprise a PTAG. The PTAG may comprise a SpCell (e.g., PCell).

The one or more configuration parameters may indicate, for the one or more TAGs, one or more time alignment timers (e.g., timeAlignmentTimer). The one or more configuration parameters may indicate, for each TAG of the one or more TAGs, a respective time alignment timer of the one or more time alignment timers. The one or more configuration parameters may indicate the one or more time alignment timers, for example, for maintenance of uplink time alignment. For example, the one or more configuration parameters may indicate, for a first TAG of the one or more TAGs, a first time alignment timer of the one or more time alignment timers. The one or more configuration parameters may indicate, for a second TAG of the one or more TAGs, a second time alignment timer of the one or more time alignment timers. For example, a time alignment timer of the one or more time alignment timers may be per TAG. For example, each time alignment timer of the one or more time alignment timers may be per TAG.

The one or more configuration parameters may indicate, for a TAG of the one or more TAGs, a time alignment timer of the one or more time alignment timers. The TAG may comprise at least one cell. The at least one cell may belong to (or be associated with) the TAG. The one or more configuration parameters may indicate, for the at least one cell, the TAG. The one or more configuration parameters may indicate, for each cell of the at least one cell, the TAG. The time alignment timer may control how long a MAC entity of the wireless device considers the at least one cell (e.g., at least one serving cell) belonging to the TAG to be uplink time aligned.

The wireless device may receive a timing advance command MAC CE. The timing advance command MAC CE may indicate a TAG of the one or more TAGs. The timing advance command MAC CE may indicate/comprise a timing advance command. The wireless device may maintain a timing advance (or a timing advance value or $N_{TA}$) for the indicated TAG. The wireless device may apply, for the indicated TAG, the timing advance command. The wireless device may start or restart a time alignment timer associated with the indicated TAG. The one or more configuration parameters may indicate, for the indicated TAG, the time alignment timer of the one or more time alignment timers.

The wireless device may transmit, for a random-access procedure, a random-access preamble. The wireless device may receive a random-access response (or a random access response message) of/for a cell (e.g., a serving cell). The random-access response may be corresponding to (or be associated with) the random-access preamble. The random-access response may comprise a timing advance command. The cell may belong a TAG of the one or more TAGs. The one or more configuration parameters may indicate, for the cell, the TAG. The one or more configuration parameters may indicate, for the TAG, a time alignment timer of the one or more time alignment timers.

The random-access procedure may be, for example, a four-step random-access procedure. The random-access procedure may be, for example, a two-step random-access procedure. The random-access response may be a MsgB of the two-step random-access procedure The cell may be, for example, a SpCell when the random-access procedure is the two-step random-access procedure For example, the wireless device (or a MAC entity of the wireless device) may not select the random-access preamble among one or more random-access preambles used/configured for contention-based random-access procedure. The random-access procedure may be, for example, a contention-free random-access procedure (e.g., PDCCH order, handover, beam failure recovery, and the like). The wireless device may apply, for the TAG comprising the cell, the timing advance command in the random-access response. The wireless device may start or restart the time alignment timer associated with the TAG comprising the cell.

For example, the wireless device (or a MAC entity of the wireless device) may select the random-access preamble among one or more random-access preambles used/configured for contention-based random-access procedure. The random-access procedure may be, for example, a contention-based random-access procedure. The time alignment timer of the TAG comprising the cell may not be running. The wireless device may apply, for the TAG comprising the cell, the timing advance command in the random-access response. The wireless device may start the time alignment timer associated with the TAG comprising the cell. The wireless device may start the time alignment timer, for example, based on receiving the random-access response.

The wireless device may stop the time alignment timer associated with the TAG comprising the cell. The wireless device may stop the time alignment timer, for example, based on a contention resolution of the random-access procedure (or the contention-based random-access procedure) being unsuccessful (or not being successful).

The wireless device may stop the time alignment timer associated with the TAG comprising the cell. The wireless device may stop the time alignment timer, for example, based on transmitting a HARQ feedback for MAC PDU including/comprising UE Contention Resolution Identity MAC CE. A contention resolution of the random-access procedure (or the contention-based random-access procedure) may be successful. The wireless device may initiate the random-access procedure (or transmit the random-access preamble) for system information (SI) request.

For example, the wireless device (or a MAC entity of the wireless device) may select the random-access preamble among one or more random-access preambles used/configured for contention-based random-access procedure. The random-access procedure may be, for example, a contention-based random-access procedure. The time alignment timer of the TAG comprising the cell may be running. The wireless device may ignore the timing advance command in the random-access response.

The wireless device may transmit, for a two-step random-access procedure, a MSGA transmission (e.g., random-access preamble plus PUSCH transmission). The MSGA transmission may comprise/include C-RNTI MAC CE. The wireless device may receive an absolute timing advance command MAC CE. The wireless device may receive the absolute timing advance command MAC CE, for example, based on the MSGA transmission comprising/including the C-RNTI MAC CE. The absolute timing advance command MAC CE may indicate/comprise a timing advance command. The wireless device may apply, for the PTAG, the timing advance command. The one or more configuration parameters may indicate, for the PTAG, a time alignment timer of the one or more time alignment timers. The wireless device may start the time alignment timer associated with the PTAG, for example, based on receiving the absolute timing advance command MAC CE.

The one or more configuration parameters may indicate, for a TAG of the one or more TAGs, a time alignment timer of the one or more time alignment timers. The time alignment timer may expire.

The TAG may be the PTAG. The time alignment timer may be associated with the PTAG. Based on the time alignment timer expiring, the wireless device may perform at least one of:

flush all HARQ buffers for all Serving Cells;
notify RRC to release PUCCH for all Serving Cells, if configured;
notify RRC to release SRS for all Serving Cells, if configured;
clear any configured downlink assignments and configured uplink grants;
clear any PUSCH resource for semi-persistent CSI reporting;
consider all running timeAlignmentTimers (e.g., the one or more time alignment timers) as expired;
maintain timing advance values (e.g., $N_{TA}$) of all TAGs (or the one or more TAGs).

The TAG may be a STAG. The time alignment timer may be associated with the STAG. Based on the time alignment timer expiring, the wireless device may perform at least one of:

flush all HARQ buffers;
notify RRC to release PUCCH, if configured;
notify RRC to release SRS, if configured;
clear any configured downlink assignments and configured uplink grants;
clear any PUSCH resource for semi-persistent CSI reporting;
maintain a timing advance value (e.g., NTA) of the STAG.

In an example, a maximum uplink transmission timing difference between a first TAG and a second TAG may be exceeded. The one or more TAGs may comprise the first TAG and the second TAG. The wireless device (or a MAC entity of the wireless device) may stop/abort uplink transmissions via/for a cell (e.g., SCell). The wireless device (or a MAC entity of the wireless device) may stop/abort uplink transmissions via/for the cell, for example, based on the maximum uplink transmission timing difference between the first TAG and the second TAG being exceeded. A TAG of the one or more TAGs may comprise the cell. For example, the TAG may be different from the first TAG. The TAG may be different from the second TAG. For example, the TAG may be the first TAG. For example, the TAG may be the second TAG. The one or more configuration parameters may indicate, for the TAG of the one or more TAGs, a time alignment timer of the one or more time alignment timers. The wireless device may determine/assume/consider the time alignment timer of the TAG associated with the cell as expired. The wireless device may determine/assume/ consider the time alignment timer of the TAG associated with the cell as expired, for example, based on the maximum uplink transmission timing difference between the first TAG and the second TAG being exceeded.

The one or more configuration parameters may indicate, for a TAG of the one or more TAGs, a time alignment timer of the one or more time alignment timers. The TAG may comprise at least one cell. The one or more configuration parameters may indicate, for the at least one cell (or for each cell of the at least one cell), the TAG. The time alignment timer may expire (or may not be running).

The wireless device may not transmit uplink transmissions via/on the at least one cell in the TAG, for example, based on the time alignment timer expiring (or not running). The wireless device may stop uplink transmissions via the at least one cell (or via each cell of the at least one cell), for example, based on the time alignment timer expiring (or not running). The wireless device may not perform uplink transmissions via the at least one cell (or via each cell of the at least one cell), for example, based on the time alignment timer expiring (or not running). The wireless device may not perform uplink transmissions via a cell of the at least one cell, for example, based on the time alignment timer expiring (or not running). The uplink transmissions may comprise PUSCH/PUCCH/SRS transmissions. The uplink transmissions may not comprise PRACH transmissions (e.g., random-access preamble and MSGA transmission).

In an example, the TAG may be the PTAG. The wireless device may not transmit uplink transmissions via/on the one or more cells in the one or more TAGs, for example, based on the time alignment timer associated with the PTAG expiring (or not running). The wireless device may not transmit uplink transmissions via/on each cell in the one or more TAGs, for example, based on the time alignment timer associated with the PTAG expiring (or not running). The wireless device may stop uplink transmissions via the one or more cells (or via each cell of the one or more cells in the one or more TAGs), for example, based on the time alignment timer associated with the PTAG expiring (or not running). The wireless device may not perform uplink transmissions via the one or more cells (or via each cell of the one or more cells in the one or more TAGs), for example, based on the time alignment timer associated with the PTAG expiring (or not running). The wireless device may not perform uplink transmissions via a cell of one or more cells in the one or more TAGs, for example, based on the time alignment timer associated with the PTAG expiring (or not running). The uplink transmissions may comprise PUSCH/PUCCH/SRS transmissions. The uplink transmissions may not comprise PRACH transmissions (e.g., random-access preamble and MSGA transmission) on a SpCell (e.g., PCell).

A timing advance command MAC CE may be identified by MAC subheader with LCID (e.g., 61). The timing advance command MAC CE may have a fixed size. The timing advance command MAC CE may comprise a single octet.

The timing advance command MAC CE may comprise one or more fields.

A field of the one or more fields may comprise a TAG identity (TAG ID). The field may indicate/comprise the TAG identity of a TAG. The one or more TAGs may comprise the TAG. The TAG containing/comprising the SpCell may have the TAG identity that is equal to 0. The length of the field may be 2 bits.

A field of the one or more fields may comprise a timing advance command, The field may indicate an index value (e.g., $T_A$=0, 1, 2 . . . 63) used to control the amount of timing adjustment that a wireless device or (or a MAC entity of a wireless device) has to apply. The length of the field may be 6 bits.

An absolute timing advance command MAC CE may be identified by MAC subheader with LCID. The absolute timing advance command MAC CE may have a fixed size. The absolute timing advance command MAC CE may comprise two octets.

The absolute timing advance command MAC CE may comprise one or more fields.

A field of the one or more fields may comprise a timing advance command, The field may indicate an index value (e.g., $T_A$) used to control the amount of timing adjustment that a wireless device or (or a MAC entity of a wireless device) has to apply. The length of the field may be 12 bits.

In an example, a wireless device may transmit a random-access preamble (e.g., MSGA preamble) for a two-step random-access procedure. The wireless device may transmit a MSGA transmission for the two-step random-access procedure. The MSGA transmission may comprise transmission of the random-access preamble and a PUSCH transmission. The wireless device may start a response window (e.g., msgB-Response Window), for example, based on transmitting the random-access preamble. The PUSCH transmission may comprise/indicate a C-RNTI MAC CE indicating a C-RNTI of the wireless device. The wireless device may monitor, for a DCI scheduling a random-access response corresponding to (or associated with) the random-access preamble, downlink control channels on/via a SpCell. The wireless device may monitor, for the DCI scheduling the random-access response, the downlink control channels during/while the response window is running. A CRC of the DCI may be scrambled by the C-RNTI. The wireless device may receive the DCI scheduling the random-access response. The two-step random-access procedure may not be initiated, by the wireless device, for a beam failure recovery. The wireless device may not transmit the random-access preamble for a beam failure recovery. A time alignment timer associated with a PTAG may be running. The one or more configuration parameters may indicate, for the PTAG, the time alignment timer. The one or more TAGs may comprise the PTAG. The one or more time alignment timers may comprise the time alignment timer. The DCI (or the random-access response) may comprise/indicate an uplink grant. The uplink grant may be for a new uplink transmission. Based on the time alignment timer associated with the PTAG running, the wireless device may determine/ consider reception of the random-access response successful. Based on the time alignment timer associated with the PTAG running, the wireless device may stop the response window. Based on the time alignment timer associated with the PTAG running, the wireless device may determine/ consider the two-step random-access procedure successful.

The wireless device may receive a DCI. The wireless device may receive the DCI in/via a PDCCH monitoring occasion (or a PDCCH occasion). The wireless device may monitor, for the DCI, downlink control channels in the PDCCH monitoring occasion.

For example, the DCI may comprise/indicate a downlink assignment.

A CRC of the DCI may scrambled by, for example, C-RNTI. A CRC of the DCI may scrambled by, for example, CS-RNTI. A CRC of the DCI may scrambled by, for example, temporary C-RNTI.

The one or more configuration parameters may indicate a configured downlink assignment (e.g., SPS PDSCH configuration). The wireless device may receive one or more SPS PDSCHs (or one or more SPS PDSCH receptions) for the configured downlink assignment.

In an example, the DCI may indicate SPS deactivation/release. The DCI may comprise a new data indicator (NDI) field. A value of the NDI field may be, for example, equal to zero. The DCI may comprise one or more fields (e.g., RV, HARQ, TDRA, FDRA) set to predefined values that indicate the SPS deactivation. The wireless device may clear the configured downlink assignment, for example, based on receiving the DCI indicating the SPS deactivation. The wireless device may not receive one or more SPS PDSCHs (or one or more SPS PDSCH receptions) for the configured downlink assignment, for example, based on clearing the configured downlink assignment. The DCI may or may not schedule a PDSCH reception.

The wireless device may transmit (or determine to transmit) a HARQ-ACK information feedback/bit for the SPS deactivation. The wireless device may transmit the HARQ-ACK information feedback/bit, for example, for confirmation of reception of the DCI indicating the SPS deactivation.

In an example, the DCI may schedule a PDSCH reception (or a transport block). The wireless device may transmit (or determine to transmit) a HARQ-ACK information feedback/bit for the PDSCH reception (or for reception of the transport block).

In an example, the DCI may indicate SCell dormancy for one or more cells. The wireless device may transmit (or determine to transmit) a HARQ-ACK information feedback/bit for the SCell dormancy. The wireless device may transmit the HARQ-ACK information feedback/bit, for example, for confirmation of reception of the DCI indicating the SCell dormancy. The DCI may or may not schedule a PDSCH reception.

In an example, the DCI may indicate TCI state update (e.g., unified TCI state) for one or more cells. The wireless device may transmit (or determine to transmit) a HARQ-ACK information feedback/bit for the TCI state update. The wireless device may transmit the HARQ-ACK information feedback/bit, for example, for confirmation of reception of the DCI indicating the TCI state update. The DCI may or may not schedule a PDSCH reception.

The wireless device may transmit, via a cell, the HARQ-ACK information feedback/bit. The one or more configuration parameters may indicate, for the cell, a TAG of the one or more TAGs. The TAG may comprise the cell. The cell may belong to the TAG. The one or more configuration parameters may indicate, for the TAG comprising the cell, a time alignment timer of the one or more time alignment timers.

In an example, the time alignment timer may be running.

The wireless device (or a MAC layer of the wireless device) may indicate, to a physical layer of the wireless device, a positive acknowledgement. The wireless device (or the MAC layer of the wireless device) may indicate, to the physical layer of the wireless device, the positive acknowledgement, for example, based on the time alignment timer being running. The wireless device (or the physical layer of the wireless device) may transmit, via the cell, the positive acknowledgement, for example, based on the time alignment timer being running. The wireless device (or the physical layer of the wireless device) may transmit, via the cell, the HARQ-ACK information feedback/bit that is set to (or that indicates) the positive acknowledgement, for example, based on the time alignment timer being running.

The positive acknowledgement may be, for example, for the SPS deactivation. The positive acknowledgement may be, for example, for the PDSCH reception scheduled by the DCI. The positive acknowledgement may be, for example, for the SCell dormancy. The positive acknowledgement may be, for example, for the TCI state update.

In an example, the time alignment timer may not be running (or may be stopped or may be expired).

The wireless device (or a MAC layer of the wireless device) may not instruct a physical layer of the wireless device to generate an acknowledgment (e.g., positive acknowledgment or negative acknowledgment). The wireless device (or a MAC layer of the wireless device) may not instruct the physical layer of the wireless device to generate the acknowledgment, for example, based on the time alignment timer not running. The wireless device (or the physical layer of the wireless device) may not transmit, via the cell, an acknowledgement, for example, based on the time alignment timer being running. The wireless device (or the physical layer of the wireless device) may not transmit, via the cell, the HARQ-ACK information feedback/bit, for example, based on the time alignment timer being running.

The wireless device (or a MAC layer of the wireless device) may not instruct the physical layer of the wireless device to generate the acknowledgment for the SPS deactivation, for example, based on the time alignment timer not running (or being stopped or being expired). The wireless device (or a MAC layer of the wireless device) may not instruct the physical layer of the wireless device to generate the acknowledgment for the PDSCH reception scheduled by the DCI, for example, based on the time alignment timer not running (or being stopped or being expired). The wireless device (or a MAC layer of the wireless device) may not instruct the physical layer of the wireless device to generate the acknowledgment for the SCell dormancy, for example, based on the time alignment timer not running (or being stopped or being expired). The wireless device (or a MAC layer of the wireless device) may not instruct the physical layer of the wireless device to generate the acknowledgment for the TCI state update, for example, based on the time alignment timer not running (or being stopped or being expired).

The HARQ-ACK information feedback/bit may be, for example, for the SPS deactivation. The HARQ-ACK information feedback/bit may be, for example, for the PDSCH reception scheduled by the DCI. The HARQ-ACK information feedback/bit may be, for example, for the SCell dormancy. The HARQ-ACK information feedback/bit may be, for example, for the TCI state update.

In an example, the one or more configuration parameters may comprise one or more sidelink PUCCH configuration parameters (e.g., sl-PUCCH-Config).

Figure 17:
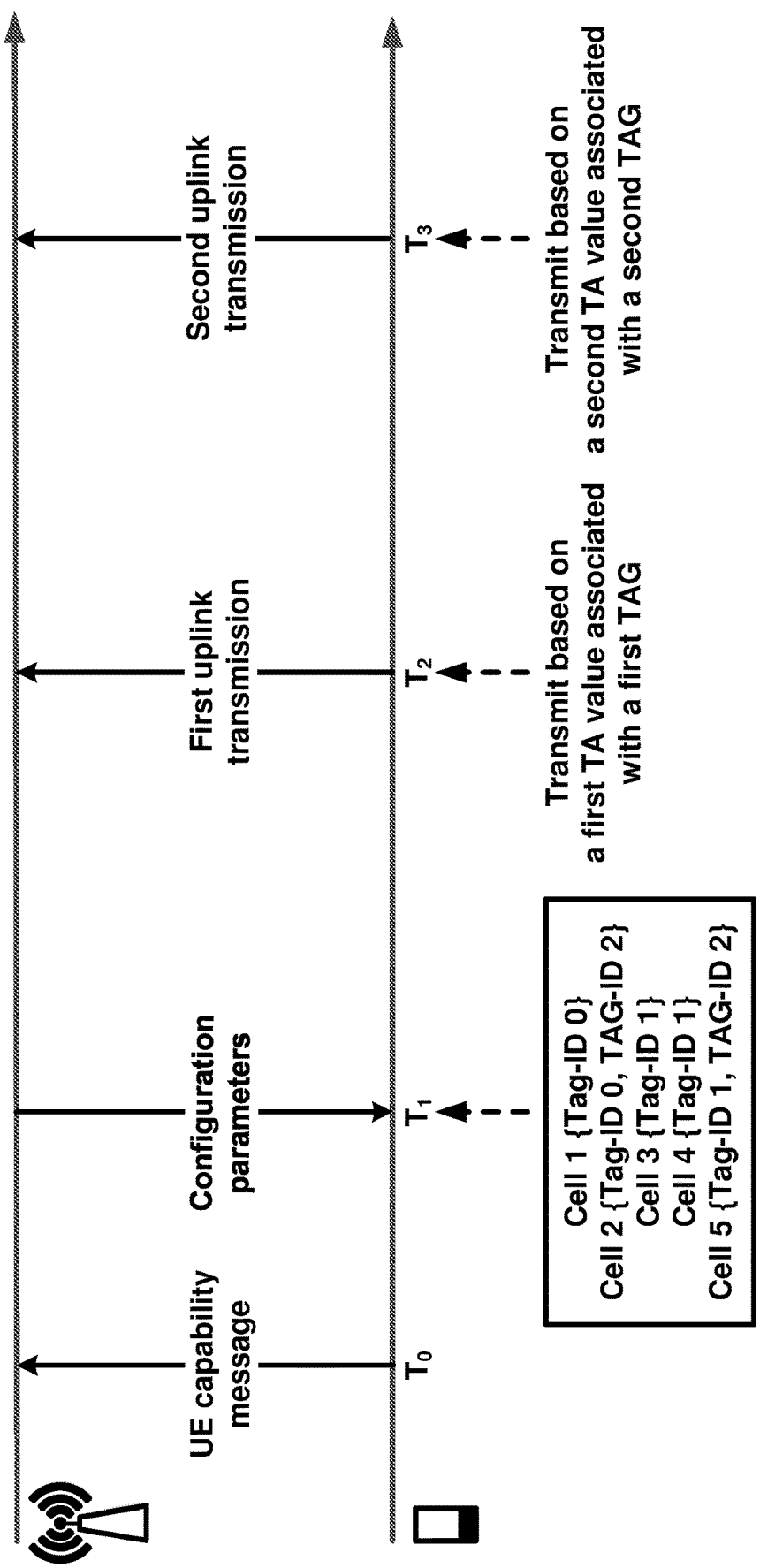
FIG. 17 illustrates an example of multiple timing advance groups as per an aspect of an embodiment of the present disclosure.
Figure 18:
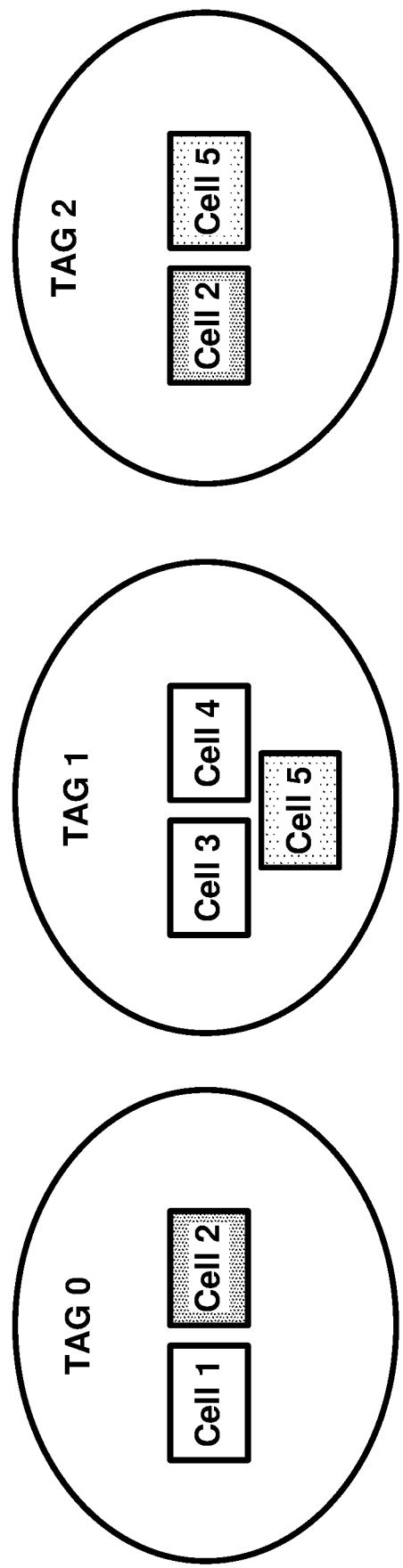
FIG. 18 illustrates an example of multiple timing advance groups as per an aspect of an embodiment of the present disclosure.

FIG. 17 and FIG. 18 illustrate examples of multiple timing advance groups as per an aspect of an embodiment of the present disclosure.

In an example, a wireless device may receive one or more messages. In an example, the wireless device may receive the one or more messages from a base station. In an example, the wireless device may receive the one or more messages from a relay node. In an example, the wireless device may receive the one or more messages from another wireless device (e.g., TRP, vehicle, remote radio head, and the like). The one or more messages may comprise one or more configuration parameters (e.g., Configuration parameters at time T1 in FIG. 17). In an example, the one or more configuration parameters may be RRC configuration parameter(s). In an example, the one or more configuration parameters may be RRC reconfiguration parameter(s).

In an example, the one or more configuration parameters may be for one or more cells.

The one or more cells may comprise a cell. The cell may be, for example, a serving cell. In an example, at least one configuration parameter of the one or more configuration parameters may be for the cell. In an example, the cell may be a primary cell (PCell). In an example, the cell may be a secondary cell (SCell). The cell may be a secondary cell configured with PUCCH (e.g., PUCCH SCell). In an example, the cell may be an unlicensed cell, e.g., operating in an unlicensed band. In an example, the cell may be a licensed cell, e.g., operating in a licensed band. In an example, the cell may operate in a first frequency range (FR1). The FR1 may, for example, comprise frequency bands below 6 GHz. In an example, the cell may operate in a second frequency range (FR2). The FR2 may, for example, comprise frequency bands from 24 GHz to 52.6 GHz. In an example, the cell may operate in a third frequency range (FR3). The FR3 may, for example, comprise frequency bands from 52.6 GHz to 71 GHz. The FR3 may, for example, comprise frequency bands starting from (or above) 52.6 GHz.

In an example, the wireless device may perform uplink transmissions (e.g., PUSCH, PUCCH, PUCCH) via/of the cell in a first time and in a first frequency. The wireless device may perform downlink receptions (e.g., PDCCH, PDSCH) via/of the cell in a second time and in a second frequency. In an example, the cell may operate in a time-division duplex (TDD) mode. In the TDD mode, the first frequency and the second frequency may be the same. In the TDD mode, the first time and the second time may be different. In an example, the cell may operate in a frequency-division duplex (FDD) mode. In the FDD mode, the first frequency and the second frequency may be different. In the FDD mode, the first time and the second time may be the same.

In an example, the wireless device may be in an RRC connected mode. In an example, the wireless device may be in an RRC idle mode. In an example, the wireless device may be in an RRC inactive mode.

In an example, the cell may comprise a plurality of BWPs. The plurality of BWPs may comprise one or more uplink BWPs comprising an uplink BWP of the cell. The plurality of BWPs may comprise one or more downlink BWPs comprising a downlink BWP of the cell.

In an example, a BWP of the plurality of BWPs may be in one of an active state and an inactive state. In an example, in the active state of a downlink BWP of the one or more downlink BWPs, the wireless device may monitor a downlink channel/signal (e.g., PDCCH, DCI, CSI-RS, PDSCH) on/for/via the downlink BWP. In an example, in the active state of a downlink BWP of the one or more downlink BWPs, the wireless device may receive a PDSCH on/via/for the downlink BWP. In an example, in the inactive state of a downlink BWP of the one or more downlink BWPs, the wireless device may not monitor a downlink channel/signal (e.g., PDCCH, DCI, CSI-RS, PDSCH) on/via/for the downlink BWP. In the inactive state of a downlink BWP of the one or more downlink BWPs, the wireless device may stop monitoring (or receiving) a downlink channel/signal (e.g., PDCCH, DCI, CSI-RS, PDSCH) on/via/for the downlink BWP. In an example, in the inactive state of a downlink BWP of the one or more downlink BWPs, the wireless device may not receive a PDSCH on/via/for the downlink BWP. In the inactive state of a downlink BWP of the one or more downlink BWPs, the wireless device may stop receiving a PDSCH on/via/for the downlink BWP.

In an example, in the active state of an uplink BWP of the one or more uplink BWPs, the wireless device may transmit an uplink signal/channel (e.g., PUCCH, preamble, PUSCH, PRACH, PUCCH, etc) on/via the uplink BWP. In an example, in the inactive state of an uplink BWP of the one or more uplink BWPs, the wireless device may not transmit an uplink signal/channel (e.g., PUCCH, preamble, PUSCH, PRACH, PUCCH, etc) on/via the uplink BWP.

In an example, the wireless device may activate the downlink BWP of the one or more downlink BWPs of the cell. In an example, the activating the downlink BWP may comprise setting (or switching to) the downlink BWP as an active downlink BWP of the cell. In an example, the activating the downlink BWP may comprise setting the downlink BWP in the active state. In an example, the activating the downlink BWP may comprise switching the downlink BWP from the inactive state to the active state.

In an example, the wireless device may activate the uplink BWP of the one or more uplink BWPs of the cell. In an example, the activating the uplink BWP may comprise that the wireless device sets (or switches to) the uplink BWP as an active uplink BWP of the cell. In an example, the activating the uplink BWP may comprise setting the uplink BWP in the active state. In an example, the activating the uplink BWP may comprise switching the uplink BWP from the inactive state to the active state.

In an example, the one or more configuration parameters may be for the (active) downlink BWP of the cell. In an example, at least one configuration parameter of the one or more configuration parameters may be for the downlink BWP of the cell.

In an example, the one or more configuration parameters may be for the (active) uplink BWP of the cell. In an example, at least one configuration parameter of the one or more configuration parameters may be for the uplink BWP of the cell.

The one or more configuration parameters may indicate a subcarrier spacing (or a numerology) for the downlink BWP.

The one or more configuration parameters may indicate a subcarrier spacing (or a numerology) for the uplink BWP.

A value of the subcarrier spacing (of the downlink BWP and/or the uplink BWP) may be/indicate, for example, 15 kHz (mu=0). A value of the subcarrier spacing may be/indicate, for example, 30 kHz (mu=1). A value of the subcarrier spacing may be/indicate, for example, 60 kHz (mu=2). A value of the subcarrier spacing may be/indicate, for example, 120 kHz (mu=3). A value of the subcarrier spacing may be/indicate, for example, 240 kHz (mu=4). A value of the subcarrier spacing may be/indicate, for example, 480 kHz (mu=5). A value of the subcarrier spacing may be/indicate, for example, 960 kHz (mu=6). For example, 480 kHz may be valid/applicable in FR3. For example, 960 kHz may be valid/applicable in FR3. For example, 240 kHz may be valid/applicable in FR3. For example, 120 kHz may be valid/applicable in FR3.

In an example, the one or more configuration parameters may indicate a plurality of control resource sets (coresets). The one or more configuration parameters may indicate the plurality of coresets for the (active) downlink BWP of the cell. The (active) downlink BWP may comprise the plurality of coresets.

In an example, the one or more configuration parameters may indicate a plurality of coreset indexes/identifiers/indicators (e.g., provided by a higher layer parameter ControlResourceSetId) for the plurality of coresets. In an example, each coreset of the plurality of coresets may be identified/indicated by a respective coreset index of the plurality of coreset indexes. In an example, a first coreset of the plurality of coresets may be identified by a first coreset index of the plurality of coreset indexes. A second coreset of the plurality of coresets may be identified by a second coreset index of the plurality of coreset indexes.

In an example, the one or more configuration parameters may indicate one or more coreset pool indexes (e.g., provided by a higher layer parameter CoresetPoolIndex) for the plurality of coresets. In an example, each coreset of the plurality of coresets may comprise (or be configured/indicated by the one or more configuration parameters) by a respective coreset pool index of the one or more coreset pool indexes (e.g., 0, 1). The one or more configuration parameters may indicate, for each coreset of the plurality of coresets, a respective coreset pool index of the one or more coreset pool indexes. For example, the one or more configuration parameters may indicate, for a first coreset of the plurality of coresets, a first coreset pool index (CoresetPoolIndex=0). The one or more configuration parameters may indicate, for a second coreset of the plurality of coresets, a second coreset pool index (CoresetPoolIndex=1). The one or more coreset pool indexes may comprise the first coreset pool index and the second coreset pool index.

In an example, the one or more configuration parameters may not indicate, for a coreset of the plurality of coresets, a coreset pool index. The higher layer parameter CoresetPoolIndex may be absent in configuration parameter(s) of the coreset. The wireless device may determine a value (or a default value) of/for a coreset pool index of the coreset as the first coreset pool index (CoresetPoolIndex=0). The wireless device may determine the value (or the default value) of/for the coreset pool index of the coreset as the first coreset pool index, for example, based on the one or more configuration parameters not indicating, for the coreset, a coreset pool index. The first coreset pool index (CoresetPoolIndex=0) may be the coreset pool index of the coreset, for example, based on the one or more configuration parameters not indicating, for the coreset, a coreset pool index.

In an example, a first coreset pool (e.g., Coreset pool 0) may comprise one or more first coresets with a coreset pool index that is equal to a first coreset pool index (e.g., CoresetPoolIndex=0). The one or more configuration parameters may indicate the first coreset pool index for each coreset of the one or more first coresets in the first coreset pool. The plurality of coresets may comprise the one or more first coresets.

In an example, a second coreset pool (e.g., Coreset pool 1) may comprise one or more second coresets with a coreset pool index that is equal to a second coreset pool index (e.g., CoresetPoolIndex=1). The one or more configuration parameters may indicate the second coreset pool index for each coreset of the one or more second coresets in the second coreset pool. The plurality of coresets may comprise the one or more second coresets.

In an example, the one or more configuration parameters may not indicate a coreset pool index for a coreset of the plurality of coresets. Based on the one or more configuration parameters not indicating the coreset pool index for the coreset, the wireless device may determine a default value for the coreset pool index of the coreset. In an example, the default value may be equal to zero (CoresetPoolIndex=0). In an example, the default value may be equal to the first coreset pool index (e.g., zero). The first coreset pool may comprise the coreset based on the one or more configuration parameters not indicating, for the coreset, the coreset pool index. The first coreset pool may comprise the coreset based on the default value of/for the coreset pool index of the coreset being equal to the first coreset pool index.

In an example, a first coreset pool index of a first coreset and a second coreset pool index of a second coreset may be the same. For example, the one or more configuration parameters may indicate the same coreset pool index for the first coreset and the second coreset. The plurality of coresets may comprise the first coreset and the second coreset. The one or more coreset pool indexes may comprise the first coreset pool index and the second coreset pool index. Based on the first coreset pool index of the first coreset and the second coreset pool index of the second coreset being the same, the wireless device may group the first coreset and the second coreset in a same coreset pool (e.g., CoresetPoolIndex=0 or CoresetPoolIndex=1). Based on the first coreset pool index of the first coreset and the second coreset pool index of the second coreset being the same, a first coreset pool comprising the first coreset and a second coreset pool comprising the second coreset may be the same.

In an example, a first coreset pool index of a first coreset and a second coreset pool index of a second coreset may be different. The plurality of coresets may comprise the first coreset and the second coreset. The one or more coreset pool indexes may comprise the first coreset pool index and the second coreset pool index. Based on the first coreset pool index of the first coreset and the second coreset pool index of the second coreset being different, the wireless device may group the first coreset and the second coreset in different coreset pools. In an example, the wireless device may group the first coreset in a first coreset pool (e.g., CoresetPoolIndex=0). The wireless device may group the second coreset in a second coreset pool (e.g., CoresetPoolIndex=1) that is different from the first coreset pool, for example, based on the first coreset pool index and the second coreset pool index being different. Based on the first coreset pool index of the first coreset and the second coreset pool index of the second coreset being different, the first coreset pool and the second coreset pool may be different.

In an example, the one or more configuration parameters may indicate at least two coreset pool indexes (e.g., 0 and 1) for a higher layer parameter CORESETPoolIndex. The one or more configuration parameters may comprise the higher layer parameter CORESETPoolIndex with (or set to) the at least two coreset pool indexes. In an example, the at least two coreset pool indexes may comprise a first coreset pool index (e.g., 0) for/of one or more first coresets of the plurality of coresets. The at least two coreset pool indexes may comprise a second coreset pool index (e.g., 1), different from the first coreset pool index, for/of one or more second coresets of the plurality of coresets. The one or more first coresets may comprise one or more third coresets, of the plurality of coresets, without a value for a higher layer parameter CORESETPoolIndex. The one or more configuration parameters may not comprise the higher layer parameter CORESETPoolIndex for the one or more third coresets.

In an example, the cell may comprise a plurality of transmission and reception points (TRPs). The plurality of TRPs may serve the cell (or may serve the wireless device in/via/of the cell). The plurality of TRPs may comprise a first TRP and a second TRP.

The first TRP may transmit a downlink signal/transmission (e.g., PDSCH, PDCCH, DCI) via the first coreset pool. Transmitting the downlink signal/transmission (e.g., PDCCH, DCI) via the first coreset pool may comprise that the first TRP transmits the downlink signal/transmission via a first coreset with (e.g., configured with or associated with) the first coreset pool index. The first TRP may not transmit a downlink signal/transmission (e.g., PDSCH, PDCCH, DCI) via the second coreset pool. Not transmitting the downlink signal/transmission (e.g., PDSCH, PDCCH, DCI) via the second coreset pool may comprise that the first TRP does not transmit the downlink signal/transmission via a second coreset with (e.g., configured with or associated with) the second coreset pool index.

The second TRP may transmit a downlink signal/transmission (e.g., PDSCH, PDCCH, DCI) via the second coreset pool. Transmitting the downlink signal/transmission (e.g., PDCCH, DCI) via the second coreset pool may comprise that the second TRP transmits the downlink signal/transmission via a second coreset with (e.g., configured with or associated with) the second coreset pool index. The second TRP may not transmit a downlink signal/transmission (e.g., PDCCH, DCI) via the first coreset pool. Not transmitting the downlink signal/transmission (e.g., PDCCH, DCI) via the first coreset pool may comprise that the second TRP does not transmit the downlink signal/transmission via a first coreset with (e.g., configured with or associated with) the first coreset pool index.

In an example, the one or more configuration parameters may indicate a plurality of uplink resources (e.g., PUCCH-Resource, SRS-Resource, and the like). The one or more configuration parameters may indicate the plurality of uplink resources for the (active) uplink BWP of the cell. The (active) uplink BWP may comprise the plurality of uplink resources. The (active) uplink BWP of an uplink carrier (e.g., NUL, SUL) of the cell may comprise the plurality of uplink resources.

The plurality of uplink resources may comprise/be, for example, a plurality of PUCCH resources. The plurality of uplink resources may comprise/be, for example, a plurality of SRS resources. The plurality of uplink resources may comprise/be, for example, a plurality of PUSCH resources.

The one or more configuration parameters may indicate one or more uplink resource groups/sets (e.g., PUCCH-ResourceGroup, SRS-ResourceSet). The one or more uplink resource groups/sets may comprise the plurality of uplink resources. Each uplink resource group/set of the one or more uplink resource groups/sets may comprise respective uplink resource(s) of the plurality of uplink resources. For example, a first uplink resource group/set of the one or more uplink resource groups/sets may comprise one or more first uplink resources of the plurality of uplink resources. A second uplink resource group/set of the one or more uplink resource groups/sets may comprise one or more second uplink resources of the plurality of uplink resources. In an example, the first uplink resource group/set and the second uplink resource group/set may not share/comprise a common/shared/same uplink resource of the plurality of uplink resources. A first uplink resource in (or belonging to) the first uplink resource group/set may not be in (or belong to) the second uplink resource group/set.

In an example, the one or more configuration parameters may indicate a plurality of uplink resource indexes/identifiers/indicators (e.g., provided by a higher layer parameter PUCCH-ResourceId, SRS-ResourceId) for the plurality of uplink resources. In an example, each uplink resource of the plurality of uplink resources may be identified/indicated by a respective uplink resource index of the plurality of uplink resource indexes. In an example, a first uplink resource of the plurality of uplink resources may be identified by a first uplink resource index of the plurality of uplink resource indexes. A second uplink resource of the plurality of uplink resources may be identified by a second uplink resource index of the plurality of uplink resource indexes.

In an example, the one or more configuration parameters may indicate one or more uplink resource group/set indexes/identifiers/indicators (e.g., provided by a higher layer parameter PUCCH-ResourceGroupId, SRS-ResourceSetId) for the one or more uplink resource groups/sets. In an example, each uplink resource group/set of the one or more uplink resource groups/sets may be identified/indicated by a respective uplink resource group/set index of the one or more uplink resource group/set indexes. In an example, a first uplink resource group/set of the one or more uplink resource groups/sets may be identified by a first uplink resource group/set index of the one or more uplink resource group/set indexes. A second uplink resource group/set of the one or more uplink resource groups/sets may be identified by a second uplink resource group/set index of the one or more uplink resource group/set indexes.

In an example, the one or more configuration parameters may indicate one or more coreset pool indexes (e.g., provided by a higher layer parameter CoresetPoolIndex) for the plurality of uplink resources. In an example, each uplink resource of the plurality of uplink resources may comprise (or be configured/indicated by the one or more configuration parameters) by a respective coreset pool index of the one or more coreset pool indexes (e.g., 0, 1). The one or more configuration parameters may indicate, for each uplink resource of the plurality of uplink resources, a respective coreset pool index of the one or more coreset pool indexes. For example, the one or more configuration parameters may indicate, for a first uplink resource of the plurality of uplink resources, a first coreset pool index (CoresetPoolIndex=0). The one or more configuration parameters may indicate, for a second uplink resource of the plurality of uplink resources, a second coreset pool index (CoresetPoolIndex=1). The one or more coreset pool indexes may comprise the first coreset pool index and the second coreset pool index.

In an example, the one or more configuration parameters may not indicate, for an uplink resource of the plurality of uplink resources, a coreset pool index. The higher layer parameter CoresetPoolIndex may be absent in configuration parameter(s) of the uplink resource. The wireless device may determine a value (or a default value) of/for a coreset pool index of the uplink resource as the first coreset pool index (CoresetPoolIndex=0). The wireless device may determine the value (or the default value) of/for the coreset pool index of the uplink resource as the first coreset pool index, for example, based on the one or more configuration parameters not indicating, for the uplink resource, a coreset pool index. The first coreset pool index (CoresetPoolIndex=0) may be the coreset pool index of the uplink resource, for example, based on the one or more configuration parameters not indicating, for the uplink resource, a coreset pool index.

In an example, the one or more configuration parameters may indicate at least two coreset pool indexes (e.g., 0 and 1) for a higher layer parameter CORESETPoolIndex. The one or more configuration parameters may comprise the higher layer parameter CORESETPoolIndex with (or set to) the at least two coreset pool indexes. In an example, the at least two coreset pool indexes may comprise a first coreset pool index (e.g., 0) for/of one or more first uplink resources of the plurality of uplink resources. The at least two coreset pool indexes may comprise a second coreset pool index (e.g., 1), different from the first coreset pool index, for/of one or more second uplink resources of the plurality of uplink resources. The one or more first uplink resources may comprise one or more third uplink resources, of the plurality of uplink resources, without a value for a higher layer parameter CORESETPoolIndex. The one or more configuration parameters may not comprise the higher layer parameter CORESETPoolIndex for the one or more third uplink resources.

In an example, the cell may comprise a plurality of transmission and reception points (TRPs). The plurality of TRPs may serve the cell (or may serve the wireless device in/via/of the cell). The plurality of TRPs may comprise a first TRP and a second TRP.

The first TRP may receive an uplink signal/transmission (e.g., PUSCH, PUCCH, SRS, UCI, PRACH) via a first uplink resource, of the plurality of uplink resources, with (e.g., configured with or associated with) the first coreset pool index. The first TRP may not receive an uplink signal/transmission (e.g., PUSCH, PUCCH, SRS, UCI, PRACH) via a second uplink resource, of the plurality of uplink resources, with (e.g., configured with or associated with) the second coreset pool index.

The second TRP may receive an uplink signal/transmission (e.g., PUSCH, PUCCH, SRS, UCI, PRACH) via a second uplink resource, of the plurality of uplink resources, with (e.g., configured with or associated with) the second coreset pool index. The second TRP may not receive an uplink signal/transmission (e.g., PUSCH, PUCCH, SRS, UCI, PRACH) via a first uplink resource, of the plurality of uplink resources, with (e.g., configured with or associated with) the first coreset pool index.

In an example, the one or more configuration parameters may indicate one or more coreset pool indexes (e.g., provided by a higher layer parameter CoresetPoolIndex) for the one or more uplink resource groups/sets. In an example, each uplink resource group/set of one or more uplink resource groups/sets may comprise (or be configured/indicated by the one or more configuration parameters) by a respective coreset pool index of the one or more coreset pool indexes (e.g., 0, 1). The one or more configuration parameters may indicate, for each uplink resource group/set of the one or more uplink resource groups/sets, a respective coreset pool index of the one or more coreset pool indexes. For example, the one or more configuration parameters may indicate, for a first uplink resource group/set of the one or more uplink resource groups/sets, a first coreset pool index (CoresetPoolIndex=0). The one or more configuration parameters may indicate, for a second uplink resource group/set of the one or more uplink resource groups/sets, a second coreset pool index (CoresetPoolIndex=1). The one or more coreset pool indexes may comprise the first coreset pool index and the second coreset pool index.

In an example, the one or more configuration parameters may not indicate, for an uplink resource group/set of the one or more uplink resource groups/sets, a coreset pool index. The higher layer parameter CoresetPoolIndex may be absent in configuration parameter(s) of the uplink resource group/set. The wireless device may determine a value (or a default value) of/for a coreset pool index of the uplink resource group/set as the first coreset pool index (CoresetPoolIndex=0). The wireless device may determine the value (or the default value) of/for the coreset pool index of the uplink resource group/set as the first coreset pool index, for example, based on the one or more configuration parameters not indicating, for the uplink resource group/set, a coreset pool index. The first coreset pool index (CoresetPoolIndex=0) may be the coreset pool index of the uplink resource group/set, for example, based on the one or more configuration parameters not indicating, for the uplink resource group/set, a coreset pool index.

In an example, the one or more configuration parameters may indicate at least two coreset pool indexes (e.g., 0 and 1) for a higher layer parameter CORESETPoolIndex. The one or more configuration parameters may comprise the higher layer parameter CORESETPoolIndex with (or set to) the at least two coreset pool indexes. In an example, the at least two coreset pool indexes may comprise a first coreset pool index (e.g., 0) for/of one or more first uplink resource groups/sets of the one or more uplink resource groups/sets. The at least two coreset pool indexes may comprise a second coreset pool index (e.g., 1), different from the first coreset pool index, for/of one or more second uplink resource groups/sets of the one or more uplink resource groups/sets. The one or more first uplink resource groups/sets may comprise one or more third uplink resource groups/sets, of the one or more uplink resource groups/sets, without a value for a higher layer parameter CORESETPoolIndex. The one or more configuration parameters may not comprise the higher layer parameter CORESETPoolIndex for the one or more third uplink resource groups/sets.

In an example, the cell may comprise a plurality of transmission and reception points (TRPs). The plurality of TRPs may serve the cell (or may serve the wireless device in/via/of the cell). The plurality of TRPs may comprise a first TRP and a second TRP.

The first TRP may receive an uplink signal/transmission (e.g., PUSCH, PUCCH, SRS, UCI, PRACH) via an uplink resource of/in a first uplink resource group/set, of the one or more uplink resource groups/sets, with (e.g., configured with or associated with) the first coreset pool index. The first TRP may not receive an uplink signal/transmission (e.g., PUSCH, PUCCH, SRS, UCI, PRACH) via an uplink resource in/of a second uplink resource group/set, of the one or more uplink resource groups/sets, with (e.g., configured with or associated with) the second coreset pool index.

The second TRP may receive an uplink signal/transmission (e.g., PUSCH, PUCCH, SRS, UCI, PRACH) via an uplink resource in/of a second uplink resource group/set, of the one or more uplink resource groups/sets, with (e.g., configured with or associated with) the second coreset pool index. The second TRP may not receive an uplink signal/transmission (e.g., PUSCH, PUCCH, SRS, UCI, PRACH) via an uplink resource in/of a first uplink resource group/set, of the one or more uplink resource groups/sets, with (e.g., configured with or associated with) the first coreset pool index.

The wireless device may transmit, via an uplink resource, an uplink signal/transmission (e.g., PUSCH/PUCCH/SRS transmission). The plurality of uplink resources may comprise the uplink resource. An uplink resource group/set of the one or more uplink resource groups/sets may comprise the uplink resource.

The wireless device may receive, via a coreset of the plurality of coresets, a downlink control information (DCI) scheduling/triggering/indicating transmission of the uplink signal/transmission. The DCI may schedule/trigger/indicate transmission of the uplink signal/transmission via the uplink resource. The DCI may indicate the uplink resource. The DCI may comprise a field indicating the uplink resource.

For example, the uplink signal/transmission may be a PUSCH transmission (e.g., transport block). The uplink resource may be a PUSCH resource. The DCI may schedule transmission of the PUSCH transmission.

For example, the uplink signal/transmission may be a PUCCH transmission (e.g., HARQ-ACK information feedback). The uplink resource may be a PUCCH resource. The DCI may schedule reception of a transport block (or a PDSCH reception). The uplink signal/transmission may be a HARQ-ACK information feedback of the transport block.

For example, the uplink signal/transmission may be an SRS. The uplink resource may be an SRS resource. The DCI may schedule transmission of the SRS. The SRS may be, for example, an aperiodic SRS.

The coreset that the wireless device receives the DCI may be associated with a coreset pool index. The one or more coreset pool indexes may comprise the coreset pool index. For example, the one or more configuration parameters may indicate, for the coreset, the coreset pool index. For example, the one or more configuration parameters may not indicate, for the coreset, the coreset pool index (CoresetPoolIndex=0 or CoresetPoolIndex=1). A value (or a default value) of the coreset pool index of the coreset may be equal to the first coreset pool index (CoresetPoolIndex=0), for example, based on the one or more configuration parameters not indicating, for the coreset, a coreset pool index.

The uplink resource may be associated with the coreset pool index. The uplink resource may be associated with the coreset pool index, for example, based on receiving, via the coreset associated with the coreset pool index, the DCI scheduling/triggering/indicating transmission of the uplink signal/transmission via the uplink resource.

The uplink resource group/set comprising the uplink resource may be associated with the coreset pool index. The uplink resource group/set may be associated with the coreset pool index, for example, based on receiving, via the coreset associated with the coreset pool index, the DCI scheduling/triggering/indicating transmission of the uplink signal/transmission via the uplink resource in (that belongs to) the uplink resource group/set. The uplink resource group/set may comprise one or more uplink resources that comprise the uplink resource. The one or more uplink resources may be associated with the coreset pool index, for example, based on the uplink resource group/set comprising the one or more uplink resources being associated with the coreset pool index. Each uplink resource of the one or more uplink resources may be associated with the coreset pool index, for example, based on the uplink resource group/set being associated with the coreset pool index.

The uplink signal/transmission may be associated with the coreset pool index. The uplink signal/transmission may be associated with the coreset pool index, for example, based on receiving, via the coreset associated with the coreset pool index, the DCI scheduling/triggering/indicating transmission of the uplink signal/transmission.

The one or more configuration parameters may indicate at least two SRS resource sets. The at least two SRS resource sets may comprise a first SRS resource set and a second SRS resource set.

The one or more configuration parameters may comprise, for each SRS resource set of the at least two SRS resource sets, a respective usage parameter.

For example, the usage parameter may be set to codebook. The usage parameter of each SRS resource set of the at least two SRS resource sets may be set to codebook. The one or more configuration parameters may indicate codebook, for example, for each SRS resource set of the at least two SRS resource sets. The one or more configuration parameters may indicate, for the first SRS resource set, codebook (or a usage parameter set to codebook). The one or more configuration parameters may indicate, for the second SRS resource set, codebook (or a usage parameter set to codebook).

For example, the usage parameter may be set to non-codebook. The usage parameter of each SRS resource set of the at least two SRS resource sets may be set to non-codebook The one or more configuration parameters may indicate non-codebook, for example, for each SRS resource set of the at least two SRS resource sets. The one or more configuration parameters may indicate, for the first SRS resource set, non-codebook (or a usage parameter set to non-codebook). The one or more configuration parameters may indicate, for the second SRS resource set, non-codebook (or a usage parameter set to non-codebook).

The one or more configuration parameters may indicate, for the at least two SRS resource sets, at least two SRS resource set indexes. The one or more configuration parameters may indicate, for each SRS resource set of the at least two SRS resource sets, a respective SRS resource set index of the at least two SRS resource set indexes. Each SRS resource set of the at least two SRS resource sets may be identified/indicated by a respective SRS resource set index of the at least two SRS resource set indexes. The first SRS resource set of the at least two SRS resource sets may be identified/indicated by a first SRS resource set index of the at least two SRS resource set indexes. The second SRS resource set of the at least two SRS resource sets may be identified/indicated by a second SRS resource set index of the at least two SRS resource set indexes.

In an example, the first SRS resource set index of the first SRS resource set may be lower/less than the second SRS resource set index of the second SRS resource set.

The wireless device may transmit repetitions of an uplink signal/transmission (e.g., repetitions of a transport block, repetitions of a PUSCH transmission, repetitions of UCI, repetitions of a PUCCH transmission, and the like). For example, the wireless device may receive a DCI scheduling/activating transmission of the repetitions of the uplink signal/transmission. The wireless device may transmit the repetitions of the uplink signal/transmission based on the receiving the DCI. For example, the repetitions of the uplink signal/transmission may be for a configured uplink grant. The one or more configuration parameters may indicate the configured uplink grant. The configured uplink grant may be, for example, a Type 1 configured uplink grant. The wireless device may transmit the repetitions of the uplink signal/transmission based on receiving the one or more configuration parameters indicating the configured uplink grant.

The DCI scheduling/activating transmission of the repetitions of the uplink signal/transmission may comprise an SRS resource set indicator field. A length/size of the SRS resource set indicator field may be 2 bits.

The wireless device may transmit one or more first repetitions of the repetitions of the uplink signal/transmission based on the first SRS resource set. The wireless device may transmit the one or more first repetitions of the repetitions of the uplink signal/transmission based on a first SRS resource in the first SRS resource set. The one or more configuration parameters may indicate, for the first SRS resource, a first number of SRS ports (e.g., nrofSRS-Ports). The wireless device may transmit the one or more first repetitions of the repetitions of the uplink signal/transmission, for example, based on the first number of SRS ports of the first SRS resource in the first SRS resource set. For example, the wireless device may transmit the one or more first repetitions of the repetitions of the uplink signal/transmission with/using a first transmission precoder that is determined based on the first number of SRS ports. For example, the wireless device may transmit the one or more first repetitions of the repetitions of the uplink signal/transmission with/using a first spatial domain transmission filter/beam that is determined based on the first SRS resource. The one or more first repetitions of the repetitions of the uplink signal/transmission may be associated with the first SRS resource set, for example, in response to transmitting the one or more first repetitions of the repetitions of the uplink signal/transmission based on the first SRS resource in the first SRS resource set.

The wireless device may transmit one or more second repetitions of the repetitions of the uplink signal/transmission based on the second SRS resource set. The wireless device may transmit the one or more second repetitions of the repetitions of the uplink signal/transmission based on a second SRS resource in the second SRS resource set. The one or more configuration parameters may indicate, for the second SRS resource, a second number of SRS ports (e.g., nrofSRS-Ports). The wireless device may transmit the one or more second repetitions of the repetitions of the uplink signal/transmission, for example, based on the second number of SRS ports of the second SRS resource in the second SRS resource set. For example, the wireless device may transmit the one or more second repetitions of the repetitions of the uplink signal/transmission with/using a second transmission precoder that is determined based on the second number of SRS ports. For example, the wireless device may transmit the one or more second repetitions of the repetitions of the uplink signal/transmission with/using a second spatial domain transmission filter/beam that is determined based on the second SRS resource. The one or more second repetitions of the repetitions of the uplink signal/transmission may be associated with the second SRS resource set, for example, in response to transmitting the one or more second repetitions of the repetitions of the uplink signal/transmission based on the second SRS resource in the second SRS resource set.

In response to the SRS resource set indicator field being equal/set to a first value (e.g., 10, 11), the wireless device may transmit the one or more first repetitions of the uplink signal/transmission based on the first SRS resource set and the one or more second repetitions of the uplink signal/transmission based on the second SRS resource set.

The wireless device may transmit the repetitions of the uplink signal/transmission based on the first SRS resource set. The wireless device may not transmit a repetition of the repetitions of the uplink signal/transmission based on the second SRS resource set. The wireless device may transmit the repetitions of the uplink signal/transmission based on a first SRS resource in the first SRS resource set. The one or more configuration parameters may indicate, for the first SRS resource, a first number of SRS ports (e.g., nrofSRS-Ports). The wireless device may transmit the repetitions of the uplink signal/transmission, for example, based on the first number of SRS ports of the first SRS resource in the first SRS resource set. For example, the wireless device may transmit the repetitions of the uplink signal/transmission with/using a first transmission precoder that is determined based on the first number of SRS ports. For example, the wireless device may transmit the repetitions of the uplink signal/transmission with/using a first spatial domain transmission filter/beam that is determined based on the first SRS resource. The repetitions of the uplink signal/transmission may be associated with the first SRS resource set, for example, in response to transmitting the repetitions of the uplink signal/transmission based on the first SRS resource in the first SRS resource set. Each repetition of the repetitions of the uplink signal/transmission may be associated with the first SRS resource set. A repetition of the repetitions of the uplink signal/transmission may not be associated with the second SRS resource set.

In response to the SRS resource set indicator field being equal/set to a second value (e.g., 00), the wireless device may transmit the repetitions of the uplink signal/transmission based on the first SRS resource set. In response to the SRS resource set indicator field being equal/set to a second value (e.g., 00), the wireless device may not transmit a repetition of the repetitions of the uplink signal/transmission based on the second SRS resource set.

The wireless device may transmit the repetitions of the uplink signal/transmission based on the second SRS resource set. The wireless device may not transmit a repetition of the repetitions of the uplink signal/transmission based on the first SRS resource set. The wireless device may transmit the repetitions of the uplink signal/transmission based on a second SRS resource in the second SRS resource set. The one or more configuration parameters may indicate, for the second SRS resource, a second number of SRS ports (e.g., nrofSRS-Ports). The wireless device may transmit the repetitions of the uplink signal/transmission, for example, based on the second number of SRS ports of the second SRS resource in the second SRS resource set. For example, the wireless device may transmit the repetitions of the uplink signal/transmission with/using a second transmission precoder that is determined based on the second number of SRS ports. For example, the wireless device may transmit the repetitions of the uplink signal/transmission with/using a second spatial domain transmission filter/beam that is determined based on the second SRS resource. The repetitions of the uplink signal/transmission may be associated with the second SRS resource set, for example, in response to transmitting the repetitions of the uplink signal/transmission based on the second SRS resource in the second SRS resource set. Each repetition of the repetitions of the uplink signal/transmission may be associated with the second SRS resource set. A repetition of the repetitions of the uplink signal/transmission may not be associated with the first SRS resource set.

In response to the SRS resource set indicator field being equal/set to a third value (e.g., 01), the wireless device may transmit the repetitions of the uplink signal/transmission based on the second SRS resource set. In response to the SRS resource set indicator field being equal/set to a third value (e.g., 01), the wireless device may not transmit a repetition of the repetitions of the uplink signal/transmission based on the first SRS resource set.

The wireless device may transmit an uplink signal/transmission (e.g., a transport block, a PUSCH transmission, an UCI, a PUCCH transmission, and the like). For example, the wireless device may receive a DCI scheduling/activating transmission of the uplink signal/transmission. The wireless device may transmit the uplink signal/transmission based on the receiving the DCI. For example, the uplink signal/transmission may be for a configured uplink grant. The one or more configuration parameters may indicate the configured uplink grant. The configured uplink grant may be, for example, a Type 1 configured uplink grant. The wireless device may transmit the uplink signal/transmission based on receiving the one or more configuration parameters indicating the configured uplink grant.

The DCI scheduling/activating transmission of the uplink signal/transmission may comprise an SRS resource set indicator field. A length/size of the SRS resource set indicator field may be 2 bits.

The wireless device may transmit a first portion (e.g., one or more first data layers/streams) of the uplink signal/transmission based on the first SRS resource set. The wireless device may transmit the first portion of the uplink signal/transmission based on a first SRS resource in the first SRS resource set. The one or more configuration parameters may indicate, for the first SRS resource, a first number of SRS ports (e.g., nrofSRS-Ports). The wireless device may transmit the first portion of the uplink signal/transmission, for example, based on the first number of SRS ports of the first SRS resource in the first SRS resource set. For example, the wireless device may transmit the first portion of the uplink signal/transmission with/using a first transmission precoder that is determined based on the first number of SRS ports. For example, the wireless device may transmit the first portion of the uplink signal/transmission with/using a first spatial domain transmission filter/beam that is determined based on the first SRS resource. The first portion the uplink signal/transmission may be associated with the first SRS resource set, for example, in response to transmitting the first portion of the uplink signal/transmission based on the first SRS resource in the first SRS resource set.

The wireless device may transmit a second portion (e.g., one or more second data layers/streams) of the uplink signal/transmission based on the second SRS resource set. The wireless device may transmit the second portion of the uplink signal/transmission based on a second SRS resource in the second SRS resource set. The one or more configuration parameters may indicate, for the second SRS resource, a second number of SRS ports (e.g., nrofSRS-Ports). The wireless device may transmit the second portion of the uplink signal/transmission, for example, based on the second number of SRS ports of the second SRS resource in the second SRS resource set. For example, the wireless device may transmit the second portion of the uplink signal/transmission with/using a second transmission precoder that is determined based on the second number of SRS ports. For example, the wireless device may transmit the second portion of the uplink signal/transmission with/using a second spatial domain transmission filter/beam that is determined based on the second SRS resource. The second portion the uplink signal/transmission may be associated with the second SRS resource set, for example, in response to transmitting the second portion of the uplink signal/transmission based on the second SRS resource in the second SRS resource set.

In response to the SRS resource set indicator field being equal/set to a first value (e.g., 10, 11), the wireless device may transmit the first portion of the uplink signal/transmission based on the first SRS resource set and the second portion of the uplink signal/transmission based on the second SRS resource set.

The uplink signal/transmission may comprise one or more data layers/streams.

In an example, the one or more data layers/streams may comprise the one or more first data layers/streams and the one or more second data layers/streams. The one or more first data layers/streams and the one or more second data layers/streams may be different. The one or more first data layers/streams and the one or more second data layers/streams may not share a data layer/stream. For example, the one or more first data layers/streams may comprise a data layer/stream 1 and a data layer/stream 2. The one or more second data layers/streams may comprise a data layer/stream 3 and a data layer/stream 4. For example, the one or more first data layers/streams may comprise a data layer/stream 1 and a data layer/stream 2. The one or more second data layers/streams may comprise a data layer/stream 3, a data layer/stream 4, and a data layer/stream 5.

In an example, the one or more first data layers/streams and the one or more second data layers/streams may be the same. The one or more first data layers/streams and the one or more second data layers/streams may be the same, for example, in a single-frequency-network (SFN). The one or more configuration parameters may indicate, for uplink transmissions (e.g., PUSCH/PUCCH/SRS transmission), the SFN (e.g., sfn-pusch, sfn-pucch, and the like). The one or more first data layers/streams may be the one or more data layers/streams of the uplink signal/transmission. The one or more second data layers/streams may be the one or more data layers/streams of the uplink signal/transmission.

The wireless device may transmit the uplink signal/transmission based on the first SRS resource set. The wireless device may transmit the uplink signal/transmission based on a first SRS resource in the second SRS resource set. The one or more configuration parameters may indicate, for the first SRS resource, a first number of SRS ports (e.g., nrofSRS-Ports). The wireless device may transmit the uplink signal/transmission, for example, based on the first number of SRS ports of the first SRS resource in the first SRS resource set. For example, the wireless device may transmit the uplink signal/transmission with/using a first transmission precoder that is determined based on the first number of SRS ports. For example, the wireless device may transmit the uplink signal/transmission with/using a first spatial domain transmission filter/beam that is determined based on the first SRS resource.

In response to the SRS resource set indicator field being equal/set to a second value (e.g., 00), the wireless device may transmit the uplink signal/transmission based on the first SRS resource set.

The wireless device may transmit the uplink signal/transmission based on the second SRS resource set. The wireless device may transmit the uplink signal/transmission based on a second SRS resource in the second SRS resource set. The one or more configuration parameters may indicate, for the second SRS resource, a second number of SRS ports (e.g., nrofSRS-Ports). The wireless device may transmit the uplink signal/transmission, for example, based on the second number of SRS ports of the second SRS resource in the second SRS resource set. For example, the wireless device may transmit the uplink signal/transmission with/using a second transmission precoder that is determined based on the second number of SRS ports. For example, the wireless device may transmit the uplink signal/transmission with/using a second spatial domain transmission filter/beam that is determined based on the second SRS resource.

In response to the SRS resource set indicator field being equal/set to a third value (e.g., 01), the wireless device may transmit the uplink signal/transmission based on the second SRS resource set.

The one or more configuration parameters may indicate a plurality of TCI states (e.g., DL-orJoint-TCIState). The one or more configuration parameters may comprise one or more PDSCH configuration parameters, for example, indicating the plurality of TCI states.

The one or more configuration parameters may comprise the one or more PDSCH configuration parameters, for example, for the downlink BWP of the cell. The one or more configuration parameters indicate the plurality of TCI states for the downlink BWP of the cell.

The one or more configuration parameters may comprise the one or more PDSCH configuration parameters, for example, for a second downlink BWP of a second cell. The one or more configuration parameters indicate the plurality of TCI states for the second downlink BWP of the second cell. The one or more cells may comprise the second cell. The one or more configuration parameters may comprise, for the downlink BWP of the cell, a reference unified TCI state list parameter (e.g., refUnifiedTClStateList) indicating the second downlink BWP of the second cell. The reference unified TCI state list parameter may comprise a BWP index (e.g., BWP-Id) identifying/indicating the second downlink BWP. The reference unified TCI state list parameter may comprise a cell index (e.g., ServCellIndex) identifying/indicating the second cell.

The one or more configuration parameters may comprise a unified-TCI-state-type parameter (e.g., unifiedtci-State-Type). The one or more configuration parameters may comprise one or more serving cell parameters (e.g., ServingCellConfig) comprising the unified-TCI-state-type parameter. The unified-TCI-state-type parameter may indicate the unified TCI state type of the cell.

For example, unified-TCI-state-type parameter may be set to "JointULDL". The wireless device may use/apply the plurality of TCI states for both uplink transmissions (e.g., PUSCH/PUCCH/SRS transmissions) of the cell and downlink receptions (e.g., PDCCH/PDSCH/CSI-RS receptions) of the cell, for example, based on the one or more configuration parameters comprising the unified-TCI-state-type parameter set to "JointULDL".

For example, unified-TCI-state-type parameter may be set to "SeparateULDL". The wireless device may use/apply the plurality of TCI states for downlink receptions (e.g., PDCCH/PDSCH/CSI-RS receptions) of the cell, for example, based on the one or more configuration parameters comprising the unified-TCI-state-type parameter set to "SeparateULDL". The wireless device may not use/apply the plurality of TCI states for uplink transmissions (e.g., PUSCH/PUCCH/SRS transmissions) of the cell, for example, based on the one or more configuration parameters comprising the unified-TCI-state-type parameter set to "SeparateULDL".

The one or more configuration parameters may indicate a second plurality of TCI states (e.g., UL-TCIState). The one or more configuration parameters may comprise one or more uplink BWP configuration parameters, for example, indicating the second plurality of TCI states.

The one or more configuration parameters may comprise the one or more uplink BWP configuration parameters, for example, for the uplink BWP of the cell. The one or more configuration parameters indicate the second plurality of TCI states for the uplink BWP of the cell.

The one or more configuration parameters may comprise the one or more uplink BWP configuration parameters, for example, for a second uplink BWP of a second cell. The one or more configuration parameters indicate the second plurality of TCI states for the second uplink BWP of the second cell. The one or more cells may comprise the second cell. The one or more configuration parameters may comprise, for the uplink BWP of the cell, a reference unified TCI state list parameter (e.g., refUnifiedTClStateList) indicating the second uplink BWP of the second cell. The reference unified TCI state list parameter may comprise a BWP index (e.g., BWP-Id) identifying/indicating the second uplink BWP. The reference unified TCI state list parameter may comprise a cell index (e.g., ServCellIndex) identifying/indicating the second cell.

The wireless device may use/apply the second plurality of TCI states for uplink transmissions (e.g., PUSCH/PUCCH/SRS transmissions) of the cell, for example, based on the one or more configuration parameters comprising the unified-TCI-state-type parameter set to "SeparateULDL". The wireless device may not use/apply the second plurality of TCI states for downlink receptions (e.g., PDCCH/PDSCH/CSI-RS receptions) of the cell, for example, based on the one or more configuration parameters comprising the unified-TCI-state-type parameter set to "SeparateULDL".

In an example, the wireless device may use, for downlink receptions via the downlink BWP of the cell, the plurality of TCI states, for example based on the one or more configuration parameters indicating the plurality of TCI states for the downlink BWP of the cell.

In an example, the wireless device may use, for uplink transmissions receptions via the uplink BWP of the cell, the plurality of TCI states, for example based on the one or more configuration parameters indicating the plurality of TCI states for the downlink BWP of the cell.

In an example, the wireless device may use, for downlink receptions via the downlink BWP of the cell, the plurality of TCI states of the second downlink BWP of the second cell, for example, based on the reference unified TCI state list parameter indicating, for the downlink BWP of the cell, the second downlink BWP of the second cell.

In an example, the wireless device may use, for uplink transmissions receptions via the uplink BWP of the cell, the plurality of TCI states of the second downlink BWP of the second cell, for example, based on the reference unified TCI state list parameter indicating, for the downlink BWP of the cell, the second downlink BWP of the second cell.

In an example, the wireless device may use, for uplink transmissions receptions via the uplink BWP of the cell, the second plurality of TCI states, for example based on the one or more configuration parameters indicating the second plurality of TCI states for the uplink BWP of the cell.

In an example, the wireless device may use, for uplink transmissions receptions via the uplink BVWP of the cell, the second plurality of TCI states of the second uplink BWP of the second cell, for example, based on the reference unified TCI state list parameter indicating, for the uplink BWP of the cell, the second uplink BWP of the second cell.

The one or more configuration parameters may indicate, for the cell, a physical cell index/identity/identifier (PCI).

The one or more configuration parameters may indicate, for the one or more cells, one or more PCIs. The one or more PCIs may comprise the PCI of the cell. The one or more configuration parameters may comprise a higher layer (or RRC) parameter physCellId indicating the one or more PCIs for the one or more cells. The one or more configuration parameters may indicate, for each cell of the one or more cells, a respective PCI of the one or more PCIs. The one or more configuration parameters may comprise the higher layer (or RRC) parameter physCellId indicating a respective PCI of the one or more PCIs for each cell of the one or more cells. For example, the one or more configuration parameters may indicate, for a first cell of the one or more cells, a first PCI of the one or more PCIs. The first PCI may identify a physical cell identity of the first cell. The one or more configuration parameters may indicate, for a second cell of the one or more cells, a second PCI of the one or more PCIs. The second PCI may identify a physical cell identity of the second cell.

The one or more configuration parameters may indicate a list of PCI sets (e.g., indicated by a RRC parameter additionalPCIList). The one or more configuration parameters may comprise one or more serving cell parameters (e.g., ServingCellConfig) indicating the list of PCI sets.

The list of PCI sets may comprise/indicate at least one PCI (e.g., additionalPCI) of the one or more PCIs. Each PCI set of the list of PCI sets may comprise/indicate a respective PCI of the at least one PCI. The one or more configuration parameters may indicate, for each PCI set of the list of PCI sets, a respective PCI of the at least one PCI. The at least one PCI may not comprise the PCI of the cell. Each PCI of the at least one PCI may be different from the PCI of the cell. The one or more PCIs may comprise the at least one PCI and the PCI of the cell. The at least one PCI may indicate/identify at least one cell of the one or more cells. Each PCI of the at least one PCI may indicate/identify a respective cell of the at least one cell. For example, a first PCI set of the list of PCI sets may comprise a first PCI of the at least one PCI. The first PCI may indicate/identify a first cell of the at least one cell. A second PCI set of the list of PCI sets may comprise a second PCI of the at least one PCI. The second PCI may indicate/identify a second cell of the at least one cell. The at least one cell may not comprise the cell. Each cell of the at least one cell may be different from the cell. The one or more cells may comprise the at least one cell and the cell.

The at least one cell may be, for example, at least one non-serving cell. The at least one cell may be, for example, at least one neighboring cell. The at least one cell may be, for example, at least one candidate/assisting cell.

A maximum size/length of the list of PCI sets may be equal to a value (e.g., 7).

The list of PCI sets may comprise/indicate at least one additional PCI index (e.g., additionalPCIIndex). Each PCI set of the list of PCI sets may comprise/indicate a respective additional PCI index of the at least one additional PCI index. The one or more configuration parameters may indicate the at least one additional PCI index for the list of PCI sets. The one or more configuration parameters may indicate, for each PCI set of the list of PCI sets, a respective additional PCI index of the at least one additional PCI index. Each PCI set of the list of PCI sets may be identified/indicated by a respective additional PCI index of the at least one additional PCI index. For example, a first PCI set of the list of PCI sets may be identified/indicated by a first additional PCI index of the at least one additional PCI index. A second PCI set of the list of PCI sets may be identified/indicated by a second additional PCI index of the at least one additional PCI index.

The one or more configuration parameters may indicate the list of PCI sets, for example, for inter-cell beam management. The one or more configuration parameters may indicate the list of PCI sets, for example, for inter-cell multi-TRP operation/mode.

For example, the list of PCI sets=[{0, PCI 5}, {1, PCI 2}, {2, PCI 4}, {3, PCI 10}, {4, PCI 21}]. The PCI of the cell is different from PCI 5, PCI 2, PCI 4, PCI 10, and PCI 21.
- {0, PCI 5} is a first PCI set of the list of PCI sets. '0' is a first additional PCI index of the first PCI set. PCI 5 is a first PCI indicating/identifying/of a first cell.
- {1, PCI 2} is a second PCI set of the list of PCI sets. '1' is a second additional PCI index of the second PCI set. PCI 2 is a second PCI indicating/identifying/of a second cell.
- {2, PCI 4} is a third PCI set of the list of PCI sets. '2' is a third additional PCI index of the third PCI set. PCI 4 is a third PCI indicating/identifying/of a third cell.
- {3, PCI 10} is a fourth PCI set of the list of PCI sets. '3' is a fourth additional PCI index of the fourth PCI set. PCI 10 is a fourth PCI indicating/identifying/of a fourth cell.
- {4, PCI 21} is a fifth PCI set of the list of PCI sets. '4' is a fifth additional PCI index of the fifth PCI set. PCI 21 is a fifth PCI indicating/identifying/of a fifth cell.

The at least one additional PCI index comprises the first additional PCI index (0), the second additional PCI index (1), the third additional PCI index (2), the fourth additional PCI index (3), and the fifth additional PCI index (4).

In an example, the one or more configuration parameters may indicate, for one or more TCI states of the plurality of TCI states, the at least one additional PCI index. The one or more configuration parameters may indicate, for each TCI state of the one or more TCI states, a respective additional PCI index (e.g., additionalPCI, AdditionalPCIIndex) of the at least one additional PCI index. For example, the one or more configuration parameters may indicate, for a first TCI state of the one or more TCI states, a first additional PCI index (e.g., 0) of the at least one additional PCI index. The first additional PCI index may indicate/identify a first PCI set of the list of PCI sets. The one or more configuration parameters may indicate, for a second TCI state of the one or more TCI states, a second additional PCI index (e.g., 1) of the at least one additional PCI index. The second additional PCI index may indicate/identify a second PCI set of the list of PCI sets. The one or more configuration parameters may indicate, for a third TCI state of the one or more TCI states, a third additional PCI index (e.g., 2) of the at least one additional PCI index, and so on. The third additional PCI index may indicate/identify a third PCI set of the list of PCI sets.

A TCI state of the one or more TCI states may be associated with an additional PCI index of the at least one additional PCI index, for example, based on the one or more configuration parameters indicating, for the TCI state, the additional PCI index. The TCI state may comprise/have the additional PCI index. The additional PCI index may indicate/identify a PCI set of the list of PCI sets. The PCI set may comprise/indicate/have a second PCI of the at least one PCI. The second PCI may indicate/identify a second cell of the at least one cell. The TCI state may be associated with the second PCI (or the second cell), for example, based on the one or more configuration parameters indicating, for the TCI state, the additional PCI index indicating the second PCI (or the second cell). The second PCI of the second cell may be, for example, different from the PCI of the cell.

In an example, the one or more configuration parameters may not indicate, for one or more TCI states of the plurality of TCI states, an additional PCI index of the at least one additional PCI index. An additional PCI index may be absent (or may not be present) in configuration parameter(s) of the one or more TCI states. The one or more configuration parameters may comprise the configuration parameter(s) of the one or more TCI states. The one or more TCI states of the plurality of TCI states may not be associated with an additional PCI index. The one or more TCI states may not comprise/have an additional PCI index. Each TCI state of the one or more TCI states may not comprise/have an additional PCI index. The one or more TCI states may be associated with the cell (or the PCI of the cell), for example, based on the one or more configuration parameters not indicating, for the one or more TCI states of the plurality of TCI states, an additional PCI index. The one or more TCI states may be associated with the cell (or the PCI of the cell), for example, based on the one or more configuration parameters not indicating, for each TCI state of the one or more TCI states, an additional PCI index. The one or more TCI states may be associated with the cell (or the PCI of the cell), for example, based on the one or more configuration parameters not indicating, for each TCI state of the one or more TCI states, an additional PCI index of the at least one additional PCI index.

In an example, the one or more configuration parameters may indicate, for one or more TCI states of the second plurality of TCI states, the at least one additional PCI index. The one or more configuration parameters may indicate, for each TCI state of the one or more TCI states, a respective additional PCI index (e.g., additionalPCI, AdditionalPCIIndex) of the at least one additional PCI index. For example, the one or more configuration parameters may indicate, for a first TCI state of the one or more TCI states, a first additional PCI index (e.g., 0) of the at least one additional PCI index. The first additional PCI index may indicate/identify a first PCI set of the list of PCI sets. The one or more configuration parameters may indicate, for a second TCI state of the one or more TCI states, a second additional PCI index (e.g., 1) of the at least one additional PCI index. The second additional PCI index may indicate/identify a second PCI set of the list of PCI sets. The one or more configuration parameters may indicate, for a third TCI state of the one or more TCI states, a third additional PCI index (e.g., 2) of the at least one additional PCI index, and so on. The third additional PCI index may indicate/identify a third PCI set of the list of PCI sets.

A TCI state of the one or more TCI states may be associated with an additional PCI index of the at least one additional PCI index, for example, based on the one or more configuration parameters indicating, for the TCI state, the additional PCI index. The TCI state may comprise/have the additional PCI index. The additional PCI index may indicate/identify a PCI set of the list of PCI sets. The PCI set may comprise/indicate/have a second PCI of the at least one PCI. The second PCI may indicate/identify a second cell of the at least one cell. The TCI state may be associated with the second PCI (or the second cell), for example, based on the one or more configuration parameters indicating, for the TCI state, the additional PCI index indicating the second PCI (or the second cell). The second PCI of the second cell may be, for example, different from the PCI of the cell.

In an example, the one or more configuration parameters may not indicate, for one or more TCI states of the second plurality of TCI states, an additional PCI index of the at least one additional PCI index. An additional PCI index may be absent (or may not be present) in configuration parameter(s) of the one or more TCI states. The one or more configuration parameters may comprise the configuration parameter(s) of the one or more TCI states. The one or more TCI states of the second plurality of TCI states may not be associated with an additional PCI index. The one or more TCI states may not comprise/have an additional PCI index. Each TCI state of the one or more TCI states may not comprise/have an additional PCI index. The one or more TCI states may be associated with the cell (or the PCI of the cell), for example, based on the one or more configuration parameters not indicating, for the one or more TCI states of the second plurality of TCI states, an additional PCI index. The one or more TCI states may be associated with the cell (or the PCI of the cell), for example, based on the one or more configuration parameters not indicating, for each TCI state of the one or more TCI states, an additional PCI index. The one or more TCI states may be associated with the cell (or the PCI of the cell), for example, based on the one or more configuration parameters not indicating, for each TCI state of the one or more TCI states, an additional PCI index of the at least one additional PCI index.

In an example, the wireless device may receive a control command (e.g., MAC-CE, DCI, downlink control command, Unified TCI States Activation/Deactivation MAC CE, and the like).

For example, the control command may indicate activation of a subset of TCI states of the plurality of TCI states (e.g., DLorJoint-TCIState).

For example, the control command may indicate activation of a subset of TCI states of the second plurality of TCI states (e.g., UL-TCIState).

The wireless device may map the subset of TCI states to one or more TCI codepoints. The wireless device may map respective TCI state(s) of the subset of TCI states to a respective TCI codepoint of the one or more TCI codepoints. The one or more TCI codepoints may indicate the subset of TCI states. Each TCI codepoint of the one or more TCI codepoints may indicate respective TCI state(s) of the subset of TCI states. Each TCI codepoint of the one or more TCI codepoints may indicate/comprise one or more TCI codepoints. For example, the subset of TCI states may be/comprise TCI state 1, TCI state 5, TCI state 8, TCI state 23, TCI state 34, and TCI state 48. The one or more TCI codepoints may/be comprise a first TCI codepoint, a second TCI codepoint, a third TCI codepoint, and a fourth TCI codepoint. The first TCI codepoint may comprise/indicate the TCI state 5. The second TCI codepoint may comprise/indicate the TCI state 8 and TCI state 48. The third TCI codepoint may comprise/indicate the TCI state 1 and TCI state 23. The fourth TCI codepoint may comprise/indicate the TCI state 34.

The wireless device may receive a DCI. The DCI may comprise a TCI field. The TCI field may indicate a TCI codepoint of the one or more TCI codepoints. A value of the TCI field may indicate (or be equal to) the TCI codepoint.

The TCI codepoint may comprise/indicate at least two TCI states. The subset of TCI states may comprise the at least two TCI states of/in the TCI codepoint. The at least two TCI states may comprise a first TCI state and a second TCI state.

The first TCI state may comprise/indicate a first reference signal (e.g., CSI-RS, SSB/PBCH block, DM-RS, SRS, and the like). The first TCI state may comprise/indicate a first quasi co-location type (e.g., QCL TypeA, QCL TypeB, QCL TypeC, QCL TypeD).

In an example, the first TCI state may be associated with the PCI of the cell. The first TCI may not comprise/have an additional PCI index of the at least one additional PCI index. An additional PCI index may be absent in configuration parameter(s) of the first TCI state. The one or more configuration parameters may comprise the configuration parameter(s) of the first TCI state. The first TCI state may be associated with the PCI of the cell, for example, based on the first TCI not comprising/having an additional PCI index of the at least one additional PCI index. In an example, the first reference signal may be quasi co-located with a first SS/PBCH block. The first SS/PBCH block may be associated with the cell. The first SS/PBCH block may be associated with the PCI of the cell. The one or more configuration parameters may indicate, the first SS/PBCH block, for the cell.

The second TCI state may comprise/indicate a second reference signal (e.g., CSI-RS, SSB/PBCH block, DM-RS, SRS, and the like). The second TCI state may comprise/indicate a second quasi co-location type (e.g., QCL TypeA, QCL TypeB, QCL TypeC, QCL TypeD).

In an example, the second TCI state may be associated with a second PCI of a second cell. The at least one cell of the one or more cells may comprise the second cell. The at least one PCI in (or indicated by) the list of PCI sets may comprise the second PCI. The second PCI may indicate/identify the second cell. The second TCI may comprise/have an additional PCI index of the at least one additional PCI index. The one or more configuration parameters may indicate, for the second TCI, the additional PCI index. The additional PCI index may indicate a PCI set of the list of PCI sets. The PCI set may comprise/indicate the second PCI of the second cell. The second TCI state may be associated with the second PCI of the second cell, for example, based on the second TCI comprising/having the additional PCI index indicating the second PCI of the second cell. The second TCI state may be associated with the second PCI of the second cell, for example, based on the one or more configuration parameters indicating, for the second TCI, the additional PCI index that indicates the second PCI of the second cell. In an example, the second reference signal may be quasi co-located with a second SS/PBCH block. The second SS/PBCH block may be associated with the second cell. The second SS/PBCH block may be associated with the second PCI of the second cell. The one or more configuration parameters may indicate, the second SS/PBCH block, for the second cell.

The one or more configuration parameters may indicate, for the first TCI state, a first TCI state index (e.g., tci-StateId). The one or more configuration parameters may indicate, for the second TCI state, a second TCI state index. In an example, the first TCI state index may be lower/less than the second TCI state index.

The control command indicating activation of the subset of TCI states may comprise a plurality of fields. A first field of the plurality of fields may indicate the first TCI state. For example, the first field may comprise the first TCI state index indicating/identifying the first TCI state. The first field may occur/be (or be located) in a first octet of the control command. A second field of the plurality of fields may indicate the second TCI state. For example, the second field may comprise the second TCI state index indicating/identifying the second TCI state. The second field may occur/be (or be located) in a second octet of the control command. The first octet may be lower/less than the second octet. For example, the first octet may be Octet 5, and the second octet may be Octet 6. For example, the first octet may be Octet 1, and the second octet may be Octet 2. For example, the first octet may be Octet 8, and the second octet may be Octet 10.

The control command may indicate/map/activate a list/set/vector of the at least two TCI states in/to/for the TCI codepoint. The control command may indicate mapping/association/activation of the list/set/vector of the at least two TCI states to/for the TCI codepoint. The at least two TCI states may comprise the first TCI state and the second TCI state. The first TCI state may occur first in the list/set/vector of the at least two TCI states. The first TCI state may be a first/starting/earliest/initial TCI state in the list/set/vector of the at least two TCI states. The second TCI state may occur second in the list/set/vector of the at least two TCI states. The second TCI state may be a last/latest/ending TCI state in the list/set/vector of the at least two TCI states.

The wireless device may transmit a first uplink signal/transmission (e.g., PUSCH/PUCCH/SRS transmission, transport block, UCI, and the like) based on the first TCI state. The wireless device may transmit the first uplink signal/transmission, for example, with/using a first spatial domain transmitting/transmission filter/beam determined based on the first TCI state. The wireless device may determine the first spatial domain transmission filter/beam determined based on the first reference signal indicated by the first TCI state.

The first spatial domain transmitting/transmission filter/beam may be, for example, same as (or substantially same as, x degrees apart, x=0, 1, 5, 10, and the like) a spatial domain reception/receiving filter/beam used to receive the first reference signal. The first spatial domain transmitting/transmission filter/beam may be, for example, same as (or substantially same as, x degrees apart, x=0, 1, 5, 10, and the like) a spatial domain transmission/transmitting filter/beam used to transmit the first reference signal.

In an example, at least one DMRS antenna port of the first uplink signal/transmission may be quasi co-located with the first reference signal indicated by the first TCI state. The at least one DMRS antenna port of the first uplink signal/transmission may be quasi co-located with the first reference signal with respect to the first quasi co-location type (e.g., QCL TypeA, QCL Type B, QCL type C, QCL TypeD) indicated by the first TCI state.

The wireless device may transmit the first uplink signal/transmission, for example, with/using a first transmission power determined based on the first TCI state. The first TCI state may indicate (or comprise or be mapped to or be associated with) one or more first power control parameters (e.g., target received power, closed-loop index, pathloss compensation factor, alpha, pathloss reference signal, and the like). The wireless device may determine the first transmission power determined based on the one or more first power control parameters indicated by (or included in or associated with or mapped to) the first TCI state. The one or more configuration parameters may indicate, for the first TCI state, the one or more first power control parameters.

The one or more configuration parameters may indicate one or more uplink power control sets (e.g., Uplink-power-Control). The one or more configuration parameters may comprise one or more serving cell parameters (e.g., ServingCellConfig) indicating the one or more uplink power control sets. The one or more configuration parameters may indicate, for the one or more uplink power control sets, one or more uplink power control set indexes/identifiers/identities (e.g., Uplink-powerControlId). The one or more configuration parameters may indicate, for each uplink power control set of the one or more uplink power control sets, a respective uplink power control set index of the one or more uplink power control set indexes/identifiers/identities. For example, the one or more uplink power control sets may comprise a first uplink power control set and a second uplink power control set. The first uplink power control set may be indicated/identified by a first uplink power control set index of the one or more uplink power control set indexes/identifiers/identities. The second uplink power control set may be indicated/identified by a second uplink power control set index of the one or more uplink power control set indexes/identifiers/identities.

For example, the one or more configuration parameters may indicate, for the first TCI state, a first uplink power control set index (e.g., Uplink-powerControlId) of the one or more uplink power control set indexes/identifiers/identities. The first TCI state may comprise/have the first power control index. The first uplink power control set index may indicate/identify a first uplink power control set of the one or more uplink power control sets. The first uplink power control set may comprise/indicate the one or more first power control parameters.

The wireless device may transmit a second uplink signal/transmission (e.g., PUSCH/PUCCH/SRS transmission, transport block, UCI, and the like) based on the second TCI state.

The wireless device may transmit the second uplink signal/transmission, for example, with/using a second spatial domain transmitting/transmission filter/beam determined based on the second TCI state. The wireless device may determine the second spatial domain transmission filter/beam determined based on the second reference signal indicated by the second TCI state.

The second spatial domain transmitting/transmission filter/beam may be, for example, same as (or substantially same as, x degrees apart, x=0, 1, 5, 10, and the like) a spatial domain reception/receiving filter/beam used to receive the second reference signal. The second spatial domain transmitting/transmission filter/beam may be, for example, same as (or substantially same as, x degrees apart, x=0, 1, 5, 10, and the like) a spatial domain transmission/transmitting filter/beam used to transmit the second reference signal.

In an example, at least one DMRS antenna port of the second uplink signal/transmission may be quasi co-located with the second reference signal indicated by the second TCI state. The at least one DMRS antenna port of the second uplink signal/transmission may be quasi co-located with the second reference signal with respect to the second quasi co-location type (e.g., QCL TypeA, QCL Type B, QCL type C, QCL TypeD) indicated by the second TCI state.

The wireless device may transmit the second uplink signal/transmission, for example, with/using a second transmission power determined based on the second TCI state. The second TCI state may indicate (or comprise or be mapped to or be associated with) one or more second power control parameters (e.g., target received power, closed-loop index, pathloss compensation factor, alpha, pathloss reference signal, and the like). The wireless device may determine the second transmission power determined based on the one or more second power control parameters indicated by (or included in or associated with or mapped to) the second TCI state. The one or more configuration parameters may indicate, for the second TCI state, the one or more second power control parameters.

For example, the one or more configuration parameters may indicate, for the second TCI state, a second uplink power control set index (e.g., Uplink-powerControlId) of the one or more uplink power control set indexes/identifiers/identities. The second TCI state may comprise/have the second power control index. The second uplink power control set index may indicate/identify a second uplink power control set of the one or more uplink power control sets. The second uplink power control set may comprise/indicate the one or more second power control parameters.

In an example, the first uplink signal/transmission and the second uplink signal/transmission may be different.

In an example, the first uplink signal/transmission and the second uplink signal/transmission may be different. The first uplink signal/transmission may be transmission of a first portion (e.g., first data layer(s)/streams) of an uplink signal. The second uplink signal/transmission may be transmission of a second portion (e.g., second data layer(s)/streams) of the uplink signal.

In an example, the first uplink signal/transmission and the second uplink signal/transmission may be the same. The first uplink signal/transmission and the second uplink signal/transmission may be repetitions of an uplink transmission (e.g., PUSCH/PUCCH repetition, repetition of a transport block, etc.). The repetitions may be, for example, in frequency domain (e.g., FDM). The repetitions may be, for example, in time domain (e.g., TDM). The repetitions may be, for example, in spatial domain (e.g., SDM, SFN).

The one or more configuration parameters may comprise one or more cell group configuration parameters (e.g., provided by MAC-CellGroupConfig). The one or more cell group configuration parameters may indicate a plurality of TAGs. For example, the one or more cell group configuration parameters may indicate, for the one or more cells, the plurality of TAGs. The one or more configuration parameters may indicate, for each cell of the one or more cells, respective TAG(s) of the plurality of TAGs. For example, the one or more cell group configuration parameters may indicate, for a subset of cells of the one or more cells, the plurality of TAGs. The one or more configuration parameters may indicate, for each cell of the subset of cells of the one or more cells, respective TAG(s) of the plurality of TAGs.

The one or more configuration parameters (or the one or more cell group configuration parameters) may indicate, for the plurality of TAGs, a plurality of TAG indexes/identifier/identities (e.g., TAG-Id). The one or more configuration parameters (or the one or more cell group configuration parameters) may indicate, for each TAG of the plurality of TAGs, a respective TAG index of the plurality of TAG indexes. For example, the one or more configuration parameters may indicate, for a first TAG of the plurality of TAGs, a first TAG index of the plurality of TAG indexes. The first TAG index may indicate/identify the first TAG. The one or more configuration parameters may indicate, for a second TAG of the plurality of TAGs, a second TAG index of the plurality of TAG indexes. The second TAG index may indicate/identify the second TAG.

For example, in FIG. 18, the plurality of TAGs comprise TAG 0, TAG 1 and TAG 2. The one or more cells (or the subset of cells) comprise Cell 1, Cell 2, Cell 3, Cell 4, and Cell 5. For example, in FIG. 17, TAG-ID 0 may indicate/identify the TAG 0, TAG-ID 1 may indicate/identify the TAG 1, and TAG-ID 2 may indicate/identify the TAG 2. The one or more configuration parameters indicate, for the Cell 1, the TAG 0 (or the TAG-ID 0 indicating/identifying the TAG 0). The one or more configuration parameters indicate, for the Cell 2, the TAG 0 and the TAG 2 (or the TAG-ID 0 indicating/identifying the TAG 0 and the TAG-ID 2 indicating/identifying the TAG 2). The one or more configuration parameters indicate, for the Cell 3, the TAG 1 (or the TAG-ID 1 indicating/identifying the TAG 1). The one or more configuration parameters indicate, for the Cell 4, the TAG 1 (or the TAG-ID 1 indicating/identifying the TAG 1). The one or more configuration parameters indicate, for the Cell 5, the TAG 1 and the TAG 2 (or the TAG-ID 1 indicating/identifying the TAG 1 and the TAG-ID 2 indicating/identifying the TAG 2).

The one or more configuration parameters may indicate, for the cell, at least two TAGs of the plurality of TAGs. The at least two TAGs may comprise a first TAG and a second TAG.

The one or more configuration parameters may comprise one or more serving cell configuration parameters (e.g., provided by ServingCellConfig) of the cell. The one or more serving cell configuration parameters may indicate/comprise, for the cell, the at least two TAGs. The one or more serving cell configuration parameters may indicate/comprise a list/set/vector of at least two TAG indexes identifying/indicating the at least two TAGs. The plurality of TAG indexes may comprise the at least two TAG indexes. Each TAG index of the at least two TAG indexes may identify/indicate a respective TAG of the at least two TAGs. The at least two TAG indexes may comprise a first TAG index and a second TAG index. For example, the first TAG index may identify/indicate the first TAG of the at least two TAGs. The second TAG index may identify/indicate the second TAG of the at least two TAGs.

For example, in FIG. 18, the cell may be the Cell 2. The at least two TAGs are the TAG 0 and the TAG 2. In FIG. 17, the list/set/vector of the at least two TAG indexes for the Cell 2 is {TAG-ID 0, TAG-ID 2}.

For example, in FIG. 18, the cell may be the Cell 5. The at least two TAGs are the TAG 1 and the TAG 2. In FIG. 17, the list/set/vector of the at least two TAG indexes for the Cell 5 is {TAG-ID 1, TAG-ID 2}.

In an example, the first TAG index of the first TAG of the at least two TAGs may be lower/less than the second TAG index of the second TAG of the at least two TAGs. The second TAG index of the second TAG of the at least two TAGs may be greater/higher than the first TAG index of the first TAG of the at least two TAGs.

For example, in FIG. 18, the cell may be the Cell 2. The at least two TAGs are the TAG 0 and the TAG 2. The TAG 0 may be indicated/identified by the TAG-ID 0. The TAG 2 may be indicated/identified by the TAG-ID 2. The first TAG of the at least two TAGs may be the TAG 0, for example, based on the TAG-ID 0 of the TAG 0 being lower/less than the TAG-ID 2 of the TAG 2. The second TAG of the at least two TAGs may be the TAG 2, for example, based on the TAG-ID 0 of the TAG 0 being lower/less than the TAG-ID 2 of the TAG 2. The second TAG of the at least two TAGs may be the TAG 2, for example, based on the TAG-ID 2 of the TAG 2 being greater/higher than the TAG-ID 0 of the TAG 0.

For example, in FIG. 18, the cell may be the Cell 5. The at least two TAGs are the TAG 1 and the TAG 2. The TAG 1 may be indicated/identified by the TAG-ID 1. The TAG 2 may be indicated/identified by the TAG-ID 2. The first TAG of the at least two TAGs may be the TAG 1, for example, based on the TAG-ID 1 of the TAG 1 being lower/less than the TAG-ID 2 of the TAG 2. The second TAG of the at least two TAGs may be the TAG 2, for example, based on the TAG-ID 1 of the TAG 1 being lower/less than the TAG-ID 2 of the TAG 2. The second TAG of the at least two TAGs may be the TAG 2, for example, based on the TAG-ID 2 of the TAG 2 being greater/higher than the TAG-ID 1 of the TAG 1.

In an example, the first TAG index may be a first/starting/earliest TAG index in the list/set/vector of the at least two TAG indexes. The first TAG index may occur first in the list/set/vector of the at least two TAG indexes. A position/location of the first TAG index may be a starting/first/earliest position/location/entry/element in the list/set/vector of the at least two TAG indexes.

In an example, the second TAG index may be a last/latest/ending/second starting/second earliest/second TAG index in the list/set/vector of the at least two TAG indexes. The second TAG index may occur second in the list/set/vector of the at least two TAG indexes. A position/location of the second TAG index may be a last/latest/ending/second starting/second earliest/second position/location/entry/element in the list/set/vector of the at least two TAG indexes. A position/location of the first TAG index may be before (or earlier than or prior to) a position/location of the second TAG index in the list/set/vector of the at least two TAG indexes.

For example, in FIG. 18, the cell may be the Cell 2. The at least two TAGs are the TAG 0 and the TAG 2. In FIG. 17, the list/set/vector of the at least two TAG indexes for the Cell 2 is {TAG-ID 0, TAG-ID 2}. The TAG 0 may be indicated/identified by the TAG-ID 0. The TAG 2 may be indicated/identified by the TAG-ID 2. The first TAG index may be the TAG-ID 0, for example, based on the TAG-ID 0 being a first/starting/earliest TAG index in the list/set/vector of the at least two TAG indexes (or the list/set/vector of the TAG-ID 0 and the TAG-ID 2). The second TAG index may be the TAG-ID 2, for example, based on the TAG-ID 0 being a first/starting/earliest TAG index in the list/set/vector of the at least two TAG indexes (or the list/set/vector of the TAG-ID 0 and the TAG-ID 2). The second TAG index may be the TAG-ID 2, for example, based on the TAG-ID 2 being a last/latest/ending/second starting/second earliest/second TAG index in the list/set/vector of the at least two TAG indexes (or the list/set/vector of the TAG-ID 0 and the TAG-ID 2). The first TAG of the at least two TAGs may be the TAG 0, for example, based on the TAG-ID 0 indicating/identifying the TAG 0 being a first/starting/earliest TAG index in the list/set/vector of the at least two TAG indexes. The first TAG of the at least two TAGs may be the TAG 0, for example, based on the TAG-ID 0 indicating/identifying the TAG 0 occurring first in the list/set/vector of the at least two TAG indexes. The second TAG of the at least two TAGs may be the TAG 2, for example, based on the TAG-ID 0 indicating/identifying the TAG 0 being a first/starting/earliest TAG index in the list/set/vector of the at least two TAG indexes. The second TAG of the at least two TAGs may be the TAG 2, for example, based on the TAG-ID 2 indicating/identifying the TAG 2 being a last/latest/ending/second starting/second earliest/second TAG index in the list/set/vector of the at least two TAG indexes. The second TAG of the at least two TAGs may be the TAG 2, for example, based on the TAG-ID 2 indicating/identifying the TAG 2 occurring second in the list/set/vector of the at least two TAG indexes.

For example, in FIG. 18, the cell may be the Cell 5. The at least two TAGs are the TAG 1 and the TAG 2. In FIG. 17, the list/set/vector of the at least two TAG indexes for the Cell 5 is {TAG-ID 1, TAG-ID 2}. The TAG 1 may be indicated/identified by the TAG-ID 1. The TAG 2 may be indicated/identified by the TAG-ID 2. The first TAG index may be the TAG-ID 1, for example, based on the TAG-ID 1 being a first/starting/earliest TAG index in the list/set/vector of the at least two TAG indexes (or the list/set/vector of the TAG-ID 1 and the TAG-ID 2). The second TAG index may be the TAG-ID 2, for example, based on the TAG-ID 1 being a first/starting/earliest TAG index in the list/set/vector of the at least two TAG indexes (or the list/set/vector of the TAG-ID 1 and the TAG-ID 2). The second TAG index may be the TAG-ID 2, for example, based on the TAG-ID 2 being a last/latest/ending/second starting/second earliest/second TAG index in the list/set/vector of the at least two TAG indexes (or the list/set/vector of the TAG-ID 1 and the TAG-ID 2). The first TAG of the at least two TAGs may be the TAG 1, for example, based on the TAG-ID 1 indicating/identifying the TAG 1 being a first/starting/earliest TAG index in the list/set/vector of the at least two TAG indexes. The first TAG of the at least two TAGs may be the TAG 1, for example, based on the TAG-ID 1 indicating/identifying the TAG 1 occurring first in the list/set/vector of the at least two TAG indexes. The second TAG of the at least two TAGs may be the TAG 2, for example, based on the TAG-ID 1 indicating/identifying the TAG 1 being a first/starting/earliest TAG index in the list/set/vector of the at least two TAG indexes. The second TAG of the at least two TAGs may be the TAG 2, for example, based on the TAG-ID 2 indicating/identifying the TAG 2 being a last/latest/ending/second starting/second earliest/second TAG index in the list/set/ vector of the at least two TAG indexes. The second TAG of the at least two TAGs may be the TAG 2, for example, based on the TAG-ID 2 indicating/identifying the TAG 2 occurring second in the list/set/vector of the at least two TAG indexes.

For example, the list/set/vector of the at least two TAG indexes of/for the cell may be {TAG-ID 3, TAG-ID 2}. The TAG 3 may be indicated/identified by the TAG-ID 3. The TAG 2 may be indicated/identified by the TAG-ID 2. The first TAG index may be the TAG-ID 3, for example, based on the TAG-ID 3 being a first/starting/earliest TAG index in the list/set/vector of the at least two TAG indexes (or the list/set/vector of the TAG-ID 3 and the TAG-ID 2). The second TAG index may be the TAG-ID 2, for example, based on the TAG-ID 1 being a first/starting/earliest TAG index in the list/set/vector of the at least two TAG indexes (or the list/set/vector of the TAG-ID 3 and the TAG-ID 2). The second TAG index may be the TAG-ID 2, for example, based on the TAG-ID 2 being a last/latest/ending/second starting/second earliest/second TAG index in the list/set/vector of the at least two TAG indexes (or the list/set/vector of the TAG-ID 3 and the TAG-ID 2). The first TAG of the at least two TAGs may be the TAG 3, for example, based on the TAG-ID 3 indicating/identifying the TAG 3 being a first/starting/earliest TAG index in the list/set/vector of the at least two TAG indexes. The first TAG of the at least two TAGs may be the TAG 3, for example, based on the TAG-ID 3 indicating/identifying the TAG 3 occurring first in the list/set/vector of the at least two TAG indexes. The second TAG of the at least two TAGs may be the TAG 2, for example, based on the TAG-ID 3 indicating/identifying the TAG 3 being a first/starting/earliest TAG index in the list/set/vector of the at least two TAG indexes. The second TAG of the at least two TAGs may be the TAG 2, for example, based on the TAG-ID 2 indicating/identifying the TAG 2 being a last/latest/ending/second starting/second earliest/second TAG index in the list/set/vector of the at least two TAG indexes. The second TAG of the at least two TAGs may be the TAG 2, for example, based on the TAG-ID 2 indicating/identifying the TAG 2 occurring second in the list/set/vector of the at least two TAG indexes.

The cell may belong to (or be associated with) the at least two TAGs, for example, based on the one or more configuration parameters (or the one or more serving cell configuration parameters) indicating, for the cell, the at least two TAGs.

The one or more configuration parameters may indicate, for one or more first cells, the first TAG. The one or more configuration parameters may indicate, for each cell of the one or more first cells, the first TAG. The one or more configuration parameters may indicate, for the first TAG, the one or more first cells. The one or more cells may comprise the one or more first cells. The one or more first cells may comprise the cell. The first TAG may comprise the one or more first cells. The one or more first cells may belong to (or be associated with) the first TAG.

The one or more configuration parameters may indicate, for one or more second cells, the second TAG. The one or more configuration parameters may indicate, for each cell of the one or more second cells, the second TAG. The one or more configuration parameters may indicate, for the second TAG, the one or more second cells. The one or more cells may comprise the one or more second cells. The one or more second cells may comprise the cell. The second TAG may comprise the one or more second cells. The one or more second cells may belong to (or be associated with) the second TAG.

In FIG. 18, when the cell is the Cell 2, the one or more first cells in (or belonging to) the first TAG (e.g., TAG 0) are the Cell 1 and the Cell 2. The one or more second cells in (or belonging to) the second TAG (e.g., TAG 2) are the Cell 2 and the Cell 5.

In FIG. 18, when the cell is the Cell 5, the one or more first cells in (or belonging to) the first TAG (e.g., TAG 1) are the Cell 3, the Cell 4, and the Cell 5. The one or more second cells in (or belonging to) the second TAG (e.g., TAG 2) are the Cell 2 and the Cell 5.

The first TAG of the at least two TAGs may be associated with a first timing advance value. The wireless device may determine/calculate/compute the first timing advance value, for example, based on receiving a first timing advance command (e.g., in a random access response or in an absolute timing advance command MAC CE or in a timing advance command MAC CE). The wireless device may receive a first control command (e.g., a random access response or an absolute timing advance command MAC CE or a timing advance command MAC CE) comprising/indicating the first timing advance command.

For example, the first control command may comprise a field indicating the first TAG. The field may comprise the first TAG index indicating/identifying the first TAG. The plurality of TAG indexes may comprise the first TAG index. The at least two TAG indexes may comprise the first TAG index. The first TAG of the at least two TAGs may be associated with the first timing advance value, for example, in response to calculating/computing the first timing advance value based on the first control command indicating the first TAG.

The wireless device may maintain/adjust the first timing advance value for the first TAG. The wireless device may maintain/adjust the first timing advance value for the one or more first cells in the first TAG. The wireless device may apply/use the first timing advance value for uplink transmissions via the one or more first cells in the first TAG. The wireless device may adjust uplink timing of the uplink transmissions via the one or more first cells in the first TAG based on the first timing advance value. For example, the wireless device may adjust uplink timing of a first uplink signal/transmission via a first cell of the one or more first cells in the first TAG based on the first timing advance value. The wireless device may adjust uplink timing of a second uplink signal/transmission via a second cell of the one or more first cells in the first TAG based on the first timing advance value.

The wireless device may receive, via a first coreset of the plurality of coresets, a first DCI scheduling reception of the first timing advance command (or the first control command comprising/indicating the first timing advance command). The first DCI may schedule a first PDSCH reception comprising/carrying/with the first timing advance command. For example, the first coreset may be associated with the first coreset pool index (CoresetPoolIndex=0). For example, the wireless device may monitor, for the first DCI, downlink control channels (or PDCCH transmissions) in the first coreset based on a third TCI state. The subset of TCI states may comprise the third TCI state. At least one DMRS antenna port of the PDCCH transmissions in the first coreset may be quasi co-located with a third reference signal indicated by the third TCI state. The at least one DMRS antenna port of the PDCCH transmissions may be quasi co-located with the third reference signal with respect to a third quasi co-location type indicated by the third TCI state. The third TCI state may be, for example, associated with the PCI of the cell.

The first TAG of the at least two TAGs may be associated with the first timing advance value, for example, based on the first coreset, that the wireless device receives the first DCI scheduling reception of the first timing advance command, being associated with the first coreset pool index. The first TAG of the at least two TAGs may be associated with the first timing advance value, for example, based on the third TCI state of the first coreset being associated with the PCI of the cell.

The second TAG of the at least two TAGs may be associated with a second timing advance value. The wireless device may determine/calculate/compute the second timing advance value, for example, based on receiving a second timing advance command (e.g., in a random access response or in an absolute timing advance command MAC CE or a timing advance command MAC CE). The wireless device may receive a second control command (e.g., a random access response or an absolute timing advance command MAC CE or a timing advance command MAC CE) comprising/indicating the second timing advance command.

For example, the second control command may comprise a field indicating the second TAG. The field may comprise the second TAG index indicating/identifying the second TAG. The plurality of TAG indexes may comprise the second TAG index. The at least two TAG indexes may comprise the second TAG index. The second TAG of the at least two TAGs may be associated with the second timing advance value, for example, in response to calculating/computing the second timing advance value based on the second control command indicating the second TAG.

The wireless device may maintain/adjust the second timing advance value for the second TAG. The wireless device may maintain/adjust the second timing advance value for the one or more second cells in the second TAG. The wireless device may apply/use the second timing advance value for uplink transmissions via the one or more second cells in the second TAG. The wireless device may adjust uplink timing of the uplink transmissions via the one or more second cells in the second TAG based on the second timing advance value. For example, the wireless device may adjust uplink timing of a first uplink signal/transmission via a first cell of the one or more second cells in the second TAG based on the second timing advance value. The wireless device may adjust uplink timing of a second uplink signal/transmission via a second cell of the one or more second cells in the second TAG based on the second timing advance value.

The wireless device may receive, via a second coreset of the plurality of coresets, a second DCI scheduling reception of the second timing advance command (or the second control command indicating/comprising the second timing advance command). The second DCI may schedule a second PDSCH reception comprising/carrying/with the second timing advance command. For example, the second coreset may be associated with the second coreset pool index (CoresetPoolIndex=1). For example, the wireless device may monitor, for the second DCI, downlink control channels (or PDCCH transmissions) in the second coreset based on a fourth TCI state. The subset of TCI states may comprise the fourth TCI state. At least one DMRS antenna port of the PDCCH transmissions in the second coreset may be quasi co-located with a fourth reference signal indicated by the fourth TCI state. The at least one DMRS antenna port of the PDCCH transmissions may be quasi co-located with the fourth reference signal with respect to a fourth quasi co-location type indicated by the fourth TCI state. The fourth TCI state may be, for example, associated with the second PCI of the second cell. The second PCI may be different from the PCI of the cell.

The second TAG of the at least two TAGs may be associated with the second timing advance value, for example, based on the second coreset, that the wireless device receives the second DCI scheduling reception of the second timing advance command, being associated with the second coreset pool index. The second TAG of the at least two TAGs may be associated with the second timing advance value, for example, based on the fourth TCI state of the second coreset being associated with the second PCI that is different from the PCI of the cell.

In an example, the first timing advance command and the second timing advance command may be different.

In an example, the first timing advance command and the second timing advance command may be the same. The first timing advance command and the second timing advance command may be a single timing advance command.

The wireless device may transmit/report, to the base station, a UE capability message (e.g., UE capability information) at time T0 in FIG. 17. The wireless device may transmit/report, to the base station, the UE capability message, for example, based on receiving, from the base station, a UE capability enquiry/request. The base station may request, via/by the UE capability enquiry/request, from the wireless device to send/transmit the UE capability message. The UE capability message (or the UE capability information) may be an RRC message that the wireless device transmits/sends/reports to the base station. The wireless device may transmit the UE capability message, for example, during initial registration process.

The UE capability message may comprise a UE capability parameter. The UE capability parameter may, for example, indicate that the wireless device is capable of supporting at least two TAGs (or more than one TAG or multiple TAGs) for a single cell. The UE capability parameter may indicate that a single cell of the wireless device may/can be configured in (or may belong to) at least two TAGs. The UE capability parameter may indicate that a single cell of the wireless device may be configured, by one or more configuration parameters transmitted by the base station, in (or may belong to) at least two TAGs.

The one or more configuration parameters (or the one or more serving cell configuration parameters) may indicate, for the cell, the at least two TAGs, for example, based on the capability parameter indicating that the wireless device is capable of supporting at least two TAGs for a single cell.

The UE capability message may comprise a UE capability parameter. The UE capability parameter may indicate a maximum number of cells that may/can be configured in (or may belong to) at least two TAGs. The one or more configuration parameters may indicate, for at least one cell of the one or more cells, at least two TAGs. A number of the at least one cell may be equal to or less than the maximum number. The at least one cell may comprise the cell. Based on the UE capability parameter indicating the maximum number of cells, the one or more configuration parameters may indicate, for the at least one cell with the number equal to or less than the maximum number equal to or less than the maximum number, the at least two TAGs.

The UE capability message may comprise a UE capability parameter. The UE capability parameter may indicate a maximum number of TAGs that may/can be configured for a single cell. The UE capability parameter may indicate that a single cell of the wireless device may/can be configured in (or may belong to) the maximum number of TAGs. The one or more configuration parameters may indicate, for a cell of the one or more cells, a number of TAGs (e.g., 1, 2, 3, . . . ). The number of TAGs may be equal to or less than the maximum number of TAGs. Based on the UE capability parameter indicating the maximum number of TAGs, the one or more configuration parameters may indicate, for the cell, the number of TAGs that is equal to or less than the maximum number of TAGs.

The one or more configuration parameters (or the one or more serving cell configuration parameters) may indicate, for the cell, the at least two TAGs, for example, based on the capability parameter indicating the maximum number of TAGs for a single cell.

For example, in FIG. 18, the at least one cell are the Cell 2 (associated with the TAG 0 and the TAG 2) and the Cell 5 (associated with the TAG 1 and the TAG 2). The number of the at least one cell is equal to two (Cell 2 and Cell 5). The maximum number may be, for example, two. The maximum number may be, for example, three. The maximum number may be, for example, n, where n=2, 3, 4, 5, . . . .

The wireless device may transmit a first uplink signal/transmission (e.g., at time T2 in FIG. 17). The wireless device may transmit, via a first uplink resource of the active uplink BWP of the cell, the first uplink signal/transmission. The wireless device may transmit, via the first uplink resource of the active uplink BWP of the uplink carrier (e.g., NUL, SUL) of the cell, the first uplink signal/transmission. The plurality of uplink resources may comprise the first uplink resource.

The first uplink signal/transmission may be, for example, a first PUSCH transmission. The first uplink signal/transmission may be, for example, a first PUCCH transmission. The first uplink signal/transmission may be, for example, a first uplink control information (UCI). The first UCI may comprise at least one of: a first HARQ-ACK information bit, a first SR, and a first CSI-RS report. The first uplink signal/transmission may be, for example, a first SRS. The first uplink signal/transmission may be, for example, a first transport block.

The wireless device may transmit the first uplink signal/transmission based on the first timing advance value associated with the first TAG. The wireless device may transmit the first uplink signal/transmission in/at a first time (e.g., symbol, absolute time, time slot, etc.) determined based on the first timing advance value associated with the first TAG. The wireless device may adjust uplink transmission timing of the first uplink signal/transmission, for example, based on the first timing advance value associated with the first TAG. The wireless device may adjust uplink timing of the first uplink signal/transmission, for example, based on the first timing advance value associated with the first TAG.

The wireless device may transmit a second uplink signal/transmission (e.g., at time T3 in FIG. 17). The wireless device may transmit, via a second uplink resource of the active uplink BWP of the cell, the second uplink signal/transmission. The wireless device may transmit, via the second uplink resource of the active uplink BWP of the uplink carrier (e.g., NUL, SUL) of the cell, the second uplink signal/transmission. The plurality of uplink resources may comprise the second uplink resource.

The first uplink resource and the second uplink resource may be, for example, different.

The first uplink resource and the second uplink resource may be, for example, the same.

The second uplink signal/transmission may be, for example, a second PUSCH transmission. The second uplink signal/transmission may be, for example, a second PUCCH transmission. The second uplink signal/transmission may be, for example, a second uplink control information (UCI). The second UCI may comprise at least one of: a second HARQ-ACK information bit, a second SR, and a second CSI-RS report. The second uplink signal/transmission may be, for example, a second SRS. The second uplink signal/transmission may be, for example, a second transport block.

The wireless device may transmit the second uplink signal/transmission based on the second timing advance value associated with the second TAG. The wireless device may transmit the second uplink signal/transmission in/at a second time determined based on the second timing advance value associated with the second TAG. The wireless device may adjust uplink transmission timing of the second uplink signal/transmission, for example, based on the second timing advance value associated with the second TAG. The wireless device may adjust uplink timing of the second uplink signal/transmission, for example, based on the second timing advance value associated with the second TAG.

In an example, the one or more configuration parameters may indicate, for the first uplink resource, the first coreset pool index (CoresetPoolIndex=0).

In an example, the one or more configuration parameters may not indicate, for the first uplink resource, a coreset pool index. The higher layer parameter CoresetPoolIndex may be absent in configuration parameter(s) of the first uplink resource. The wireless device may determine a value (or a default value) of/for a coreset pool index of the first uplink resource as the first coreset pool index (CoresetPoolIndex=0). The wireless device may determine the value (or the default value) of/for the coreset pool index of the first uplink resource as the first coreset pool index, for example, based on the one or more configuration parameters not indicating, for the first uplink resource, a coreset pool index. The first coreset pool index (CoresetPoolIndex=0) may be the coreset pool index of the first uplink resource, for example, based on the one or more configuration parameters not indicating, for the first uplink resource, a coreset pool index.

The first uplink resource may be associated with the first coreset pool index.

The first uplink resource may be associated with the first coreset pool index, for example, based on the one or more configuration parameters indicating, for the first uplink resource, the first coreset pool index (CoresetPoolIndex=0). The first uplink resource may be associated with the first coreset pool index, for example, based on the one or more configuration parameters not indicating, for the first uplink resource, a coreset pool index.

In an example, a first uplink resource group/set of the one or more uplink resource groups/sets may comprise the first uplink resource.

In an example, the one or more configuration parameters may indicate, for the first uplink resource group/set, the first coreset pool index (CoresetPoolIndex=0).

In an example, the one or more configuration parameters may not indicate, for the first uplink resource group/set, a coreset pool index. The higher layer parameter CoresetPoolIndex may be absent in configuration parameter(s) of the first uplink resource group/set. The wireless device may determine a value (or a default value) of/for a coreset pool index of the first uplink resource group/set as the first coreset pool index (CoresetPoolIndex=0). The wireless device may determine the value (or the default value) of/for the coreset pool index of the first uplink resource group/set as the first coreset pool index, for example, based on the one or more configuration parameters not indicating, for the first uplink resource group/set, a coreset pool index. The first coreset pool index (CoresetPoolIndex=0) may be the coreset pool index of the first uplink resource group/set, for example, based on the one or more configuration parameters not indicating, for the first uplink resource group/set, a coreset pool index.

The first uplink resource group set (or one or more first uplink resources in the first uplink resource group set) may be associated with the first coreset pool index.

The first uplink resource may be associated with the first coreset pool index, for example, based on the one or more configuration parameters indicating, for the first uplink resource group/set comprising the first uplink resource, the first coreset pool index (CoresetPoolIndex=0). The first uplink resource may be associated with the first coreset pool index, for example, based on the one or more configuration parameters not indicating, for the first uplink resource group/set comprising the first uplink resource, a coreset pool index.

The wireless device may transmit, via the first uplink resource, the first uplink signal/transmission based on the first timing advance value associated with the first TAG, for example, in response to the first uplink resource (or the first uplink resource group/set comprising the first uplink resource) being associated with the first coreset pool index (CoresetPoolIndex=0). The wireless device may transmit, via the first uplink resource, the first uplink signal/transmission based on the first timing advance value associated with the first TAG, for example, in response to the one or more configuration parameters indicating, for the first uplink resource (or the first uplink resource group/set comprising the first uplink resource), the first coreset pool index (CoresetPoolIndex=0). The wireless device may transmit, via the first uplink resource, the first uplink signal/transmission based on the first timing advance value associated with the first TAG, for example, in response to the one or more configuration parameters not indicating, for the first uplink resource (or the first uplink resource group/set comprising the first uplink resource), a coreset pool index.

In an example, the first coreset pool index (CoresetPoolIndex=0) may be associated with the first TAG of the at least two TAGs. The first coreset pool index (CoresetPoolIndex=0) may be associated with the first TAG of the at least two TAGs, for example, based on the first TAG index of the first TAG of the at least two TAGs being lower/less than the second TAG index of the second TAG of the at least two TAGs. The first coreset pool index (CoresetPoolIndex=0) may be associated with the first TAG of the at least two TAGs, for example, based on the first TAG index of the first TAG being a first/starting/earliest TAG index in the list/set/vector of the at least two TAG indexes. The first coreset pool index (CoresetPoolIndex=0) may be associated with the first TAG of the at least two TAGs, for example, based on the first TAG index of the first TAG occurring first in the list/set/vector of the at least two TAG indexes.

The wireless device may transmit, via the first uplink resource, the first uplink signal/transmission based on the first timing advance value associated with the first TAG, for example, in response to the first uplink resource (or the first uplink resource group/set comprising the first uplink resource) being associated with the first coreset pool index (CoresetPoolIndex=0) that is associated with the first TAG. The wireless device may transmit, via the first uplink resource associated with the first coreset pool index (CoresetPoolIndex=0), the first uplink signal/transmission based on the first timing advance value associated with the first TAG, for example, in response to the first TAG index of the first TAG of the at least two TAGs being lower/less than the second TAG index of the second TAG of the at least two TAGs. The wireless device may transmit, via the first uplink resource associated with the first coreset pool index (CoresetPoolIndex=0), the first uplink signal/transmission based on the first timing advance value associated with the first TAG, for example, in response to the first TAG index of the first TAG being a first/starting/earliest TAG index in the list/set/vector of the at least two TAG indexes. The wireless device may transmit, via the first uplink resource associated with the first coreset pool index (CoresetPoolIndex=0), the first uplink signal/transmission based on the first timing advance value associated with the first TAG, for example, in response to the first TAG index of the first TAG occurring first in the list/set/vector of the at least two TAG indexes.

In an example, the wireless device may receive, via a first coreset of the plurality of coresets, a first DCI scheduling/triggering/indicating the first uplink signal/transmission. The first coreset may be associated with the first coreset pool index (CoresetPoolIndex=0). For example, the one or more configuration parameters may indicate, for the first coreset, the first coreset pool index (CoresetPoolIndex=0). The first coreset may be associated with the first coreset pool index based on the one or more configuration parameters indicating, for the first coreset, the first coreset pool index (CoresetPoolIndex=0). For example, the one or more configuration parameters may not indicate, for the first coreset, a coreset pool index. The higher layer parameter CoresetPoolIndex may be absent in configuration parameter(s) of the first coreset. The wireless device may determine a value (or a default value) of/for a coreset pool index of the first coreset as the first coreset pool index (CoresetPoolIndex=0). The wireless device may determine the value (or the default value) of/for the coreset pool index of the first coreset as the first coreset pool index, for example, based on the one or more configuration parameters not indicating, for the first coreset, a coreset pool index. The first coreset pool index (CoresetPoolIndex=0) may be the coreset pool index of the first coreset, for example, based on the one or more configuration parameters not indicating, for the first coreset, a coreset pool index. The first coreset may be associated with the first coreset pool index based on the one or more configuration parameters not indicating, for the first coreset, a coreset pool index.

In an example, the first uplink signal/transmission may be for a first configured uplink grant (e.g., Type 1 configured uplink grant).

For example, the one or more configuration parameters may indicate, for the first configured uplink grant, the first coreset pool index (CoresetPoolIndex=0).

In an example, the one or more configuration parameters may not indicate, for the first configured uplink grant, a coreset pool index. The higher layer parameter CoresetPoolIndex may be absent in configuration parameter(s) of the first configured uplink grant. The wireless device may determine a value (or a default value) of/for a coreset pool index of the first configured uplink grant as the first coreset pool index (CoresetPoolIndex=0). The wireless device may determine the value (or the default value) of/for the coreset pool index of the first configured uplink grant as the first coreset pool index, for example, based on the one or more configuration parameters not indicating, for the first configured uplink grant, a coreset pool index. The first coreset pool index (CoresetPoolIndex=0) may be the coreset pool index of the first configured uplink grant, for example, based on the one or more configuration parameters not indicating, for the first configured uplink grant, a coreset pool index.

The first uplink signal/transmission may be associated with the first coreset pool index.

The first uplink signal/transmission may be associated with the first coreset pool index, for example, based on the receiving, via the first coreset associated with the first coreset pool index (CoresetPoolIndex=0), the first DCI scheduling/triggering/indicating the first uplink signal/transmission.

The first uplink signal/transmission may be associated with the first coreset pool index, for example, based on the one or more configuration parameters indicating, for the first configured uplink grant, the first coreset pool index (CoresetPoolIndex=0). The first uplink signal/transmission may be associated with the first coreset pool index, for example, based on the one or more configuration parameters not indicating, for the first configured uplink grant, a coreset pool index.

The wireless device may transmit the first uplink signal/transmission based on the first timing advance value associated with the first TAG, for example, in response to the first uplink signal/transmission being associated with the first coreset pool index (CoresetPoolIndex=0). The wireless device may transmit the first uplink signal/transmission based on the first timing advance value associated with the first TAG, for example, in response to the receiving, via the first coreset associated with the first coreset pool index (CoresetPoolIndex=0), the first DCI scheduling/triggering/indicating the first uplink signal/transmission. The wireless device may transmit the first uplink signal/transmission based on the first timing advance value associated with the first TAG, for example, in response to the one or more configuration parameters indicating, for the first configured uplink grant, the first coreset pool index (CoresetPoolIndex=0). The wireless device may transmit the first uplink signal/transmission based on the first timing advance value associated with the first TAG, for example, in response to the one or more configuration parameters not indicating, for the first configured uplink grant, a coreset pool index.

The wireless device may transmit the first uplink signal/transmission based on the first timing advance value associated with the first TAG, for example, in response to the first uplink signal/transmission being associated with the first coreset pool index (CoresetPoolIndex=0) that is associated with the first TAG. The wireless device may transmit the first uplink signal/transmission associated with the first coreset pool index (CoresetPoolIndex=0) based on the first timing advance value associated with the first TAG, for example, in response to the first TAG index of the first TAG of the at least two TAGs being lower/less than the second TAG index of the second TAG of the at least two TAGs. The wireless device may transmit the first uplink signal/transmission associated with the first coreset pool index (CoresetPoolIndex=0) based on the first timing advance value associated with the first TAG, for example, in response to the first TAG index of the first TAG being a first/starting/earliest TAG index in the list/set/vector of the at least two TAG indexes. The wireless device may transmit the first uplink signal/transmission associated with the first coreset pool index (CoresetPoolIndex=0) based on the first timing advance value associated with the first TAG, for example, in response to the first TAG index of the first TAG occurring first in the list/set/vector of the at least two TAG indexes.

In an example, the one or more configuration parameters may indicate, for the second uplink resource, the second coreset pool index (CoresetPoolIndex=1).

The second uplink resource may be associated with the second coreset pool index.

The second uplink resource may be associated with the second coreset pool index, for example, based on the one or more configuration parameters indicating, for the second uplink resource, the second coreset pool index (CoresetPoolIndex=1).

In an example, a second uplink resource group/set of the one or more uplink resource groups/sets may comprise the second uplink resource.

In an example, the one or more configuration parameters may indicate, for the second uplink resource group/set, the second coreset pool index (CoresetPoolIndex=1).

The second uplink resource group set (or one or more second uplink resources in the second uplink resource group set) may be associated with the second coreset pool index.

The second uplink resource may be associated with the second coreset pool index, for example, based on the one or more configuration parameters indicating, for the second uplink resource group/set comprising the second uplink resource, the second coreset pool index (CoresetPoolIndex=1).

The wireless device may transmit, via the second uplink resource, the second uplink signal/transmission based on the second timing advance value associated with the second TAG, for example, in response to the second uplink resource (or the second uplink resource group/set comprising the second uplink resource) being associated with the second coreset pool index (CoresetPoolIndex=1). The wireless device may transmit, via the second uplink resource, the second uplink signal/transmission based on the second timing advance value associated with the second TAG, for example, in response to the one or more configuration parameters indicating, for the second uplink resource (or the second uplink resource group/set comprising the second uplink resource), the second coreset pool index (CoresetPoolIndex=1).

In an example, the second coreset pool index (CoresetPoolIndex=1) may be associated with the second TAG of the at least two TAGs. The second coreset pool index (CoresetPoolIndex=1) may be associated with the second TAG of the at least two TAGs, for example, based on the second TAG index of the second TAG of the at least two TAGs being greater/higher than the first TAG index of the first TAG of the at least two TAGs. The second coreset pool index (CoresetPoolIndex=1) may be associated with the second TAG of the at least two TAGs, for example, based on the second TAG index of the second TAG being a last/ending/latest TAG index in the list/set/vector of the at least two TAG indexes. The second coreset pool index (CoresetPoolIndex=1) may be associated with the second TAG of the at least two TAGs, for example, based on the second TAG index of the second TAG occurring second in the list/set/vector of the at least two TAG indexes.

The wireless device may transmit, via the second uplink resource, the second uplink signal/transmission based on the second timing advance value associated with the second TAG, for example, in response to the second uplink resource (or the second uplink resource group/set comprising the second uplink resource) being associated with the second coreset pool index (CoresetPoolIndex=1) that is associated with the second TAG. The wireless device may transmit, via the second uplink resource associated with the second coreset pool index (CoresetPoolIndex=1), the second uplink signal/transmission based on the second timing advance value associated with the second TAG, for example, in response to the second TAG index of the second TAG of the at least two TAGs being greater/higher than the first TAG index of the first TAG of the at least two TAGs. The wireless device may transmit, via the second uplink resource associated with the second coreset pool index (CoresetPoolIndex=1), the second uplink signal/transmission based on the second timing advance value associated with the second TAG, for example, in response to the second TAG index of the second TAG being a last/latest/ending TAG index in the list/set/vector of the at least two TAG indexes. The wireless device may transmit, via the second uplink resource associated with the second coreset pool index (CoresetPoolIndex=1), the second uplink signal/transmission based on the second timing advance value associated with the second TAG, for example, in response to the second TAG index of the second TAG occurring second in the list/set/vector of the at least two TAG indexes.

In an example, the wireless device may receive, via a second coreset of the plurality of coresets, a second DCI scheduling/triggering/indicating the second uplink signal/transmission. The second coreset may be associated with the second coreset pool index (CoresetPoolIndex=1). For example, the one or more configuration parameters may indicate, for the second coreset, the second coreset pool index (CoresetPoolIndex=1). The second coreset may be associated with the second coreset pool index based on the one or more configuration parameters indicating, for the second coreset, the second coreset pool index (CoresetPoolIndex=0).

In an example, the second uplink signal/transmission may be for a second configured uplink grant (e.g., Type 1 configured uplink grant).

For example, the one or more configuration parameters may indicate, for the second configured uplink grant, the second coreset pool index (CoresetPoolIndex=1).

The second uplink signal/transmission may be associated with the second coreset pool index.

The second uplink signal/transmission may be associated with the second coreset pool index, for example, based on the receiving, via the second coreset associated with the second coreset pool index (CoresetPoolIndex=1), the second DCI scheduling/triggering/indicating the second uplink signal/transmission.

The second uplink signal/transmission may be associated with the second coreset pool index, for example, based on the one or more configuration parameters indicating, for the second configured uplink grant, the second coreset pool index (CoresetPoolIndex=1).

The wireless device may transmit the second uplink signal/transmission based on the second timing advance value associated with the second TAG, for example, in response to the second uplink sign al/transmission being associated with the second coreset pool index (CoresetPoolIndex=1). The wireless device may transmit the second uplink signal/transmission based on the second timing advance value associated with the second TAG, for example, in response to the receiving, via the second coreset associated with the second coreset pool index (CoresetPoolIndex=1), the second DCI scheduling/triggering/indicating the second uplink signal/transmission. The wireless device may transmit the second uplink signal/transmission based on the second timing advance value associated with the second TAG, for example, in response to the one or more configuration parameters indicating, for the second configured uplink grant, the second coreset pool index (CoresetPoolIndex=1).

The wireless device may transmit the second uplink signal/transmission based on the second timing advance value associated with the second TAG, for example, in response to the second uplink signal/transmission being associated with the second coreset pool index (CoresetPoolIndex=1) that is associated with the second TAG. The wireless device may transmit the second uplink signal/transmission associated with the second coreset pool index (CoresetPoolIndex=1) based on the second timing advance value associated with the second TAG, for example, in response to the second TAG index of the second TAG of the at least two TAGs being greater/higher than the first TAG index of the first TAG of the at least two TAGs. The wireless device may transmit the second uplink signal/transmission associated with the second coreset pool index (CoresetPoolIndex=1) based on the second timing advance value associated with the second TAG, for example, in response to the second TAG index of the second TAG being a last/latest/ending/second starting/second earliest/second TAG index in the list/set/vector of the at least two TAG indexes. The wireless device may transmit the second uplink signal/transmission associated with the second coreset pool index (CoresetPoolIndex=1) based on the second timing advance value associated with the second TAG, for example, in response to the second TAG index of the second TAG occurring second in the list/set/vector of the at least two TAG indexes.

The wireless device may transmit the first uplink signal/transmission, for example, based on the first SRS resource set of the at least two SRS resource sets.

For example, the wireless device may transmit the first uplink signal/transmission with/using a first transmission precoder that is determined based on a first number of SRS ports (e.g., nrofSRS-Ports) of a first SRS resource in the first SRS resource set. For example, the wireless device may transmit the first uplink signal/transmission with/using a first spatial domain transmission filter/beam that is determined based on a first SRS resource in the first SRS resource set. The first uplink signal/transmission may be associated with the first SRS resource set, for example, in response to transmitting the first uplink signal/transmission based on the first SRS resource in the first SRS resource set.

The wireless device may receive a first DCI scheduling/triggering/indicating the first uplink signal/transmission. The first DCI may be, for example, a fallback DCI (e.g., DCI format 0-0). The first uplink signal/transmission may be associated with the first SRS resource set, for example, based on the first DCI scheduling/triggering/indicating the first uplink signal/transmission being a fallback DCI. The first DCI (e.g., DCI 0-1, 0-2) may comprise, for example, an SRS resource set indicator field. The first uplink signal/transmission may be associated with the first SRS resource set, for example, based on the SRS resource set indicator field of/in the first DCI being equal to a first value (e.g., 00, 10, 11).

In an example, the first uplink signal/transmission may be for a first configured uplink grant (e.g., Type 1 configured uplink grant).

For example, the one or more configuration parameters may indicate, for the first configured uplink grant, a single transmission parameter (e.g., pathlossReferenceIndex, srs-ResourceIndicator, precodingAndNumberOfLayers). The first uplink signal/transmission may be associated with the first SRS resource set, for example, based on the one or more configuration parameters indicating, for the first configured uplink grant, a single transmission parameter (e.g., pathlossReferenceIndex, srs-ResourceIndicator, precodingAndNumberOfLayers).

For example, the one or more configuration parameters may indicate, for the first configured uplink grant, two transmission parameters. The two transmission parameters may be, for example, two pathloss reference indexes (e.g., pathlossReferenceIndex, pathlossReferenceIndex2). The two transmission parameters may be, for example, two SRS resource indicators (e.g., srs-ResourceIndicator, srs-ResourceIndicator2). The two transmission parameters may be, for example, two precoding-and-number-of-layers fields (e.g., precodingAndNumberOfLayers, precodingAndNumberOfLayers2). The first uplink signal/transmission may be associated with the first SRS resource set, for example, based on the one or more configuration parameters indicating, for the first configured uplink grant, the two transmission parameters.

The wireless device may transmit the first uplink signal/transmission based on the first timing advance value associated with the first TAG, for example, in response to the first uplink signal/transmission being associated with the first SRS resource set. The wireless device may transmit the first uplink signal/transmission based on the first timing advance value associated with the first TAG, for example, in response to the first DCI scheduling/triggering/indicating the first uplink signal/transmission being a fallback DCI. The wireless device may transmit the first uplink signal/transmission based on the first timing advance value associated with the first TAG, for example, in response to the SRS resource set indicator field of/in the first DCI being equal to a first value (e.g., 00, 10, 11). The wireless device may transmit the first uplink signal/transmission based on the first timing advance value associated with the first TAG, for example, in response to the one or more configuration parameters indicating, for the first configured uplink grant, a single transmission parameter (e.g., pathlossReferenceIndex, srs-ResourceIndicator, precodingAndNumberOfLayers). The wireless device may transmit the first uplink signal/transmission based on the first timing advance value associated with the first TAG, for example, in response to the one or more configuration parameters indicating, for the first configured uplink grant, the two transmission parameters.

In an example, the first SRS resource set may be associated with the first TAG of the at least two TAGs. The first SRS resource set may be associated with the first TAG of the at least two TAGs, for example, based on the first TAG index of the first TAG of the at least two TAGs being lower/less than the second TAG index of the second TAG of the at least two TAGs. The first SRS resource set may be associated with the first TAG of the at least two TAGs, for example, based on the first TAG index of the first TAG being a first/starting/earliest TAG index in the list/set/vector of the at least two TAG indexes. The first SRS resource set may be associated with the first TAG of the at least two TAGs, for example, based on the first TAG index of the first TAG occurring first in the list/set/vector of the at least two TAG indexes.

The wireless device may transmit the first uplink signal/transmission based on the first timing advance value associated with the first TAG, for example, in response to the first uplink signal/transmission being associated with the first SRS resource set that is associated with the first TAG. The wireless device may transmit the first uplink signal/transmission associated with the first SRS resource set based on the first timing advance value associated with the first TAG, for example, in response to the first TAG index of the first TAG of the at least two TAGs being lower/less than the second TAG index of the second TAG of the at least two TAGs. The wireless device may transmit the first uplink signal/transmission associated with the first SRS resource set based on the first timing advance value associated with the first TAG, for example, in response to the first TAG index of the first TAG being a first/starting/earliest TAG index in the list/set/vector of the at least two TAG indexes. The wireless device may transmit the first uplink signal/transmission associated with the first SRS resource set based on the first timing advance value associated with the first TAG, for example, in response to the first TAG index of the first TAG occurring first in the list/set/vector of the at least two TAG indexes.

The wireless device may transmit the second uplink signal/transmission, for example, based on the second SRS resource set of the at least two SRS resource sets.

For example, the wireless device may transmit the second uplink signal/transmission with/using a second transmission precoder that is determined based on a second number of SRS ports (e.g., nrofSRS-Ports) of a second SRS resource in the second SRS resource set. For example, the wireless device may transmit the second uplink signal/transmission with/using a second spatial domain transmission filter/beam that is determined based on a second SRS resource in the second SRS resource set. The second uplink signal/transmission may be associated with the second SRS resource set, for example, in response to transmitting the second uplink signal/transmission based on the second SRS resource in the second SRS resource set.

The wireless device may receive a second DCI scheduling/triggering/indicating the second uplink signal/transmission. The second DCI (e.g., DCI 0-1, 0-2) may comprise, for example, an SRS resource set indicator field. The second uplink signal/transmission may be associated with the second SRS resource set, for example, based on the SRS resource set indicator field of/in the second DCI being equal to a second value (e.g., 01, 10, 11).

In an example, the second uplink signal/transmission may be for a second configured uplink grant (e.g., Type 1 configured uplink grant).

For example, the one or more configuration parameters may indicate, for the second configured uplink grant, two transmission parameters. The two transmission parameters may be, for example, two pathloss reference indexes (e.g., pathlossReferenceIndex, pathlossReferenceIndex2). The two transmission parameters may be, for example, two SRS resource indicators (e.g., srs-ResourceIndicator, srs-ResourceIndicator2). The two transmission parameters may be, for example, two precoding-and-number-of-layers fields (e.g., precodingAndNumberOfLayers, precodingAndNumberOfLayers2). The second uplink signal/transmission may be associated with the second SRS resource set, for example, based on the one or more configuration parameters indicating, for the second configured uplink grant, the two transmission parameters.

The wireless device may transmit the second uplink signal/transmission based on the second timing advance value associated with the second TAG, for example, in response to the second uplink signal/transmission being associated with the second SRS resource set. The wireless device may transmit the second uplink signal/transmission based on the second timing advance value associated with the second TAG, for example, in response to the SRS resource set indicator field of/in the second DCI being equal to a second value (e.g., 01, 10, 11). The wireless device may transmit the second uplink signal/transmission based on the second timing advance value associated with the second TAG, for example, in response to the one or more configuration parameters indicating, for the second configured uplink grant, the two transmission parameters.

In an example, the second SRS resource set may be associated with the second TAG of the at least two TAGs.

The second SRS resource set may be associated with the second TAG of the at least two TAGs, for example, based on the second TAG index of the second TAG of the at least two TAGs being greater/higher than the first TAG index of the first TAG of the at least two TAGs. The second SRS resource set may be associated with the second TAG of the at least two TAGs, for example, based on the second TAG index of the second TAG being a last/ending/latest TAG index in the list/set/vector of the at least two TAG indexes. The second SRS resource set may be associated with the second TAG of the at least two TAGs, for example, based on the second TAG index of the second TAG occurring second in the list/set/vector of the at least two TAG indexes.

The wireless device may transmit the second uplink signal/transmission based on the second timing advance value associated with the second TAG, for example, in response to the second uplink signal/transmission being associated with the second SRS resource set that is associated with the second TAG. The wireless device may transmit the second uplink signal/transmission associated with the second SRS resource set based on the second timing advance value associated with the second TAG, for example, in response to the second TAG index of the second TAG of the at least two TAGs being greater/higher than the first TAG index of the first TAG of the at least two TAGs. The wireless device may transmit the second uplink signal/transmission associated with the second SRS resource set based on the second timing advance value associated with the second TAG, for example, in response to the second TAG index of the second TAG being a last/latest/ending/second starting/second earliest/second TAG index in the list/set/vector of the at least two TAG indexes. The wireless device may transmit the second uplink signal/transmission associated with the second SRS resource set based on the second timing advance value associated with the second TAG, for example, in response to the second TAG index of the second TAG occurring second in the list/set/vector of the at least two TAG indexes.

The wireless device may transmit, via the first uplink resource, the first uplink signal/transmission, for example, based on the first TCI state of the at least two TCI states. The wireless device may transmit the first uplink signal/transmission, for example, with/using a first spatial domain transmitting/transmission filter/beam determined based on the first TCI state. The wireless device may transmit the first uplink signal/transmission, for example, with/using a first transmission power determined based on the first TCI state.

The wireless device may receive a first DCI scheduling/triggering/indicating the first uplink signal/transmission. The first DCI may be, for example, a fallback DCI (e.g., DCI format 0-0). The wireless device may transmit the first uplink signal/transmission based on the first TCI state, for example, in response to the first DCI scheduling/triggering/indicating the first uplink signal/transmission being a fallback DCI. The first uplink signal/transmission may be associated with the first TCI state, for example, based on the first DCI scheduling/triggering/indicating the first uplink signal/transmission being a fallback DCI. The first DCI (e.g., DCI 0-1, 0-2) may comprise, for example, a field (e.g., SRS resource set indicator field, coreset pool index, TRP index, Capability set index, Antenna panel index, Joint/Common TCI state index, and the like). The wireless device may transmit the first uplink signal/transmission based on the first TCI state, for example, in response to the field of/in the first DCI being equal to a first value (e.g., 0, 00, 10, 11, and the like) indicating the first TCI state. The first uplink signal/transmission may be associated with the first TCI state, for example, based on the field of/in the first DCI being equal to a first value (e.g., 0, 00, 10, 11, and the like) indicating the first TCI state.

In an example, the first uplink signal/transmission may be for a first configured uplink grant (e.g., Type 1 configured uplink grant).

For example, the one or more configuration parameters may indicate, for the first configured uplink grant, a field (e.g., SRS resource set indicator field, coreset pool index, TRP index, Capability set index, Antenna panel index, Joint/Common TCI state index, and the like). The wireless device may transmit the first uplink signal/transmission based on the first TCI state, for example, in response to the field in/of the first configured uplink grant being equal to a first value (e.g., 0, 00, 10, 11, and the like) indicating the first TCI state. The first uplink signal/transmission may be associated with the first TCI state, for example, based on the field of/in the first configured uplink grant being equal to a first value (e.g., 0, 00, 10, 11, and the like) indicating the first TCI state.

For example, the one or more configuration parameters may not indicate, for the first configured uplink grant, a field (e.g., SRS resource set indicator field, coreset pool index, TRP index, Capability set index, Antenna panel index, Joint/Common TCI state index, and the like). The wireless device may transmit the first uplink signal/transmission based on the first TCI state, for example, in response to the one or more configuration parameters not indicating, for the first configured uplink grant, the field. The first uplink signal/transmission may be associated with the first TCI state, for example, based on the one or more configuration parameters not indicating, for the first configured uplink grant, the field.

The one or more configuration parameters may indicate, for the first uplink resource, a field (e.g., SRS resource set indicator field, coreset pool index, TRP index, Capability set index, Antenna panel index, Joint/Common TCI state index, and the like). The wireless device may transmit, via the first uplink resource, the first uplink signal/transmission based on the first TCI state, for example, in response to the one or more configuration parameters indicating, for the first uplink resource, the field that is equal/set to a first value (e.g., 0, 00, 10, 11, and the like) indicating the first TCI state. The first uplink signal/transmission may be associated with the first TCI state, for example, based on the one or more configuration parameters indicating, for the first uplink resource that/via/on/in/which/where the wireless device transmits the first uplink signal/transmission, the field that is equal/set to a first value (e.g., 0, 00, 10, 11, and the like) indicating the first TCI state.

The one or more configuration parameters may not indicate, for the first uplink resource, a field (e.g., SRS resource set indicator field, coreset pool index, TRP index, Capability set index, Antenna panel index, Joint/Common TCI state index, and the like). The wireless device may transmit, via the first uplink resource, the first uplink signal/transmission based on the first TCI state, for example, in response to the one or more configuration parameters not indicating, for the first uplink resource, the field. The first uplink signal/transmission may be associated with the first TCI state, for example, based on the one or more configuration parameters not indicating, for the first uplink resource, the field.

The wireless device may transmit the first uplink signal/transmission based on the first timing advance value associated with the first TAG, for example, in response to the first uplink signal/transmission being associated with the first TCI state. The wireless device may transmit the first uplink signal/transmission based on the first timing advance value associated with the first TAG, for example, in response to the first DCI scheduling/triggering/indicating the first uplink signal/transmission being a fallback DCI. The wireless device may transmit the first uplink signal/transmission based on the first timing advance value associated with the first TAG, for example, in response to the field of/in the first DCI being equal/set to a first value (e.g., 0, 00, 10, 11). The wireless device may transmit the first uplink signal/transmission based on the first timing advance value associated with the first TAG, for example, in response to the one or more configuration parameters indicating, for the first configured uplink grant, the field that is equal/set to a first value (e.g., 0, 00, 10, 11). The wireless device may transmit the first uplink signal/transmission based on the first timing advance value associated with the first TAG, for example, in response to the one or more configuration parameters not indicating, for the first configured uplink grant, the field. The wireless device may transmit the first uplink signal/transmission based on the first timing advance value associated with the first TAG, for example, in response to the one or more configuration parameters indicating, for the first uplink resource at/via/on/in/which/where the wireless device transmits the first uplink signal/transmission, the field that is equal/set to a first value (e.g., 0, 00, 10, 11). The wireless device may transmit the first uplink signal/transmission based on the first timing advance value associated with the first TAG, for example, in response to the one or more configuration parameters not indicating, for the first uplink resource at/via/on/in/which/where the wireless device transmits the first uplink signal/transmission, the field.

In an example, the first TCI state may be associated with the PCI of the cell. The one or more configuration parameters may not indicate, for first TCI state, an additional PCI index of the at least one additional PCI index. The first TCI state may be associated with the PCI of the cell, for example, based on the one or more configuration parameters not indicating, for first TCI state, an additional PCI index of the at least one additional PCI index. The first TCI state may be associated with the PCI of the cell, for example, based on an additional PCI index being absent (or not being present) in configuration parameter(s) of the first TCI state. The one or more configuration parameters may comprise the configuration parameter(s) of the first TCI state.

The wireless device may transmit the first uplink signal/transmission based on the first timing advance value associated with the first TAG, for example, in response to the first uplink signal/transmission being associated with the first TCI state that is associated with the PCI of the cell. The wireless device may transmit the first uplink signal/transmission based on the first timing advance value associated with the first TAG, for example, in response to the first TCI state of the first uplink signal/transmission being associated with the PCI of the cell.

In an example, the first TCI state may be associated with the first TAG of the at least two TAGs. The first TCI state may be associated with the first TAG of the at least two TAGs, for example, based on the first TCI state being associated with the PCI of the cell. The first TCI state may be associated with the first TAG of the at least two TAGs, for example, based on the PCI of the cell being associated with the first TAG. The first TCI state may be associated with the first TAG of the at least two TAGs, for example, based on the first TAG index of the first TAG of the at least two TAGs being lower/less than the second TAG index of the second TAG of the at least two TAGs. The first TCI state may be associated with the first TAG of the at least two TAGs, for example, based on the first TAG index of the first TAG being a first/starting/earliest TAG index in the list/set/vector of the at least two TAG indexes. The first TCI state may be associated with the first TAG of the at least two TAGs, for example, based on the first TAG index of the first TAG occurring first in the list/set/vector of the at least two TAG indexes.

The wireless device may transmit the first uplink signal/transmission based on the first timing advance value associated with the first TAG, for example, in response to the first uplink signal/transmission being associated with the first TCI state that is associated with the first TAG. The wireless device may transmit the first uplink signal/transmission based on the first timing advance value associated with the first TAG, for example, in response to the first uplink signal/transmission being associated with the first TCI state that is associated with the PCI of the cell. The wireless device may transmit the first uplink signal/transmission based on the first timing advance value associated with the first TAG, for example, in response to the first TCI state of the first uplink signal/transmission being associated with the PCI of the cell. The wireless device may transmit the first uplink signal/transmission associated with the first TCI state based on the first timing advance value associated with the first TAG, for example, in response to the first TAG index of the first TAG of the at least two TAGs being lower/less than the second TAG index of the second TAG of the at least two TAGs. The wireless device may transmit the first uplink signal/transmission associated with the first TCI state based on the first timing advance value associated with the first TAG, for example, in response to the first TAG index of the first TAG being a first/starting/earliest TAG index in the list/set/vector of the at least two TAG indexes. The wireless device may transmit the first uplink signal/transmission associated with the first TCI state based on the first timing advance value associated with the first TAG, for example, in response to the first TAG index of the first TAG occurring first in the list/set/vector of the at least two TAG indexes.

The wireless device may transmit, via the second uplink resource, the second uplink signal/transmission, for example, based on the second TCI state of the at least two TCI states. The wireless device may transmit the second uplink signal/transmission, for example, with/using a second spatial domain transmitting/transmission filter/beam determined based on the second TCI state. The wireless device may transmit the second uplink signal/transmission, for example, with/using a second transmission power determined based on the second TCI state.

The wireless device may receive a second DCI scheduling/triggering/indicating the second uplink signal/transmission. The second DCI (e.g., DCI 0-1, 0-2) may comprise, for example, a field (e.g., SRS resource set indicator field, coreset pool index, TRP index, Capability set index, Antenna panel index, Joint/Common TCI state index, and the like). The wireless device may transmit the second uplink signal/transmission based on the second TCI state, for example, in response to the field of/in the second DCI being equal to a second value (e.g., 1, 01, 10, 11, and the like) indicating the second TCI state. The second uplink signal/transmission may be associated with the second TCI state, for example, based on the field of/in the second DCI being equal to a second value (e.g., 1, 01, 10, 11, and the like) indicating the second TCI state.

In an example, the second uplink signal/transmission may be for a second configured uplink grant (e.g., Type 1 configured uplink grant).

For example, the one or more configuration parameters may indicate, for the second configured uplink grant, a field (e.g., SRS resource set indicator field, coreset pool index, TRP index, Capability set index, Antenna panel index, Joint/Common TCI state index, and the like). The wireless device may transmit the second uplink signal/transmission based on the second TCI state, for example, in response to the field in/of the second configured uplink grant being equal to a second value (e.g., 1, 01, 10, 11, and the like) indicating the second TCI state. The second uplink signal/transmission may be associated with the second TCI state, for example, based on the field of/in the second configured uplink grant being equal to a second value (e.g., 1, 01, 10, 11, and the like) indicating the second TCI state.

The one or more configuration parameters may indicate, for the second uplink resource, a field (e.g., SRS resource set indicator field, coreset pool index, TRP index, Capability set index, Antenna panel index, Joint/Common TCI state index, and the like). The wireless device may transmit, via the second uplink resource, the second uplink signal/transmission based on the second TCI state, for example, in response to the one or more configuration parameters indicating, for the second uplink resource, the field that is equal/set to a second value (e.g., 1, 01, 10, 11, and the like) indicating the second TCI state. The second uplink signal/transmission may be associated with the second TCI state, for example, based on the one or more configuration parameters indicating, for the second uplink resource that/via/on/in/which/where the wireless device transmits the second uplink signal/transmission, the field that is equal/set to a second value (e.g., 1, 01, 10, 11, and the like) indicating the second TCI state.

The wireless device may transmit the second uplink signal/transmission based on the second timing advance value associated with the second TAG, for example, in response to the second uplink signal/transmission being associated with the second TCI state. The wireless device may transmit the second uplink signal/transmission based on the second timing advance value associated with the second TAG, for example, in response to the field of/in the second DCI being equal/set to a second value (e.g., 1, 01, 10, 11). The wireless device may transmit the second uplink signal/transmission based on the second timing advance value associated with the second TAG, for example, in response to the one or more configuration parameters indicating, for the second configured uplink grant, the field that is equal/set to a second value (e.g., 1, 01, 10, 11). The wireless device may transmit the second uplink signal/transmission based on the second timing advance value associated with the second TAG, for example, in response to the one or more configuration parameters indicating, for the second uplink resource at/via/on/in/which/where the wireless device transmits the second uplink signal/transmission, the field that is equal/set to a second value (e.g., 1, 01, 10, 11).

In an example, the second TCI state may be associated with a second PCI of a second cell. The one or more configuration parameters may indicate, for the second TCI state, an additional PCI index of the at least one additional PCI index. The second TCI state may comprise/have the additional PCI index. The additional PCI index may indicate/identify a PCI set of the list of PCI sets. The PCI set may comprise/indicate/have the second PCI of the at least one PCI. The second PCI may indicate/identify the second cell of the at least one cell. The one or more configuration parameters may indicate, for the second cell, the second PCI. The second TCI state may be associated with the second PCI (or the second cell), for example, based on the one or more configuration parameters indicating, for the second TCI state, the additional PCI index indicating the second PCI (or the second cell). The second PCI of the second cell may be, for example, different from the PCI of the cell.

The wireless device may transmit the second uplink signal/transmission based on the second timing advance value associated with the second TAG, for example, in response to the second uplink signal/transmission being associated with the second TCI state that is associated with the second PCI that is different from the PCI of the cell. The wireless device may transmit the second uplink signal/transmission based on the second timing advance value associated with the second TAG, for example, in response to the second TCI state of the second uplink signal/transmission being associated with the second PCI that is different from the PCI of the cell.

In an example, the second TCI state may be associated with the second TAG of the at least two TAGs. The second TCI state may be associated with the second TAG of the at least two TAGs, for example, based on the second TCI state being associated with the second PCI that is different from the PCI of the cell. The second TCI state may be associated with the second TAG of the at least two TAGs, for example, based on the second PCI of the second cell being associated with the second TAG. The second TCI state may be associated with the second TAG of the at least two TAGs, for example, based on the second TAG index of the second TAG of the at least two TAGs being greater/higher than the first TAG index of the first TAG of the at least two TAGs. The second TCI state may be associated with the second TAG of the at least two TAGs, for example, based on the second TAG index of the second TAG being a last/latest/ending/second starting/second earliest/second TAG index in the list/set/vector of the at least two TAG indexes. The second TCI state may be associated with the second TAG of the at least two TAGs, for example, based on the second TAG index of the second TAG occurring second in the list/set/vector of the at least two TAG indexes.

The wireless device may transmit the second uplink signal/transmission based on the second timing advance value associated with the second TAG, for example, in response to the second uplink signal/transmission being associated with the second TCI state that is associated with the second TAG. The wireless device may transmit the second uplink signal/transmission based on the second timing advance value associated with the second TAG, for example, in response to the second uplink signal/transmission being associated with the second TCI state that is associated with the second PCI that is different from the PCI of the cell. The wireless device may transmit the second uplink signal/transmission based on the second timing advance value associated with the second TAG, for example, in response to the second TCI state of the second uplink signal/transmission being associated with the second PCI that is different from the PCI of the cell. The wireless device may transmit the second uplink signal/transmission associated with the second TCI state based on the second timing advance value associated with the second TAG, for example, in response to the second TAG index of the second TAG of the at least two TAGs being greater/higher than the first TAG index of the first TAG of the at least two TAGs. The wireless device may transmit the second uplink signal/transmission associated with the second TCI state based on the second timing advance value associated with the second TAG, for example, in response to the second TAG index of the second TAG being a last/latest/ending/second starting/second earliest/second TAG index in the list/set/vector of the at least two TAG indexes. The wireless device may transmit the second uplink signal/transmission associated with the second TCI state based on the second timing advance value associated with the second TAG, for example, in response to the second TAG index of the second TAG occurring second in the list/set/vector of the at least two TAG indexes.

In an example, the first DCI scheduling/triggering/indicating the first uplink signal/transmission and the second DCI scheduling/triggering/indicating the second uplink signal/transmission may be different.

In an example, the first DCI scheduling/triggering/indicating the first uplink signal/transmission and the second DCI scheduling/triggering/indicating the second uplink signal/transmission may be the same. The first DCI and the second DCI may be a single DCI. The single DCI may schedule/trigger/indicate the first uplink signal/transmission and the second uplink signal/transmission.

In an example, the first uplink signal/transmission and the second uplink signal/transmission may be different.

In an example, the first uplink signal/transmission and the second uplink signal/transmission may be repetitions of an uplink signal/transmission (e.g., PUSCH/PUCCH transmission, transport block, UCI, and the like).

In an example, the first uplink signal/transmission and the second uplink signal/transmission may be the same. The first uplink signal/transmission and the second uplink signal/transmission may be transmissions of an uplink signal/transmission (e.g., PUSCH/PUCCH transmission, transport block, UCI, and the like). The one or more configuration parameters may indicate, for uplink transmissions (e.g., PUSCH/PUCCH/SRS transmission), an SFN (e.g., sfn-pusch, sfn-pucch, and the like).

In an example, the first uplink signal/transmission may be transmission of a first portion (e.g., one or more first data layers/streams) of an uplink signal/transmission (e.g., PUSCH/PUCCH transmission, transport block, UCI, and the like). The second uplink signal/transmission may be transmission of a second portion (e.g., one or more second data layers/streams) of the uplink signal/transmission.

In an example, the PCI of the cell may be associated with the first TAG of the at least two TAGs. The PCI of the cell may be associated with the first TAG, for example, based on the receiving, via the first coreset monitored with the third TCI state that is associated with the PCI of the cell, the first DCI scheduling reception of the first timing advance command that is associated with the first TAG. The PCI of the cell may be associated with the first TAG, for example, based on the third TCI state, of the first coreset that the wireless device receives the first DCI scheduling reception of the first timing advance command that is associated with the first TAG, being associated with the PCI of the cell.

The wireless device may transmit the first uplink signal/transmission based on the first timing advance value associated with the first TAG, for example, in response to the first uplink signal/transmission being associated with the first TCI state. The wireless device may transmit the first uplink signal/transmission based on the first timing advance value associated with the first TAG, for example, in response to the receiving, via the first coreset associated with (or monitored based on) the third TCI state, the first DCI scheduling reception of the first timing advance command. The wireless device may transmit the first uplink signal/transmission based on the first timing advance value associated with the first TAG, for example, in response to the first uplink signal/transmission being associated with the first TCI state and in response to the receiving, via the first coreset associated with (or monitored based on) the third TCI state, the first DCI scheduling reception of the first timing advance command.

The wireless device may transmit the first uplink signal/transmission based on the first timing advance value associated with the first TAG, for example, in response to the first uplink signal/transmission being associated with the first TCI state that is associated with the PCI of the cell. The wireless device may transmit the first uplink signal/transmission based on the first timing advance value associated with the first TAG, for example, in response to the receiving, via the first coreset associated with (or monitored based on) the fourth TCI state that is associated with the PCI of the cell, the first DCI scheduling reception of the first timing advance command. The wireless device may transmit the first uplink signal/transmission based on the first timing advance value associated with the first TAG, for example, in response to the first TCI state of the first uplink signal/transmission being associated with the PCI of the cell and the third TCI state of the first coreset that the wireless device receives the first DCI scheduling reception of the first timing advance command being associated with the PCI of the cell. The wireless device may transmit the first uplink signal/transmission based on the first timing advance value associated with the first TAG, for example, in response to the first TCI state of the first uplink signal/transmission being associated with the PCI that is associated with the first TAG of the at least two TAGs.

In an example, the first TCI state of the first uplink signal/transmission and the third TCI state of the first coreset may be the same.

In an example, the first TCI state of the first uplink signal/transmission and the third TCI state of the first coreset may be different.

In an example, the second PCI of the second cell may be associated with the second TAG of the at least two TAGs. The second PCI of the second cell may be associated with the second TAG, for example, based on the receiving, via the second coreset monitored with the fourth TCI state that is associated with the second PCI of the second cell, the second DCI scheduling reception of the second timing advance command that is associated with the second TAG. The second PCI of the second cell may be associated with the second TAG, for example, based on the fourth TCI state, of the second coreset that the wireless device receives the second DCI scheduling reception of the second timing advance command that is associated with the second TAG, being associated with the second PCI of the second cell.

The wireless device may transmit the second uplink signal/transmission based on the second timing advance value associated with the second TAG, for example, in response to the second uplink signal/transmission being associated with the second TCI state. The wireless device may transmit the second uplink signal/transmission based on the second timing advance value associated with the second TAG, for example, in response to the receiving, via the second coreset associated with (or monitored based on) the fourth TCI state, the second DCI scheduling reception of the second timing advance command. The wireless device may transmit the second uplink signal/transmission based on the second timing advance value associated with the second TAG, for example, in response to the second uplink signal/transmission being associated with the second TCI state and in response to the receiving, via the second coreset associated with (or monitored based on) the fourth TCI state, the second DCI scheduling reception of the second timing advance command.

The wireless device may transmit the second uplink signal/transmission based on the second timing advance value associated with the second TAG, for example, in response to the second uplink signal/transmission being associated with the second TCI state that is associated with the second PCI that is different from the PCI of the cell. The wireless device may transmit the second uplink signal/transmission based on the second timing advance value associated with the second TAG, for example, in response to the receiving, via the second coreset associated with (or monitored based on) the fourth TCI state that is associated with the second PCI, the second DCI scheduling reception of the second timing advance command. The wireless device may transmit the second uplink signal/transmission based on the second timing advance value associated with the second TAG, for example, in response to the second TCI state of the second uplink signal/transmission being associated with the second PCI that is different from the PCI of the cell and the fourth TCI state of the second coreset that the wireless device receives the second DCI scheduling reception of the second timing advance command being associated with the second PCI. The wireless device may transmit the second uplink signal/transmission based on the second timing advance value associated with the second TAG, for example, in response to the second TCI state of the second uplink signal/transmission being associated with the second PCI that is associated with the second TAG of the at least two TAGs.

In an example, the second TCI state of the second uplink signal/transmission and the fourth TCI state of the second coreset may be the same.

In an example, the second TCI state of the second uplink signal/transmission and the fourth TCI state of the second coreset may be different.

In an example, the first coreset pool index (CoresetPoolIndex=0) may be associated with the first TAG of the at least two TAGs. The first coreset pool index may be associated with the first TAG, for example, based on the receiving, via the first coreset (associated) with the first coreset pool index, the first DCI scheduling reception of the first timing advance command that is associated with the first TAG. The first coreset pool index may be associated with the first TAG, for example, based on the first coreset, that the wireless device receives the first DCI scheduling reception of the first timing advance command that is associated with the first TAG, being associated with the first coreset pool index.

The wireless device may transmit the first uplink signal/transmission based on the first timing advance value associated with the first TAG, for example, in response to the first uplink signal/transmission being associated with the first coreset pool index. The wireless device may transmit the first uplink signal/transmission based on the first timing advance value associated with the first TAG, for example, in response to the receiving, via the first coreset associated with the first coreset pool index, the first DCI scheduling reception of the first timing advance command. The wireless device may transmit the first uplink signal/transmission based on the first timing advance value associated with the first TAG, for example, in response to the first uplink signal/transmission being associated with the first coreset pool index and the first coreset, that the wireless device receives the first DCI scheduling reception of the first timing advance command, being associated with the first coreset pool index. The wireless device may transmit the first uplink signal/transmission based on the first timing advance value associated with the first TAG, for example, in response to the first uplink signal/transmission being associated with the first coreset pool index that is associated with the first TAG of the at least two TAGs.

In an example, the second coreset pool index (CoresetPoolIndex=1) may be associated with the second TAG of the at least two TAGs. The second coreset pool index may be associated with the second TAG, for example, based on the receiving, via the second coreset (associated) with the second coreset pool index, the second DCI scheduling reception of the second timing advance command that is associated with the second TAG. The second coreset pool index may be associated with the second TAG, for example, based on the second coreset, that the wireless device receives the second DCI scheduling reception of the second timing advance command that is associated with the second TAG, being associated with the second coreset pool index.

The wireless device may transmit the second uplink signal/transmission based on the second timing advance value associated with the second TAG, for example, in response to the second uplink signal/transmission being associated with the second coreset pool index. The wireless device may transmit the second uplink signal/transmission based on the second timing advance value associated with the second TAG, for example, in response to the receiving, via the second coreset associated with the second coreset pool index, the second DCI scheduling reception of the second timing advance command. The wireless device may transmit the second uplink signal/transmission based on the second timing advance value associated with the second TAG, for example, in response to the second uplink signal/transmission being associated with the second coreset pool index and the second coreset, that the wireless device receives the second DCI scheduling reception of the second timing advance command, being associated with the second coreset pool index. The wireless device may transmit the second uplink signal/transmission based on the second timing advance value associated with the second TAG, for example, in response to the second uplink signal/transmission being associated with the second coreset pool index that is associated with the second TAG of the at least two TAGs.

An uplink signal/transmission may be associated with a coreset pool index, for example, based on transmitting the uplink signal/transmission via an uplink resource associated with the coreset pool index.

The one or more configuration parameters may comprise one or more TAG configuration parameters (e.g., TAG-Config).

The one or more TAG configuration parameters may indicate, for the plurality of TAGs, one or more indexes (e.g., one or more coreset pool indexes, one or more SRS resource set indicators, additional PCI index, and the like). The one or more TAG configuration parameters may indicate, for each TAG of the plurality of TAGs, a respective index of the one or more indexes. For example, the one or more TAG configuration parameters may indicate, for the first TAG, a first index (e.g., the first coreset pool index, the first SRS resource set, the PCI of the cell, zero, and the like) of the one or more indexes. The one or more TAG configuration parameters may indicate, for the second TAG, a second index (e.g., the second coreset pool index, the second SRS resource set, the second PCI that is different from the PCI of the cell, one, and the like) of the one or more indexes.

The first TAG may be associated with the first index (e.g., the first coreset pool index, the first SRS resource set, the PCI of the cell, zero, and the like), for example, based on the one or more TAG configuration parameters indicating, for the first TAG, the first index. The second TAG may be associated with the second index (e.g., the second coreset pool index, the second SRS resource set, the second PCI, one, and the like), for example, based on the one or more TAG configuration parameters indicating, for the second TAG, the second index.

The first TAG may be associated with the first coreset pool index, for example, based on the one or more TAG configuration parameters indicating, for the first TAG, the first index (e.g., 0). The first TAG may be associated with the first SRS resource set, for example, based on the one or more TAG configuration parameters indicating, for the first TAG, the first index (e.g., 0). The first TAG may be associated with the PCI of the cell, for example, based on the one or more TAG configuration parameters indicating, for the first TAG, the first index (e.g., 0).

The second TAG may be associated with the second coreset pool index, for example, based on the one or more TAG configuration parameters indicating, for the second TAG, the second index (e.g., 1). The second TAG may be associated with the second SRS resource set, for example, based on the one or more TAG configuration parameters indicating, for the second TAG, the second index (e.g., 1). The second TAG may be associated with the second PCI that is different from the PCI of the cell, for example, based on the one or more TAG configuration parameters indicating, for the second TAG, the second index (e.g., 1).

In an example, the one or more TAG configuration parameters may not indicate, for a TAG of the plurality of TAGs, an index of the one or more indexes. The TAG may be associated with the first index (e.g., the first coreset pool index, the first SRS resource set, the PCI of the cell, zero, and the like), for example, based on the one or more TAG configuration parameters not indicating, for the TAG, an index of the one or more indexes. The first index may be a default value.

The TAG may be associated with the first coreset pool index, for example, based on the one or more TAG configuration parameters not indicating, for the TAG, an index of the one or more indexes. The TAG may be associated with the first SRS resource set, for example, based on the one or more TAG configuration parameters not indicating, for the TAG, an index of the one or more indexes. The TAG may be associated with the PCI of the cell, for example, based on the one or more TAG configuration parameters not indicating, for the TAG, an index of the one or more indexes.

Figure 19:
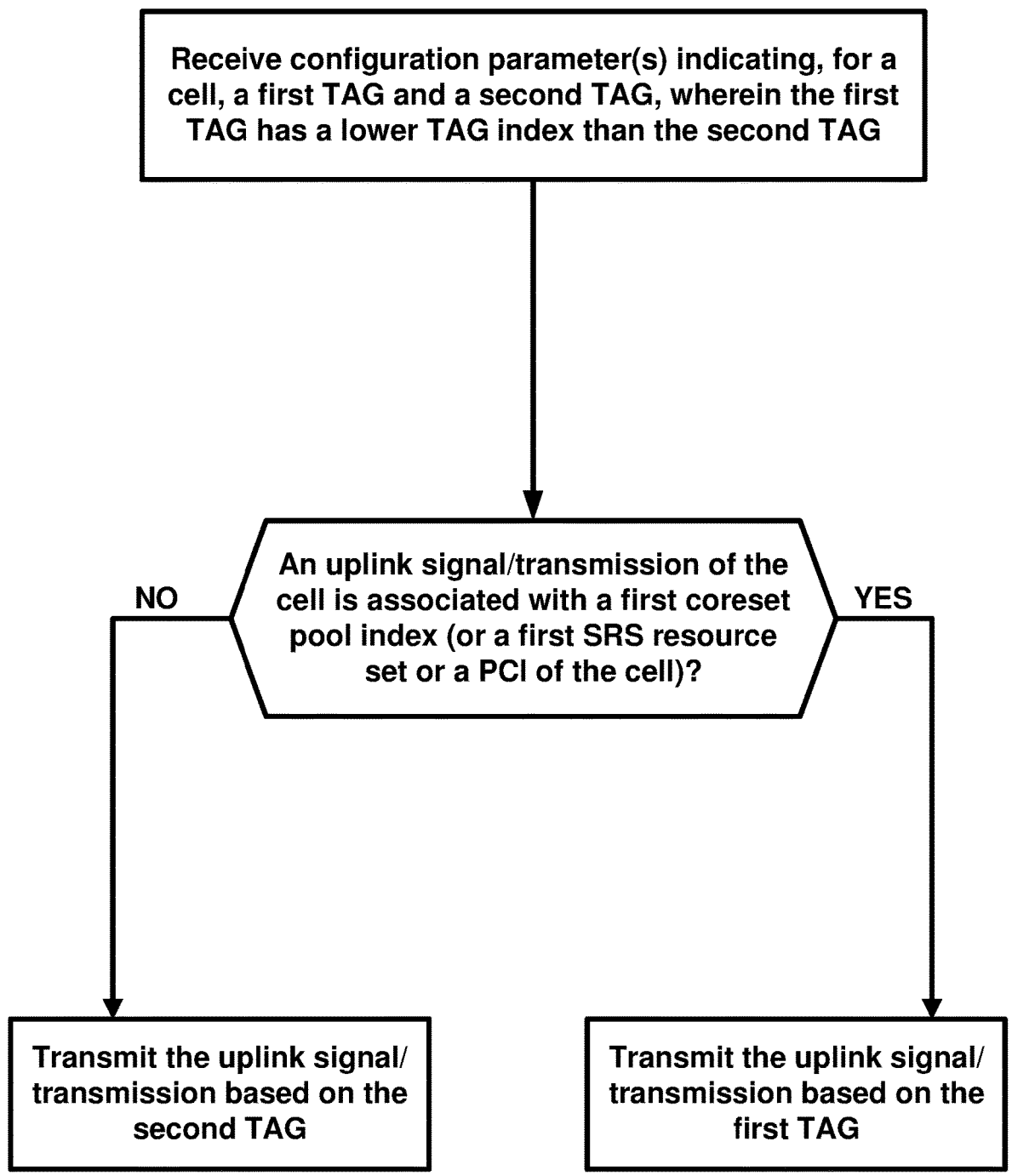
FIG. 19 illustrates an example flow chart of multiple timing advance groups as per an aspect of an embodiment of the present disclosure.

FIG. 19 illustrates an example flow chart of multiple timing advance groups as per an aspect of an embodiment of the present disclosure.

A wireless device may receive one or more messages comprising one or more configuration parameters. The configuration parameters may indicate at least two timing advance groups (TAGs) for a cell. A base station may transmit, to the wireless device, the one or more messages comprising the one or more configuration parameters.

The wireless device may transmit, via the cell, a first uplink signal/transmission based on a first timing advance value. The wireless device may transmit the first uplink signal/transmission is via an active uplink bandwidth part (BWP) of an uplink carrier of the cell. The first timing advance value may be associated with a first TAG of the at least two TAGs. The base station may receive, via the cell, the first uplink signal/transmission based on the first timing advance value.

The wireless device may transmit, via the cell, a second uplink signal/transmission based on a second timing advance value. The wireless device may transmit the second uplink signal/transmission is via the active uplink BWP of the uplink carrier of the cell. The second timing advance value may be associated with a second TAG of the at least two TAGs. The base station may receive, via the cell, the second uplink signal/transmission based on the second timing advance value.

The uplink carrier may be, for example, a supplementary uplink (SUL) carrier. The uplink carrier may be, for example, a normal uplink (NUL) carrier.

The one or more configuration parameters may indicate, for one or more cells comprising the cell, a plurality of TAGs comprising the at least two TAGs.

The one or more configuration parameters may indicate, for the cell, a list/set/vector of the at least two TAGs. The first TAG may occur first in the list of the at least two TAGs. The second TAG may occur second in the list of the at least two TAGs.

The one or more configuration parameters may indicate a first TAG index for the first TAG. The one or more configuration parameters may indicate a second TAG index for the second TAG. The first TAG index may be, for example, lower/less than the second TAG index.

The wireless device may transmit the first uplink signal/transmission based on the first TAG that occurs first in the list, for example, in response to the first uplink signal/transmission being associated with a first control resource set (coreset) pool index. The base station may receive the first uplink signal/transmission based on the first TAG that occurs first in the list, for example, in response to the first uplink signal/transmission being associated with the first coreset pool index.

The wireless device may transmit the second uplink signal/transmission based on the second TAG that occurs second in the list, for example, in response to the second uplink signal/transmission being associated with a second coreset pool index. The base station may receive the second uplink signal/transmission based on the second TAG that occurs second in the list, for example, in response to the second uplink signal/transmission being associated with the second coreset pool index.

The wireless device may transmit the first uplink signal/transmission based on the first TAG with the first TAG index that is lower than the second TAG index of the second TAG, for example, in response to the first uplink signal/transmission being associated with a first control resource set (coreset) pool index. The base station may receive the first uplink signal/transmission based on the first TAG with the first TAG index that is lower than the second TAG index of the second TAG, for example, in response to the first uplink signal/transmission being associated with the first coreset pool index.

The wireless device may transmit the second uplink signal/transmission based on the second TAG with the second TAG index that is higher than the first TAG index of the first TAG, for example, in response to the second uplink signal/transmission being associated with a second coreset pool index. The base station may receive the second uplink signal/transmission based on the second TAG with the second TAG index that is higher than the first TAG index of the first TAG, for example, in response to the second uplink signal/transmission being associated with the second coreset pool index.

For example, the one or more configuration parameters may indicate the first coreset pool index for the first uplink resource. The one or more configuration parameters may indicate the second coreset pool index for the second uplink resource.

For example, the one or more configuration parameters may indicate the first coreset pool index for a first uplink resource group/set comprising the first uplink resource. The one or more configuration parameters may indicate the second coreset pool index for a second uplink resource group/set comprising the second uplink resource.

The first uplink signal/transmission may be associated with the first coreset pool index, for example, based on receiving, via a first coreset associated with the first coreset pool index, a first downlink control information (DCI) scheduling the first uplink signal/transmission. The base station may transmit the first DCI scheduling the first uplink signal/transmission. The second uplink signal/transmission may be associated with the second coreset pool index, for example, based on receiving, via a second coreset associated with the second coreset pool index, a second DCI scheduling the second uplink signal/transmission. The base station may transmit the second DCI scheduling the second uplink signal/transmission. The one or more configuration parameters may indicate the first coreset pool index for the first coreset. The one or more configuration parameters may indicate the second coreset pool index for the second coreset.

The wireless device may transmit the first uplink signal/transmission based on the first TAG that occurs first in the list, for example, in response to the first uplink signal/transmission being associated with a first sounding reference signal (SRS) resource set. The base station may receive the first uplink signal/transmission based on the first TAG that occurs first in the list, for example, in response to the first uplink signal/transmission being associated with the first SRS resource set.

The wireless device may transmit the second uplink signal/transmission based on the second TAG that occurs second in the list, for example, in response to the second uplink signal/transmission being associated with a second SRS resource set. The base station may receive the second uplink signal/transmission based on the second TAG that occurs second in the list, for example, in response to the second uplink signal/transmission being associated with the second SRS resource set.

The wireless device may transmit the first uplink signal/transmission based on the first TAG with the first TAG index that is lower than the second TAG index of the second TAG, for example, in response to the first uplink signal/transmission being associated with a first sounding reference signal (SRS) resource set. The base station may receive the first uplink signal/transmission based on the first TAG with the first TAG index that is lower than the second TAG index of the second TAG, for example, in response to the first uplink signal/transmission being associated with the first SRS resource set.

The wireless device may transmit the second uplink signal/transmission based on the second TAG with the second TAG index that is higher than the first TAG index of the first TAG, for example, in response to the second uplink signal/transmission being associated with a second SRS resource set. The base station may receive the second uplink signal/transmission based on the second TAG with the second TAG index that is higher than the first TAG index of the first TAG, for example, in response to the second uplink signal/transmission being associated with the second SRS resource set.

The one or more configuration parameters may indicate at least two sounding reference signal (SRS) resource sets with codebook or non-codebook. The at least two SRS resource sets may comprise the first SRS resource set and the second SRS resource set.

For example, the wireless device may receive a DCI scheduling the first uplink signal/transmission and the second uplink signal/transmission. The DCI may comprise an SRS resource set indicator field with a value. The value of the SRS resource set indicator field may indicate the first SRS resource set for the first uplink signal/transmission and the second SRS resource set for the second uplink signal/transmission. The base station may transmit the DCI scheduling the first uplink signal/transmission and the second uplink signal/transmission.

The first uplink signal/transmission and the second uplink signal/transmission may be for a configured uplink grant (e.g., Type 1 configured uplink grant, Type 2 configured uplink grant). The one or more configuration parameters may indicate the first SRS resource set for the first uplink signal/transmission. The one or more configuration parameters may indicate the second SRS resource set for the second uplink signal/transmission.

The wireless device may transmit the first uplink signal/transmission based on the first TAG that occurs first in the list, for example, in response to the first uplink signal/transmission being associated with a first transmission configuration indicator (TCI) state. The first TCI state may be associated with (or mapped to or may indicate) a physical cell index (PCI) of the cell. The base station may receive the first uplink signal/transmission based on the first TAG that occurs first in the list, for example, in response to the first uplink signal/transmission being associated with the first TCI state.

The wireless device may transmit the second uplink signal/transmission based on the second TAG that occurs second in the list, for example, in response to the second uplink signal/transmission being associated with a second TCI state. The second TCI state may be associated with (or mapped to or may indicate) a second PCI that is different from the PCI of the cell. The second PCI may indicate/identify a second cell (e.g., non-serving cell, a neighbor cell, a candidate/assisting cell, and the like). The base station may receive the second uplink signal/transmission based on the second TAG that occurs second in the list, for example, in response to the second uplink signal/transmission being associated with the second TCI state.

The wireless device may transmit the first uplink signal/transmission based on the first TAG with the first TAG index that is lower than the second TAG index of the second TAG, for example, in response to the first uplink signal/transmission being associated with a first TCI state. The first TCI state may be associated with (or mapped to or may indicate) a physical cell index (PCI) of the cell. The base station may receive the first uplink signal/transmission based on the first TAG with the first TAG index that is lower than the second TAG index of the second TAG, for example, in response to the first uplink signal/transmission being associated with the first TCI state.

The wireless device may transmit the second uplink signal/transmission based on the second TAG with the second TAG index that is higher than the first TAG index of the first TAG, for example, in response to the second uplink signal/transmission being associated with a second TCI state. The second TCI state may be associated with (or mapped to or may indicate) a second PCI that is different from the PCI of the cell. The second PCI may indicate/identify a second cell (e.g., non-serving cell, a neighbor cell, a candidate/assisting cell, and the like). The base station may receive the second uplink signal/transmission based on the second TAG with the second TAG index that is higher than the first TAG index of the first TAG, for example, in response to the second uplink signal/transmission being associated with the second TCI state.

The wireless device may transmit the first uplink signal/transmission based on the first TCI state. The base station may receive the first uplink signal/transmission based on the first TCI state. The wireless device may transmit the second uplink signal/transmission based on the second TCI state. The base station may receive the second uplink signal/transmission based on the second TCI state The wireless device may transmit the first uplink signal/transmission with/using a first transmission parameter determined based on a first reference signal indicated by the first TCI state. The first transmission parameter may be, for example, a first spatial domain transmission filter. The first transmission parameter may be, for example, a first transmission power. The base station may receive the first uplink signal/transmission with/using a first reception parameter determined based on the first transmission parameter used/determined by/at the wireless device. For example, the first reception parameter may be a first spatial domain reception/receiving filter. The base station may determine the first spatial domain reception/receiving filter based on the first reference signal indicated by the first TCI state. The base station may receive the first uplink signal/transmission with/using the first spatial domain reception/receiving filter.

The wireless device may transmit the second uplink signal/transmission with/using a second transmission parameter determined based on a second reference signal indicated by the second TCI state. The second transmission parameter may be, for example, a second spatial domain transmission filter. The second transmission parameter may be, for example, a second transmission power. The base station may receive the second uplink signal/transmission with/using a second reception parameter determined based on the second transmission parameter used/determined by/at the wireless device. For example, the second reception parameter may be a second spatial domain reception/receiving filter. The base station may determine the second spatial domain reception/receiving filter based on the second reference signal indicated by the second TCI state. The base station may receive the second uplink signal/transmission with/using the second spatial domain reception/receiving filter.

The wireless device may receive a first control command comprising/indicating a first timing advance command for the first TAG. The base station may transmit the first control command.

The wireless device may receive a second control command comprising/indicating a second timing advance command for the second TAG. The base station may transmit the second control command.

The first control command and the second control command may be, for example, the same. The first control command and the second control command may be, for example, a single control command.

The first control command and the second control command may be, for example, different. For example, the wireless device may receive/decode the first command and the second control command at different times. For example, the wireless device may receive/decode the first command and the second control command at the same time.

The wireless device may determine/calculate/compute the first timing advance value based on the first timing advance command in the first control command. The wireless device may determine/calculate/compute the second timing advance value based on the second timing advance command in the second control command.

The first control command may comprise a first TAG index indicating/identifying the first TAG. The second control command may comprise a second TAG index indicating/identifying the second TAG.

The first timing advance value may be associated with the first TAG in response to the first control command comprising the first TAG index that indicates/identifies the first TAG. The second timing advance value may be associated with the second TAG in response to the second control command comprising the second TAG index that indicates/identifies the second TAG.

The wireless device may receive, via a first coreset, a first DCI scheduling transmission of the first control command. The base station may transmit, via the first coreset, the first DCI scheduling transmission of the first control command.

The one or more configuration parameters may indicate a first coreset pool index for the first coreset. The first timing advance value may be associated with the first TAG in response to receiving, via the first coreset with the first coreset pool index, the first DCI scheduling transmission of the first control command.

The wireless device may monitor downlink control channels in the first coreset based on a first TCI state. The wireless device may receive, via the first coreset, the first DCI based on the first TCI state. The first TCI state may be associated with a physical cell index (PCI) of the cell. The base station may transmit, via the first coreset, the first DCI based on the first TCI state. The base station may transmit, via the first coreset, the first DCI with/using a first spatial domain transmission filter/beam that is determined based on a first reference signal indicated by the first TCI state. The first timing advance value may be associated with the first TAG in response to receiving, via the first coreset monitored/activated with the first TCI state that is associated with the PCI of the cell, the first DCI scheduling transmission of the first control command.

The wireless device may receive, via a second coreset, a second DCI scheduling transmission of the second control command. The base station may transmit, via the second coreset, the second DCI scheduling transmission of the second control command.

The one or more configuration parameters may indicate a second coreset pool index for the second coreset. The second timing advance value may be associated with the second TAG in response to receiving, via the second coreset with the second coreset pool index, the second DCI scheduling transmission of the second control command.

The wireless device may monitor downlink control channels in the second coreset based on a second TCI state. The wireless device may receive, via the second coreset, the second DCI based on the second TCI state. The second TCI state may be associated with a second PCI that is different from the PCI of the cell. The second PCI may indicate/identify a second cell (e.g., non-serving cell, neighbor cell, and the like) that is different from the cell. The base station may transmit, via the second coreset, the second DCI based on the second TCI state. The base station may transmit, via the second coreset, the second DCI with/using a second spatial domain transmission filter/beam that is determined based on a second reference signal indicated by the second TCI state. The second timing advance value may be associated with the second TAG in response to receiving, via the second coreset monitored/activated with the second TCI state associated with the second PCI that is different from the PCI of the cell, the second DCI scheduling transmission of the second control command.

The wireless device may transmit a user-equipment (UE) capability message (or UE capability information).

For example, the UE capability message may indicate support of more than one TAG (or at least two TAGs or a plurality of TAGs) for a single cell. The one or more configuration parameters may indicate the at least two TAGs for the cell, for example, based on the UE capability message indicating support of more than one TAG (or at least two TAGs or a plurality of TAGs) for a single cell.

For example, the UE capability message may indicate support of more than one TAG (or a plurality of TAGs) for the cell. The one or more configuration parameters may indicate the at least two TAGs for the cell, for example, based on the UE capability message indicating support of more than one TAG (or a plurality of TAGs) for the cell For example, the UE capability message may indicate a maximum number of cells that the wireless device supports more than one TAG (or at least two TAGs or a plurality of TAGs). The one or more configuration parameters may indicate the at least two TAGs for the cell, for example, based on the UE capability message indicating the maximum number of cells that the wireless device supports more than one TAG. The one or more configuration parameters may indicate more than one TAG for one or more cells. The one or more cells may comprise the cell. A number of the one or more cells may be equal to or less than the maximum number of cells. The one or more configuration parameters may indicate more than one TAG for the number of the one or more cells that is equal to or less than the maximum number of cells, for example, based on the UE capability message indicating the maximum number of cells that the wireless device supports more than one TAG.

For example, the UE capability message may indicate a maximum number of TAGs that the wireless device supports for a single cell. The one or more configuration parameters may indicate the at least two TAGs for the cell, for example, based on the UE capability message indicating the maximum number of TAGs that the wireless device supports for a single cell.

For example, the UE capability message may indicate a maximum number of TAGs that the wireless device supports for the cell. The one or more configuration parameters may indicate the at least two TAGs for the cell, for example, based on the UE capability message indicating the maximum number of TAGs that the wireless device supports for the cell.

A number of the at least two TAGs of the cell may be, for example, equal to or less than the maximum number of TAGs. The one or more configuration parameters may indicate, for the cell, the number of the at least two TAGs that is equal to or less than the maximum number of TAGs, for example, based on the UE capability message indicating the maximum number of TAGs.

A wireless device may receive one or more messages comprising one or more configuration parameters. The configuration parameters may indicate at least two timing advance groups (TAGs) for a cell. The at least two TAGs may comprise a first TAG and a second TAG. A base station may transmit, to the wireless device, the one or more messages comprising the one or more configuration parameters.

The one or more configuration parameters may indicate a first TAG index for the first TAG. The one or more configuration parameters may indicate a second TAG index for the second TAG. The first TAG index may be, for example, lower/less than the second TAG index.

The wireless device may transmit, via the cell, an uplink signal/transmission. The wireless device may transmit the uplink signal/transmission is via an active uplink bandwidth part (BWP) of an uplink carrier of the cell. The uplink carrier may be, for example, a supplementary uplink (SUL) carrier. The uplink carrier may be, for example, a normal uplink (NUL) carrier.

The wireless device may determine, for example, whether the uplink signal/transmission is associated with a first coreset pool index (CoresetPoolIndex=0) or a second coreset pool index (CoresetPoolIndex=1).

The wireless device may determine, for example, whether the uplink signal/transmission is associated with a first SRS resource set or a second SRS resource set. For example, the one or more configuration parameters may indicate, for the first SRS resource set and the second SRS resource set, a usage parameter set to 'codebook.' For example, the one or more configuration parameters may indicate, for the first SRS resource set and the second SRS resource set, a usage parameter set to 'non-codebook.'

The wireless device may determine, for example, whether the uplink signal/transmission is associated with a first TCI state or a second TCI state. The first TCI state may be associated with (or mapped to or indicate) a PCI of the cell. The second TCI state may be associated with (or mapped to or indicate) a second PCI that is different from the PCI of the cell.

In an example, the wireless device may transmit the uplink signal/transmission based on a first timing advance value associated with the first TAG.

The wireless device may transmit the uplink signal/transmission based on the first timing advance value associated with the first TAG, for example, in response to the uplink signal/transmission being associated with the first coreset pool index (CoresetPoolIndex=0).

The wireless device may transmit the uplink signal/transmission based on the first timing advance value associated with the first TAG, for example, in response to the uplink signal/transmission being associated with the first SRS resource set. The wireless device may transmit the uplink signal/transmission based on the first timing advance value associated with the first TAG, for example, in response to transmitting the uplink signal/transmission based on the first SRS resource set.

The wireless device may transmit the uplink signal/transmission based on the first timing advance value associated with the first TAG, for example, in response to the uplink signal/transmission being associated with the first TCI state that is associated with the PCI of the cell. The wireless device may transmit the uplink signal/transmission based on the first timing advance value associated with the first TAG, for example, in response to transmitting the uplink signal/transmission based on the first TCI state that is associated with the PCI of the cell.

In an example, the wireless device may transmit the uplink signal/transmission based on a second timing advance value associated with the second TAG.

The wireless device may transmit the uplink signal/transmission based on the second timing advance value associated with the second TAG, for example, in response to the uplink signal/transmission being associated with the second coreset pool index (CoresetPoolIndex=1).

The wireless device may transmit the uplink signal/transmission based on the second timing advance value associated with the second TAG, for example, in response to the uplink signal/transmission being associated with the second SRS resource set. The wireless device may transmit the uplink signal/transmission based on the second timing advance value associated with the second TAG, for example, in response to transmitting the uplink signal/transmission based on the second SRS resource set.

The wireless device may transmit the uplink signal/transmission based on the second timing advance value associated with the second TAG, for example, in response to the uplink signal/transmission being associated with the second TCI state that is associated with the second PCI that is different from the PCI of the cell. The wireless device may transmit the uplink signal/transmission based on the second timing advance value associated with the second TAG, for example, in response to transmitting the uplink signal/transmission based on the second TCI state that is associated with the second PCI that is different from the PCI of the cell.

Figure 20:
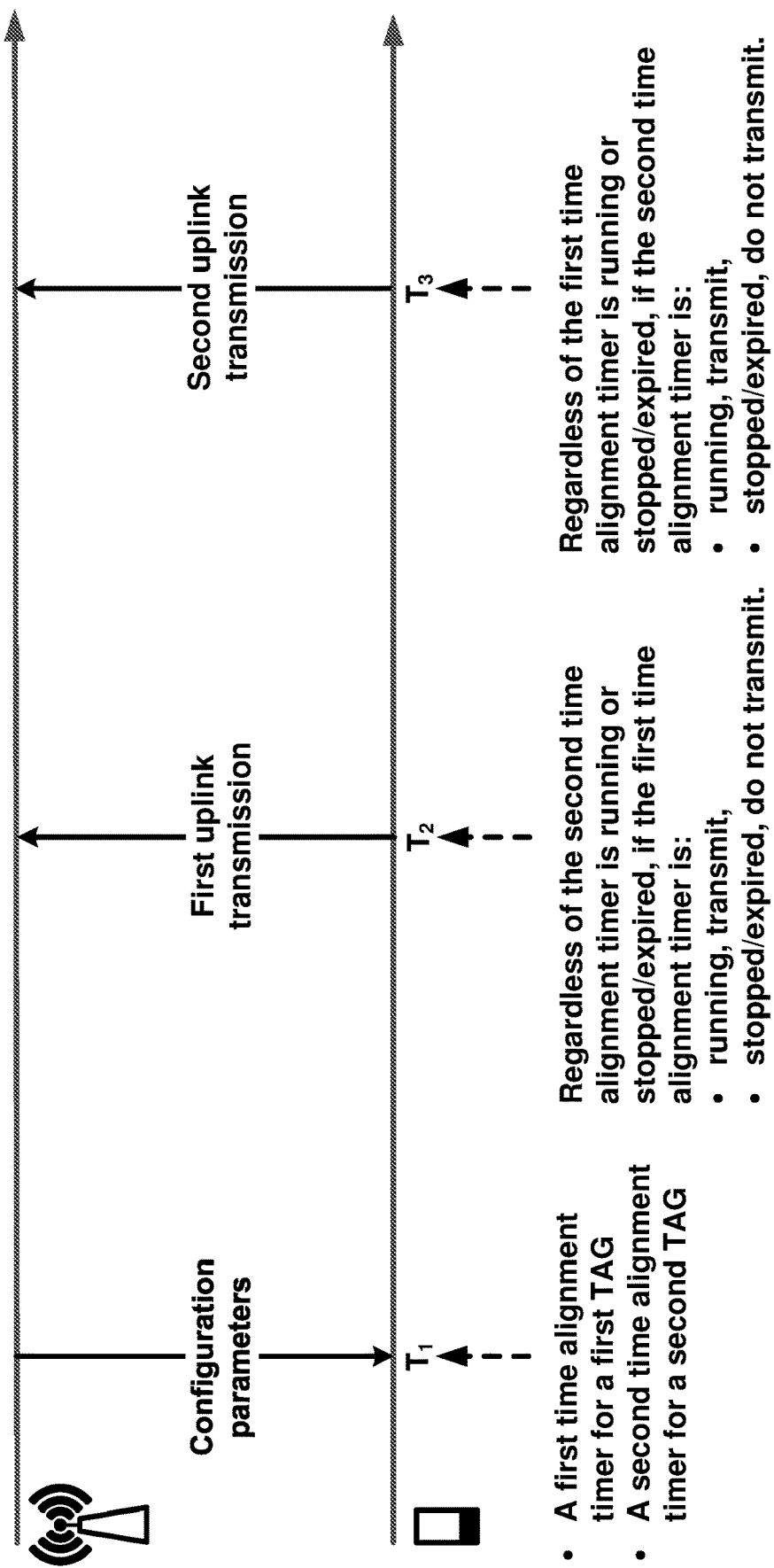
FIG. 20 illustrates an example of management of multiple time alignment timers as per an aspect of an embodiment of the present disclosure.

FIG. 20 illustrates an example of management of multiple time alignment timers as per an aspect of an embodiment of the present disclosure.

The one or more configuration parameters may indicate, for the at least two TAGs, at least two time alignment timers (e.g., TimeAlignmentTimer). The one or more configuration parameters may indicate, for each TAG of the at least two TAGs, a respective time alignment timer of the at least two time alignment timers. The one or more configuration parameters may indicate, for the first TAG of the at least two TAGs, a first time alignment timer of the at least two time alignment timers. The one or more configuration parameters may indicate, for the second TAG of the at least two TAGs, a second time alignment timer of the at least two time alignment timers.

The wireless device may be configured to transmit a first uplink signal/transmission (e.g., PUSCH/PUCCH/SRS transmission, transport block, UCI, and the like). The one or more configuration parameters may indicate/schedule/activate the first uplink signal/transmission. The one or more configuration parameters may indicate a first uplink resource for the first uplink signal/transmission. The one or more configuration parameters may indicate, for transmission of the first uplink signal/transmission, a first time slot (e.g., time T2 in FIG. 20). The one or more configuration parameters may indicate, for transmission of the first uplink signal/transmission, a first uplink transmission occasion (e.g., a first PUSCH/PUCCH/SRS transmission occasion). The first uplink signal/transmission may, for example, be/comprise a PUSCH transmission for a configured uplink grant (e.g., Type 1 configured uplink grant). The first uplink signal/transmission may, for example, be/comprise a PUCCH transmission (e.g., periodic CSI report, SR transmission, and the like). The first uplink signal/transmission may, for example, be/comprise an SRS transmission (e.g., periodic SRS).

For example, the wireless device may receive a first DCI. The first DCI may schedule/indicate/trigger transmission of a first uplink signal/transmission (e.g., PUSCH/PUCCH/SRS transmission, transport block, UCI, HARQ-ACK information bit/feedback, and the like). The first uplink signal/transmission may be/comprise, for example, a first HARQ-ACK information bit/feedback. The first uplink signal/transmission may be/comprise, for example, a PUSCH transmission. The first uplink signal/transmission may be/comprise, for example, an SRS transmission (e.g., aperiodic SRS transmission). The first DCI may indicate a first uplink resource for the first uplink signal/transmission. The first DCI may comprise a field (e.g., PUCCH resource indicator field, TDRA field, FDRA field, and the like) indicating the first uplink resource. The first DCI may comprise a field (e.g., PDSCH-to-HARQ_feedback timing indicator) indicating a first time slot (e.g., time T2 in FIG. 20) for transmission of the first uplink signal/transmission. The first DCI may indicate, for transmission of the first uplink signal/transmission, a first uplink transmission occasion (e.g., a first PUSCH/PUCCH/SRS transmission occasion). For example, the field (e.g., PDSCH-to-HARQ_feedback timing indicator) may indicate the first uplink transmission occasion. For example, the field (e.g., PUCCH resource indicator field) may indicate the first uplink transmission occasion.

In an example, the plurality of uplink resources may comprise the first uplink resource.

The first uplink signal/transmission may not be/comprise, for example, a PRACH transmission. The first uplink signal/transmission may not be/comprise, for example a random-access preamble transmission. The first uplink signal/transmission may not be/comprise, for example a MSGA transmission of a two-step random access procedure.

The first DCI may, for example, schedule reception of a PDSCH transmission. The first HARQ-ACK information feedback/bit may be for the PDSCH transmission. The first HARQ-ACK information feedback/bit may be for a successful or unsuccessful reception/decoding of the PDSCH transmission The PDSCH transmission may be for a second cell. The PDSCH transmission may comprise a transport block. The transport block in the PDSCH transmission may be one or more transport blocks (e.g., if multiplexing supported, the PDSCH transmission may comprise two transport blocks).

The first DCI may, for example, indicate an SCell dormancy for/of a second cell. The first DCI may comprise one or more fields (e.g., RV, TDRA, FDRA, HARQ process, etc) that are set/equal to predefined values (e.g., 0, 1) indicating the SCell dormancy. The first HARQ-ACK information feedback/bit may be for the SCell dormancy (or for confirmation of the first DCI that indicates the SCell dormancy). The first HARQ-ACK information feedback/bit may be for a successful or unsuccessful reception/decoding of the first DCI that indicates the SCell dormancy.

The first DCI may, for example, indicate an SPS PDSCH release/deactivation for/of a second cell. The first DCI may comprise one or more fields (e.g., RV, TDRA, FDRA, HARQ process, etc) that are set/equal to predefined values (e.g., 0, 1) indicating the SPS PDSCH release/deactivation. The first HARQ-ACK information feedback/bit may be for the SPS PDSCH release (or for confirmation of the first DCI that indicates the SPS PDSCH release). The first HARQ-ACK information feedback/bit may be for a successful or unsuccessful reception/decoding of the first DCI that indicates the SPS PDSCH release.

The first DCI may, for example, indicate a TCI state update for/of a second cell. The first DCI may comprise one or more fields (e.g., RV, TDRA, FDRA, HARQ process, etc) that are set/equal to predefined values (e.g., 0, 1) indicating the TCI state update. The first HARQ-ACK information feedback/bit may be for the TCI state update (or for confirmation of the first DCI that indicates the TCI state update). The first HARQ-ACK information feedback/bit may be for a successful or unsuccessful reception/decoding of the first DCI that indicates the TCI state update.

In an example, the second cell may be different from the cell. A cell index identifying the cell and a second cell index identifying/indicating the second cell may be different. In an example, the second cell may be the same as the cell. A cell index identifying/indicating the cell and a second cell index identifying/indicating the second cell may be the same. The one or more cells may comprise the second cell. The one or more configuration parameters may indicate, for the cell, the cell index. The one or more configuration parameters may indicate, for the second cell, the second cell index.

A cyclic redundancy check (CRC) of the first DCI may be scrambled with an RNTI. The RNTI may be, for example, C-RNTI. The RNTI may be, for example, CS-RNTI. The RNTI may be, for example, Temporary C-RNTI.

The first DCI may comprise a HARQ process identifier field. The HARQ process identifier field (or a value of the HARQ process identifier field) may indicate/identify a HARQ process. The HARQ process identifier field (or the value of the HARQ process identifier field) may indicate/identify the HARQ process, for example, for the PDSCH transmission (or the transport block) scheduled by the first DCI.

The PDSCH transmission (or transmission of the transport block) may be, for example, a new transmission of the transport block. The PDSCH transmission (or transmission of the transport block) may be, for example, a retransmission of the transport block.

The first DCI may comprise a new data indicator (NDI) field with a value. The value of the NDI field may be, for example, equal to zero.

The wireless device may decode (or attempt to decode) the transport block. The wireless device may decode (or attempt to decode) data comprising/carrying/including/containing the transport block. The wireless device may buffer the data, for example, before (or prior to) decoding (or attempting to decode) the data.

The decoding of the transport block may be, for example, successful. The decoding of the transport block may be, for example, unsuccessful.

The first uplink signal/transmission may be, for example, associated with the first TAG of the at least two TAGs.

The first uplink signal/transmission may be, for example, associated with the first coreset pool index (CoresetPoolIndex=0). The first uplink signal/transmission may be associated with the first TAG of the at least two TAGs, for example, based on the first uplink signal/transmission being associated with the first coreset pool index.

The first uplink signal/transmission may be, for example, associated with the first SRS resource set of the at least two SRS resource sets. The first uplink signal/transmission may be associated with the first TAG of the at least two TAGs, for example, based on the first uplink signal/transmission being associated with the first SRS resource set.

The first uplink signal/transmission may be, for example, associated with the first TCI state, of the at least two TCI states, that is associated with the PCI of the cell. The first uplink signal/transmission may be associated with the first TAG of the at least two TAGs, for example, based on the first uplink signal/transmission being associated with the first TCI state that is associated with the PCI of the cell.

The wireless device may transmit/perform the first uplink signal/transmission (e.g., at time T2 in FIG. 20). The wireless device may transmit/perform, via the first uplink resource, the first uplink signal/transmission. The wireless device may transmit/perform, in the first time slot, the first uplink signal/transmission. The wireless device may transmit/perform, in the first uplink transmission occasion, the first uplink signal/transmission. The wireless device may transmit/perform the first uplink signal/transmission, for example, based on the first time alignment timer of the first TAG running (or being running). The wireless device may transmit/perform the first uplink signal/transmission associated with the first TAG, for example, based on the first time alignment timer of the first TAG running (or being running). The wireless device may transmit/perform the first uplink signal/transmission associated with the first coreset pool index, for example, based on the first time alignment timer of the first TAG running (or being running). The wireless device may transmit/perform the first uplink signal/transmission associated with the first SRS resource set, for example, based on the first time alignment timer of the first TAG running (or being running). The wireless device may transmit/perform the first uplink signal/transmission associated with the first TCI state that is associated with the PCI of the cell, for example, based on the first time alignment timer of the first TAG running (or being running). The wireless device may transmit/perform the first uplink signal/transmission, for example, regardless of the second time alignment timer of the second TAG is running or being stopped/expired (or not running). The second time alignment timer may, for example, be stopped/expired (or not running). The second time alignment timer may, for example, be stopped/expired (or not running) when the wireless device transmits/performs the first uplink signal/transmission (e.g., at time T2 in FIG. 20). The transmission of the first uplink signal/transmission may be, for example, independent from/of the second time alignment timer of the second TAG.

The transmitting/performing the first uplink signal/transmission may comprise keep transmitting the first uplink signal/transmission. The first uplink signal/transmission may comprise/be one or more first uplink signal/transmissions. The wireless device may keep transmitting the one or more first uplink signal/transmissions. The wireless device may keep transmitting the one or more first uplink signal/transmissions, for example, based on the first time alignment timer of the first TAG running (or being running). The wireless device may keep transmitting the one or more first uplink signal/transmissions, for example, regardless of the second time alignment timer of the second TAG is running or being stopped/expired (or not running).

The wireless device may transmit the first uplink signal/transmission based on the first timing advance value associated with the first TAG. The wireless device may transmit the first uplink signal/transmission in/at a first time (e.g., symbol, absolute time, time slot, etc.) determined based on the first timing advance value associated with the first TAG. The wireless device may adjust uplink transmission timing of the first uplink signal/transmission, for example, based on the first timing advance value associated with the first TAG. The wireless device may adjust uplink timing of the first uplink signal/transmission, for example, based on the first timing advance value associated with the first TAG.

A medium access control (MAC) layer of the wireless device may instruct a physical (PHY) layer of the wireless device to generate an acknowledgement.

The MAC layer may instruct the PHY layer to generate the acknowledgment, for example, for the transport block (or for/of the data comprising the transport block). The MAC layer may instruct the PHY layer to generate the acknowledgment, for example, for the PDSCH transmission. The MAC layer may instruct the PHY layer to generate the acknowledgment, for example, for the SCell dormancy. The MAC layer may instruct the PHY layer to generate the acknowledgment, for example, for the SPS PDSCH release/deactivation. The MAC layer may instruct the PHY layer to generate the acknowledgment, for example, for the TCI state update.

In an example, the acknowledgement may be a positive acknowledgement. The first HARQ-ACK information feedback/bit may be/comprise the acknowledgement. The first HARQ-ACK information feedback/bit may, for example, be/comprise the positive acknowledgement.

In an example, the acknowledgement may be a negative acknowledgement. The first HARQ-ACK information feedback/bit may, for example, be/comprise the negative acknowledgement.

The wireless device may, for example, transmit the first uplink signal/transmission comprising the acknowledgment.

A medium access control (MAC) layer of the wireless device may instruct a physical (PHY) layer of the wireless device to generate the first HARQ-ACK information feedback/bit.

The MAC layer may instruct the PHY layer to generate the first HARQ-ACK information feedback/bit, for example, for the transport block (or for/of the data comprising the transport block). The MAC layer may instruct the PHY layer to generate the first HARQ-ACK information feedback/bit, for example, for the PDSCH transmission. The MAC layer may instruct the PHY layer to generate the first HARQ-ACK information feedback/bit, for example, for the SCell dormancy. The MAC layer may instruct the PHY layer to generate the first HARQ-ACK information feedback/bit, for example, for the SPS PDSCH release/deactivation. The MAC layer may instruct the PHY layer to generate the first HARQ-ACK information feedback/bit, for example, for the TCI state update.

In an example, the first HARQ-ACK information feedback/bit may be a positive acknowledgement.

The MAC layer of the wireless device may instruct the PHY layer of the wireless device to generate the positive acknowledgement, for example, based on the first time alignment timer of the first TAG running (or being running). The MAC layer of the wireless device may instruct the PHY layer of the wireless device to generate the positive acknowledgement, for example, regardless of the second time alignment timer of the second TAG is running or being stopped/expired (or not running). The second time alignment timer may, for example, be stopped/expired (or not running). The second time alignment timer may, for example, be stopped/expired (or not running) when the MAC layer of the wireless device instructs the PHY layer of the wireless device to generate the positive acknowledgement. The instruction of the MAC layer to generate the positive acknowledgement may be, for example, independent from/of the second time alignment timer of the second TAG.

The wireless device may, for example, transmit the first HARQ-ACK information feedback/bit.

A medium access control (MAC) layer of the wireless device may indicate, to a physical (PHY) layer of the wireless device, a positive acknowledgement.

The MAC layer may indicate, to the PHY layer, the positive acknowledgment, for example, for the transport block (or for/of the data comprising the transport block). The MAC layer may indicate, to the PHY layer, the positive acknowledgment, for example, for the PDSCH transmission. The MAC layer may indicate, to the PHY layer, the positive acknowledgment, for example, for the SCell dormancy. The MAC layer may indicate, to the PHY layer, the positive acknowledgment, for example, for the SPS PDSCH release/deactivation. The MAC layer may indicate, to the PHY layer, the positive acknowledgment, for example, for the TCI state update.

The first HARQ-ACK information feedback/bit may, for example, be/comprise the positive acknowledgement. The wireless device may, for example, transmit the first uplink signal/transmission comprising the positive acknowledgment.

A medium access control (MAC) layer of the wireless device may indicate, to a physical (PHY) layer of the wireless device, the first HARQ-ACK information feedback/bit that is (set to) a positive acknowledgement. The first HARQ-ACK information feedback/bit may be a positive acknowledgement.

The MAC layer may indicate, to the PHY layer, the first HARQ-ACK information feedback/bit that is set to the positive acknowledgment, for example, for the transport block (or for/of the data comprising the transport block). The MAC layer may indicate, to the PHY layer, the first HARQ-ACK information feedback/bit that is set to the positive acknowledgment, for example, for the PDSCH transmission. The MAC layer may indicate, to the PHY layer, the first HARQ-ACK information feedback/bit that is set to the positive acknowledgment, for example, for the SCell dormancy. The MAC layer may indicate, to the PHY layer, the first HARQ-ACK information feedback/bit that is set to the positive acknowledgment, for example, for the SPS PDSCH release/deactivation. The MAC layer may indicate, to the PHY layer, the first HARQ-ACK information feedback/bit that is set to the positive acknowledgment, for example, for the TCI state update.

The MAC layer may indicate, to the PHY layer, the positive acknowledgment, for example, based on the first time alignment timer of the first TAG running (or being running). The MAC layer may indicate, to the PHY layer, the positive acknowledgment, for example, regardless of the second time alignment timer of the second TAG is running or being stopped/expired (or not running). The second time alignment timer may, for example, be stopped/expired (or not running). The second time alignment timer may, for example, be stopped/expired (or not running) when the MAC layer indicates, to the PHY layer, the positive acknowledgment. The indication of the positive acknowledgement may be, for example, independent from/of the second time alignment timer of the second TAG.

The wireless device may, for example, transmit the first HARQ-ACK information feedback/bit (or the positive acknowledgement). The wireless device may, for example, transmit the first HARQ-ACK information feedback/bit that is set to the positive acknowledgement.

The wireless device may not transmit/perform the first uplink signal/transmission (e.g., at time T2 in FIG. 20). The wireless device may not transmit/perform, via the first uplink resource, the first uplink signal/transmission. The wireless device may not transmit/perform, in the first time slot, the first uplink signal/transmission. The wireless device may not transmit/perform, in the first uplink transmission occasion, the first uplink signal/transmission. The wireless device may not transmit/perform the first uplink signal/transmission, for example, based on the first time alignment timer of the first TAG being stopped/expired (or not running). The wireless device may not transmit/perform the first uplink signal/transmission associated with the first TAG, for example, based on the first time alignment timer of the first TAG being stopped/expired (or not running). The wireless device may not transmit/perform the first uplink signal/transmission associated with the first coreset pool index, for example, based on the first time alignment timer of the first TAG being stopped/expired (or not running). The wireless device may not transmit/perform the first uplink signal/ transmission associated with the first SRS resource set, for example, based on the first time alignment timer of the first TAG being stopped/expired (or not running). The wireless device may not transmit/perform the first uplink signal/transmission associated with the first TCI state that is associated with the PCI of the cell, for example, based on the first time alignment timer of the first TAG being stopped/expired (or not running). The wireless device may not transmit/perform the first uplink signal/transmission, for example, regardless of the second time alignment timer of the second TAG is running or being stopped/expired (or not running). The second time alignment timer may, for example, be running. The second time alignment timer may, for example, be running when the wireless device does not transmit/perform the first uplink signal/transmission (e.g., at time T2 in FIG. 20). The (configured/scheduled) transmission of the first uplink signal/transmission may be, for example, independent from/of the second time alignment timer of the second TAG.

Not transmitting/performing the first uplink signal/transmission may comprise stopping/aborting (scheduled/configured) transmission of the first uplink signal/transmission. The first uplink signal/transmission may comprise/be one or more first uplink signal/transmissions. The wireless device may stop/abort transmission of the one or more first uplink signal/transmissions. The wireless device may stop/abort scheduled/configured transmission of the one or more first uplink signal/transmissions. The wireless device may stop/abort transmission of the one or more first uplink signal/transmissions, for example, based on the first time alignment timer of the first TAG being stopped/expired (or not running). The wireless device may stop/abort transmission of the one or more first uplink signal/transmissions, for example, regardless of the second time alignment timer of the second TAG is running or being stopped/expired (or not running).

A medium access control (MAC) layer of the wireless device may not instruct a physical (PHY) layer of the wireless device to generate an acknowledgement.

The MAC layer may not instruct the PHY layer to generate the acknowledgment, for example, of/for the transport block (or for/of the data comprising the transport block). The MAC layer may instruct the PHY layer to generate the acknowledgment, for example, of/for the PDSCH transmission. The MAC layer may not instruct the PHY layer to generate the acknowledgment, for example, of/for the SCell dormancy. The MAC layer may not instruct the PHY layer to generate the acknowledgment, for example, of/for the SPS PDSCH release/deactivation. The MAC layer may not instruct the PHY layer to generate the acknowledgment, for example, of/for the TCI state update.

The wireless device may not, for example, transmit the first uplink signal/transmission comprising the acknowledgment. The wireless device may not transmit the first uplink signal/transmission, for example based on the MAC layer not instructing the PHY layer to generate the acknowledgement. The wireless device may not transmit the first HARQ-ACK information feedback/bit, for example based on the MAC layer not instructing the PHY layer to generate the acknowledgement.

The MAC layer of the wireless device may not instruct the PHY layer of the wireless device to generate the acknowledgement, for example, based on the first time alignment timer of the first TAG being stopped/expired (or not running). The MAC layer of the wireless device may not instruct the PHY layer of the wireless device to generate the acknowledgement, for example, regardless of the second time alignment timer of the second TAG is running or being stopped/expired (or not running). The second time alignment timer may, for example, be running. The second time alignment timer may, for example, be running when the MAC layer of the wireless device does not instruct the PHY layer of the wireless device to generate the acknowledgement. The MAC layer of the wireless device may not instruct the PHY layer of the wireless device to generate the acknowledgement, for example, independent from/of the second time alignment timer of the second TAG.

The wireless device may be configured to transmit a second uplink signal/transmission (e.g., PUSCH/PUCCH/SRS transmission, transport block, UCI, and the like). The one or more configuration parameters may indicate/schedule/activate the second uplink signal/transmission. The one or more configuration parameters may indicate a second uplink resource for the second uplink signal/transmission. The one or more configuration parameters may indicate, for transmission of the second uplink signal/transmission, a second time slot (e.g., time T3 in FIG. 20). The one or more configuration parameters may indicate, for transmission of the second uplink signal/transmission, a second uplink transmission occasion (e.g., a second PUSCH/PUCCH/SRS transmission occasion). The second uplink signal/transmission may, for example, be/comprise a PUSCH transmission for a configured uplink grant (e.g., Type 1 configured uplink grant). The second uplink signal/transmission may, for example, be/comprise a PUCCH transmission (e.g., periodic CSI report, SR transmission, and the like). The second uplink signal/transmission may, for example, be/comprise an SRS transmission (e.g., periodic SRS).

For example, the wireless device may receive a second DCI. The second DCI may schedule/indicate/trigger transmission of a second uplink signal/transmission (e.g., PUSCH/PUCCH/SRS transmission, transport block, UCI, HARQ-ACK information bit/feedback, and the like). The second uplink signal/transmission may be/comprise, for example, a second HARQ-ACK information bit/feedback. The second uplink signal/transmission may be/comprise, for example, a PUSCH transmission. The second uplink signal/transmission may be/comprise, for example, an SRS transmission (e.g., aperiodic SRS transmission). The second DCI may indicate a second uplink resource for the second uplink signal/transmission. The second DCI may comprise a field (e.g., PUCCH resource indicator field, TDRA field, FDRA field, and the like) indicating the second uplink resource. The second DCI may comprise a field (e.g., PDSCH-to-HARQ_feedback timing indicator) indicating a second time slot (e.g., time T3 in FIG. 20) for transmission of the second uplink signal/transmission. The second DCI may indicate, for transmission of the second uplink signal/transmission, a second uplink transmission occasion (e.g., a second PUSCH/PUCCH/SRS transmission occasion). For example, the field (e.g., PDSCH-to-HARQ_feedback timing indicator) may indicate the second uplink transmission occasion. For example, the field (e.g., PUCCH resource indicator field) may indicate the second uplink transmission occasion.

In an example, the plurality of uplink resources may comprise the second uplink resource.

The second uplink signal/transmission may not be/comprise, for example, a PRACH transmission. The second uplink signal/transmission may not be/comprise, for example a random-access preamble transmission. The second uplink signal/transmission may not be/comprise, for example a MSGA transmission of a two-step random access procedure.

In an example, the first time slot indicated by the first DCI and the second time slot indicated by the second DCI may be different.

In an example, the first PUCCH transmission occasion indicated by the first DCI and the second PUCCH transmission occasion indicated by the second DCI may be different.

In an example, the first time slot indicated by the first DCI and the second time slot indicated by the second DCI may be the same.

In an example, the first PUCCH transmission occasion indicated by the first DCI and the second PUCCH transmission occasion indicated by the second DCI may be the same.

The second DCI may, for example, schedule reception of a second PDSCH transmission. The second HARQ-ACK information feedback/bit may be for the second PDSCH transmission. The second HARQ-ACK information feedback/bit may be for a successful or unsuccessful reception/decoding of the second PDSCH transmission The second PDSCH transmission may be for a second cell. The second PDSCH transmission may comprise a second transport block. The second transport block in the second PDSCH transmission may be one or more transport blocks (e.g., if multiplexing supported, the second PDSCH transmission may comprise two transport blocks).

The second DCI may, for example, indicate an SCell dormancy for/of a second cell. The second DCI may comprise one or more fields (e.g., RV, TDRA, FDRA, HARQ process, etc.) that are set/equal to predefined values (e.g., 0, 1) indicating the SCell dormancy. The second HARQ-ACK information feedback/bit may be for the SCell dormancy (or for confirmation of the second DCI that indicates the SCell dormancy). The second HARQ-ACK information feedback/bit may be for a successful or unsuccessful reception/decoding of the second DCI that indicates the SCell dormancy.

The second DCI may, for example, indicate an SPS PDSCH release/deactivation for/of a second cell. The second DCI may comprise one or more fields (e.g., RV, TDRA, FDRA, HARQ process, etc.) that are set/equal to predefined values (e.g., 0, 1) indicating the SPS PDSCH release/deactivation. The second HARQ-ACK information feedback/bit may be for the SPS PDSCH release (or for confirmation of the second DCI that indicates the SPS PDSCH release). The second HARQ-ACK information feedback/bit may be for a successful or unsuccessful reception/decoding of the second DCI that indicates the SPS PDSCH release.

The second DCI may, for example, indicate a TCI state update for/of a second cell. The second DCI may comprise one or more fields (e.g., RV, TDRA, FDRA, HARQ process, etc.) that are set/equal to predefined values (e.g., 0, 1) indicating the TCI state update. The second HARQ-ACK information feedback/bit may be for the TCI state update (or for confirmation of the second DCI that indicates the TCI state update). The second HARQ-ACK information feedback/bit may be for a successful or unsuccessful reception/decoding of the second DCI that indicates the TCI state update.

In an example, the second cell may be different from the cell. A cell index identifying the cell and a second cell index identifying/indicating the second cell may be different. In an example, the second cell may be the same as the cell. A cell index identifying/indicating the cell and a second cell index identifying/indicating the second cell may be the same. The one or more cells may comprise the second cell. The one or more configuration parameters may indicate, for the cell, the cell index. The one or more configuration parameters may indicate, for the second cell, the second cell index.

A cyclic redundancy check (CRC) of the second DCI may be scrambled with an RNTI. The RNTI may be, for example, C-RNTI. The RNTI may be, for example, CS-RNTI. The RNTI may be, for example, Temporary C-RNTI.

The second DCI may comprise a HARQ process identifier field. The HARQ process identifier field (or a value of the HARQ process identifier field) may indicate/identify a HARQ process. The HARQ process identifier field (or the value of the HARQ process identifier field) may indicate/identify the HARQ process, for example, for the second PDSCH transmission (or the second transport block) scheduled by the second DCI.

The second PDSCH transmission (or transmission of the second transport block) may be, for example, a new transmission of the second transport block. The second PDSCH transmission (or transmission of the second transport block) may be, for example, a retransmission of the second transport block.

The second DCI may comprise a new data indicator (NDI) field with a value. The value of the NDI field may be, for example, equal to zero.

The wireless device may decode (or attempt to decode) the second transport block. The wireless device may decode (or attempt to decode) data comprising/carrying/including/containing the second transport block. The wireless device may buffer the data, for example, before (or prior to) decoding (or attempting to decode) the data.

The decoding of the second transport block may be, for example, successful. The decoding of the second transport block may be, for example, unsuccessful.

The second uplink signal/transmission may be, for example, associated with the second TAG of the at least two TAGs.

The second uplink signal/transmission may be, for example, associated with the second coreset pool index (CoresetPoolIndex=1). The second uplink signal/transmission may be associated with the second TAG of the at least two TAGs, for example, based on the second uplink signal/transmission being associated with the second coreset pool index.

The second uplink signal/transmission may be, for example, associated with the second SRS resource set of the at least two SRS resource sets. The second uplink signal/transmission may be associated with the second TAG of the at least two TAGs, for example, based on the second uplink signal/transmission being associated with the second SRS resource set.

The second uplink signal/transmission may be, for example, associated with the second TCI state, of the at least two TCI states, that is associated with the second PCI that is different from the PCI of the cell. The second uplink signal/transmission may be associated with the second TAG of the at least two TAGs, for example, based on the second uplink signal/transmission being associated with the second TCI state that is associated with the second PCI that is different from the PCI of the cell.

The wireless device may transmit/perform the second uplink signal/transmission (e.g., at time T3 in FIG. 20). The wireless device may transmit/perform, via the second uplink resource, the second uplink signal/transmission. The wireless device may transmit/perform, in the second time slot, the second uplink signal/transmission. The wireless device may transmit/perform, in the second uplink transmission occasion, the second uplink signal/transmission. The wireless device may transmit/perform the second uplink signal/transmission, for example, based on the second time alignment timer of the second TAG running (or being running).

The wireless device may transmit/perform the second uplink signal/transmission associated with the second TAG, for example, based on the second time alignment timer of the second TAG running (or being running). The wireless device may transmit/perform the second uplink signal/transmission associated with the second coreset pool index, for example, based on the second time alignment timer of the second TAG running (or being running). The wireless device may transmit/perform the second uplink signal/transmission associated with the second SRS resource set, for example, based on the second time alignment timer of the second TAG running (or being running). The wireless device may transmit/perform the second uplink signal/transmission associated with the second TCI state that is associated with the second PCI that is different from the PCI of the cell, for example, based on the second time alignment timer of the second TAG running (or being running). The wireless device may transmit/perform the second uplink signal/transmission, for example, regardless of the first time alignment timer of the first TAG is running or being stopped/expired (or not running). The first time alignment timer may, for example, be stopped/expired (or not running). The first time alignment timer may, for example, be stopped/expired (or not running) when the wireless device transmits/performs the second uplink signal/transmission (e.g., at time T3 in FIG. 20). The transmission of the second uplink signal/transmission may be, for example, independent from/of the first time alignment timer of the first TAG.

The transmitting/performing the second uplink signal/transmission may comprise keep transmitting the second uplink signal/transmission. The second uplink signal/transmission may comprise/be one or more second uplink signal/transmissions. The wireless device may keep transmitting the one or more second uplink signal/transmissions. The wireless device may keep transmitting the one or more second uplink signal/transmissions, for example, based on the second time alignment timer of the second TAG running (or being running). The wireless device may keep transmitting the one or more second uplink signal/transmissions, for example, regardless of the first time alignment timer of the first TAG is running or being stopped/expired (or not running).

The wireless device may transmit the second uplink signal/transmission based on the second timing advance value associated with the second TAG. The wireless device may transmit the second uplink signal/transmission in/at a second time (e.g., symbol, absolute time, time slot, etc.) determined based on the second timing advance value associated with the second TAG. The wireless device may adjust uplink transmission timing of the second uplink signal/transmission, for example, based on the second timing advance value associated with the second TAG. The wireless device may adjust uplink timing of the second uplink signal/transmission, for example, based on the second timing advance value associated with the second TAG.

A medium access control (MAC) layer of the wireless device may instruct a physical (PHY) layer of the wireless device to generate an acknowledgement.

The MAC layer may instruct the PHY layer to generate the acknowledgment, for example, for the second transport block (or for/of the data comprising the second transport block). The MAC layer may instruct the PHY layer to generate the acknowledgment, for example, for the second PDSCH transmission. The MAC layer may instruct the PHY layer to generate the acknowledgment, for example, for the SCell dormancy indicated by the second DCI. The MAC layer may instruct the PHY layer to generate the acknowledgment, for example, for the SPS PDSCH release/deactivation indicated by the second DCI. The MAC layer may instruct the PHY layer to generate the acknowledgment, for example, for the TCI state update indicated by the second DCI.

In an example, the acknowledgement may be a positive acknowledgement.

The second HARQ-ACK information feedback/bit may be/comprise the acknowledgement. The second HARQ-ACK information feedback/bit may, for example, be/comprise the positive acknowledgement.

In an example, the acknowledgement may be a negative acknowledgement. The second HARQ-ACK information feedback/bit may, for example, be/comprise the negative acknowledgement.

The wireless device may, for example, transmit the second uplink signal/transmission comprising the acknowledgment.

A medium access control (MAC) layer of the wireless device may instruct a physical (PHY) layer of the wireless device to generate the second HARQ-ACK information feedback/bit.

The MAC layer may instruct the PHY layer to generate the second HARQ-ACK information feedback/bit, for example, for the second transport block (or for/of the data comprising the second transport block). The MAC layer may instruct the PHY layer to generate the second HARQ-ACK information feedback/bit, for example, for the second PDSCH transmission. The MAC layer may instruct the PHY layer to generate the second HARQ-ACK information feedback/bit, for example, for the SCell dormancy indicated by the second DCI. The MAC layer may instruct the PHY layer to generate the second HARQ-ACK information feedback/bit, for example, for the SPS PDSCH release/deactivation indicated by the second DCI. The MAC layer may instruct the PHY layer to generate the second HARQ-ACK information feedback/bit, for example, for the TCI state update indicated by the second DCI.

In an example, the second HARQ-ACK information feedback/bit may be a positive acknowledgement.

The MAC layer of the wireless device may instruct the PHY layer of the wireless device to generate the positive acknowledgement, for example, based on the second time alignment timer of the second TAG running (or being running). The MAC layer of the wireless device may instruct the PHY layer of the wireless device to generate the positive acknowledgement, for example, regardless of the first time alignment timer of the first TAG is running or being stopped/expired (or not running). The first time alignment timer may, for example, be stopped/expired (or not running). The first time alignment timer may, for example, be stopped/expired (or not running) when the MAC layer of the wireless device instructs the PHY layer of the wireless device to generate the positive acknowledgement. The instruction of the MAC layer to generate the positive acknowledgement may be, for example, independent from/of the first time alignment timer of the first TAG.

The wireless device may, for example, transmit the second HARQ-ACK information feedback/bit.

A medium access control (MAC) layer of the wireless device may indicate, to a physical (PHY) layer of the wireless device, a positive acknowledgement.

The MAC layer may indicate, to the PHY layer, the positive acknowledgment, for example, for the second transport block (or for/of the data comprising the second transport block). The MAC layer may indicate, to the PHY layer, the positive acknowledgment, for example, for the second PDSCH transmission. The MAC layer may indicate, to the PHY layer, the positive acknowledgment, for example, for the SCell dormancy indicated by the second DCI. The MAC layer may indicate, to the PHY layer, the positive acknowledgment, for example, for the SPS PDSCH release/deactivation indicated by the second DCI. The MAC layer may indicate, to the PHY layer, the positive acknowledgment, for example, for the TCI state update indicated by the second DCI.

The second HARQ-ACK information feedback/bit may, for example, be/comprise the positive acknowledgement. The wireless device may, for example, transmit the second uplink signal/transmission comprising the positive acknowledgment.

A medium access control (MAC) layer of the wireless device may indicate, to a physical (PHY) layer of the wireless device, the second HARQ-ACK information feedback/bit that is (set to) a positive acknowledgement. The second HARQ-ACK information feedback/bit may be a positive acknowledgement.

The MAC layer may indicate, to the PHY layer, the second HARQ-ACK information feedback/bit that is set to the positive acknowledgment, for example, for the second transport block (or for/of the data comprising the second transport block). The MAC layer may indicate, to the PHY layer, the second HARQ-ACK information feedback/bit that is set to the positive acknowledgment, for example, for the second PDSCH transmission. The MAC layer may indicate, to the PHY layer, the second HARQ-ACK information feedback/bit that is set to the positive acknowledgment, for example, for the SCell dormancy indicated by the second DCI. The MAC layer may indicate, to the PHY layer, the second HARQ-ACK information feedback/bit that is set to the positive acknowledgment, for example, for the SPS PDSCH release/deactivation indicated by the second DCI. The MAC layer may indicate, to the PHY layer, the second HARQ-ACK information feedback/bit that is set to the positive acknowledgment, for example, for the TCI state update indicated by the second DCI.

The MAC layer may indicate, to the PHY layer, the positive acknowledgment, for example, based on the second time alignment timer of the second TAG running (or being running). The MAC layer may indicate, to the PHY layer, the positive acknowledgment, for example, regardless of the first time alignment timer of the first TAG is running or being stopped/expired (or not running). The first time alignment timer may, for example, be stopped/expired (or not running). The first time alignment timer may, for example, be stopped/expired (or not running) when the MAC layer indicates, to the PHY layer, the positive acknowledgment. The indication of the positive acknowledgement may be, for example, independent from/of the first time alignment timer of the first TAG.

The wireless device may, for example, transmit the second HARQ-ACK information feedback/bit (or the positive acknowledgement). The wireless device may, for example, transmit the second HARQ-ACK information feedback/bit that is set to the positive acknowledgement.

The wireless device may not transmit/perform the second uplink signal/transmission (e.g., at time T3 in FIG. 20). The wireless device may not transmit/perform, via the second uplink resource, the second uplink signal/transmission. The wireless device may not transmit/perform, in the second time slot, the second uplink signal/transmission. The wireless device may not transmit/perform, in the second uplink transmission occasion, the second uplink signal/transmission. The wireless device may not transmit/perform the second uplink signal/transmission, for example, based on the second time alignment timer of the second TAG being stopped/expired (or not running). The wireless device may not transmit/perform the second uplink signal/transmission associated with the second TAG, for example, based on the second time alignment timer of the second TAG being stopped/expired (or not running). The wireless device may not transmit/perform the second uplink signal/transmission associated with the second coreset pool index, for example, based on the second time alignment timer of the second TAG being stopped/expired (or not running). The wireless device may not transmit/perform the second uplink signal/transmission associated with the second SRS resource set, for example, based on the second time alignment timer of the second TAG being stopped/expired (or not running). The wireless device may not transmit/perform the second uplink signal/transmission associated with the second TCI state that is associated with the second PCI different from the PCI of the cell, for example, based on the second time alignment timer of the second TAG being stopped/expired (or not running). The wireless device may not transmit/perform the second uplink signal/transmission, for example, regardless of the first time alignment timer of the first TAG is running or being stopped/expired (or not running). The first time alignment timer may, for example, be running. The first time alignment timer may, for example, be running when the wireless device does not transmit/perform the second uplink signal/transmission (e.g., at time T3 in FIG. 20). The (configured/scheduled) transmission of the second uplink signal/transmission may be, for example, independent from/of the first time alignment timer of the first TAG.

Not transmitting/performing the second uplink signal/transmission may comprise stopping/aborting (scheduled/configured) transmission of the second uplink signal/transmission. The second uplink signal/transmission may comprise/be one or more second uplink signal/transmissions. The wireless device may stop/abort (or may not perform) transmission of the one or more second uplink signal/transmissions. The wireless device may stop/abort scheduled/configured transmission of the one or more second uplink signal/transmissions. The wireless device may stop/abort transmission of the one or more second uplink signal/transmissions, for example, based on the second time alignment timer of the second TAG being stopped/expired (or not running). The wireless device may stop/abort transmission of the one or more second uplink signal/transmissions, for example, regardless of the first time alignment timer of the first TAG is running or being stopped/expired (or not running).

A medium access control (MAC) layer of the wireless device may not instruct a physical (PHY) layer of the wireless device to generate an acknowledgement.

The MAC layer may not instruct the PHY layer to generate the acknowledgment, for example, of/for the second transport block (or for/of the data comprising the second transport block). The MAC layer may instruct the PHY layer to generate the acknowledgment, for example, of/for the second PDSCH transmission. The MAC layer may not instruct the PHY layer to generate the acknowledgment, for example, of/for the SCell dormancy indicated by the second DCI. The MAC layer may not instruct the PHY layer to generate the acknowledgment, for example, of/for the SPS PDSCH release/deactivation indicated by the second DCI. The MAC layer may not instruct the PHY layer to generate the acknowledgment, for example, of/for the TCI state update indicated by the second DCI.

The wireless device may not, for example, transmit the second uplink signal/transmission comprising the acknowledgment. The wireless device may not transmit the second uplink signal/transmission, for example based on the MAC layer not instructing the PHY layer to generate the acknowledgement. The wireless device may not transmit the second HARQ-ACK information feedback/bit, for example based on the MAC layer not instructing the PHY layer to generate the acknowledgement.

The MAC layer of the wireless device may not instruct the PHY layer of the wireless device to generate the acknowledgement, for example, based on the second time alignment timer of the second TAG being stopped/expired (or not running). The MAC layer of the wireless device may not instruct the PHY layer of the wireless device to generate the acknowledgement, for example, regardless of the first time alignment timer of the first TAG is running or being stopped/expired (or not running). The first time alignment timer may, for example, be running. The first time alignment timer may, for example, be running when the MAC layer of the wireless device does not instruct the PHY layer of the wireless device to generate the acknowledgement. The MAC layer of the wireless device may not instruct the PHY layer of the wireless device to generate the acknowledgement, for example, independent from/of the first time alignment timer of the first TAG.

Figure 21:
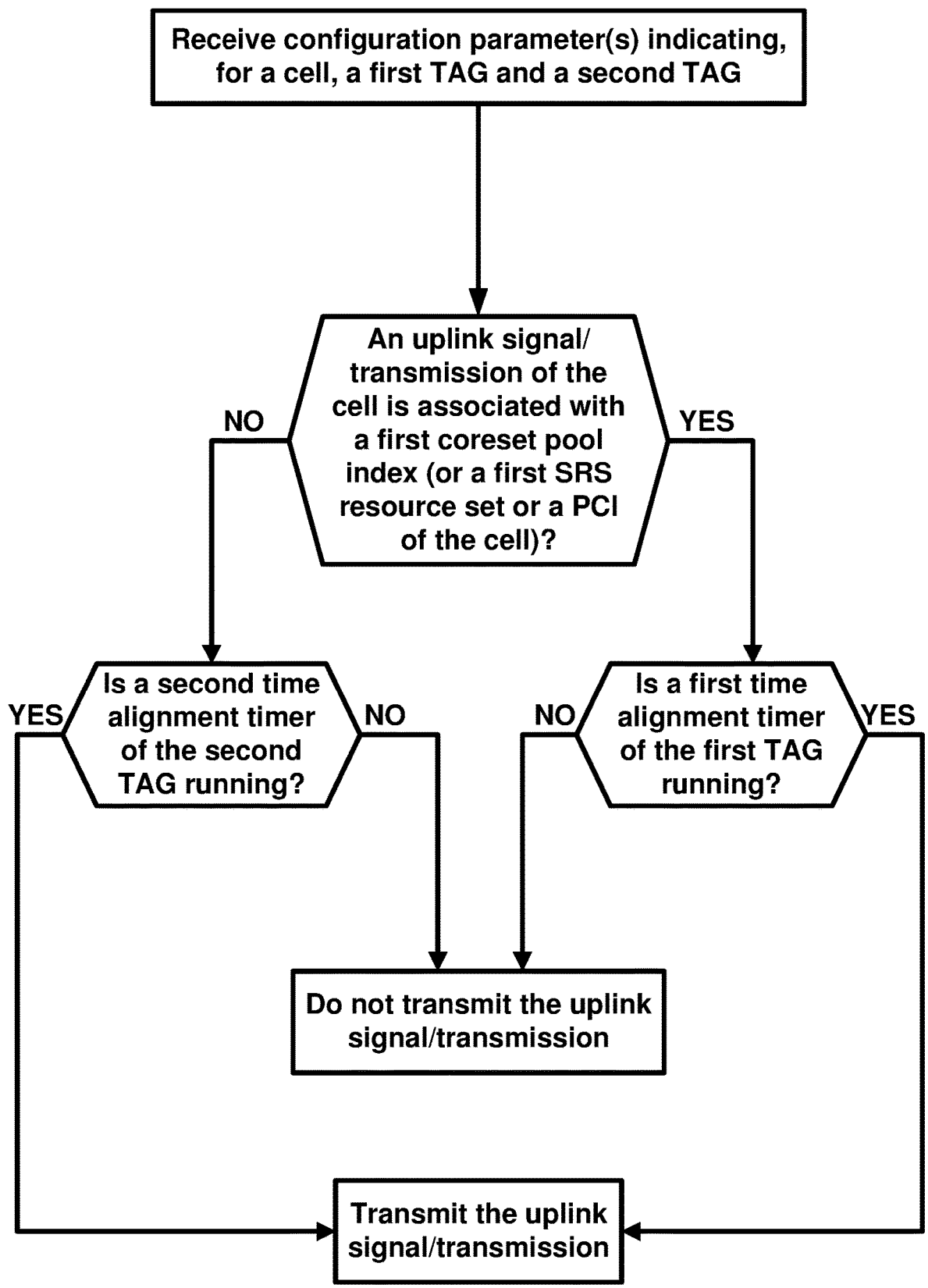
FIG. 21 illustrates an example flow chart of management of multiple time alignment timers as per an aspect of an embodiment of the present disclosure.

FIG. 21 illustrates an example flow chart of management of multiple time alignment timers as per an aspect of an embodiment of the present disclosure.

A wireless device may receive one or more messages comprising one or more configuration parameters. A base station may transmit, to the wireless device. the one or more messages comprising the one or more configuration parameters.

The one or more configuration parameters may indicate a plurality of TAGs.

A cell (e.g., PCell, SCell, SpCell) may be associated with at least two TAGs of the plurality of TAGs. For example, the one or more configuration parameters may indicate, for the cell, the at least two TAGs. The at least two TAGs may comprise a first TAG and a second TAG. The cell may belong to (or be associated with) the first TAG and the second TAG. The first TAG may comprise the cell. The second TAG may comprise the TAG.

The one or more configuration parameters may indicate a first time alignment timer for the first TAG of the at least two TAGs. The one or more configuration parameters may indicate a second time alignment timer for the second TAG of the at least two TAGs.

The one or more configuration parameters may indicate, for one or more first coresets of/in the cell (or a downlink BWP of the cell), a first coreset pool index (e.g., CoresetPoolIndex=0). The one or more configuration parameters may indicate, for one or more second coresets of/in the cell (or a downlink BWP of the cell), a second coreset pool index (e.g., CoresetPoolIndex=1).

The one or more configuration parameters may indicate, for the cell, at least two SRS resource sets. In an example, the one or more configuration parameters may indicate, for each SRS resource set of the at least two SRS resource sets, a usage parameter set to 'codebook'. In an example, the one or more configuration parameters may indicate, for each SRS resource set of the at least two SRS resource sets, a usage parameter set to 'non-codebook'. The at least two SRS resource sets may comprise a first SRS resource set and a second SRS resource set.

The wireless device may transmit an uplink signal/transmission. The base station may receive the uplink signal/transmission.

For example, the wireless device may transmit, via the cell, the uplink signal/transmission. The base station may receive, via the cell, the uplink signal/transmission.

The uplink signal/transmission may be, for example, a PUCCH transmission. The uplink signal/transmission may be, for example, an uplink control information (UCI). The UCI may comprise a scheduling request (SR). The UCI may comprise a CSI report. The UCI may comprise a HARQ-ACK information feedback/bit. The uplink signal/transmission may be, for example, a PUSCH transmission. The uplink signal/transmission may be, for example, a transport block. The uplink signal/transmission may be, for example, an SRS transmission.

For example, the one or more configuration parameters may schedule/configure/activate/trigger transmission of the uplink signal/transmission. For example, the wireless device may receive a DCI scheduling/activating/triggering transmission of the uplink signal/transmission. The base station may transmit the DCI scheduling/activating/triggering transmission of the uplink signal/transmission.

The uplink signal/transmission may be, for example, associated with the first TAG of the at least two TAGs. The uplink signal/transmission may be, for example, associated with the first coreset pool index. The uplink signal/transmission may be, for example, associated with the first SRS resource set. The uplink signal/transmission may be, for example, associated with a first TCI state. The wireless device may transmit the uplink signal/transmission based on the first TCI state. The wireless device may transmit the uplink signal/transmission with/using a transmission parameter (e.g., transmission power, spatial domain transmission filter/beam) determined based on the first TCI state. The first TCI state may indicate (or be associated with) a PCI of the cell. The base station may receive the uplink signal/transmission based on the first TCI state.

The first time alignment timer of (or associated with) the first TAG may be running. The wireless device may transmit the uplink signal/transmission, for example, based on the first time alignment timer of (or associated with) the first TAG being running. The wireless device may transmit the uplink signal/transmission, for example, regardless of the second time alignment timer of (or associated with) the second TAG being running or stopped/expired. The base station may receive the uplink signal/transmission, for example, based on the first time alignment timer of (or associated with) the first TAG being running. The base station may receive the uplink signal/transmission, for example, regardless of the second time alignment timer of (or associated with) the second TAG being running or stopped/expired. The uplink signal/transmission and the first time alignment timer may be associated with the same TAG. For example, the uplink signal/transmission and the first time alignment timer may be associated with the first TAG. The wireless device may transmit the uplink signal/transmission, for example, based on the first time alignment timer of the first TAG associated with the uplink signal/transmission being running. The base station may receive the uplink signal/transmission, for example, based on the first time alignment timer of the first TAG associated with the uplink signal/transmission being running.

A MAC layer of the wireless device may instruct a PHY layer of the wireless device to generate an acknowledgement (e.g., negative acknowledgement, positive acknowledgement). The wireless device may transmit the uplink signal/ transmission comprising the acknowledgement. The base station may receive the uplink signal/transmission comprising the acknowledgement. The MAC layer of the wireless device may instruct the PHY layer of the wireless device to generate the acknowledgement, for example, based on the first time alignment timer of (or associated with) the first TAG being running. The MAC layer of the wireless device may instruct the PHY layer of the wireless device to generate the acknowledgement, for example, based on the first time alignment timer of the first TAG associated with the uplink signal/transmission being running. The MAC layer of the wireless device may instruct the PHY layer of the wireless device to generate the acknowledgement, for example, regardless of the second time alignment timer of (or associated with) the second TAG being running or stopped/expired.

A MAC layer of the wireless device may indicate, to a PHY layer of the wireless device, a positive acknowledgement. The wireless device may transmit the uplink signal/transmission comprising the positive acknowledgement. The base station may receive the uplink signal/transmission comprising the positive acknowledgement. The MAC layer of the wireless device may indicate, to the PHY layer of the wireless device, the positive acknowledgement, for example, based on the first time alignment timer of (or associated with) the first TAG being running. The MAC layer of the wireless device may indicate, to the PHY layer of the wireless device, the positive acknowledgement, for example, based on the first time alignment timer of the first TAG associated with the uplink signal/transmission being running. The MAC layer of the wireless device may indicate, to the PHY layer of the wireless device, the positive acknowledgement, for example, regardless of the second time alignment timer of (or associated with) the second TAG being running or stopped/expired.

The uplink signal/transmission may be, for example, associated with the second TAG of the at least two TAGs. The uplink signal/transmission may be, for example, associated with the second coreset pool index. The uplink signal/transmission may be, for example, associated with the second SRS resource set. The uplink signal/transmission may be, for example, associated with a second TCI state. The wireless device may transmit the uplink signal/transmission based on the second TCI state. The wireless device may transmit the uplink signal/transmission with/using a transmission parameter (e.g., transmission power, spatial domain transmission filter/beam) determined based on the second TCI state. The second TCI state may indicate (or be associated with) a second PCI that is different from the PCI of the cell. The base station may receive the uplink signal/transmission based on the second TCI state.

The second time alignment timer of (or associated with) the second TAG may be running. The wireless device may transmit the uplink signal/transmission, for example, based on the second time alignment timer of (or associated with) the second TAG being running. The wireless device may transmit the uplink signal/transmission, for example, regardless of the first time alignment timer of (or associated with) the first TAG being running or stopped/expired. The base station may receive the uplink signal/transmission, for example, based on the second time alignment timer of (or associated with) the second TAG being running. The base station may receive the uplink signal/transmission, for example, regardless of the first time alignment timer of (or associated with) the first TAG being running or stopped/expired. The uplink signal/transmission and the second time alignment timer may be associated with the same TAG. For example, the uplink signal/transmission and the second time alignment timer may be associated with the second TAG. The wireless device may transmit the uplink signal/transmission, for example, based on the second time alignment timer of the second TAG associated with the uplink signal/transmission being running. The base station may receive the uplink signal/transmission, for example, based on the second time alignment timer of the second TAG associated with the uplink signal/transmission being running.

A MAC layer of the wireless device may instruct a PHY layer of the wireless device to generate an acknowledgement (e.g., negative acknowledgement, positive acknowledgement). The wireless device may transmit the uplink signal/transmission comprising the acknowledgement. The base station may receive the uplink signal/transmission comprising the acknowledgement. The MAC layer of the wireless device may instruct the PHY layer of the wireless device to generate the acknowledgement, for example, based on the second time alignment timer of (or associated with) the second TAG being running. The MAC layer of the wireless device may instruct the PHY layer of the wireless device to generate the acknowledgement, for example, based on the second time alignment timer of the second TAG associated with the uplink signal/transmission being running. The MAC layer of the wireless device may instruct the PHY layer of the wireless device to generate the acknowledgement, for example, regardless of the first time alignment timer of (or associated with) the first TAG being running or stopped/expired.

A MAC layer of the wireless device may indicate, to a PHY layer of the wireless device, a positive acknowledgement. The wireless device may transmit the uplink signal/transmission comprising the positive acknowledgement. The base station may receive the uplink signal/transmission comprising the positive acknowledgement. The MAC layer of the wireless device may indicate, to the PHY layer of the wireless device, the positive acknowledgement, for example, based on the second time alignment timer of (or associated with) the second TAG being running. The MAC layer of the wireless device may indicate, to the PHY layer of the wireless device, the positive acknowledgement, for example, based on the second time alignment timer of the second TAG associated with the uplink signal/transmission being running. The MAC layer of the wireless device may indicate, to the PHY layer of the wireless device, the positive acknowledgement, for example, regardless of the first time alignment timer of (or associated with) the first TAG being running or stopped/expired.

The wireless device may not transmit/perform an uplink signal/transmission. The wireless device may stop/abort (or may not perform) transmission of the uplink signal/transmission The base station may not receive the uplink signal/transmission.

For example, the wireless device may not transmit, via the cell, the uplink signal/transmission. The base station may not receive, via the cell, the uplink signal/transmission.

The uplink signal/transmission may be, for example, a PUCCH transmission. The uplink signal/transmission may be, for example, an uplink control information (UCI). The UCI may comprise a scheduling request (SR). The UCI may comprise a CSI report. The UCI may comprise a HARQ-ACK information feedback/bit. The uplink signal/transmission may be, for example, a PUSCH transmission. The uplink signal/transmission may be, for example, a transport block. The uplink signal/transmission may be, for example, an SRS transmission.

For example, the one or more configuration parameters may schedule/configure/activate/trigger transmission of the uplink signal/transmission. For example, the wireless device may receive a DCI scheduling/activating/triggering transmission of the uplink signal/transmission. The base station may transmit the DCI scheduling/activating/triggering transmission of the uplink signal/transmission.

The uplink signal/transmission may be, for example, associated with the first TAG of the at least two TAGs. The uplink signal/transmission may be, for example, associated with the first coreset pool index. The uplink signal/transmission may be, for example, associated with the first SRS resource set. The uplink signal/transmission may be, for example, associated with a first TCI state. The wireless device may be scheduled/configured/activated, by the one or more configuration parameters or the DCI or a MAC-CE, to transmit the uplink signal/transmission based on the first TCI state. The wireless device may be scheduled/configured/activated, by the one or more configuration parameters or the DCI or a MAC-CE or a second DCI activating the first TCI state, to transmit the uplink signal/transmission with/using a transmission parameter (e.g., transmission power, spatial domain transmission filter/beam) determined based on the first TCI state. The first TCI state may indicate (or be associated with) a PCI of the cell.

The first time alignment timer of (or associated with) the first TAG may be stopped/expired (or not running). The wireless device may not transmit the uplink signal/transmission, for example, based on the first time alignment timer of (or associated with) the first TAG being stopped/expired (or not running). The wireless device may not transmit the uplink signal/transmission, for example, regardless of the second time alignment timer of (or associated with) the second TAG being running or stopped/expired. The base station may not receive the uplink signal/transmission, for example, based on the first time alignment timer of (or associated with) the first TAG being stopped/expired (or not running). The base station may not receive the uplink signal/transmission, for example, regardless of the second time alignment timer of (or associated with) the second TAG being running or stopped/expired. The uplink signal/transmission and the first time alignment timer may be associated with the same TAG. For example, the uplink signal/transmission and the first time alignment timer may be associated with the first TAG. The wireless device may not transmit the uplink signal/transmission, for example, based on the first time alignment timer of the first TAG associated with the uplink signal/transmission being stopped/expired (or not running). The base station may not receive the uplink signal/transmission, for example, based on the first time alignment timer of the first TAG associated with the uplink signal/transmission being stopped/expired (or not running).

A MAC layer of the wireless device may not instruct a PHY layer of the wireless device to generate an acknowledgement (e.g., negative acknowledgement, positive acknowledgement). The wireless device may not transmit the uplink signal/transmission comprising the acknowledgement. The base station may not receive the uplink signal/transmission comprising the acknowledgement. The MAC layer of the wireless device may not instruct the PHY layer of the wireless device to generate the acknowledgement, for example, based on the first time alignment timer of (or associated with) the first TAG being stopped/expired (or not running). The MAC layer of the wireless device may not instruct the PHY layer of the wireless device to generate the acknowledgement, for example, based on the first time alignment timer of the first TAG associated with the uplink signal/transmission being stopped/expired (or not running). The MAC layer of the wireless device may not instruct the PHY layer of the wireless device to generate the acknowledgement, for example, regardless of the second time alignment timer of (or associated with) the second TAG being running or stopped/expired.

The uplink signal/transmission may be, for example, associated with the second TAG of the at least two TAGs. The uplink signal/transmission may be, for example, associated with the second coreset pool index. The uplink signal/transmission may be, for example, associated with the second SRS resource set. The uplink signal/transmission may be, for example, associated with a second TCI state. The wireless device may be scheduled/configured/activated, by the one or more configuration parameters or the DCI or a MAC-CE, to transmit the uplink signal/transmission based on the second TCI state. The wireless device may be scheduled/configured/activated, by the one or more configuration parameters or the DCI or a MAC-CE or a second DCI activating the second TCI state, to transmit the uplink signal/transmission with/using a transmission parameter (e.g., transmission power, spatial domain transmission filter/beam) determined based on the second TCI state. The second TCI state may indicate (or be associated with) a second PCI that is different from the PCI of the cell.

The second time alignment timer of (or associated with) the second TAG may be stopped/expired (or not running). The wireless device may not transmit the uplink signal/transmission, for example, based on the second time alignment timer of (or associated with) the second TAG being stopped/expired (or not running). The wireless device may not transmit the uplink signal/transmission, for example, regardless of the first time alignment timer of (or associated with) the first TAG being running or stopped/expired. The base station may not receive the uplink signal/transmission, for example, based on the second time alignment timer of (or associated with) the second TAG being stopped/expired (or not running). The base station may not receive the uplink signal/transmission, for example, regardless of the first time alignment timer of (or associated with) the first TAG being running or stopped/expired. The uplink signal/transmission and the second time alignment timer may be associated with the same TAG. For example, the uplink signal/transmission and the second time alignment timer may be associated with the second TAG. The wireless device may not transmit the uplink signal/transmission, for example, based on the second time alignment timer of the second TAG associated with the uplink signal/transmission being stopped/expired (or not running). The base station may not receive the uplink signal/transmission, for example, based on the second time alignment timer of the second TAG associated with the uplink signal/transmission being stopped/expired (or not running).

A MAC layer of the wireless device may not instruct a PHY layer of the wireless device to generate an acknowledgement (e.g., negative acknowledgement, positive acknowledgement). The wireless device may not transmit the uplink signal/transmission comprising the acknowledgement. The base station may not receive the uplink signal/transmission comprising the acknowledgement. The MAC layer of the wireless device may not instruct the PHY layer of the wireless device to generate the acknowledgement, for example, based on the second time alignment timer of (or associated with) the second TAG being stopped/expired (or not running). The MAC layer of the wireless device may not instruct the PHY layer of the wireless device to generate the acknowledgement, for example, based on the second time alignment timer of the second TAG associated with the uplink signal/transmission being stopped/expired (or not running). The MAC layer of the wireless device may not instruct the PHY layer of the wireless device to generate the acknowledgement, for example, regardless of the first time alignment timer of (or associated with) the first TAG being running or stopped/expired.

In an example, the first time alignment timer of the first TAG may be stopped/expired (or may not be running). The second time alignment timer of the second TAG may be running.

The first TAG may comprise one or more first cells. The one or more cells may comprise the one or more first cells.

The one or more first cells may comprise a first cell. The first TAG may comprise the first cell. The one or more configuration parameters may indicate, for the first cell, the first TAG. A TAG that is different from the first TAG may not comprise the first cell. The first cell may not belong a TAG that is different from the first TAG. The plurality of TAGs may comprise the TAG. The second TAG may not comprise the first cell. The first cell may not belong to the second TAG.

The wireless device may stop/abort (may not perform) uplink transmissions via the first cell. The wireless device may stop/abort (not perform) the uplink transmissions via the first cell, for example, based on the first time alignment timer of the first TAG being stopped/expired (or not running). The wireless device may stop/abort (not perform) the uplink transmissions via the first cell, for example, based on the first cell not belonging a TAG that is different from the first TAG associated with the (stopped/expired) first time alignment timer. The wireless device may stop/abort (not perform) the uplink transmissions via the first cell, for example, based on the first cell not belonging the second TAG with the (running) second time alignment timer. The wireless device may stop/abort any uplink transmission via the first cell, for example, based on the first time alignment timer of the first TAG being stopped/expired (or not running).

The uplink transmissions may not comprise, for example, random-access preamble transmissions. The uplink transmissions may not comprise, for example, PRACH transmissions. The uplink transmissions may not comprise, for example, MSGA transmissions of a two-step random-access procedure.

In an example, the first cell may be an SpCell (e.g., PCell). The first TAG may be a PTAG.

The wireless device may stop/abort (may not perform) uplink transmissions via the one or more cells. The wireless device may stop/abort (not perform) uplink transmissions via each cell of the one or more cells. The wireless device may stop/abort (not perform) the uplink transmissions via the one or more cells, for example, based on the first time alignment timer of the first TAG being stopped/expired (or not running). The wireless device may stop/abort (not perform) the uplink transmissions via the one or more cells, for example, based on the first TAG being the PTAG. The wireless device may stop/abort (not perform) the uplink transmissions via the one or more cells, for example, based on the first time alignment timer of the first TAG (or the PTAG) being stopped/expired (or not running). The wireless device may stop/abort the uplink transmissions via the one or more cells, for example, based on the first cell not belonging a TAG that is different from the first TAG with the (stopped/expired) first time alignment timer. The wireless device may stop/abort (not perform) the uplink transmissions via the one or more cells, for example, based on the first cell not belonging the second TAG with the (running) second time alignment timer.

The wireless device may stop/abort (may not perform) any uplink transmission via the one or more cells. The wireless device may stop/abort (not perform) any uplink transmission (except random-access preamble transmission and MSGA transmission on the first cell (or the SpCell)) via the one or more cells The wireless device may stop/abort (not perform) any uplink transmission via each cell of the one or more cells. The wireless device may stop/abort (not perform) any uplink transmission via the one or more cells, for example, based on the first time alignment timer of the first TAG being stopped/expired (or not running). The wireless device may stop/abort (not perform) any uplink transmission via the one or more cells, for example, based on the first TAG being the PTAG. The wireless device may stop/abort (not perform) any uplink transmission via the one or more cells, for example, based on the first time alignment timer of the first TAG (or the PTAG) being stopped/expired (or not running). The wireless device may stop/abort any uplink transmission via the one or more cells, for example, based on the first cell not belonging a TAG that is different from the first TAG with the (stopped/expired) first time alignment timer. The wireless device may stop/abort (not perform) any uplink transmission via the one or more cells, for example, based on the first cell not belonging the second TAG with the (running) second time alignment timer.

The one or more first cells may comprise a second cell. The first TAG may comprise the second cell. The second TAG that is different from the first TAG may comprise the second cell. The second cell may belong to the first TAG and the second TAG. The one or more configuration parameters may indicate, for the second cell, the first TAG. The one or more configuration parameters may indicate, for the second cell, the second TAG.

The wireless device may stop/abort (or may not perform) first uplink transmissions via/on the second cell. The wireless device may stop/abort (or may not perform) the first uplink transmissions via/on the second cell, for example, based on the first time alignment timer of the first TAG being stopped/expired (or not running). The first uplink transmissions may be, for example, associated with the first TAG. The first uplink transmissions may be, for example, associated with the first coreset pool index (e.g., CoresetPoolIndex=0). The first uplink transmissions may be, for example, associated with the first SRS resource set. The first uplink transmissions may be, for example, associated with the first TCI state associated with the PCI of the cell.

The wireless device may stop/abort (or may not perform) any uplink transmission, via/on the second cell, associated with the first TAG, for example, based on the first time alignment timer of the first TAG being stopped/expired (or not running). The wireless device may stop/abort any uplink transmission (except a random access preamble transmission and MSGA transmission), via/on the second cell, associated with the first TAG, for example, based on the first time alignment timer of the first TAG being stopped/expired (or not running). The wireless device may stop/abort any uplink transmission, via/on the second cell, associated with the first coreset pool index (e.g., CoresetPoolIndex=0), for example, based on the first time alignment timer of the first TAG being stopped/expired (or not running). The wireless device may stop/abort any uplink transmission, via/on the second cell, associated with the first SRS resource set, for example, based on the first time alignment timer of the first TAG being stopped/expired (or not running). The wireless device may stop/abort any uplink transmission, via/on the second cell, associated with the first TCI state that is associated with the PCI of the cell, for example, based on the first time alignment timer of the first TAG being stopped/expired (or not running).

The first uplink transmissions may not comprise, for example, random-access preamble transmissions. The first uplink transmissions may not comprise, for example, PRACH transmissions. The first uplink transmissions may not comprise, for example, MSGA transmissions of a two-step random-access procedure.

The wireless device may keep transmitting (or performing) second uplink transmissions via/on the second cell. The wireless device may keep transmitting (or performing) the second uplink transmissions via/on the second cell, for example, based on the second time alignment timer of the second TAG being running. The wireless device may keep transmitting (or performing) the second uplink transmissions via/on the second cell, for example, regardless of the first time alignment timer of the first TAG being stopped/expired (or not running). The second uplink transmissions may be, for example, associated with the second TAG. The second uplink transmissions may be, for example, associated with the second coreset pool index (e.g., CoresetPoolIndex=1). The second uplink transmissions may be, for example, associated with the second SRS resource set. The second uplink transmissions may be, for example, associated with the second TCI state associated with a second PCI that is different from the PCI of the cell. The wireless device may keep transmitting (or performing) the second uplink transmissions via the second cell, for example, based on the second cell belonging the second TAG with the (running) second time alignment timer.

In an example, the second cell may be an SpCell (e.g., PCell). The first TAG may be a first PTAG. The second TAG may be a second PTAG. The first time alignment timer of the first PTAG (or the first TAG) may be stopped/expired (or may not be running). The second time alignment timer of the second PTAG (or the second TAG) may be running.

The wireless device may keep transmitting (or performing) second uplink transmissions via/on at least one cell. The one or more cells may comprise the at least one cell. One or more TAGs that are different from the first TAG may comprise the at least one cell. Each TAG of the one or more TAGs may comprise respective cell(s) of the at least one cell. The at least one cell may comprise the second cell. The plurality of TAGs may comprise the one or more TAGs. In an example, the one or more TAGs may comprise the second TAG. In an example, the one or more TAGs may be the second TAG. In an example, the one or more TAGs may not comprise the first TAG. The wireless device may keep transmitting (or performing) the second uplink transmissions via/on the at least one cell, for example, based on the second time alignment timer of the second PTAG running. The wireless device may keep transmitting (or performing) the second uplink transmissions via/on the at least one cell, for example, based on the second time alignment timer of the second PTAG running, regardless of the first time alignment timer of the first PTAG being stopped/expired (or not running).

The one or more configuration parameters may indicate, for the one or more TAGs, one or more time alignment timers. The one or more configuration parameters may indicate, for each TAG of the one or more TAGs, a respective time alignment timer of the one or more time alignment timers. The one or more time alignment timers may comprise the second time alignment timer of the second PTAG (or the second TAG). The one or more time alignment timers may not comprise the first time alignment timer of the first PTAG (or the first TAG). The one or more time alignment timers may be running. Each time alignment timer of the one or more time alignment timers may be running. The wireless device may keep transmitting (or performing) the second uplink transmissions via/on the at least one cell, for example, based on the one or more time alignment timers being running.

In an example, the first time alignment timer of the first TAG may be running. The second time alignment timer of the second TAG may be stopped/expired (or may not be running).

The second TAG may comprise one or more second cells. The one or more cells may comprise the one or more second cells.

The one or more second cells may comprise a first cell. The second TAG may comprise the first cell. The one or more configuration parameters may indicate, for the first cell, the second TAG. A TAG that is different from the second TAG may not comprise the first cell. The first cell may not belong a TAG that is different from the second TAG. The plurality of TAGs may comprise the TAG. The first TAG may not comprise the first cell. The first cell may not belong to the first TAG. The wireless device may stop/abort (or may not perform) uplink transmissions via the first cell. The wireless device may stop/abort the uplink transmissions via the first cell, for example, based on the second time alignment timer of the second TAG being stopped/expired (or not running). The wireless device may stop/abort the uplink transmissions via the first cell, for example, based on the first cell not belonging a TAG that is different from the second TAG with the (stopped/expired) second time alignment timer. The wireless device may stop/abort the uplink transmissions via the first cell, for example, based on the first cell not belonging the first TAG with the (running) first time alignment timer. The wireless device may stop/abort any uplink transmission via the first cell, for example, based on the second time alignment timer of the second TAG being stopped/expired (or not running).

The uplink transmissions may not comprise, for example, random-access preamble transmissions. The uplink transmissions may not comprise, for example, PRACH transmissions. The uplink transmissions may not comprise, for example, MSGA transmissions of a two-step random-access procedure.

In an example, the first cell may be an SpCell (e.g., PCell). The second TAG may be a PTAG.

The wireless device may stop/abort (may not perform) uplink transmissions via the one or more cells. The wireless device may stop/abort (not perform) uplink transmissions via each cell of the one or more cells. The wireless device may stop/abort (not perform) the uplink transmissions via the one or more cells, for example, based on the second time alignment timer of the second TAG being stopped/expired (or not running). The wireless device may stop/abort (not perform) the uplink transmissions via the one or more cells, for example, based on the second TAG being the PTAG. The wireless device may stop/abort (not perform) the uplink transmissions via the one or more cells, for example, based on the second time alignment timer of the second TAG (or the PTAG) being stopped/expired (or not running). The wireless device may stop/abort the uplink transmissions via the one or more cells, for example, based on the first cell not belonging a TAG that is different from the second TAG with the (stopped/expired) second time alignment timer. The wireless device may stop/abort (not perform) the uplink transmissions via the one or more cells, for example, based on the first cell not belonging the first TAG with the (running) first time alignment timer.

The wireless device may stop/abort (may not perform) any uplink transmission via the one or more cells. The wireless device may stop/abort (not perform) any uplink transmission (except random-access preamble transmission and MSGA transmission on the first cell (or the SpCell)) via the one or more cells The wireless device may stop/abort (not perform) any uplink transmission via each cell of the one or more cells. The wireless device may stop/abort (not perform) any uplink transmission via the one or more cells, for example, based on the second time alignment timer of the second TAG being stopped/expired (or not running). The wireless device may stop/abort (not perform) any uplink transmission via the one or more cells, for example, based on the second TAG being the PTAG. The wireless device may stop/abort (not perform) any uplink transmission via the one or more cells, for example, based on the second time alignment timer of the second TAG (or the PTAG) being stopped/expired (or not running). The wireless device may stop/abort any uplink transmission via the one or more cells, for example, based on the first cell not belonging a TAG that is different from the second TAG with the (stopped/expired) second time alignment timer. The wireless device may stop/abort (not perform) any uplink transmission via the one or more cells, for example, based on the first cell not belonging the first TAG with the (running) first time alignment timer.

The one or more second cells may comprise a second cell. The first TAG may comprise the second cell. The second TAG that is different from the first TAG may comprise the second cell. The second cell may belong to the first TAG and the second TAG. The one or more configuration parameters may indicate, for the second cell, the first TAG. The one or more configuration parameters may indicate, for the second cell, the second TAG.

The wireless device may stop/abort (or may not perform) second uplink transmissions via/on the second cell. The wireless device may stop/abort (or may not perform) the second uplink transmissions via/on the second cell, for example, based on the second time alignment timer of the second TAG being stopped/expired (or not running). The second uplink transmissions may be, for example, associated with the second TAG. The second uplink transmissions may be, for example, associated with the second coreset pool index (e.g., CoresetPoolIndex=1). The second uplink transmissions may be, for example, associated with the second SRS resource set. The second uplink transmissions may be, for example, associated with the second TCI state associated with a second PCI that is different from the PCI of the cell.

The wireless device may stop/abort (or may not perform) any uplink transmission, via/on the second cell, associated with the second TAG, for example, based on the second time alignment timer of the second TAG being stopped/expired (or not running). The wireless device may stop/abort any uplink transmission (except a random access preamble transmission and MSGA transmission), via/on the second cell, associated with the second TAG, for example, based on the second time alignment timer of the second TAG being stopped/expired (or not running). The wireless device may stop/abort any uplink transmission, via/on the second cell, associated with the second coreset pool index (e.g., CoresetPoolIndex=1), for example, based on the second time alignment timer of the second TAG being stopped/expired (or not running). The wireless device may stop/abort any uplink transmission, via/on the second cell, associated with the second SRS resource set, for example, based on the second time alignment timer of the second TAG being stopped/expired (or not running). The wireless device may stop/abort any uplink transmission, via/on the second cell, associated with the second TCI state that is associated with the second PCI different from the PCI of the cell, for example, based on the second time alignment timer of the second TAG being stopped/expired (or not running).

The second uplink transmissions may not comprise, for example, random-access preamble transmissions. The second uplink transmissions may not comprise, for example, PRACH transmissions. The second uplink transmissions may not comprise, for example, MSGA transmissions of a two-step random-access procedure.

The wireless device may keep transmitting (or performing) first uplink transmissions via/on the second cell. The wireless device may keep transmitting (or performing) the first uplink transmissions via/on the second cell, for example, based on the first time alignment timer of the first TAG being running. The wireless device may keep transmitting (or performing) the first uplink transmissions via/on the second cell, for example, regardless of the second time alignment timer of the second TAG being stopped/expired (or not running). The first uplink transmissions may be, for example, associated with the first TAG. The first uplink transmissions may be, for example, associated with the first coreset pool index (e.g., CoresetPoolIndex=0). The first uplink transmissions may be, for example, associated with the first SRS resource set. The first uplink transmissions may be, for example, associated with the first TCI state associated with the PCI of the cell. The wireless device may keep transmitting (or performing) the first uplink transmissions via the second cell, for example, based on the second cell belonging the first TAG with the (running) first time alignment timer.

In an example, the second cell may be an SpCell (e.g., PCell). The first TAG may be a first PTAG. The second TAG may be a second PTAG. The first time alignment timer of the first PTAG (or the first TAG) may be running. The second time alignment timer of the second PTAG (or the second TAG) may be stopped/expired (or may not be running).

The wireless device may keep transmitting (or performing) first uplink transmissions via/on at least one cell. The one or more cells may comprise the at least one cell. One or more TAGs that are different from the second TAG may comprise the at least one cell. Each TAG of the one or more TAGs may comprise respective cell(s) of the at least one cell. The at least one cell may comprise the second cell. The plurality of TAGs may comprise the one or more TAGs. In an example, the one or more TAGs may comprise the first TAG. In an example, the one or more TAGs may be the first TAG. In an example, the one or more TAGs may not comprise the second TAG. The wireless device may keep transmitting (or performing) the first uplink transmissions via/on the at least one cell, for example, based on the first time alignment timer of the first PTAG running. The wireless device may keep transmitting (or performing) the first uplink transmissions via/on the at least one cell, for example, based on the first time alignment timer of the first PTAG running, regardless of the second time alignment timer of the second PTAG being stopped/expired (or not running).

The one or more configuration parameters may indicate, for the one or more TAGs, one or more time alignment timers. The one or more configuration parameters may indicate, for each TAG of the one or more TAGs, a respective time alignment timer of the one or more time alignment timers. The one or more time alignment timers may comprise the first time alignment timer of the first PTAG (or the first TAG). The one or more time alignment timers may not comprise the second time alignment timer of the second PTAG (or the second TAG). The one or more time alignment timers may be running. Each time alignment timer of the one or more time alignment timers may be running. The wireless device may keep transmitting (or performing) the first uplink transmissions via/on the at least one cell, for example, based on the one or more time alignment timers being running.

In an example, the first time alignment timer of the first TAG may be stopped/expired (or may not be running). The second time alignment timer of the second TAG may be stopped/expired (or may not be running).

The first TAG may comprise the second cell. The second TAG that is different from the first TAG may comprise the second cell. The second cell may belong to the first TAG and the second TAG. The one or more configuration parameters may indicate, for the second cell, the first TAG. The one or more configuration parameters may indicate, for the second cell, the second TAG.

The wireless device may stop/abort (or may not perform) any uplink transmission, via/on the second cell, for example, based on the first time alignment timer of the first TAG and the second time alignment timer of the second TAG being stopped/expired (or not running). The wireless device may stop/abort (or may not perform) any uplink transmission, via/on the second cell, associated with the first TAG or the second TAG, for example, based on the first time alignment timer of the first TAG and the second time alignment timer of the second TAG being stopped/expired (or not running).

The wireless device may stop/abort (or may not perform) any uplink transmission (except a random access preamble transmission and MSGA transmission), via/on the second cell, associated with the first TAG or the second TAG, for example, based on the first time alignment timer of the first TAG and the second time alignment timer of the second TAG being stopped/expired (or not running). The wireless device may stop/abort any uplink transmission, via/on the second cell, associated with the first coreset pool index (e.g., CoresetPoolIndex=0) or the second coreset pool index (e.g., CoresetPoolIndex=1), for example, based on the first time alignment timer of the first TAG and the second time alignment timer of the second TAG being stopped/expired (or not running). The wireless device may stop/abort any uplink transmission, via/on the second cell, associated with the first SRS resource set or the second SRS resource set, for example, based on the first time alignment timer of the first TAG and the second time alignment timer of the second TAG being stopped/expired (or not running). The wireless device may stop/abort any uplink transmission, via/on the second cell, associated with the first TCI state that is associated with the PCI of the cell or the second TCI state associated with the second PCI different from the PCI of the cell, for example, based on the first time alignment timer of the first TAG and the second time alignment timer of the second TAG being stopped/expired (or not running).

In an example, the second cell may be an SpCell (e.g., PCell). The first TAG may be a first PTAG. The second TAG may be a second PTAG. The first time alignment timer of the first PTAG (or the first TAG) may be stopped/expired (or may not be running). The second time alignment timer of the second PTAG (or the second TAG) may be stopped/expired (or may not be running).

The wireless device may stop/abort (not perform) uplink transmissions via the one or more cells. The wireless device may stop/abort (not perform) uplink transmissions via each cell of the one or more cells. The wireless device may stop/abort (not perform) the uplink transmissions via the one or more cells, for example, based on the first time alignment timer of the first PTAG and the second time alignment timer of the second PTAG being stopped/expired (or not running). The wireless device may stop/abort (not perform) the uplink transmissions via the one or more cells, for example, based on the first TAG being the first PTAG and the second TAG being the second PTAG. The wireless device may stop/abort the uplink transmissions via the one or more cells, for example, based on both of the first time alignment timer of the first PTAG and the second time alignment timer of the second PTAG being stopped/expired (or not running).

The wireless device may stop/abort (not perform) any uplink transmission via the one or more cells. The wireless device may stop/abort (not perform) any uplink transmission (except random-access preamble transmission and MSGA transmission on the first cell (or the SpCell)) via the one or more cells The wireless device may stop/abort (not perform) any uplink transmission via each cell of the one or more cells. The wireless device may stop/abort (not perform) any uplink transmission via the one or more cells, for example, based on the first time alignment timer of the first PTAG and the second time alignment timer of the second PTAG being stopped/expired (or not running). The wireless device may stop/abort (not perform) any uplink transmission via the one or more cells, for example, based on the first TAG being the first PTAG and the second TAG being the second PTAG.

In an example, the wireless device may not expect to be configured with different coreset pool indexes for cells in the same TAG. The base station may not configure, by the one or more configuration parameters, the cells, of the wireless device, in the same TAG with different coreset pool indexes.

For example, the first TAG (e.g., TAG 0 in FIG. 18) may comprise one or more first cells (e.g., Cell 1 and Cell 2 in FIG. 18). The one or more cells may comprise the one or more first cells. The one or more first cells may comprise a first cell (e.g., Cell 1). The one or more first cells may comprise a second cell (e.g., Cell 2). First uplink transmissions, via the first cell, associated with the first coreset pool index (e.g., CoresetPoolIndex=0) may be associated with the first TAG. Uplink transmissions, via the first cell, associated with the second coreset pool index (e.g., CoresetPoolIndex=1) may not be associated with the first TAG. Second uplink transmissions, via the second cell, associated with the first coreset pool index (e.g., CoresetPoolIndex=0) may be associated with the first TAG. Uplink transmissions, via the second cell, associated with the second coreset pool index (e.g., CoresetPoolIndex=1) may not be associated with the first TAG.

The one or more configuration parameters may indicate, for the first cell and the second cell in the first TAG (e.g., in the same TAG), the same coreset pool index.

For example, the base station may determine to transmit the one or more messages comprising the one or more configuration parameters. The one or more configuration parameters may indicate, for a first cell, a first TAG of the plurality of TAGs. The one or more configuration parameters may indicate, for a second cell, a second TAG of the plurality of TAGs. The one or more cells may comprise the first cell and the second cell. The first TAG may be associated with a first coreset pool index. The second TAG may be associated with a second coreset pool index.

In an example, the first TAG of the first cell and the second TAG of the second cell may be the same. A first TAG index of the first TAG and a second TAG index of the second TAG may be the same. Based on the first TAG of the first cell and the second TAG of the second cell being the same, the one or more configuration parameters may indicate the same value for the first coreset pool index and the second coreset pool index. Based on the first TAG of the first cell and the second TAG of the second cell being the same, the base station may set, in the one or more configuration parameters, the first coreset pool index and the second coreset pool index to a same value. The base station may transmit the one or more messages comprising the one or more configuration parameters, for example, after setting the first coreset pool index and the second coreset pool index to the same value.

In an example, the first TAG of the first cell and the second TAG of the second cell may be different. A first TAG index of the first TAG and a second TAG index of the second TAG may be different. Based on the first TAG of the first cell and the second TAG of the second cell being different, the one or more configuration parameters may or may not indicate the same value for the first coreset pool index and the second coreset pool index. Based on the first TAG of the first cell and the second TAG of the second cell being different, the base station may set, in the one or more configuration parameters, the first coreset pool index and the second coreset pool index to a same value or different values. The base station may transmit the one or more messages comprising the one or more configuration parameters, for example, after setting the first coreset pool index and the second coreset pool index to the same value or the different values.

The one or more configuration parameters may indicate, for the first TAG, the first TAG index. The one or more configuration parameters may indicate, for the second TAG, the second TAG index.

In an example, the wireless device may not expect to be configured with different indexes (e.g., coreset pool indexes, SRS resource sets, PCIs) for cells in the same TAG. The base station may not configure, by the one or more configuration parameters, the cells, of the wireless device, in the same TAG with different indexes.

For example, the first TAG (e.g., TAG 0 in FIG. 18) may comprise one or more first cells (e.g., Cell 1 and Cell 2 in FIG. 18). The one or more cells may comprise the one or more first cells. The one or more first cells may comprise a first cell (e.g., Cell 1). The one or more first cells may comprise a second cell (e.g., Cell 2).

First uplink transmissions, via the first cell, associated with the first SRS resource set may be associated with the first TAG. Uplink transmissions, via the first cell, associated with the second SRS resource set may not be associated with the first TAG. Second uplink transmissions, via the second cell, associated with the first SRS resource set may be associated with the first TAG. Uplink transmissions, via the second cell, associated with the second SRS resource set may not be associated with the first TAG.

First uplink transmissions, via the first cell, associated with a first PCI of the first cell m ay be associated with the first TAG. Uplink transmissions, via the first cell, associated with a second PCI different from the first PCI of the first cell set may not be associated with the first TAG. Second uplink transmissions, via the second cell, associated with a second PCI of the second cell set may be associated with the first TAG. Uplink transmissions, via the second cell, associated with a first PCI different from the second PCI of the second cell may not be associated with the first TAG.

The one or more configuration parameters may indicate, for the first cell and the second cell in the first TAG (e.g., in the same TAG), the same SRS resource set indicators.

For example, the base station may determine to transmit the one or more messages comprising the one or more configuration parameters. The one or more configuration parameters may indicate, for a first cell, a first TAG of the plurality of TAGs. The one or more configuration parameters may indicate, for a second cell, a second TAG of the plurality of TAGs. The one or more cells may comprise the first cell and the second cell.

The first TAG may be associated with a first SRS resource set. The second TAG may be associated with a second SRS resource set.

In an example, the first TAG of the first cell and the second TAG of the second cell may be the same. A first TAG index of the first TAG and a second TAG index of the second TAG may be the same. Based on the first TAG of the first cell and the second TAG of the second cell being the same, the one or more configuration parameters may indicate the same value for the first SRS resource set and the second SRS resource set. Based on the first TAG of the first cell and the second TAG of the second cell being the same, the base station may set, in the one or more configuration parameters, the first SRS resource set and the second SRS resource set to a same value. The base station may transmit the one or more messages comprising the one or more configuration parameters, for example, after setting the first SRS resource set and the second SRS resource set to the same value.

In an example, the first TAG of the first cell and the second TAG of the second cell may be different. A first TAG index of the first TAG and a second TAG index of the second TAG may be different. Based on the first TAG of the first cell and the second TAG of the second cell being different, the one or more configuration parameters may or may not indicate the same value for the first SRS resource set and the second SRS resource set. Based on the first TAG of the first cell and the second TAG of the second cell being different, the base station may set, in the one or more configuration parameters, the first SRS resource set and the second SRS resource set to a same value or different values. The base station may transmit the one or more messages comprising the one or more configuration parameters, for example, after setting the first SRS resource set and the second SRS resource set to the same value or the different values.

The first TAG may be associated with a first PCI. The second TAG may be associated with a second PCI.

In an example, the first TAG of the first cell and the second TAG of the second cell may be the same. A first TAG index of the first TAG and a second TAG index of the second TAG may be the same. Based on the first TAG of the first cell and the second TAG of the second cell being the same, the one or more configuration parameters may indicate the same value for the first PCI and the second PCI. Based on the first TAG of the first cell and the second TAG of the second cell being the same, the base station may set, in the one or more configuration parameters, the first PCI and the second PCI to a same value. The base station may transmit the one or more messages comprising the one or more configuration parameters, for example, after setting the first PCI and the second PCI to the same value.

In an example, the first TAG of the first cell and the second TAG of the second cell may be different. A first TAG index of the first TAG and a second TAG index of the second TAG may be different. Based on the first TAG of the first cell and the second TAG of the second cell being different, the one or more configuration parameters may or may not indicate the same value for the first PCI and the second PCI. Based on the first TAG of the first cell and the second TAG of the second cell being different, the base station may set, in the one or more configuration parameters, the first PCI and the second PCI to a same value or different values. The base station may transmit the one or more messages comprising the one or more configuration parameters, for example, after setting the first PCI and the second PCI to the same value or the different values.

The one or more configuration parameters may indicate, for the first TAG, the first TAG index. The one or more configuration parameters may indicate, for the second TAG, the second TAG index.

In an example, the cell may be associated with the at least two TAGs (e.g., TAG 0 and TAG 2 for Cell 2 in FIG. 18).

The first TAG of the at least two TAGs may comprise one or more first cells (e.g., Cell 1 and Cell 2 in TAG 0 in FIG. 18). The second TAG of the at least two TAGs may comprise one or more second cells (e.g., Cell 2 and Cell 5 in TAG 2 in FIG. 18).

The one or more first cells may comprise the cell. The one or more first cells may comprise one or more third cells different from the cell. The one or more third cells may not comprise the cell. Each cell of the one or more third cells may be different from the cell. The one or more first cells may comprise the cell and the one or more third cells. For example, in FIG. 18, for the TAG 0, the cell is the Cell 2, and the one or more third cells are the Cell 1.

The one or more configuration parameters may indicate, for the one or more first cells, one or more first subcarrier spacings. The one or more configuration parameters may indicate, for each cell of the one or more first cells, a respective subcarrier spacing of the one or more first subcarrier spacings. The one or more configuration parameters may indicate, for active BWP(s) of the one or more first cells, the one or more first subcarrier spacings. The active BWP(s) may be, for example, active uplink BWP(s). The active BWP(s) may be, for example, active downlink BWP(s). The one or more configuration parameters may indicate, for the cell, a subcarrier spacing of the one or more first subcarrier spacings. For example, in FIG. 18, for the TAG 0, the one or more configuration parameters may indicate, for the Cell 1 (or for an active BWP of the Cell 1), a first subcarrier spacing. The one or more configuration parameters may indicate, for the Cell 2 (or for an active BWP of the Cell 2), a second subcarrier spacing.

The one or more configuration parameters may indicate, for the one or more third cells, one or more third subcarrier spacings. The one or more configuration parameters may indicate, for each cell of the one or more third cells, a respective subcarrier spacing of the one or more third subcarrier spacings. The one or more configuration parameters may indicate, for active BWP(s) of the one or more third cells, the one or more third subcarrier spacings. The active BWP(s) may be, for example, active uplink BWP(s). The active BWP(s) may be, for example, active downlink BWP(s). For example, in FIG. 18, for the TAG 0, the one or more configuration parameters may indicate, for the Cell 1 (or for an active BWP of the Cell 1), a first subcarrier spacing. The one or more third cells are the Cell 1 in FIG. 18.

The one or more second cells may comprise the cell. The one or more second cells may comprise one or more fourth cells different from the cell. The one or more fourth cells may not comprise the cell. Each cell of the one or more fourth cells may be different from the cell. The one or more second cells may comprise the cell and the one or more fourth cells. For example, in FIG. 18, for the TAG 2, the cell is the Cell 2, and the one or more fourth cells are the Cell 5.

The one or more configuration parameters may indicate, for the one or more second cells, one or more second subcarrier spacings. The one or more configuration parameters may indicate, for each cell of the one or more second cells, a respective subcarrier spacing of the one or more second subcarrier spacings. The one or more configuration parameters may indicate, for the cell, a subcarrier spacing of the one or more second subcarrier spacings The one or more configuration parameters may indicate, for active BWP(s) of the one or more second cells, the one or more second subcarrier spacings. The active BWP(s) may be, for example, active uplink BWP(s). The active BWP(s) may be, for example, active downlink BWP(s). For example, in FIG. 18, for the TAG 2, the one or more configuration parameters may indicate, for the Cell 5 (or for an active BWP of the Cell 5), a first subcarrier spacing. The one or more configuration parameters may indicate, for the Cell 2 (or for an active BWP of the Cell 2), a second subcarrier spacing.

The one or more configuration parameters may indicate, for the one or more fourth cells, one or more fourth subcarrier spacings. The one or more configuration parameters may indicate, for each cell of the one or more fourth cells, a respective subcarrier spacing of the one or more fourth subcarrier spacings. The one or more configuration parameters may indicate, for active BWP(s) of the one or more fourth cells, the one or more fourth subcarrier spacings. The active BWP(s) may be, for example, active uplink BWP(s). The active BWP(s) may be, for example, active downlink BWP(s). For example, in FIG. 18, for the TAG 2, the one or more configuration parameters may indicate, for the Cell 5 (or for an active BWP of the Cell 5), a first subcarrier spacing. The one or more fourth cells are the Cell 5 in FIG. 18.

The wireless device may receive a first control command (e.g., a random access response or an absolute timing advance command MAC CE or a timing advance command MAC CE). The first control command may comprise/indicate a first timing advance command. For example, the first control command may comprise a field indicating the first TAG. The wireless device may determine/calculate/compute a first timing advance value, for example, based on the first timing advance command. The wireless device may apply the first timing advance value (or the first timing advance command) at a first time (e.g., time slot, symbol, mini-slot, and the like). The wireless device may start applying the first timing advance value (or the first timing advance command) at the first time. The wireless device may apply the first timing advance value (or the first timing advance command) starting at/from the first time. The wireless device may transmit an uplink signal based on the first timing advance value, for example, starting from/at the first time. The wireless device may transmit, via a first cell in the first TAG, an uplink signal based on the first timing advance value, for example, starting from/at the first time. The one or more first cells may comprise the first cell.

The wireless device may receive a second control command (e.g., a random access response or an absolute timing advance command MAC CE or a timing advance command MAC CE). The second control command may comprise/indicate a second timing advance command. For example, the second control command may comprise a field indicating the second TAG. The wireless device may determine/calculate/compute a second timing advance value, for example, based on the second timing advance command. The wireless device may apply the second timing advance value (or the second timing advance command) at a second time (e.g., time slot, symbol, mini-slot, and the like). The wireless device may start applying the second timing advance value (or the second timing advance command) at the second time.

The wireless device may apply the second timing advance value (or the second timing advance command) starting at/from the second time. The wireless device may transmit an uplink signal based on the second timing advance value, for example, starting from/at the second time. The wireless device may transmit, via a second cell in the second TAG, an uplink signal based on the second timing advance value, for example, starting from/at the second time. The one or more second cells may comprise the second cell.

In an example, the one or more configuration parameters may indicate, for an active BWP of the cell, two coreset pool indexes. The one or more configuration parameters may indicate, for the active BWP of the cell, a first coreset pool index (e.g., CoresetPoolIndex=0) and a second coreset pool index (e.g., CoresetPoolIndex=1). The active BWP may be/comprise, for example, an active uplink BWP of the cell. The active uplink BWP may comprise one or more first uplink resources (e.g., PUCCH/PUSCH/SRS resources) with the first coreset pool index and one or more second uplink resources (e.g., PUCCH/PUSCH/SRS resources) with the second coreset pool index. The active BWP may be/comprise, for example, an active downlink BWP of the cell. The active downlink BWP may comprise one or more first coresets with the first coreset pool index and one or more second coresets with the second coreset pool index.

In an example, the one or more configuration parameters may indicate, for an active BWP of the cell, the at least two SRS resource sets.

The wireless device may determine/calculate/compute the first timing advance value, for example, based on the one or more first subcarrier spacings. The wireless device may determine/calculate/compute the first timing advance value, for example, based on each subcarrier spacing of the one or more first subcarrier spacings. The wireless device may determine/calculate/compute the first timing advance value, for example, based on a maximum/largest subcarrier spacing among the one or more first subcarrier spacings. The wireless device may determine/calculate/compute the first timing advance value, for example, based on a minimum/smallest subcarrier spacing among the one or more first subcarrier spacings. The wireless device may determine/calculate/compute the first timing advance value based on the one or more first subcarrier spacings, for example, in response to the one or more configuration parameters indicating, for the active BWP of the cell, the two coreset pool indexes. The wireless device may determine/calculate/compute the first timing advance value based on the one or more first subcarrier spacings, for example, in response to the one or more configuration parameters indicating, for the active BWP of the cell, the at least two SRS resource sets. The wireless device may determine/calculate/compute the first timing advance value based on the one or more first subcarrier spacings, for example, in response to the DCI indicating the at least two TCI states comprising the first TCI state associated with the PCI of the cell and the second TCI state associated with the second PCI different from the PCI of the cell. For example, in FIG. 18, for the TAG 0, the wireless device may determine/calculate/compute the first timing advance value based on the first subcarrier spacing of the Cell 1 (or of an active BWP of the Cell 1) and the second subcarrier spacing of the Cell 2 (or of an active BWP of the Cell 2).

The wireless device may determine/calculate/compute the second timing advance value, for example, based on the one or more second subcarrier spacings. The wireless device may determine/calculate/compute the second timing advance value, for example, based on each subcarrier spacing of the one or more second subcarrier spacings. The wireless device may determine/calculate/compute the second timing advance value, for example, based on a maximum/largest subcarrier spacing among the one or more second subcarrier spacings. The wireless device may determine/calculate/compute the second timing advance value, for example, based on a minimum/smallest subcarrier spacing among the one or more second subcarrier spacings. The wireless device may determine/calculate/compute the second timing advance value based on the one or more second subcarrier spacings, for example, in response to the one or more configuration parameters indicating, for the active BWP of the cell, the two coreset pool indexes. The wireless device may determine/calculate/compute the second timing advance value based on the one or more second subcarrier spacings, for example, in response to the one or more configuration parameters indicating, for the active BWP of the cell, the at least two SRS resource sets. The wireless device may determine/calculate/compute the second timing advance value based on the one or more second subcarrier spacings, for example, in response to the DCI indicating the at least two TCI states comprising the first TCI state associated with the PCI of the cell and the second TCI state associated with the second PCI different from the PCI of the cell. For example, in FIG. 18, for the TAG 2, the wireless device may determine/calculate/compute the second timing advance value based on the first subcarrier spacing of the Cell 5 (or of an active BWP of the Cell 5) and the second subcarrier spacing of the Cell 2 (or of an active BWP of the Cell 2).

The wireless device may determine/calculate/compute the first time to apply the first timing advance value (or the first timing advance command), for example, based on the one or more first subcarrier spacings. The wireless device may determine/calculate/compute the first time to apply the first timing advance value (or the first timing advance command), for example, based on each subcarrier spacing of the one or more first subcarrier spacings. The wireless device may determine/calculate/compute the first time to apply the first timing advance value (or the first timing advance command), for example, based on a maximum/largest subcarrier spacing among the one or more first subcarrier spacings. The wireless device may determine/calculate/compute the first time to apply the first timing advance value (or the first timing advance command), for example, based on a minimum/smallest subcarrier spacing among the one or more first subcarrier spacings. The wireless device may determine/calculate/compute the first time to apply the first timing advance value (or the first timing advance command) based on the one or more first subcarrier spacings, for example, in response to the one or more configuration parameters indicating, for the active BWP of the cell, the two coreset pool indexes. The wireless device may determine/calculate/compute the first time to apply the first timing advance value (or the first timing advance command) based on the one or more first subcarrier spacings, for example, in response to the one or more configuration parameters indicating, for the active BWP of the cell, the at least two SRS resource sets. The wireless device may determine/calculate/compute the first time to apply the first timing advance value (or the first timing advance command) based on the one or more first subcarrier spacings, for example, in response to the DCI indicating the at least two TCI states comprising the first TCI state associated with the PCI of the cell and the second TCI state associated with the second PCI different from the PCI of the cell. For example, in FIG. 18, for the TAG 0, the wireless device may determine/calculate/compute the first time to apply the first timing advance value (or the first timing advance command) based on the first subcarrier spacing of the Cell 1 (or of an active BWP of the Cell 1) and the second subcarrier spacing of the Cell 2 (or of an active BWP of the Cell 2).

The wireless device may determine/calculate/compute the second time to apply the second timing advance value (or the second timing advance command), for example, based on the one or more second subcarrier spacings. The wireless device may determine/calculate/compute the second time to apply the second timing advance value (or the second timing advance command), for example, based on each subcarrier spacing of the one or more second subcarrier spacings. The wireless device may determine/calculate/compute the second time to apply the second timing advance value (or the second timing advance command), for example, based on a maximum/largest subcarrier spacing among the one or more second subcarrier spacings. The wireless device may determine/calculate/compute the second time to apply the second timing advance value (or the second timing advance command), for example, based on a minimum/smallest subcarrier spacing among the one or more second subcarrier spacings. The wireless device may determine/calculate/compute the second time to apply the second timing advance value (or the second timing advance command) based on the one or more second subcarrier spacings, for example, in response to the one or more configuration parameters indicating, for the active BWP of the cell, the two coreset pool indexes. The wireless device may determine/calculate/compute the second time to apply the second timing advance value (or the second timing advance command) based on the one or more second subcarrier spacings, for example, in response to the one or more configuration parameters indicating, for the active BWP of the cell, the at least two SRS resource sets. The wireless device may determine/calculate/compute the second time to apply the second timing advance value (or the second timing advance command) based on the one or more second subcarrier spacings, for example, in response to the DCI indicating the at least two TCI states comprising the first TCI state associated with the PCI of the cell and the second TCI state associated with the second PCI different from the PCI of the cell. For example, in FIG. 18, for the TAG 2, the wireless device may determine/calculate/compute the second time to apply the second timing advance value (or the second timing advance command) based on the first subcarrier spacing of the Cell 5 (or of an active BWP of the Cell 5) and the second subcarrier spacing of the Cell 2 (or of an active BWP of the Cell 2).

In an example, the one or more configuration parameters may indicate, for an active BWP of the cell, a first coreset pool index (e.g., CoresetPoolIndex=0). In an example, the one or more configuration parameters may not indicate, for an active BWP of the cell, a coreset pool index. The first coreset pool index (e.g., CoresetPoolIndex=0) may be a default coreset pool index, for the active BWP, for example, based on the one or more configuration parameters not indicating, for the active BWP of the cell, a coreset pool index. The one or more configuration parameters may not indicate, for the active BWP of the cell, a second coreset pool index (e.g., CoresetPoolIndex=1). The active BWP may be/comprise, for example, an active uplink BWP of the cell. The active uplink BWP may comprise one or more first uplink resources (e.g., PUCCH/PUSCH/SRS resources) with the first coreset pool index. The active uplink BWP may not comprise one or more second uplink resources (e.g., PUCCH/PUSCH/SRS resources) with the second coreset pool index. The active BWP may be/comprise, for example, an active downlink BWP of the cell. The active downlink BWP may comprise one or more first coresets with the first coreset pool index. The active downlink BWP may not comprise one or more second coresets with the second coreset pool index.

In an example, the one or more configuration parameters may indicate, for an active BWP of the cell, a single SRS resource set (e.g., a first SRS resource set only). The active BWP may be, for example, an active uplink BWP. In an example, the one or more configuration parameters may not indicate, for an active BWP of the cell, two SRS resource sets (or more than one SRS resource set).

The wireless device may determine/calculate/compute the second timing advance value, for example, based on the one or more fourth subcarrier spacings. The wireless device may not determine/calculate/compute the second timing advance value, for example, based on the subcarrier spacing of the cell. The wireless device may determine/calculate/compute the second timing advance value, for example, based on each subcarrier spacing of the one or more fourth subcarrier spacings. The wireless device may determine/calculate/compute the second timing advance value, for example, based on a maximum/largest subcarrier spacing among the one or more fourth subcarrier spacings. The wireless device may determine/calculate/compute the second timing advance value, for example, based on a minimum/smallest subcarrier spacing among the one or more fourth subcarrier spacings. The wireless device may determine/calculate/compute the second timing advance value based on the one or more fourth subcarrier spacings, for example, in response to the one or more configuration parameters indicating, for the active BWP of the cell, the first coreset pool index. The wireless device may determine/calculate/compute the second timing advance value based on the one or more fourth subcarrier spacings, for example, in response to the one or more configuration parameters not indicating, for the active BWP of the cell, the second coreset pool index. The wireless device may determine/calculate/compute the second timing advance value based on the one or more fourth subcarrier spacings, for example, in response to the one or more configuration parameters not indicating, for the active BWP of the cell, a coreset pool index. The wireless device may determine/calculate/compute the second timing advance value based on the one or more fourth subcarrier spacings, for example, in response to the one or more configuration parameters indicating, for the active BWP of the cell, a single SRS resource set (or the first SRS resource set). The wireless device may determine/calculate/compute the second timing advance value based on the one or more fourth subcarrier spacings, for example, in response to a DCI indicating/activating a single TCI state (e.g., a first TCI state associated with the PCI of the cell) for the cell. For example, in FIG. 18, for the TAG 2, the wireless device may determine/calculate/compute the second timing advance value based on the first subcarrier spacing of the Cell 5 (or of an active BWP of the Cell 5). The wireless device may not determine/calculate/compute the second timing advance value based on the second subcarrier spacing of the Cell 2 (or of an active BWP of the Cell 2).

The wireless device may determine/calculate/compute the second time to apply the second timing advance value (or the second timing advance command), for example, based on the one or more fourth subcarrier spacings. The wireless device may not determine/calculate/compute the second time to apply the second timing advance value (or the second timing advance command), for example, based on the subcarrier spacing of the cell. The wireless device may determine/calculate/compute the second time to apply the second timing advance value (or the second timing advance command), for example, based on each subcarrier spacing of the one or more fourth subcarrier spacings. The wireless device may determine/calculate/compute the second time to apply the second timing advance value (or the second timing advance command), for example, based on a maximum/largest subcarrier spacing among the one or more fourth subcarrier spacings. The wireless device may determine/calculate/compute the second time to apply the second timing advance value (or the second timing advance command), for example, based on a minimum/smallest subcarrier spacing among the one or more fourth subcarrier spacings. The wireless device may determine/calculate/compute the second time to apply the second timing advance value (or the second timing advance command) based on the one or more fourth subcarrier spacings, for example, in response to the one or more configuration parameters indicating, for the active BWP of the cell, the first coreset pool index. The wireless device may determine/calculate/compute the second time to apply the second timing advance value (or the second timing advance command) based on the one or more fourth subcarrier spacings, for example, in response to the one or more configuration parameters not indicating, for the active BWP of the cell, the second coreset pool index. The wireless device may determine/calculate/compute the second time to apply the second timing advance value (or the second timing advance command) based on the one or more fourth subcarrier spacings, for example, in response to the one or more configuration parameters not indicating, for the active BWP of the cell, a coreset pool index. The wireless device may determine/calculate/compute the second time to apply the second timing advance value (or the second timing advance command) based on the one or more fourth subcarrier spacings, for example, in response to the one or more configuration parameters indicating, for the active BWP of the cell, a single SRS resource set (or the first SRS resource set). The wireless device may determine/calculate/compute the second time to apply the second timing advance value (or the second timing advance command) based on the one or more fourth subcarrier spacings, for example, in response to a DCI indicating/activating a single TCI state (e.g., a first TCI state associated with the PCI of the cell) for the cell. For example, in FIG. 18, for the TAG 2, the wireless device may determine/calculate/compute the second time to apply the second timing advance value (or the second timing advance command) based on the first subcarrier spacing of the Cell 5 (or of an active BWP of the Cell 5). The wireless device may not determine/calculate/compute the second timing advance value based on the second subcarrier spacing of the Cell 2 (or of an active BWP of the Cell 2).

In an example, the one or more configuration parameters may indicate, for an active BWP of the cell, a second coreset pool index (e.g., CoresetPoolIndex=1). The one or more configuration parameters may not indicate, for the active BWP of the cell, a first coreset pool index (e.g., CoresetPoolIndex=0). The active BWP may be/comprise, for example, an active uplink BWP of the cell. The active uplink BWP may comprise one or more second uplink resources (e.g., PUCCH/PUSCH/SRS resources) with the second coreset pool index. The active uplink BWP may not comprise one or more first uplink resources (e.g., PUCCH/PUSCH/SRS resources) with the first coreset pool index. The active BWP may be/comprise, for example, an active downlink BWP of the cell. The active downlink BWP may comprise one or more second coresets with the second coreset pool index. The active downlink BWP may not comprise one or more first coresets with the first coreset pool index.

In an example, the one or more configuration parameters may indicate, for an active BWP of the cell, a single SRS resource set (e.g., a second SRS resource set only). The active BWP may be, for example, an active uplink BWP. In an example, the one or more configuration parameters may not indicate, for an active BWP of the cell, two SRS resource sets (or more than one SRS resource set).

The wireless device may determine/calculate/compute the first timing advance value, for example, based on the one or more third subcarrier spacings. The wireless device may not determine/calculate/compute the first timing advance value, for example, based on the subcarrier spacing of the cell. The wireless device may determine/calculate/compute the first timing advance value, for example, based on each subcarrier spacing of the one or more third subcarrier spacings. The wireless device may determine/calculate/compute the first timing advance value, for example, based on a maximum/largest subcarrier spacing among the one or more third subcarrier spacings. The wireless device may determine/calculate/compute the first timing advance value, for example, based on a minimum/smallest subcarrier spacing among the one or more third subcarrier spacings. The wireless device may determine/calculate/compute the first timing advance value based on the one or more third subcarrier spacings, for example, in response to the one or more configuration parameters indicating, for the active BWP of the cell, the second coreset pool index. The wireless device may determine/calculate/compute the first timing advance value based on the one or more third subcarrier spacings, for example, in response to the one or more configuration parameters not indicating, for the active BWP of the cell, the first coreset pool index. The wireless device may determine/calculate/compute the first timing advance value based on the one or more third subcarrier spacings, for example, in response to the one or more configuration parameters indicating, for the active BWP of the cell, a single SRS resource set (or the second SRS resource set). The wireless device may determine/calculate/compute the first timing advance value based on the one or more third subcarrier spacings, for example, in response to a DCI indicating/activating a single TCI state (e.g., a second TCI state associated with a second PCI different from the PCI of the cell) for the cell. For example, in FIG. 18, for the TAG 0, the wireless device may determine/calculate/compute the first timing advance value based on the first subcarrier spacing of the Cell 1 (or of an active BWP of the Cell 1). The wireless device may not determine/calculate/compute the first timing advance value based on the second subcarrier spacing of the Cell 2 (or of an active BWP of the Cell 2).

The wireless device may determine/calculate/compute the first time to apply the first timing advance value (or the first timing advance command), for example, based on the one or more third subcarrier spacings. The wireless device may not determine/calculate/compute the first time to apply the first timing advance value (or the first timing advance command), for example, based on the subcarrier spacing of the cell. The wireless device may determine/calculate/compute the first time to apply the first timing advance value (or the first timing advance command), for example, based on each subcarrier spacing of the one or more third subcarrier spacings. The wireless device may determine/calculate/compute the first time to apply the first timing advance value (or the first timing advance command), for example, based on a maximum/largest subcarrier spacing among the one or more third subcarrier spacings. The wireless device may determine/calculate/compute the first time to apply the first timing advance value (or the first timing advance command), for example, based on a minimum/smallest subcarrier spacing among the one or more third subcarrier spacings. The wireless device may determine/calculate/compute the first time to apply the first timing advance value (or the first timing advance command) based on the one or more third subcarrier spacings, for example, in response to the one or more configuration parameters indicating, for the active BWP of the cell, the second coreset pool index. The wireless device may determine/calculate/compute the first time to apply the first timing advance value (or the first timing advance command) based on the one or more third subcarrier spacings, for example, in response to the one or more configuration parameters not indicating, for the active BWP of the cell, the first coreset pool index. The wireless device may determine/calculate/compute the first time to apply the first timing advance value (or the first timing advance command) based on the one or more third subcarrier spacings, for example, in response to the one or more configuration parameters indicating, for the active BWP of the cell, a single SRS resource set (or the second SRS resource set). The wireless device may determine/calculate/compute the first time to apply the first timing advance value (or the first timing advance command) based on the one or more third subcarrier spacings, for example, in response to a DCI indicating/activating a single TCI state (e.g., a second TCI state associated with a second PCI different from the PCI of the cell) for the cell. For example, in FIG. 18, for the TAG 0, the wireless device may determine/calculate/compute the first time to apply the first timing advance value (or the first timing advance command) based on the first subcarrier spacing of the Cell 1 (or of an active BWP of the Cell 1). The wireless device may not determine/calculate/compute the first timing advance value based on the second subcarrier spacing of the Cell 2 (or of an active BWP of the Cell 2).

What is claimed is:

1. A wireless device comprising:
one or more processors; and
memory storing instructions that, when executed by the one or more processors, cause the wireless device to:
receive one or more messages indicating at least two timing advance groups (TAGs) for a cell, wherein each TAG of the at least two TAGs is associated with a respective transmission configuration indicator (TCI) state;
receive downlink control information (DCI) indicating:
a semi-persistent scheduling (SPS) deactivation; and
an uplink resource of a hybrid automatic repeat request acknowledgement (HARQ-ACK) feedback;
indicate, to a physical layer of the wireless device, a positive acknowledgement for the SPS deactivation in response to a time alignment timer of a TAG, among the at least two TAGs and associated with a TCI state used for transmitting the HARQ-ACK feedback, being running; and
transmit, via the cell and based on the TCI state, the HARQ-ACK feedback comprising the positive acknowledgement.

2. The wireless device of claim 1, wherein the one or more messages are one or more radio resource control (RRC) messages.

3. The wireless device of claim 1, wherein the one or more messages further indicate one or more configured downlink assignments for SPS physical downlink shared channel (PDSCH) receptions.

4. The wireless device of claim 3, further comprising clearing the one or more configured downlink assignments for SPS PDSCH receptions based on the receiving the DCI indicating the SPS deactivation.

5. The wireless device of claim 1, wherein the HARQ-ACK feedback is transmitted based on a timing advance value associated with the TAG.

6. The wireless device of claim 1, wherein:
the time alignment timer of the TAG is a first time alignment timer of a first TAG of the at least two TAGs; and
the indicating the positive acknowledgement to the physical layer is:
in response to the first time alignment timer of the first TAG being running; and
regardless of whether a second time alignment timer of a second TAG of the at least two TAGs is running or not running.

7. The wireless device of claim 1, wherein the one or more messages indicate:
a first control resource set (coreset) pool index for one or more first coresets of the cell; and
a second coreset pool index for one or more second coresets of the cell.

8. A method comprising:
receiving, by a wireless device, one or more messages indicating at least two timing advance groups (TAGs) for a cell, wherein each TAG of the at least two TAGs is associated with a respective transmission configuration indicator (TCI) state;
receiving downlink control information (DCI) indicating:
a semi-persistent scheduling (SPS) deactivation; and
an uplink resource of a hybrid automatic repeat request acknowledgement (HARQ-ACK) feedback;
indicating, to a physical layer of the wireless device, a positive acknowledgement for the SPS deactivation in response to a time alignment timer of a TAG, among the at least two TAGs and associated with a TCI state used for transmitting the HARQ-ACK feedback, being running; and
transmitting, via the cell and based on the TCI state, the HARQ-ACK feedback comprising the positive acknowledgement.

9. The method of claim 8, wherein the one or more messages are one or more radio resource control (RRC) messages.

10. The method of claim 8, wherein the one or more messages further indicate one or more configured downlink assignments for SPS physical downlink shared channel (PDSCH) receptions.

11. The method of claim 10, further comprising clearing the one or more configured downlink assignments for SPS PDSCH receptions based on the receiving the DCI indicating the SPS deactivation.

12. The method of claim 8, wherein the HARQ-ACK feedback is transmitted based on a timing advance value associated with the TAG.

13. The method of claim 8, wherein:
the time alignment timer of the TAG is a first time alignment timer of a first TAG of the at least two TAGs; and
the indicating the positive acknowledgement to the physical layer is:

in response to the first time alignment timer of the first TAG being running; and regardless of whether a second time alignment timer of a second TAG of the at least two TAGs is running or not running.

14. The method of claim 8, wherein the one or more messages indicate:
   a first control resource set (coreset) pool index for one or more first coresets of the cell; and
   a second coreset pool index for one or more second coresets of the cell.

15. A non-transitory computer-readable medium comprising instructions that, when executed by one or more processors of a wireless device, cause the wireless device to:
   receive one or more messages indicating at least two timing advance groups (TAGs) for a cell, wherein each TAG of the at least two TAGs is associated with a respective transmission configuration indicator (TCI) state;
   receive downlink control information (DCI) indicating:
      a semi-persistent scheduling (SPS) deactivation; and
      an uplink resource of a hybrid automatic repeat request acknowledgement (HARQ-ACK) feedback;
   indicate, to a physical layer of the wireless device, a positive acknowledgement for the SPS deactivation in response to a time alignment timer of a TAG, among the at least two TAGs and associated with a TCI state used for transmitting the HARQ-ACK feedback, being running; and
   transmit, via the cell and based on the TCI state, the HARQ-ACK feedback comprising the positive acknowledgement.

16. The non-transitory computer-readable medium of claim 15, wherein the one or more messages are one or more radio resource control (RRC) messages.

17. The non-transitory computer-readable medium of claim 15, wherein the one or more messages further indicate one or more configured downlink assignments for SPS physical downlink shared channel (PDSCH) receptions.

18. The non-transitory computer-readable medium of claim 15, wherein the HARQ-ACK feedback is transmitted based on a timing advance value associated with the TAG.

19. The non-transitory computer-readable medium of claim 15, wherein:
   the time alignment timer of the TAG is a first time alignment timer of a first TAG of the at least two TAGs; and
   the indicating the positive acknowledgement to the physical layer is:
      in response to the first time alignment timer of the first TAG being running; and
      regardless of whether a second time alignment timer of a second TAG of the at least two TAGs is running or not running.

20. The non-transitory computer-readable medium of claim 15, wherein the one or more messages indicate:
   a first control resource set (coreset) pool index for one or more first coresets of the cell; and
   a second coreset pool index for one or more second coresets of the cell.

* * * * *